(12) United States Patent
Wolinsky et al.

(10) Patent No.: US 7,912,759 B2
(45) Date of Patent: Mar. 22, 2011

(54) METHOD FOR PROVIDING A RETAILER WITH OUT-OF-HOME ADVERTISING CAPABILITIES

(75) Inventors: Robert I. Wolinsky, Fairfield, CT (US); Martin A. Amadio, Virginia Beach, VA (US); Peter Goldring, Edgewater, NJ (US); Stanley Kirshenbaum, Great Neck, NY (US)

(73) Assignee: Automated Media Services, Inc., Allendale, NJ (US)

( * ) Notice: Subject to any disclaimer, the term of this patent is extended or adjusted under 35 U.S.C. 154(b) by 0 days.

(21) Appl. No.: 12/776,147

(22) Filed: May 7, 2010

(65) Prior Publication Data
US 2010/0280907 A1 Nov. 4, 2010

Related U.S. Application Data

(60) Division of application No. 11/600,498, filed on Nov. 16, 2006, now Pat. No. 7,742,950, which is a continuation of application No. 10/277,218, filed on Oct. 17, 2002, now abandoned.

(60) Provisional application No. 60/330,224, filed on Oct. 17, 2001, provisional application No. 60/341,626, filed on Dec. 17, 2001.

(51) Int. Cl.
*G06Q 30/00* (2006.01)
(52) U.S. Cl. ............................................. 705/26
(58) Field of Classification Search .............. 705/26, 705/27
See application file for complete search history.

(56) References Cited

U.S. PATENT DOCUMENTS

| | | | |
|---|---|---|---|
| 2,626,301 | A | 1/1953 | Hammerly |
| 2,969,438 | A | 1/1961 | Hermann et al. |
| 3,159,937 | A | 12/1964 | Barnes |
| 3,210,716 | A | 10/1965 | Meacham |
| 3,504,172 | A | 3/1970 | Liberman |
| 3,680,030 | A | 7/1972 | Johnson |
| 4,245,874 | A | 1/1981 | Bishop |
| 4,472,707 | A | 9/1984 | Wilensky et al. |
| 4,489,995 | A | 12/1984 | Barr |
| 4,747,025 | A | 5/1988 | Barton |
| 4,775,857 | A | 10/1988 | Staggs |

(Continued)

FOREIGN PATENT DOCUMENTS
BE 1011839 2/2000

(Continued)

OTHER PUBLICATIONS

"A Captive View," The Delaney Report, Mar. 2001.

(Continued)

*Primary Examiner* — Mila Airapetian
(74) *Attorney, Agent, or Firm* — SNR Denton US LLP

(57) ABSTRACT

A system and method for providing a subscription-based, electronic signage advertisement service to retailers may include establishing a retailer as a subscriber for use of an electronic display. A subscription agreement may enable the retailer to use the electronic display and receive communications services for content to be distributed to the electronic display. The electronic display may be provided to the retailer and configured to receive and display the content by configuring the electronic display as a network node for content to be distributed. The content may be stored in a data repository and distributed to the electronic display at the retailer. The content may be distributed via a communications network to the electronic display and displayed at the retailer.

10 Claims, 50 Drawing Sheets

U.S. PATENT DOCUMENTS

| | | |
|---|---|---|
| 4,887,401 A | 12/1989 | Gioscia |
| 4,891,922 A | 1/1990 | Hozer et al. |
| 4,907,137 A | 3/1990 | Schladitz et al. |
| 4,916,731 A | 4/1990 | Brisson et al. |
| 4,961,533 A | 10/1990 | Teller et al. |
| 5,061,997 A | 10/1991 | Rea et al. |
| 5,070,666 A | 12/1991 | Looman |
| 5,172,314 A | 12/1992 | Poland et al. |
| 5,241,467 A | 8/1993 | Failing et al. |
| 5,245,534 A | 9/1993 | Waterhouse et al. |
| 5,309,174 A | 5/1994 | Minkus |
| 5,321,579 A | 6/1994 | Brown et al. |
| 5,348,485 A | 9/1994 | Briechle et al. |
| 5,374,815 A | 12/1994 | Waterhouse et al. |
| 5,412,416 A | 5/1995 | Nemirofsky |
| 5,418,328 A | 5/1995 | Nadeau et al. |
| 5,420,606 A | 5/1995 | Begum et al. |
| 5,448,226 A | 9/1995 | Failing, Jr. et al. |
| 5,461,561 A | 10/1995 | Ackerman et al. |
| 5,467,474 A | 11/1995 | Ackerman et al. |
| 5,473,832 A | 12/1995 | Briechle et al. |
| 5,532,465 A | 7/1996 | Waterhouse et al. |
| 5,543,856 A | 8/1996 | Rosser et al. |
| 5,553,412 A | 9/1996 | Briechle et al. |
| 5,555,405 A | 9/1996 | Griesmer et al. |
| 5,566,353 A | 10/1996 | Cho et al. |
| 5,572,653 A | 11/1996 | De Temple et al. |
| 5,583,487 A | 12/1996 | Ackerman et al. |
| 5,632,010 A | 5/1997 | Briechle et al. |
| 5,636,750 A | 6/1997 | Heyl |
| 5,642,484 A | 6/1997 | Harrison, III et al. |
| 5,652,845 A | 7/1997 | Arai et al. |
| 5,670,743 A | 9/1997 | Welch et al. |
| 5,673,037 A | 9/1997 | Cesar et al. |
| 5,687,499 A | 11/1997 | Brnjac et al. |
| 5,703,564 A | 12/1997 | Begum et al. |
| 5,704,049 A | 12/1997 | Briechle |
| 5,734,823 A | 3/1998 | Saigh et al. |
| 5,736,967 A | 4/1998 | Kayser et al. |
| 5,739,809 A | 4/1998 | McLauglin et al. |
| 5,758,064 A | 5/1998 | Zimmerman et al. |
| 5,761,601 A | 6/1998 | Nemirofsky et al. |
| 5,797,132 A | 8/1998 | Altwasser |
| 5,812,985 A | 9/1998 | Failing et al. |
| 5,818,346 A | 10/1998 | Goodwin, III et al. |
| 5,828,318 A | 10/1998 | Cesar |
| 5,864,325 A | 1/1999 | Briechle et al. |
| 5,887,147 A | 3/1999 | Arai et al. |
| 5,930,771 A | 7/1999 | Stapp |
| 5,955,710 A | 9/1999 | DiFranza |
| 5,963,133 A | 10/1999 | Monjo |
| 5,977,998 A | 11/1999 | Briechle et al. |
| 5,983,069 A | 11/1999 | Cho et al. |
| 5,999,912 A | 12/1999 | Wodarz et al. |
| 6,016,481 A | 1/2000 | Failing, Jr. et al. |
| 6,038,545 A | 3/2000 | Mandeberg et al. |
| 6,038,594 A | 3/2000 | Puente et al. |
| 6,046,682 A | 4/2000 | Zimmerman et al. |
| 6,060,993 A | 5/2000 | Cohen |
| 6,061,039 A | 5/2000 | Ryan et al. |
| 6,075,576 A | 6/2000 | Tan et al. |
| 6,076,071 A | 6/2000 | Freeny, Jr. |
| 6,082,500 A | 7/2000 | Amo et al. |
| 6,107,936 A | 8/2000 | Zimmerman |
| 6,108,042 A | 8/2000 | Adams et al. |
| 6,108,367 A | 8/2000 | Herman et al. |
| 6,108,637 A | 8/2000 | Blumenau |
| 6,112,232 A | 8/2000 | Shahar et al. |
| 6,130,603 A | 10/2000 | Briechle |
| 6,142,322 A | 11/2000 | Smith et al. |
| 6,144,944 A | 11/2000 | Kurtzman, II et al. |
| 6,146,158 A | 11/2000 | Peratoner et al. |
| 6,148,291 A | 11/2000 | Radican |
| 6,160,477 A | 12/2000 | Sandelman et al. |
| 6,173,317 B1 | 1/2001 | Chaddha et al. |
| 6,181,299 B1 | 1/2001 | Frederick et al. |
| 6,199,705 B1 | 3/2001 | Portner |
| 6,202,334 B1 | 3/2001 | Reynolds et al. |
| 6,208,977 B1 | 3/2001 | Hernandez et al. |
| 6,215,411 B1 | 4/2001 | Gothard |
| 6,233,536 B1 | 5/2001 | Zale et al. |
| 6,236,330 B1 | 5/2001 | Cohen |
| 6,236,335 B1 | 5/2001 | Goodwin, III |
| 6,247,090 B1 | 6/2001 | Arai et al. |
| 6,263,440 B1 | 7/2001 | Pruett et al. |
| 6,279,278 B1 | 8/2001 | Morris et al. |
| 6,288,688 B1 | 9/2001 | Hughes et al. |
| 6,292,827 B1 | 9/2001 | Raz |
| 6,300,980 B1 | 10/2001 | McGraw et al. |
| 6,311,213 B2 | 10/2001 | Dawson et al. |
| 6,311,308 B1 | 10/2001 | Adamec |
| 6,330,976 B1 | 12/2001 | Dymetman et al. |
| 6,340,958 B1 | 1/2002 | Cantu et al. |
| 6,351,776 B1 | 2/2002 | O'Brien et al. |
| 6,366,914 B1 | 4/2002 | Stern |
| 6,377,938 B1 | 4/2002 | Block et al. |
| 6,381,626 B1 | 4/2002 | De Leo et al. |
| 6,384,736 B1 | 5/2002 | Gothard |
| 6,388,716 B1 | 5/2002 | Tsuzuki et al. |
| 6,408,278 B1 | 6/2002 | Carney et al. |
| 6,424,998 B2 | 7/2002 | Hunter |
| 6,438,368 B1 | 8/2002 | Phillips et al. |
| 6,438,882 B1 | 8/2002 | Reynolds |
| 6,487,457 B1 | 11/2002 | Hull et al. |
| 6,502,076 B1 | 12/2002 | Smith |
| 6,535,119 B1 | 3/2003 | Haulk et al. |
| 6,539,429 B2 | 3/2003 | Rakavy et al. |
| 6,570,492 B1 | 5/2003 | Peratoner |
| 6,594,311 B1 | 7/2003 | Pearlstein |
| 6,648,153 B2 | 11/2003 | Holmes |
| 6,662,483 B2 | 12/2003 | Reynolds |
| 6,715,676 B1 | 4/2004 | Janning |
| 6,716,042 B2 | 4/2004 | Lin et al. |
| 6,725,460 B1 | 4/2004 | Nishiyama et al. |
| 6,741,188 B1 | 5/2004 | Miller et al. |
| 6,748,710 B2 | 6/2004 | Gresham et al. |
| 6,749,116 B2 | 6/2004 | Massaro |
| 6,774,812 B2 | 8/2004 | Tada |
| 6,812,852 B1 | 11/2004 | Cesar |
| 6,829,854 B2 | 12/2004 | Reynolds |
| 6,892,650 B2 | 5/2005 | Baloga et al. |
| 6,947,987 B2 | 9/2005 | Boland |
| 6,959,471 B2 | 11/2005 | Temple et al. |
| 6,988,667 B2 | 1/2006 | Stewart et al. |
| 7,066,435 B2 | 6/2006 | Oddsen, Jr. et al. |
| 7,080,028 B2 | 7/2006 | Goodwin, III et al. |
| 7,084,765 B2 | 8/2006 | Clapper |
| 7,098,870 B2 | 8/2006 | Wampler et al. |
| 7,136,906 B2 | 11/2006 | Giacalone, Jr. |
| 7,155,663 B2 | 12/2006 | Landsman et al. |
| 7,158,046 B2 | 1/2007 | Cesar et al. |
| 7,175,034 B2 | 2/2007 | Nook et al. |
| 7,193,504 B2 | 3/2007 | Carrender et al. |
| 7,228,341 B2 | 6/2007 | Gaicalone, Jr. |
| 7,242,301 B2 | 7/2007 | August et al. |
| 7,249,872 B2 | 7/2007 | Ragsdale et al. |
| 7,262,686 B2 | 8/2007 | Stewart et al. |
| 7,302,102 B2 | 11/2007 | Reynolds et al. |
| 7,613,630 B2 | 11/2009 | Wolinsky et al. |
| 7,614,065 B2 | 11/2009 | Weissmueller, Jr. et al. |
| 2001/0003846 A1 | 6/2001 | Rowe et al. |
| 2001/0014876 A1 | 8/2001 | Miyashita |
| 2001/0020343 A1 | 9/2001 | Reynolds |
| 2001/0052000 A1 | 12/2001 | Giacalone, Jr. |
| 2002/0023274 A1 | 2/2002 | Giacalone, Jr. |
| 2002/0055942 A1 | 5/2002 | Reynolds |
| 2002/0059743 A1 | 5/2002 | Reynolds |
| 2002/0073588 A1 | 6/2002 | Reynolds et al. |
| 2002/0077896 A1 | 6/2002 | Liu et al. |
| 2002/0077909 A1 | 6/2002 | Kanojia |
| 2002/0085300 A1 | 7/2002 | Bracken et al. |
| 2002/0087401 A1 | 7/2002 | Leapman et al. |
| 2002/0104246 A1 | 8/2002 | Reynolds |
| 2002/0108330 A1 | 8/2002 | Yu et al. |
| 2002/0109729 A1 | 8/2002 | Dutta |
| 2002/0111866 A1 | 8/2002 | Carney et al. |
| 2002/0120518 A1 | 8/2002 | Carney et al. |

| | | | |
|---|---|---|---|
| 2002/0147987 A1 | 10/2002 | Reynolds et al. | |
| 2002/0178445 A1 | 11/2002 | Eldering et al. | |
| 2002/0190972 A1 | 12/2002 | Ven de Van | |
| 2002/0196126 A1 | 12/2002 | Eisenberg et al. | |
| 2003/0051415 A1 | 3/2003 | Remelts et al. | |
| 2003/0055725 A1 | 3/2003 | Lee | |
| 2003/0079391 A1 | 5/2003 | Reynolds et al. | |
| 2003/0095784 A1 | 5/2003 | Gordon | |
| 2003/0115096 A1 | 6/2003 | Reynolds et al. | |
| 2003/0206632 A1 | 11/2003 | Itoh et al. | |
| 2004/0019497 A1 | 1/2004 | Volk et al. | |
| 2004/0035037 A1 | 2/2004 | Reynolds | |
| 2004/0060218 A1 | 4/2004 | Reynolds et al. | |
| 2004/0073484 A1 | 4/2004 | Camporeale et al. | |
| 2004/0086039 A1 | 5/2004 | Reynolds et al. | |
| 2004/0116183 A1 | 6/2004 | Prindle | |
| 2004/0158865 A1* | 8/2004 | Kubler et al. | 725/82 |
| 2004/0165783 A1 | 8/2004 | Reynolds et al. | |
| 2005/0018768 A1 | 1/2005 | Mabey et al. | |
| 2005/0038645 A1 | 2/2005 | Mabey et al. | |
| 2005/0060745 A1 | 3/2005 | Riedl et al. | |
| 2005/0171843 A1 | 8/2005 | Brazell et al. | |
| 2005/0216339 A1 | 9/2005 | Brazell et al. | |
| 2005/0279257 A1 | 12/2005 | Bettinger | |
| 2006/0074769 A1 | 4/2006 | Looney et al. | |
| 2006/0085262 A1 | 4/2006 | Brazell et al. | |
| 2006/0101521 A1 | 5/2006 | Rabinovitch | |
| 2006/0149631 A1 | 7/2006 | Brazell et al. | |
| 2006/0212346 A1 | 9/2006 | Brazell et al. | |
| 2006/0230416 A1 | 10/2006 | Brazell et al. | |
| 2007/0130023 A1 | 6/2007 | Wolinsky et al. | |
| 2007/0219866 A1 | 9/2007 | Wolf et al. | |

FOREIGN PATENT DOCUMENTS

| | | |
|---|---|---|
| DE | 200 04 924 U1 | 7/2000 |
| EP | 0978814 A1 | 2/2000 |
| EP | 1098288 A1 | 5/2001 |
| EP | 1152614 A2 | 11/2001 |
| FR | 2639410 | 5/1990 |
| FR | 2765018 | 12/1998 |
| JP | 2003050947 | 2/2003 |
| TW | 408540 | 11/2000 |
| TW | 412687 | 11/2000 |
| TW | 453087 | 1/2001 |
| WO | WO 01/48581 A2 | 7/2001 |
| WO | WO 01/65531 A1 | 9/2001 |
| WO | WO 2005/050988 A1 | 6/2005 |
| WO | WO 2005/107116 A2 | 11/2005 |

OTHER PUBLICATIONS

"A Truly New Advertising Medium . . . ," Distributed Media Corporation, Jan. 23, 2001.
"Attention Wal-Mart Shoppers" Forbest Magazine, Apr. 16, 2001.
"Broadband has arrived . . . In a Big Way" DirecWay by Hughes Network Systems, Inc., © 2002.
"BuyMedia.com Unveils Personalization Enhancements to Web-based Media Buying Service", Business Wire, Nov. 11, 1999.
"Can Retail Be Media?", Pivot Points, Summer 2001.
Cap ventures—Narrowcasting in Public Spaces—The Outlook For Digital Signage, Sep. 24, 2001.
"Chrysler Drives Away From Focus on TV", The Wall Street Journal, May 31, 2001.
"CyberStar, a Loral Company", Info printed May 22, 2002 (print date).
"Dancast™: The most exciting new advertising medium in a generation?" © 2001.
"Digital Media", IBM Corporation, © 2001.
"Digital Promotions Make Quick Point McDonald's Testing New Technology on its Menus", The Chicago Tribune Archives, Dec. 26, 1997.
"Digital Signage System", ICS Technology Inc., Info printed May 22, 2002.
"Eddie Bauer's Windows Add Electrinics in New Customised Mark" www.financialexpress.com/fe/daily/200011129/efe29023.html, Nov. 29, 2000.
"EPOP—The Extraordinary Promotional Medium", Toppan Printing Company America, Inc., Info printed May 22, 2002.
"EPOP—The Extraordinary Promotional Medium," Toppan Printing Company America, Inc., Jun. 29, 2001.
"Execs: GM may buy TV ad time via Net", Media Electronic, vol. 74, Mar. 13, 2000.
Forbes.com, "Unplugged" Nov. 25, 2002 (Post filing).
"Getting Late Dateiced", S&VC, May 1999.
I-Open Presentation, Jan. 24, 2001.
"In-Store Marketing/advertising solution for Retail", IBM—Digitalmedia Distributor, Dec. 11, 2000.
"Info Touch Technologies", May 8, 2002.
"InfoChannel 3", Scala Broadcast Multimedia, Mar. 2002.
"Introducing an Integrated Media Company," Broadband Broadcasting Network, Inc., 1997-1999.
International Search Report, PCT/US02/33391, dated Sep. 3, 2003.
International Search Report and Written Opinion mailed May 5, 2009; PCT International Application No. PCT/US09/33595.
"imagicast™", Imagicast, Inc. 2000; retrieved from the Internet at URL:<http://www.imagicast.com> (23 pages).
"Immeon/A New Broadband Concept", © 2002.
"Is Promotion a Dirty Word?", PROMO, Mar. 1, 2001.
"Is it Prime Time at the Mall? New innovators undeterred by past mall TV flops" ISCS Publications, Oct. 2002.
"Jasmine 2000", Fujitsu Limited © 2001.
"m-cast", Fujitsu Australia Software Technology 2001-2002.
"Managing the Message", Dynamics Sign Display, Info printed May 22, 2002.
Market Leader Media, Nov. 13, 1998.
"Marketing Waste is a Big Problem—a Survey of Marketing Performance Management", Reveries.com, Apr. 2, 2001.
M.E. Podmolik, ""Optimism reigns at online bazaar; Growing pack of services tout savings and efficiency of ad orders; Advertising Age, vol. 71, Jul. 31, 2000.
"Media", Digital View, 2002.
Media SideStreet Corporation, Jun. 13, 2001.
"NCR DecisionNet™ Elecronic Shelf Labels", NCR Corporation, © 2002.
"Out of Home Video", OOH Video Systems Ltd. © 2001.
"POPvideo Player" Maintenance-Free Video Advertising by Visual Circuits www.vcircuits.com; Dec. 31, 1998.
"Plasma Video Screens Prove Customer Hit in Eddie Bauer Test" In-Store Technology, Feb. 2001.
"Plasma in Demand" P-O-P & In-Store Marketing, www.SalesAndMarketingMag.com, Oct. 2001.
"Putting the Snap! Into POP" Creative Marketing Magazine, 1998.
"Remarkable Market Facts About Retail Sign Costs", Gyricon, May 17, 2001.
"Scala—Solutions, Multimedia Messaging to Targeted Audiences", Scala Broadcast Multimedia, Info printed May 22, 2002.
"Services", MyDataVault, © 2002.
SignCast, Jan. 17, 2000.
"Store-Specific Marketing—Promotion Optimization Using Digital Signage", i-Open Solutions, No print date available (most likely printed May 22, 2002).
"Technology Uses "Sight & Sound" to Grab Customers at the Point of Purchase", Point-of-Purchase Magazine, Apr. 2000.
The Sidecast Network, Feb. 23, 1999.
"Trade Promotion:Going for Broke", Promo, Aug. 1, 2001.
"Transcript—Case & Levin", www.pathfinder.com/time/transcript/case-levin/pf.html, Feb. 7, 2000.
Transvision, Oct. 28, 2001 (launch network).
"Turn Browsers Into Buyers", i-Open Solution, Info printed May 22, 2002.
"Video Wall Technology", Easy Systems SA Belgium, © 2001.
Video Billboard, www.futureproof.com/Video%20Bill%20Board.html, Oct. 2000.
"VideoworX™ POS Screen", Digital Matter Corporation, Info printed May 22, 2002.
"Welcome to Digital Display Corporation", Digital Display Corp Home Page, Info printed May 22, 2002.
"What is adPOS?" and "adPOS for Retailers", adPOS; retrieved from the Internet on May 22, 2002 at URL: <http://www.adpos.net/ whatisadpos.html> and URL: <http://www.adpos.net/forretailers.html> (original Internet Publication Date Unknown).
"What is a Digital Sign?", Tzero, Dec. 31, 1999.
WSN-Women's Supermarket Network, Feb. 27, 2001.
European Search Report date mailed Nov. 23, 2009; European Application No. 02803159.9 [AMS.0101PTEP].
Non-Final Office Action dated Dec. 2, 2005 for U.S. Appl. No. 10/277,218.
Response filed May 2, 2006 for U.S. Appl. No. 10/277,218.
Final Office Action dated Jul. 31, 2006 for U.S. Appl. No. 10/277,218.
Notice of Abandonment dated Mar. 8, 2007 for U.S. Appl. No. 10/277,218.
Non-Final Office Action dated Nov. 14, 2007 for U.S. Appl. No. 11/600,498.
Response filed May 14, 2008 for U.S. Appl. No. 11/600,498.
Final Office Action dated Aug. 20, 2008 for U.S. Appl. No. 11/600,498.
RCE/Response filed Nov. 20, 2008 for U.S. Appl. No. 11/600,498.
Restriction requirement dated Feb. 19, 2009 for U.S. Appl. No. 11/600,498.
Response filed Mar. 19, 2009 for U.S. Appl. No. 11/600,498.
Restriction Requirement dated Jun. 4, 2009 for U.S. Appl. No. 11/600,498.
Response filed Jun. 11, 2009 for U.S. Appl. No. 11/600,498.
Non-Final Rejection date mailed Sep. 28, 2009 for U.S. Appl. No. 11/600,498.
Response filed Nov. 23, 2009 for U.S. Appl. No. 11/600,498.
Non-Final Rejection date mailed Mar. 12, 2010 for U.S. Appl. No. 11/600,498.
Notice of Allowance and Examiner Interview summary date mailed Apr. 5, 2010 for U.S. Appl. No. 11/600,498.
Restriction Requirement dated Oct. 22, 2008 for U.S. Appl. No. 10/265,512.
Response filed Nov. 2008/2008 for U.S. Appl. No. 10/265,512.
Non-Final Office Action dated Feb. 2, 2009 for U.S. Appl. No. 10/265,512.
Interview Summary dated Apr. 27, 2009 for U.S. Appl. No. 10/265,512.
Response filed May 13, 2009 for U.S. Appl. No. 10/265,512.
Notice of Allowance date mailed Jul. 31, 2009 for U.S. Appl. No. 10/265,512.
Misc. Communication dated Aug. 20, 2009 for U.S. Appl. No. 10/265,512.
Amendment after Notice Allowance (RI 312) dated Aug. 27, 2009 for U.S. Appl. No. 10/265,512.
Supplemental response filed Aug. 28, 2009 for U.S. Appl. No. 10/265,512.
Response to Amendment (RI 312) dated Sep. 3, 2009 for U.S. Appl. No. 10/265,512.
Non-Final Office Action date mailed May 11, 2010 for U.S. Appl. No. 12/549,139.
Response filed Aug. 12, 2010 for U.S. Appl. No. 12/549,139.
Non-Final Office Action dated Apr. 6, 2007 for U.S. Appl. No. 11/600,635.
Response filed Aug. 2, 2007 for U.S. Appl. No. 11/600,635.
Final Office Action dated Nov. 2, 2007 for U.S. Appl. No. 11/600,635.
RCE/Response filed May 2, 2008 for U.S. Appl. No. 11/600,635.
Non-Final Office Action dated Aug. 20, 2008 for U.S. Appl. No. 11/600,635.
Response filed Nov. 20, 2008 for U.S. Appl. No. 11/600,635.
Final Office Action dated Feb. 3, 2009 for U.S. Appl. No. 11/600,635.
Response filed Apr. 10, 2009 for U.S. Appl. No. 11/600,635.
Advisory Action dated Apr. 17, 2009 for U.S. Appl. No. 11/600,635.
Notice of Abandonment dated Sep. 1, 2009 for U.S. Appl. No. 11/600,635.
Non-Final Office Action dated Mar. 21, 2006 for U.S. Appl. No. 10/760,802.
Response filed Apr. 18, 2006 for U.S. Appl. No. 10/760,802.
Non-Final Office Action dated May 16, 2006 for U.S. Appl. No. 10/760,802.
Notice of Abandonment dated Apr. 5, 2007 for U.S. Appl. No. 10/760,802.
Non-Final Office Action dated Feb. 5, 2007 for U.S. Appl. No. 10/866,517.
Response filed Jun. 5, 2007 for U.S. Appl. No. 10/866,517.
Final Office Action dated Aug. 1, 2007 for U.S. Appl. No. 10/866,517.
RCE/Response filed Oct. 31, 2007 for U.S. Appl. No. 10/866,517.
Interview Summary dated Jan. 9, 2008 for U.S. Appl. No. 10/866,517.
Non-Final Office Action dated Jan. 9, 2008 for U.S. Appl. No. 10/866,517.
Response filed May 9, 2008 for U.S. Appl. No. 10/866,517.
Final Office Action dated Aug. 27, 2008 for U.S. Appl. No. 10/866,517.
RCE/Response filed Nov. 24, 2008 for U.S. Appl. No. 10/866,517.
Interview Summary dated Nov. 26, 2008 for U.S. Appl. No. 10/866,517.
Non-Final Office Action dated Feb. 20, 2009 for U.S. Appl. No. 10/866,517.
Interview Summary dated Mar. 12, 2009 for U.S. Appl. No. 10/866,517.
Interview Summary dated Mar. 19, 2009 for U.S. Appl. No. 10/866,517.
Response filed Apr. 10, 2009 for U.S. Appl. No. 10/866,517.
Supplemental Amendment Response filed Apr. 21, 2009 to Non-Final Office Action dated Feb. 20, 2009 and Examiner Interviews on Mar. 10, 2009, Mar. 17, 2009, Apr. 17, 2009 and Apr. 20, 2009 for U.S. Appl. No. 10/866,517.
Notice of Allowance dated May 14, 2009 for U.S. Appl. No. 10/866,517.
Notice of Allowance dated Jun. 19, 2009 for U.S. Appl. No. 10/866,517.
RCE filed Jun. 26, 2009 for U.S. Appl. No. 10/866,517.
Notice of Allowance dated Jul. 10, 2009 for U.S. Appl. No. 10/866,517.
Non-Final Office Action dated Jun. 28, 2005 for U.S. Appl. No. 10/893,757.
Response filed Nov. 28, 2005 for U.S. Appl. No. 10/893,757.
Non-Final Office Action dated Feb. 9, 2006 for U.S. Appl. No. 10/893,757.
Notice of Abandonment dated Sep. 7, 2006 for U.S. Appl. No. 10/893,757.
Restriction Requirement dated Dec. 19, 2008 for U.S. Appl. No. 10/866,533.
Response filed Dec. 31, 2008 for U.S. Appl. No. 10/866,533.
Restriction Requirement dated Feb. 26, 2009 for U.S. Appl. No. 10/866,533.
Response filed Mar. 25, 2009 for U.S. Appl. No. 10/866,533.
Non-Final Office Action date mailed Jun. 9, 2009 for U.S. Appl. No. 10/866,533.
Interview Summary date mailed Aug. 14, 2009 for U.S. Appl. No. 10/866,533.
Response filed Aug. 26, 2009 for U.S. Appl. No. 10/866,533.
Final Rejection date mailed Dec. 23, 2009 for U.S. Appl. No. 10/866,533.
Response filed Jan. 15, 2010 for U.S. Appl. No. 10/866,533.
Examiner Interview Summary date mailed Jan. 19, 2010 for U.S. Appl. No. 10/866,533.
Advisory Action date mailed Feb. 12, 2010 for U.S. Appl. No. 10/866,533.
RCE filed Feb. 26, 2010 for U.S. Appl. No. 10/866,533.
Non-Final Rejection date mailed Apr. 6, 2010 for U.S. Appl. No. 10/866,533.
Response filed Apr. 29, 2010 for U.S. Appl. No. 10/866,533.
Final Office Action date mailed Jul. 28, 2010 for U.S. Appl. No. 10/866,533.

* cited by examiner

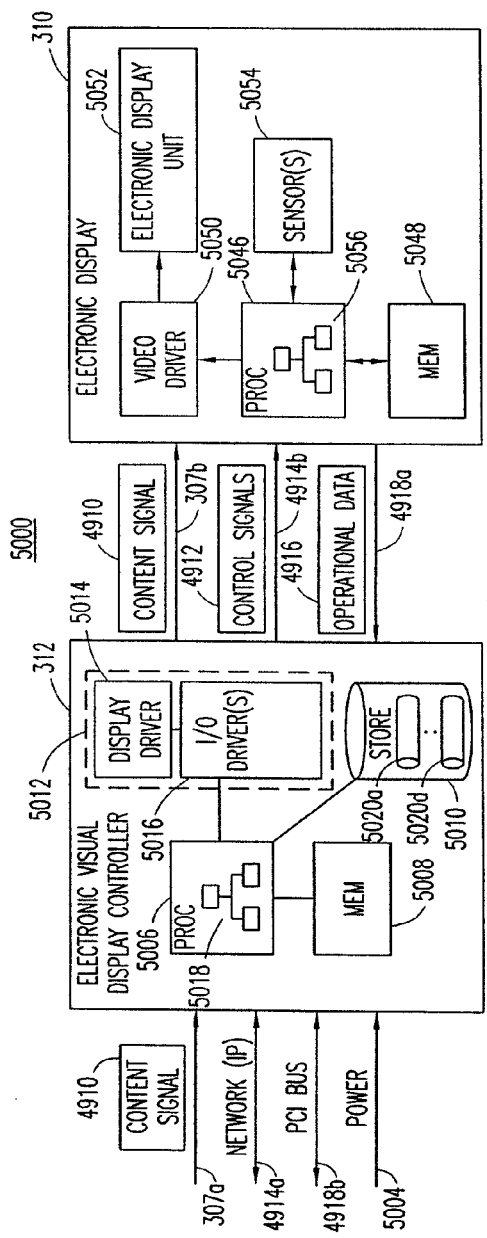
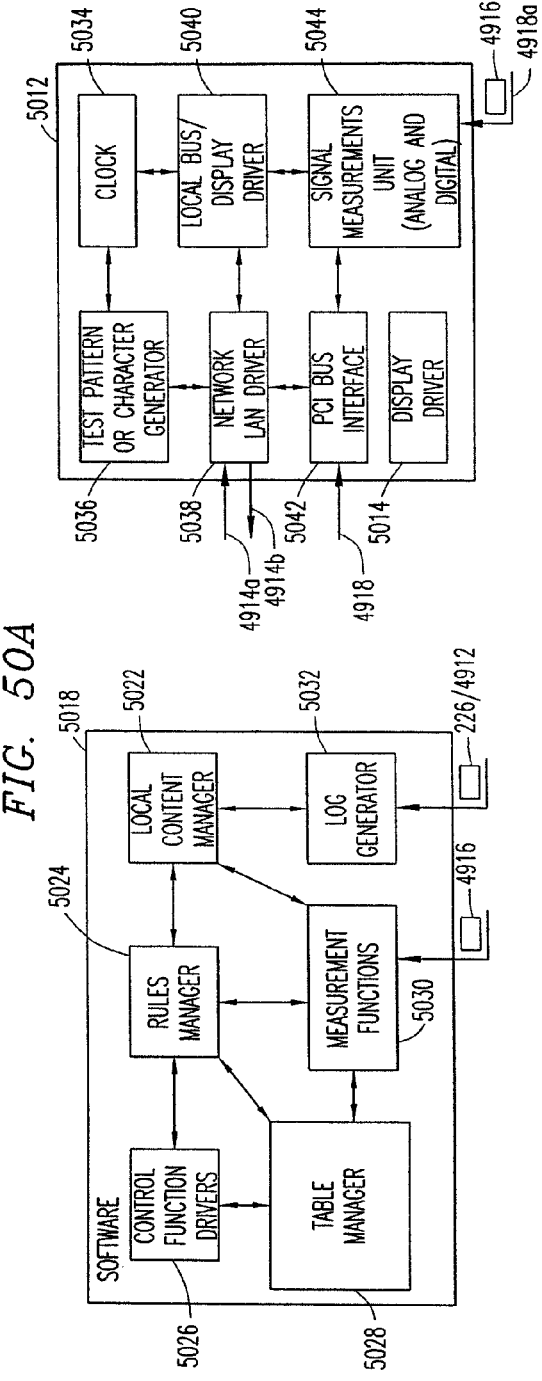
FIG. 50A
FIG. 50B
FIG. 50C

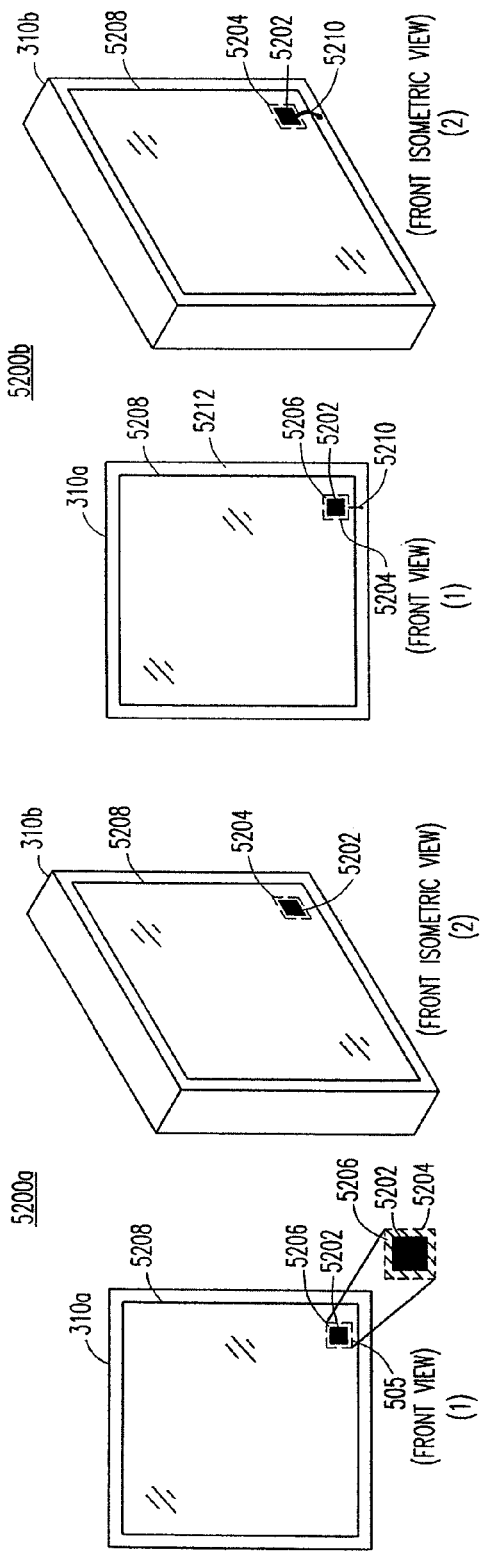
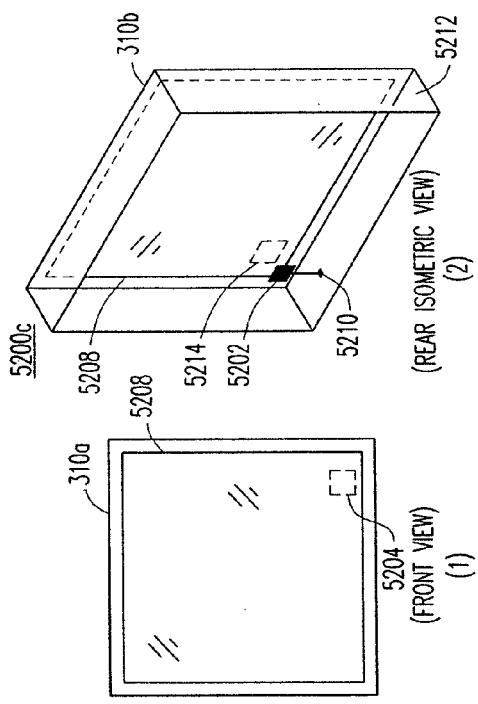
FIG. 52A
FIG. 52B
FIG. 52C

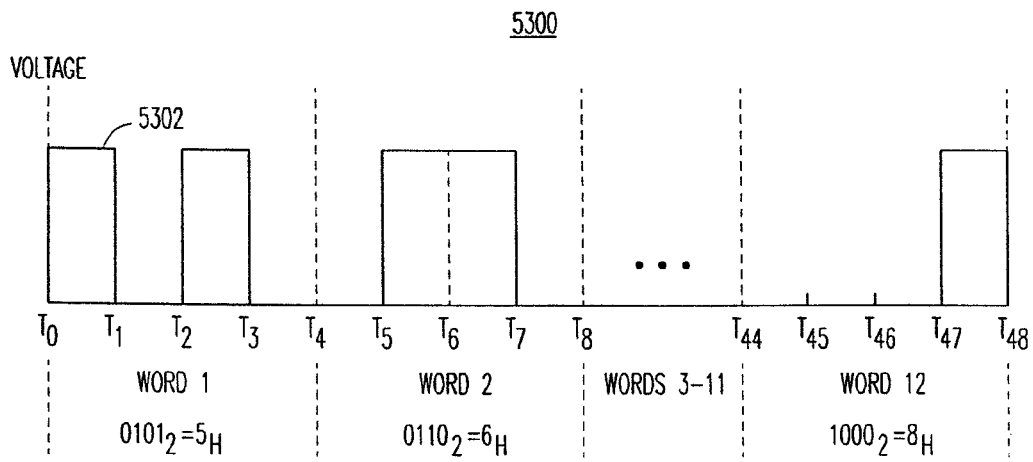
FIG. 53
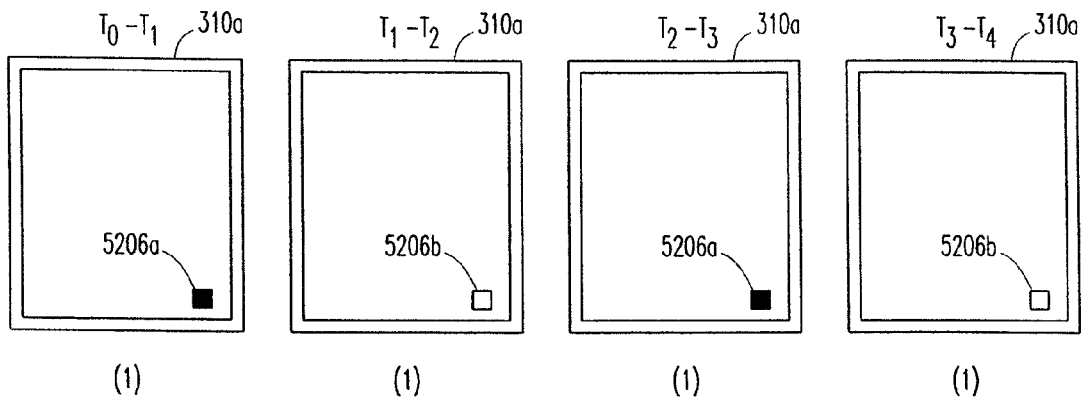
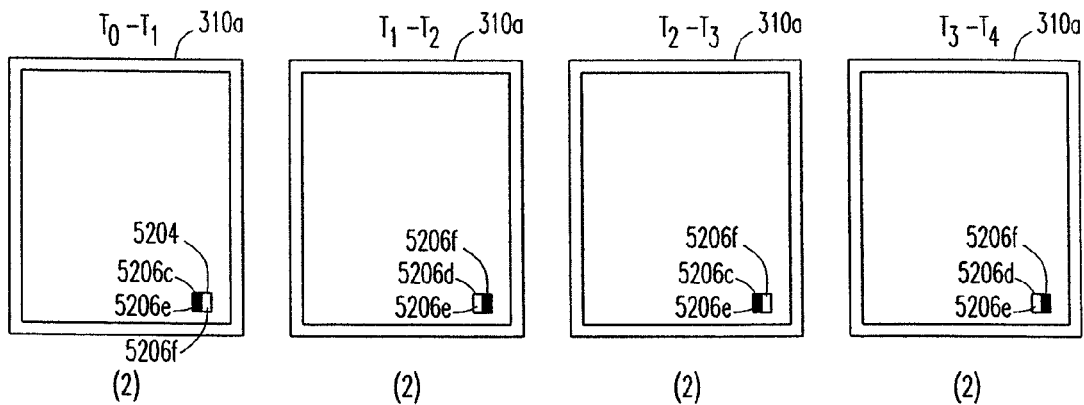
FIG. 54A   FIG. 54B   FIG. 54C   FIG. 54D

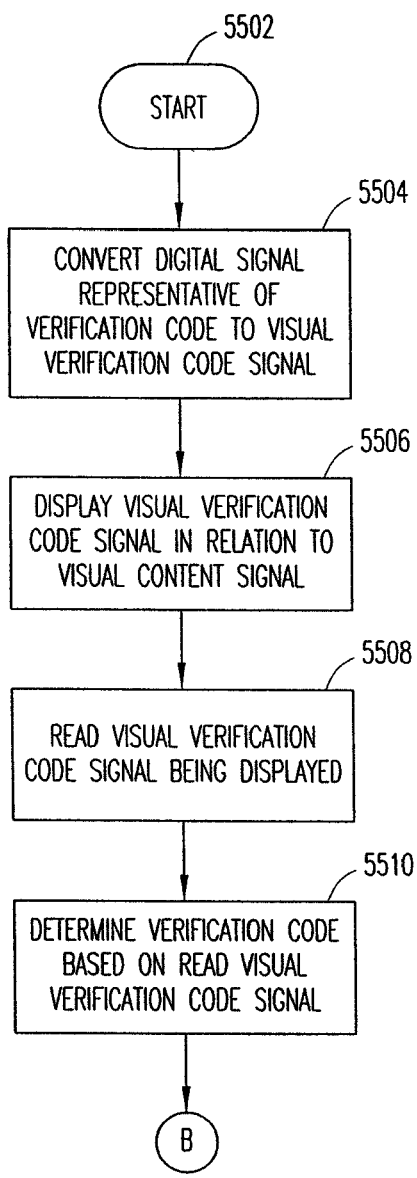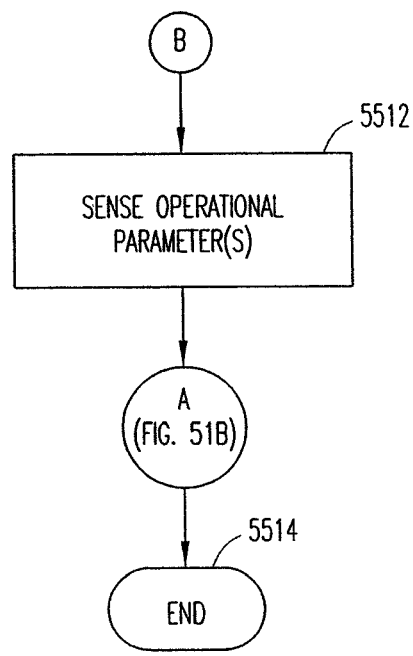
FIG. 55A
FIG. 55B

Scheduling/Transmission
5604

Account Information
5608

Library
5602

Site Selection
5606

5600

METHOD FOR PROVIDING A RETAILER WITH OUT-OF-HOME ADVERTISING CAPABILITIES

CROSS-REFERENCES TO RELATED APPLICATIONS

This Application for Patent is a Divisional of U.S. patent application Ser. No. 11/600,498 filed Nov. 16, 2006 now U.S. Pat. No. 7,742,950, which is a Continuation of U.S. patent application Ser. No. 10/277,218 filed on Oct. 17, 2002 now abandoned and claims the benefit of priority from U.S. Provisional Application for Patent Ser. No. 60/330,224, filed Oct. 17, 2001; co-pending U.S. patent application Ser. No. 10/265,512, filed Oct. 3, 2002, and U.S. Provisional Application Ser. No. 60/341,626, filed Dec. 17, 2001. The teachings of the above applications are incorporated herein by reference in their entirety.

BACKGROUND OF THE INVENTION

1. Technical Field of the Invention

The principles of the present invention generally relate to a system and method for performing out-of-home advertising, and more particularly, but not by way of limitation, for providing the system and method to subscribers (e.g., retailers and out-of-home advertisement agencies) to operate as private broadcasters to provide advertising or content delivery services for advertisers and subscribers in a targeted manner.

2. Description of Related Art

Traditional out-of-home advertising, including point-of-purchase and promotional retail advertising, has been generally formed of static and expensive signs and promotional materials that typically utilize photographs, graphics, and text for advertising products. Advertising space located in retail outlets is generally rented, leased, or otherwise disposed of by a manufacturer for a certain period of time, such as a month. While the cost of renting the advertising space may be expensive, the cost to produce the content that is placed in the advertising space may be as or more expensive (e.g., $800 per sign) due to production and printing costs. Further, advertisers (e.g., product manufacturers) typically have as much as 70 percent or more of the signs, promotional materials, and display fixtures not used or displayed by the retailer. The cost to produce these items or materials also may carry additional costs if techniques, such as backlighting, are used.

In an effort to reduce production and printing costs and increase revenue from the out-of-home advertising locations, dynamic signage has developed. Dynamic signage includes many techniques for allowing advertisements to be non-static, including rotating mechanical devices having multiple printed advertisements mounted thereto and utilizing electronic displays. In the case of using electronic displays, one technique has included playing video tapes, compact disks (CDs), digital video disks (DVDs), etc., of advertisements and/or content on an electronic display that is proximately located in relation to a product. Content is any and all information of any form, including, without limitation, images (still, motion, and/or animated) and audio. Advertising is content related to products and/or services. Additionally, computers have been connected directly to monitors to display digitally stored advertisement data. More recently, larger, flat-panel electronic displays have allowed retailers to display advertisements with increased space savings and with better visual appeal.

However, conventional dynamic signage systems utilizing visual displays for advertising have several drawbacks. First, distributing and maintaining the content (e.g., advertising information on a large scale is difficult. Even in the case of having a single display, installing, updating, and servicing the advertisement data on the associated computer is time consuming and expensive from an equipment and manpower perspective. In the case of utilizing a computer server and local computer network to maintain and distribute the data from the computer server at a central location, distribution costs may be reduced, but higher equipment costs and maintenance fees are needed due to the more sophisticated hardware and software being utilized. These costs are generally beyond what retailers and out-of-home media entities, for example, are willing or able to afford as they are reluctant to purchase the equipment and hire staff to support the technology.

A second drawback includes the capitalization of the computer and electronic display equipment being significant. While the cost of this equipment has been reduced over the past few years, especially for computer equipment and flat panel displays, retailers have not fully embraced the technology due the capitalization costs—particularly from a balance sheet standpoint. In other words, retailers and other business establishments are cautious in purchasing and owning computing and electronic display equipment that will become outdated and negatively affect the balance sheet.

A third drawback is that large content datafiles for advertising or other purposes requires a high bandwidth communication network to communicate the datafiles. Because of the high bandwidth requirement, use of terrestrial broadband for communication of large datafiles to many distribution points presently is not a viable option due to communication fees and bandwidth limitations. Additionally, geographic coverage of the Internet is not sufficient in many rural areas that potential customers or users require. Other forms of terrestrial communication having insufficient bandwidth, such as cellular networks, cable, digital subscriber lines (DSL), and broadcasts are similarly problematic in terms of coverage areas and associated costs across the country and around the world. These communication limitations are magnified when distribution of the content is performed on a large scale basis.

A fourth drawback is that the electronic displays traditionally used by out-of-home establishments have been large (e.g., 36×48 inches) such that the electronic displays generally have been utilized to perform "brand messaging" or "bill boarding" for advertisers and retailers. One reason for the limited usage of the large electronic displays is due to the inability to place the large electronic displays at or near point-of-purchase displays. The placements include mounting the electronic displays to the walls and ceilings or on a pedestal that is free-standing on the floor. Such placements, again, provide for brand messaging, which may help to increase sales volume, but "impulse" purchasing, as understood in the art, may not be fully captured due to the electronic displays only being in the general vicinity of the products being advertised and not close enough to inspire consumers to readily purchase the product being advertised.

Further, the large electronic displays have typically been fixed or mounted to walls or other relatively immovable structures such that it is difficult for the retail establishment to easily relocate the electronic displays. And, because electronic displays are not easily moveable, advertisers are limited in being able to utilize the advertising technology as their products are unable to be relocated in proximity of one of the electronic displays. Also, because the electronic displays are limited in number and placed "where convenient", specifying the location of the electronic display in relation to a store layout is generally not performed or performed at a very broad level (e.g., checkout counter), thereby being difficult or impossible for retailers to easily manage and sell to advertisers for advertising usage.

A fifth drawback includes the long-time common practice for advertisers to request "tearsheets" as understood in the art of advertisements printed in periodicals or other printed material. However, in the case of using electronic displays, advertisers are unable to receive true verification as to whether the content was actually displayed as requested both in terms of time and quality (e.g., color and intensity). While it may be possible to verify that the content was communicated to an electronic display, simply knowing that the content was communicated does not indicate truly whether the electronic display was properly operating (e.g., proper operation of the picture tube, proper color, proper brightness, existence of power, sound quality, etc.). Because of the lack of a "tearsheet" verification, advertisers are reluctant to engage in the use of electronic display technology for advertising at remote locations.

To address the bandwidth requirements for the large amounts of digital media content for advertisements and the insufficient geographic coverage presently existing with terrestrial networks, satellite networking has been utilized. The satellite network offers sufficient global reach necessary for the advertising industry, which is truly international in scope. One such satellite network is provided by Hughes Network Systems. Other satellite networks are available from Loral Space and Communications and Gilat Satellite Networks, to name a few. However, while communication technology has become available to solve the communication problems, the other drawbacks and issues (e.g., management, cost, verification, etc.) remain open issues that restrict technology usage and industry growth.

SUMMARY OF THE INVENTION

To overcome the drawbacks of conventional electronic display advertising at out-of-home locations, including (i) distributing and maintaining content, (ii) capitalizing equipment, (iii) utilizing high bandwidth communication equipment, (iv) positioning electronic displays, and (v) verifying timely and proper display of the content, systems and methods have been developed that address the drawbacks.

To overcome the problems of limited geographic distribution and storage of out-of-home content, a satellite communication network with storage may be utilized. Rather than having the service provider of the infrastructure operate as the broadcaster (i.e., the group who books and schedules the content and/or sells advertising space), the principles of the present invention provide for subscribers (e.g., retail establishment, product manufacturer, out-of-home media entity) operate as a private broadcaster by performing booking and scheduling operations for advertisers, thereby enabling the subscribers to gain significantly more revenue and to maintain control over the type and quality of content being displayed. To provide affordable infrastructure, including satellite communication equipment, local computing equipment, and electronic displays, the subscribers may subscribe to the content management and distribution service via a subscription and be charged by the service provider on a capacity basis (e.g., megabytes per time period) for distribution of the content (e.g., photograph, video, etc). Additionally, the subscribers may be charged for storage of the content on a capacity basis (e.g., megabytes per month). These charges may be passed through to the advertisers, thereby further minimizing the cost for the subscribers. To address positioning limitations of large electronic displays, small, wireless, electronic displays that may be mounted to shelves, stands, and other previously inaccessible locations may be utilized.

One embodiment of a system and method for providing a subscription-based, out-of-home, dynamic signage advertisement service to retailers may include establishing a retailer as a subscriber for use of an electronic display. A subscription agreement may enable the retailer to use the electronic display and receive communications services for content to be distributed to the electronic display. The electronic display may be provided to the retailer and configured to receive and display the content by configuring the electronic display as a network distribution point for content to be distributed. The content may be stored in a data repository and distributed to the electronic display at the retailer. The content may be distributed via a communications network to the electronic display and displayed at the retailer.

To provide confidence to the advertisers, actual verification of the content being displayed by electronic displays is provided by performing feedback. One feedback embodiment includes the use of an identifier associated with content and displayed on the electronic display. A log of the content displayed on an electronic display is stored by a computing device in communication with the electronic display and communicated with a service provider computing system to enable the subscribers to provide the actual verification to the content providers and advertisers and brand subscribers.

BRIEF DESCRIPTION OF THE DRAWINGS

A more complete understanding of the system and methods of the principles of the present invention may be obtained by reference to the following Detailed Description when taken in conjunction with the accompanying Drawings wherein:

FIGS. 50A-C are more detailed block diagrams of the electronic display controller and electronic display of FIG. 49;

FIGS. 52A-C provides a number of exemplary embodiments for utilizing an optical sensor for measuring illumination of a verification code on the visual appliance of FIG. 3A;

FIG. 53 is an exemplary graph for showing a digital verification code signal representative of a content identifier that may be utilized to form a verification code associated with a content signal to be displayed on the visual appliance of FIG. 3A;

FIGS. 54A-D is a sequence of images that illustrate the digital verification code signal being displayed as a visual verification code signal on the visual appliance of FIG. 3A;

FIG. 55A is an exemplary flow chart describing an operation for the verification level 3 of the visual content being displayed on the visual appliance of FIG. 3A;

FIG. 55B is an exemplary flow chart describing verification level 4, which indicates that a particular content signal is timely and properly displayed on the visual appliance of FIG. 3A;

DETAILED DESCRIPTION OF THE DRAWINGS

Figure 1A:
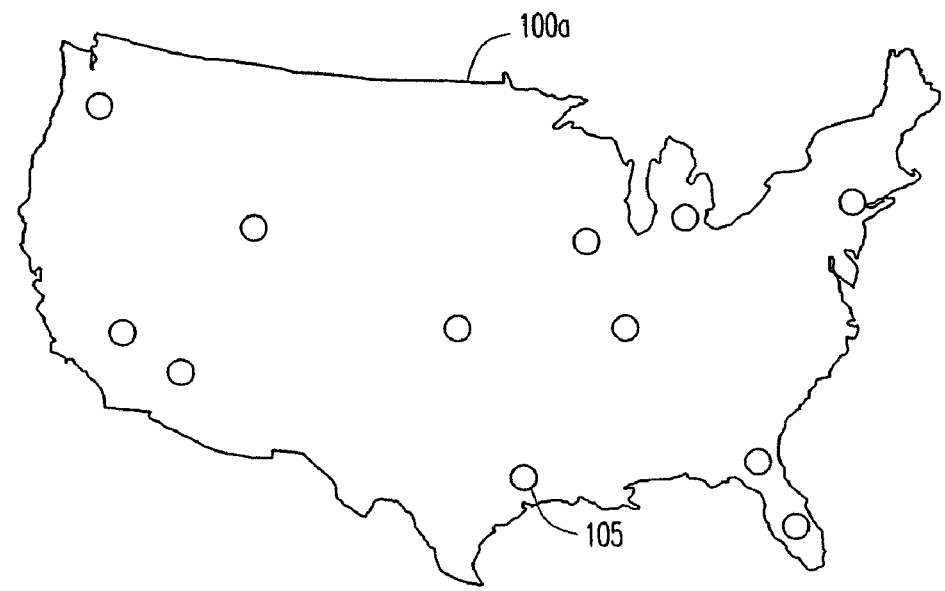
FIGS. 1A-1B are exemplary maps and of the United States showing cable and digital subscriber line (DSL) communication coverage area and satellite communication coverage areas.
Figure 1B:
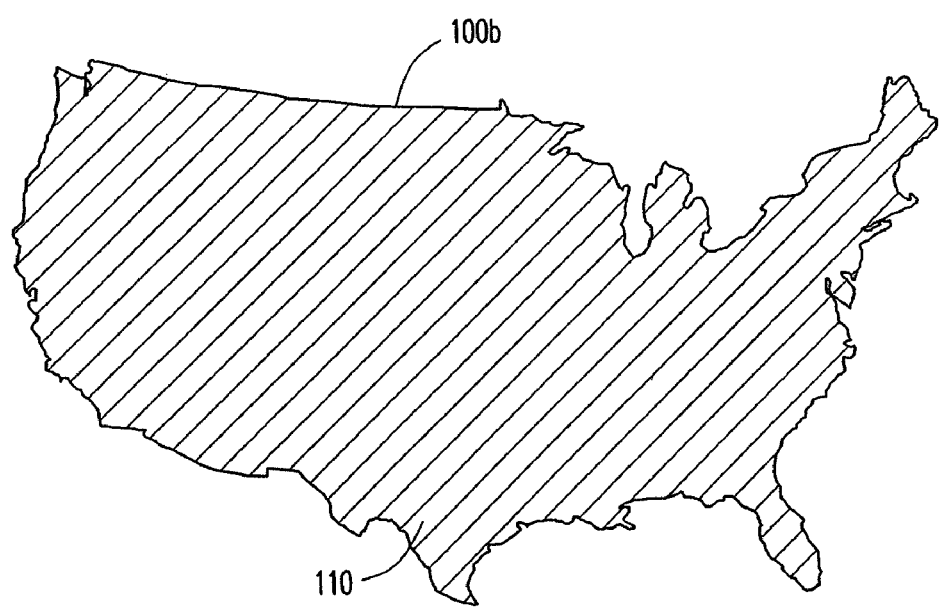

FIGS. 1A-1B are exemplary maps 100a and 100b of the United States showing cable and digital subscriber line (DSL) communication coverage area 105 and satellite communication coverage area 110. Because coverage of cable and digital subscriber lines in the United States and around the world (DSL) is relatively sparse, terrestrial communications of large datafiles are expensive and difficult or impossible if a destination location for the data is not covered by either of these or other forms of terrestrial communication. It should be understood that slower forms of communication are impractical for communicating large content datafiles, such as those communicated for advertisements.

Satellite communication coverage enables communication throughout the entire United States. And because the satellite communication covers the entire country, distribution cost of content is simple and inexpensive relative to terrestrial communication. Additionally, satellite coverage offers governmental level security in terms of encryption and other data and communication security measures. Satellite communications further provide a fully distributive network, which allows for communication from one to many locations. Users of the satellite communications are charged for usage and need not be charged for being on-line as bandwidth of the system is not decreased by having additional users. Because subscribers of the services as defined below in more detail are located all over the United States with varying densities, satellite communication currently provides the "broadest" coverage.

System General Description

A content management and distribution service provider ("service provider") may provide infrastructure equipment to out-of-home enterprises (e.g., retail facilities) or locations (e.g., billboard). In one embodiment, the users of the infrastructure are "subscribers", who may be enterprises, out-of-home advertisers, advertising space resellers, retailers, manufacturers, or other advertising sellers or purchasers. The infrastructure equipment may include satellite communication equipment, computing equipment, local network equipment and electronic display equipment. In the case of a subscriber being an enterprise, such as a large retail chain having a corporate office and individual stores, the home office receive access to a network-accessible service and the individual stores receive satellite communication equipment, server, local area communication equipment, and visual appliances. The visual appliances include an electronic display screen and an electronic display controller, which may be formed of a circuit board having communication and display driver capabilities. For practical reasons, the electric displays may be flat-panel display screens. The flat-panel electronic displays may be LCD, LED, plasma, CRT, projection or the like. The electronic display controllers may be established to have unique identifiers so as to be individually or uniquely addressable. The visual appliances may alternatively be formed of an electronic display controller and cathode ray tube (CRT), television, or other controllable electronic display device.

An end-to-end out-of-home content display system may be integrated as follows. The service provider operates a server that hosts an interface for the subscribers to utilize in managing content, such as advertisements, to be displayed on the local network(s) of the subscribers. The home office of the subscriber may communicate with the server of the service provider to establish a playlist for the content, where the playlist establishes content to be played at certain time(s) and on certain visual appliance(s). Datafiles containing the content to be displayed may be uploaded via the network or via the satellite communication equipment of the satellite service provider.

Once the playlist is defined, the server of the service provider may manually, semi-automatically, or automatically communicate with a communications network service provider (e.g., satellite service provider) to distribute the datafile(s) containing the content to local servers being operated by individual enterprise locations prior to the content being scheduled to play on the visual appliances. In one embodiment, the datafile(s) may be communicated to the local servers at off-peak times to reduce communication fees as the datafiles are utilized for low priority business operations (relative to credit card verification operations, for example). The local servers store the datafile(s) until about the scheduled playtime. At or about the scheduled playtime, the datafile(s) are communicated to the visual appliance(s) for display as scheduled. The communication may be performed wirelessly over a local area network.

The visual appliance(s) receiving the content in the form of a datafile containing image and/or sound data of the content loads and stores the datafile. The datafile may be played on the visual appliance(s) (i) in response to receiving a "start" command by the local server, (ii) automatically during or after the datafile is downloaded, or (iii) by simply being powered (i.e. play content in memory). However, because the visual appliances are generally operated as "dumb" terminals (i.e., slaves), network interaction is utilized to begin display of the content.

Because content providers (e.g., advertisers) are often very concerned about verification that the content is (i) displayed, (ii) at the proper time, having (iii) the correct visual appearance (e.g., color and intensity), the principles of the present invention provide for content datafiles to be encoded with an identifier and/or other attribute information of the content. Alternatively, rather than encoding the datafile, a separate data signal may be displayed on the visual appliance in association with the content. Other techniques for verifying the timely and proper display of the content may be found in co-pending U.S. patent application Ser. No. 10/265,512, filed on Oct. 3, 2002, which hereby is incorporated by reference herein. The identifier and/or other attribute information is displayed on the visual appliance in conjunction with displaying the content. Alternatively, the identifier and/or other attribute information may be displayed prior to or after completion of the content being displayed.

To provide for verification of the content being timely and properly displayed, one embodiment may include an optical sensor positioned to measure the identifier and/or other attribute information associated with the content and feedsback the measured information. In one embodiment, the optical sensor is coupled to the external surface of a display screen of the visual appliance for sensing the identifier and/or other attribute information. The feedback of the sensed information may be measured by the electronic display controller of the visual appliance or a remote computing system. In either case, the measurements are interpreted to determine the measured information. In the case of the visual appliance performing the measurement, a log is generated and stored at the visual appliance. The measured information, which may include the identifier of the content, color information, intensity information and display time, for example, may be used to provide a certified verification to advertisers that the content was played at the correct time and location, and that the appearance was correct, thereby providing for a "virtual tearsheet". Other log information may be stored and read by the local server. Such other log information may include operation of the visual appliance, start/end times of content, currently stored content, performance data, interactive tracking information, etc.

To close the loop for the communications system or private broadcasting network, the local servers may communicate the log information to the service provider. The service provider, in turn, may generate billing and reporting information for the retailer and/or advertisers. It should be understood, however, that the transfer of information may be performed by other sequences or along other communication paths and be in accordance with the principles of the present invention.

As will be further discussed hereinafter, the visual appliances may be reduced in size to be mounted to specific shelves or other locations within a retail or other establishment. By mounting the visual appliances to specific shelves to be located substantially close to the products being advertised, impulse purchases may be better captured by the advertisers. Additionally, the visual appliances may be "mapped" to a store layout plan (i.e., how and where products or merchandise are displayed within the store), generally known in the art as a planogram. By having the mapping capability, the subscribers may easily manage the visual appliances in relation to products associated with the content.

The service provider further provides an interface on a network that enables the subscribers to receive or post and schedule the content via a playlist. Because the visual appliances are network addressable, the content may be scheduled to display on selected visual appliances. For example, an advertisement for a particular beverage may be displayed on visual appliance(s) coupled to a store shelf that supports the particular beverage.

System Detailed Description

Figure 2:
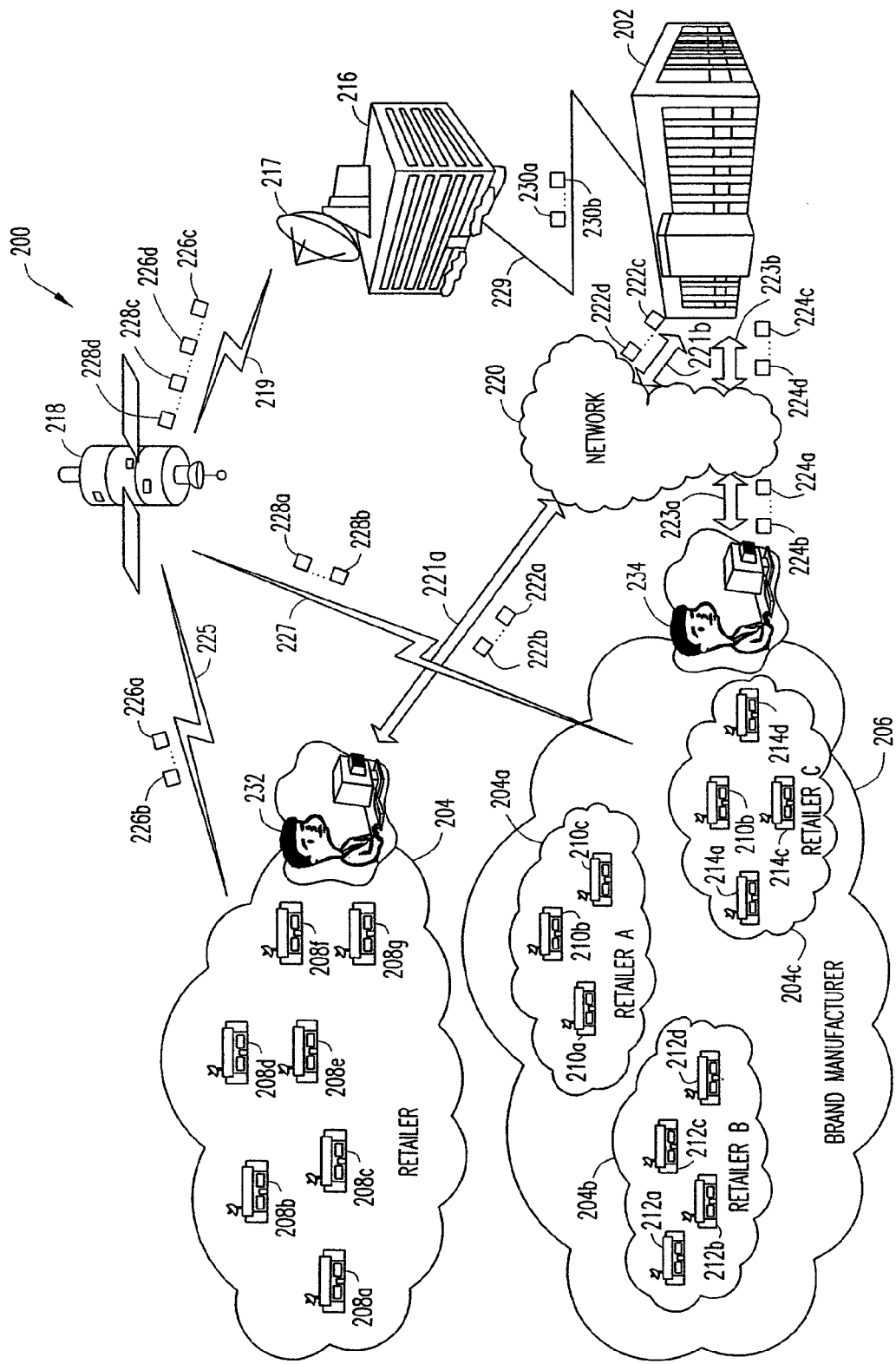
FIG. 2 is an exemplary system diagram of a communications system that provides for communication of content utilizing the principles of the present invention.

FIG. 2 is an exemplary system diagram of a communications system 200 that provides for communication of content utilizing the principles of the present invention as generally described above. A content management and service provider ("service provider") 202 provides retail subscribers 204 and brand subscribers 206 with the ability to operate as private network providers or broadcasters by allowing the retail and brand subscribers 204 and 206 to manage, schedule, and control content being distributed via the communications system 200.

The retail subscriber 204 is a business entity or establishment, such as a retail establishment or retailer, that may be formed of multiple facilities 208a-208g (collectively 208) that operate in distinct locations. In one embodiment, a main office may operate to manage the content for each facility 208. Alternatively, each facility may manage the content being displayed therein. The brand subscriber 206 may be a manufacturer, for example, that conducts business with or sells products to multiple retailers, who may be the retail subscribers 204a-204c (collectively 204). The retail subscribers 204a-204c may be composed of multiple facilities 210a-210c, 212a-212d, and 214a-214d, respectively. It should be understood that other types of subscribers may utilize the services of the service provider 202.

The service provider 202 may utilize a communications network service provider 216 for performing the actual distribution of content via the communications system 200. One such communications network service provider 216 is a satellite network service provider that utilizes a satellite dish 217 to communicate with one or more satellites 218 over a communication link 219 to communicate the content for the subscribers 204 and 206 to the facilities 208-214. In providing subscriber services (e.g., managing, scheduling, distributing, displaying, and storing the content) for the subscribers 204 and 206, the service provider 202 enables the subscribers 204 and 206 to communicate therewith via a network 220. In one embodiment, the network 220 is a terrestrial network, such as the Internet. Alternatively, the network 220 may be other terrestrial networks, either wireless (e.g., cellular) or wired (e.g., cable, DSL, local area network (LAN), or wide area network (WAN)). Still yet, the network 220 may utilize the satellite 218 to enable the service provider 202 to provide subscriber services.

In providing the subscriber services, the service provider 202 and communications network service provider 216 may operate in conjunction to allow the subscribers 204 and 206 to manage, schedule, store, and communicate or distribute the content to the facilities 208-214. For the non-content communication (e.g., management and scheduling services), the subscribers may communicate via the network 220 with the service provider 202 across communication lines 221a and 221b (collectively 221) via data packets 222a-222d (collectively 222) and across communication lines 223a and 223b (collectively 223) via data packets 224a-224d as understood in the art.

The network 220 may be utilized for non-content communications as low bandwidth communications are being performed. However, for the high bandwidth communications to communicate the content, which are typically large datafiles, the satellite 218 is utilized. As shown, communication path 225 is used to communicate the content in the form of data packets 226a-226b (collectively 226) and communication path 227 carries data packets 228a-228b from the subscribers 204 and 206, collectively. The satellite 218, in turn, communicates data packets 226c-226d and 228c-228d to the communications network service provider 216. The content may be maintained at the communications network service provider 216 for distribution to the facilities 208-214 associated with the subscribers 204 and 206. The service provider 202 may communicate over a communication link 229 with the communications network service provider 216. The information may be in the form of data packets 230a-230b (collectively 230) to manage, distribute, etc., the content of the subscribers 204 and 206 being maintained by the communications network service provider 216. If the subscriber 204 schedules particular content to be displayed by the facilities 208, then prior to the scheduled display time, the content is communicated by the communications network service provider 216 to the facilities 208. Because the communication of the content is a non-critical business communication, a low priority communication status may be applied to the communication so that the communication occurs at low-peak hours (e.g., at night) to minimize cost of communication for the service provider 202 and/or subscribers 204 and 206.

In operation, a retail operator 232 of the retail subscriber 204 may interface with the service provider 202 to load, unload, manage, store, distribute and display content. The content may be distributed to the retail facilities 208 by the communications network service provider 216 via the satellite 218. Similarly, a brand operator 234 of the brand subscriber 206 may interface with the service provider 202 to manage and distribute content to facilities 210, 212, and 214 of the retail subscribers 204a-204c.

Figure 3A:
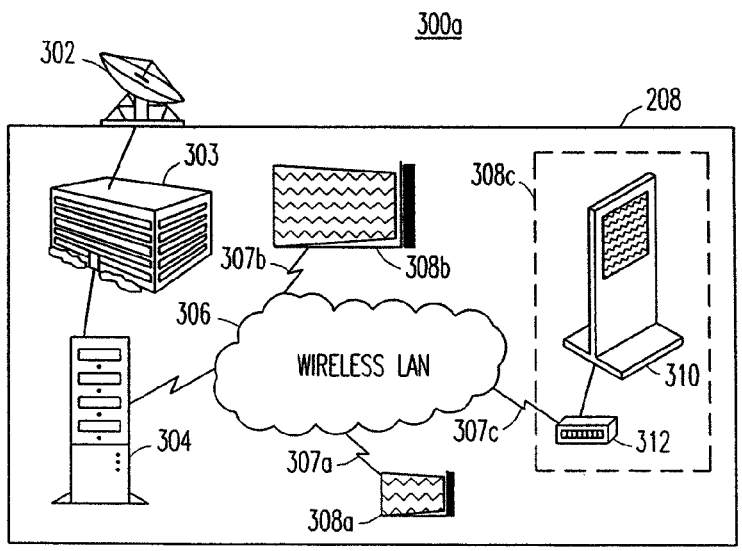
FIGS. 3A-3C are more detailed exemplary system block diagrams of infrastructure of the communications system of FIG. 2.

FIG. 3A is a more detailed exemplary system diagram 300a in accordance with the communications system 200 of FIG. 2. As shown, equipment utilized at a facility 208 for a retail subscriber 204 may include a satellite dish 302 maintained at the facility 208 that includes a local server 304. Within the facility 208, a wireless local area network (LAN) 306 may be utilized to communicate to a variety of visual appliances 308. The visual appliances 308 may be formed of an electronic display 310 coupled to an electronic display controller 312. One embodiment of the visual appliance 308a is a small electronic display 310 having an electronic display controller 312 embedded therein. Another exemplary visual appliance 308b includes a large electronic display 310 having an electronic display controller 312 embedded therein. Yet another exemplary visual appliance 308c includes an electronic display 310 having an electronic display controller 312.

In operation, the communications network service provider 216 communicates content to be displayed on the visual appliances 308, either individually or in groups, via the satellite dish 217 to the satellite 218 across the communication link 219. The satellite 218 operates as a transponder and communicates the content via the communication path 225 to the satellite dish 302 located at the facility 208. The local server 304 receives and stores the content for distribution to the visual appliances 308 via the wireless LAN 306. The local server 304 communicates the content to the visual appliances 308 in accordance with a broadcast schedule via a playlist, for example, for the content established by the subscriber 204. In scheduling the content to be distributed to the subscriber 204, an operator 314 associated with the subscriber 204 may interface with the service provider 202 across the communication lines 221 to schedule the content for display on the visual appliances 308. In establishing the schedule, the operator 314 may utilize an interface provided by the service provider 202. The interface may be a web site or other on-line interface that provides for scheduling services for the content to be displayed on individual or multiple visual appliances 308.

In addition to the operator 314 interfacing with the service provider 202 for scheduling content to be delivered and displayed at the facility 208, the interface may also provide the operator 314 the ability to access and manage accounts including functionality to manage the library of digital assets, view content in the library, determine content playing, perform site selection, scheduling a transmission of the content, and obtain detailed subscriber accounting and billing information. The interface also provides the capability for viewing detailed subscriber account information, which includes, but is not limited to, storage, billing, playlist schedules, transmissions, play acknowledgments, airtime plans, fault logs, and any historical logs that are generated. Multi-layered security may be utilized to allow subscribers 204 and 206 to designate various levels of restricted access to the stored content based on individual organizational requirements.

Figure 3B:
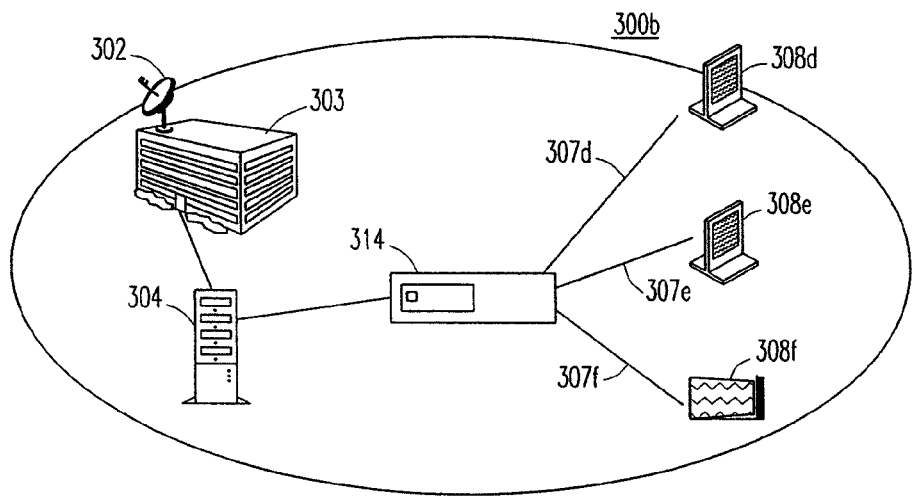

FIG. 3B is an exemplary local network 300b as utilized by a retail subscriber 204 at a facility 208 or brand subscriber 206 at a facility 210, 212, 214 as shown in FIG. 2. The local network 300b includes the satellite dish 302 coupled to the multi-media video satellite receiver unit 303, which is further coupled to the local server 304. An access point 314 is coupled to the local server 304 and is operable to wirelessly broadcast the content to the visual appliances 308d-308f via the communication paths 307d-307f, respectively, as understood in the art. The communication paths 307 may utilize an 802.11 wireless network protocol. In operation, the content is broadcast in accordance with the functionality provided by the local server 304 and the visual appliances 308.

Figure 3C:
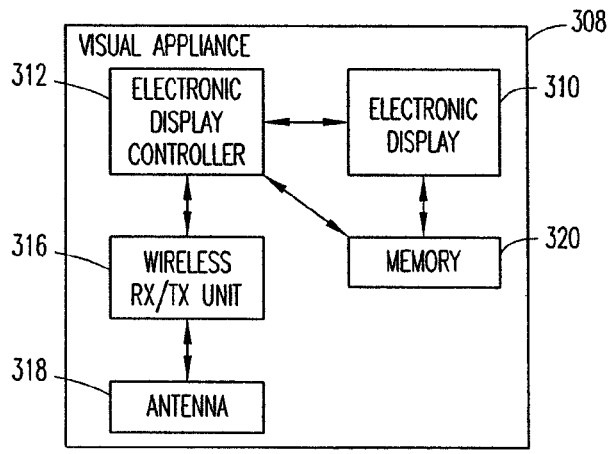

FIG. 3C is an exemplary block diagram of a visual appliance 308 of FIG. 3A. The visual appliance 308 may include the electronic display controller 316 in communication with the electronic display 310. To provide for wireless communication, the visual appliance 308 may include a wireless receiver/transmitter (Rx/Tx) unit 316 coupled to an antenna 318. The wireless receiver/transmitter unit 316 and antenna 318 may be tuned for frequencies utilized by the 802.11 or other wireless LAN standard as understood in the art. The electronic display controller 312 may further be coupled to the wireless receiver/transmitter 316 unit to receive and store data in a memory 320 for display on the electronic display 310. It should be understood that the electronic display 310 may be integrated with the electronic display controller 312 to form a visual appliance 308 capable of receiving, processing, storing, and displaying the content. Accordingly, the electronic display controller 312 may include processing capability and is further discussed with regard to FIG. 3B.

Visual Appliance Positioning in Facilities

Figure 4B:
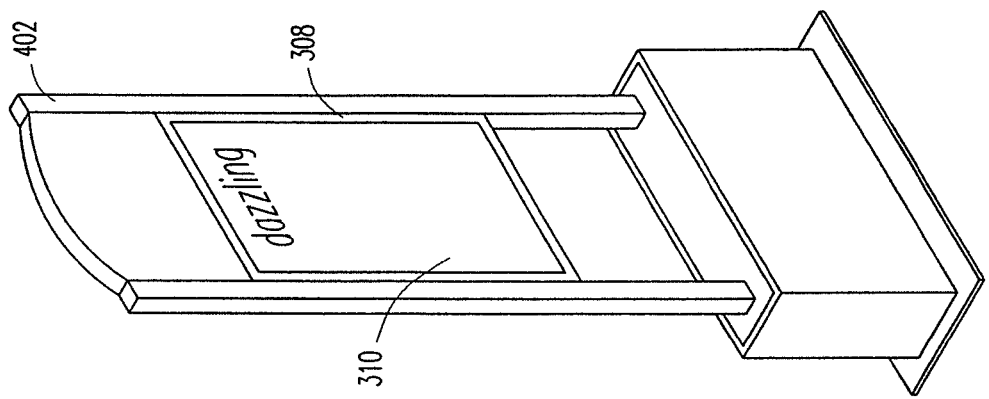
FIGS. 4A-4C are exemplary illustrations of various embodiments of visual appliances of FIG. 3A coupled to point-of-purchase displays as utilized in facilities of FIG. 2.
Figure 4A:
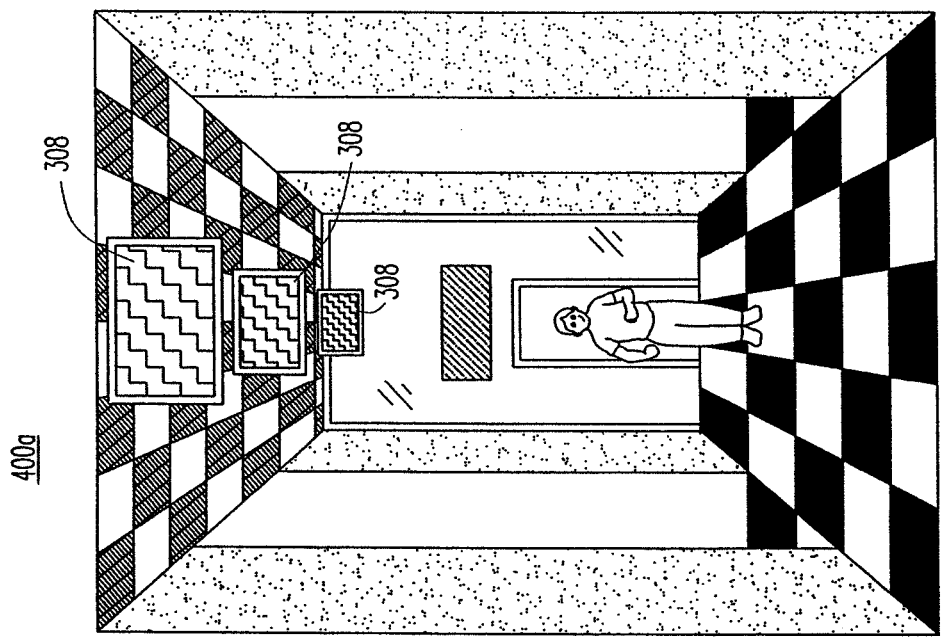
Figure 4C:
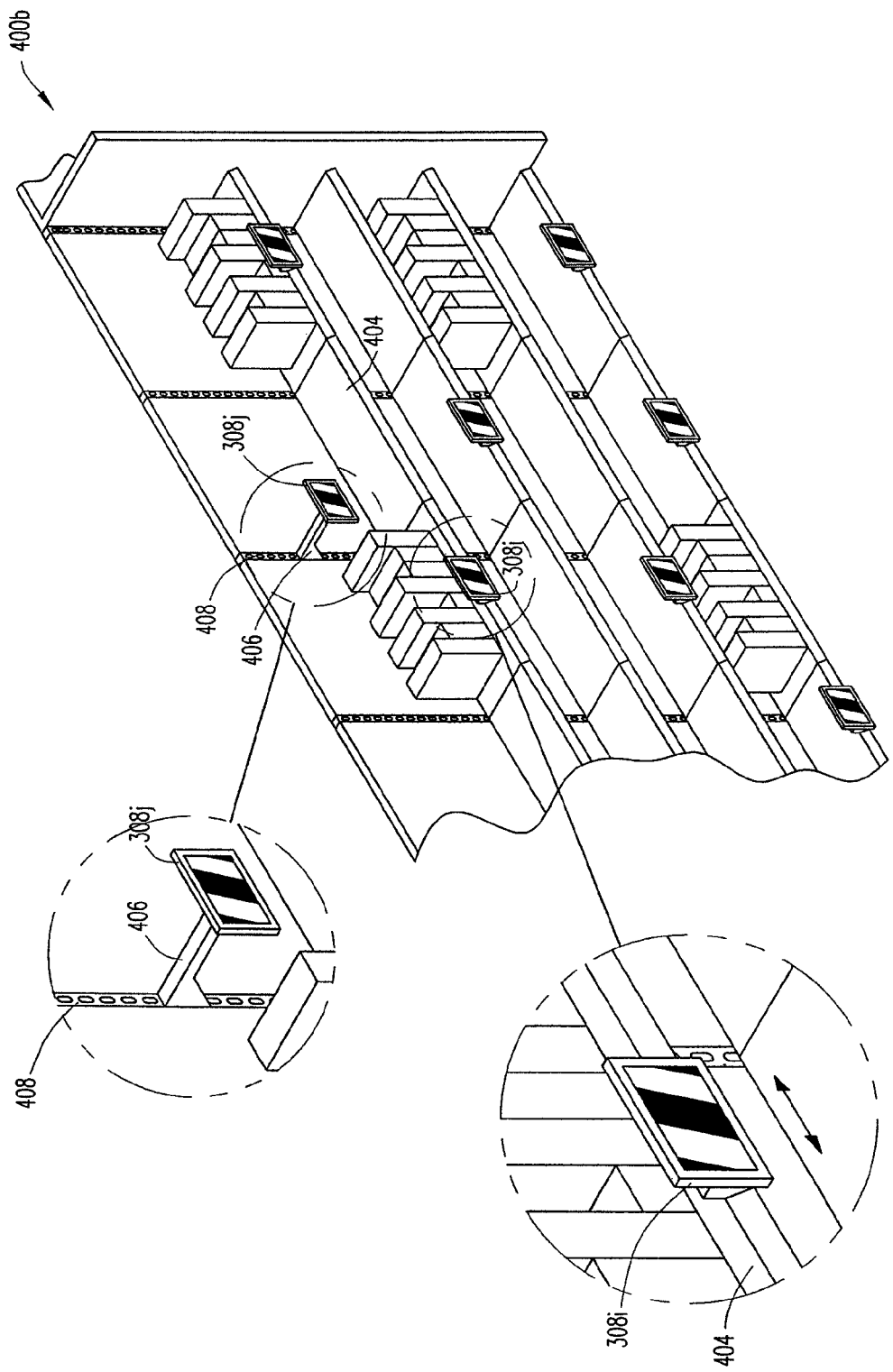

FIGS. 4A-4C are exemplary illustrations of various embodiments of the visual appliances 308. FIG. 4A is an exemplary facility environment 400a that shows large visual appliances 308 formed of plasma screens or CRTs mounted to the ceiling. Because the ceiling-mounted visual appliances 308 are not as closely situated to products as are shelf-mounted visual appliances 308, these visual appliances 308 may be utilized for more general advertising rather than product-targeted advertising. Because the electronic display controllers 312 may be stand-alone devices with standard video/audio output connectors, the electronic display controllers 312 may be adapted to existing electronic displays 310 (e.g., televisions) to enable the subscriber 204 to display content thereon. These ceiling-mounted visual appliances 308, however, may not be mapped into a traditional planogram, but may be assigned with alternative positioning values that correspond to the planogram. It should be understood that other configurations of CRTs and/or large flat-panel displays may be similarly configured with an electronic display controller 312 to form a visual appliance 308 that is mapped in association with the planogram (see, for example, FIG. 6).

FIG. 4B is an exemplary stand-alone floor display 402 that includes a visual appliance 308. Because the electronic display 310 is sufficiently large, multiple content and/or or advertisements may be displayed consecutively or simultaneously. In providing for such usage, the content for display may be "spliced" into a single content (e.g., video clip and/or loop) prior to distribution to reduce complexity of the electronic display controller 312. Similar to the visual appliances 308 of FIG. 3A, the stand-alone floor display 402 may not be mapped to the planogram, but may be associated therewith.

FIG. 4C is an exemplary point-of-purchase display 400b having for displaying products and configured to support visual appliances 308i and 308j. Because the visual appliances 308 may utilize a small, light-weight, electronic display 310, edge-mounted designs (e.g., visual appliance 308i) and bracket-extension designs (e.g., visual appliance 308j) may be utilized to mount the visual appliances 308 to a shelf 404 and a bracket 406 extending from a frame 408 of the point-of-purchase display 400b. And, because the visual appliances 308 are mounted to the point-of-purchase display 400b and disposed relative to products stored thereon, the visual appliances 308 may utilize planogram positioning values for location and positioning information. By being able to mount or configure the visual appliances 308 to an extensive variety of product display fixtures due to the ability to produce small, light-weight nature of the visual appliances 308, the subscriber 204 may assign content to be displayed according to product and/or shelf locations as defined in the planogram of one or more facilities 208. Visual appliance 308i is mounted to a sliding shelf mount and may therefore be repositioned by simply sliding to another section along the same shelf.

The visual appliances 308 may further be integrated into other point-of-purchase displays 400b, including stand-alone pricing and sign displays, gondola displays, slat wall displays, store fixtures, glass showcases in a fixed or movable configuration, free-standing display stand, and cosmetic cases. It should be understood that the variety of configurations for the visual appliances 308 are nearly infinite as the size and type of the electronic display 310 and electronic display controller 312 may be varied according to the fixturing and placement desired. For example, a shelf supporting a running-shoe may utilize a visual appliance 308 having a one-inch-by-one-inch (1"×1") electronic display 310, whereas a wall located at a weightlifting product display unit may utilize an electronic display 310 that utilizes plasma technology and is 48-inches-by-36-inches (48"×36") in size.

Power Distribution Systems

Figure 5A:
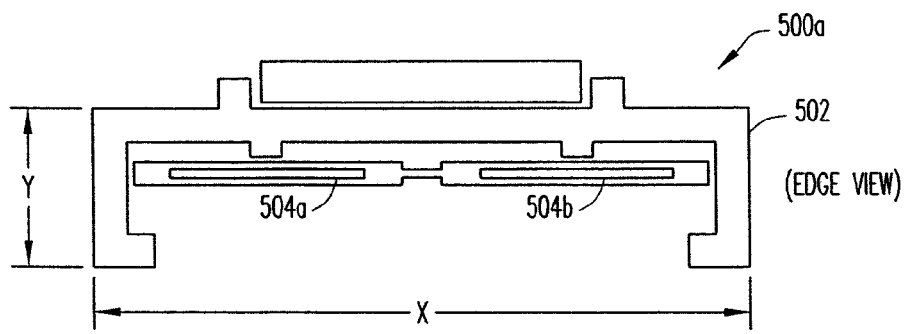
FIG. 5A is an edge-view of an exemplary power distribution system that includes a low-profile track and conductive power strips utilized in the facilities of FIG. 2.
Figure 5B:
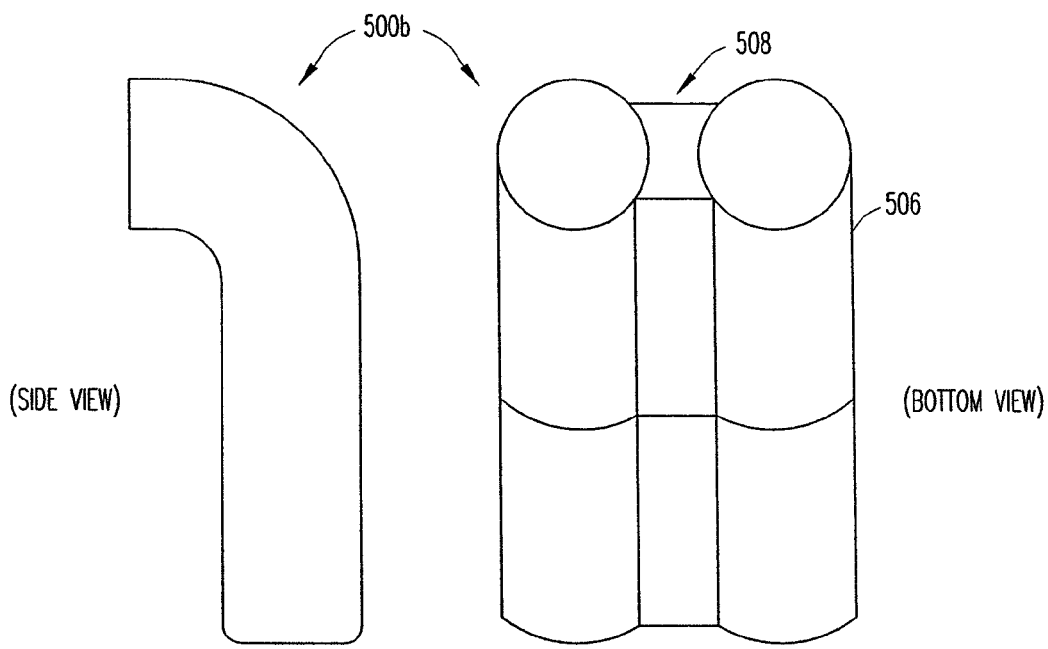
FIG. 5B is another exemplary power distribution system formed of tubing that may operate as a support extension arm to mount and extend visual appliances from a display fixture within the facilities of FIG. 2.
Figure 5C:
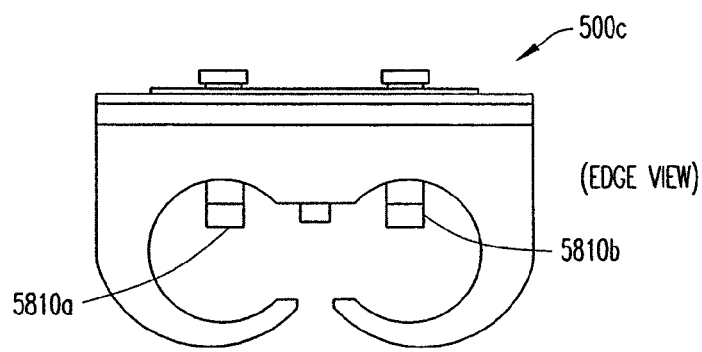
FIG. 5C is yet another embodiment of a power distribution system configured as a support arm connector that may be mounted below a shelf, along a wall, or otherwise support visual appliances of FIG. 3A.

FIGS. 5A, 5B, and 5C are exemplary power distribution systems that conduct electricity to power the visual appliances 308 and enable subscribers 204 who utilize the visual appliances 308 of FIG. 3A to maintain aesthetically pleasing public environments. Although the sizes and power requirements for the visual appliances may be relatively low, rather than relying on batteries, rechargeable or otherwise, power distribution systems may be designed to conform with the point-of-purchasing display or fixture (e.g., shelves).

FIG. 5A is an edge-view of an exemplary power distribution system 500a that includes a low-profile track 502 and conductive power strips 504a and 504b (collectively 504). The dimensions of the low-profile track 502 are x-wide and y-high and are sized to allow for the visual appliance 308 to be mounted below a shelf of a point-of-purchase display 400b without substantially obstructing products being displayed. Accordingly, the low-profile track 502 extends along a shelf such that the visual appliance 308 coupled thereto may be slid along the track to be disposed in relation to different products along the shelf. And, because the power strips 504 extend along the track 502, the operator moving the visual appliance 308 does not have to contend with wires, cords, or other power connecting devices.

FIG. 5B is another exemplary power distribution system 500b formed of tubing 506 that may operate as a support extension arm to mount and extend the visual appliance 308 from a point-of-purchase display 400b. Side and bottom views of the power distribution system 500b are shown, where the x-dimension of the tube 506 may be sized according to the usage. In one embodiment, the tubing 506 may be nickel-plated copper and separated by a non-conductive material 508 to isolate the two conductive paths. Accordingly, power adapters (e.g., plugs) may be configured to the visual appliance 308 to receive power from the power distribution system 500b. It should be understood that other, non-tubular designs may be provided to functionally offer the same or similar power distribution functionality and be integrated to a support structure of a point-of-purchase display 400b.

FIG. 5C is yet another embodiment of a power distribution system 500c configured as a support arm connector that may be mounted below a shelf, along a wall, or otherwise support a visual appliance 308. As shown, the edge view of the power distribution system 500c shows two electrical contacts 510a and 510b that provide for the power to be distributed along the power distribution system 500c. Again, the power distribution system 500c is to be utilized for simplifying the use of the visual appliances 308 in a facility 208, such as a grocery store, that dictates that power cords and other non-aesthetically pleasing devices not be used in conjunction with the visual appliances 308. It should be understood that other power distribution systems may be utilized that offer simple connections (e.g., snap-on) and support for the visual appliances 308 in accordance with the principles of the present invention.

Planogram

Figure 6:
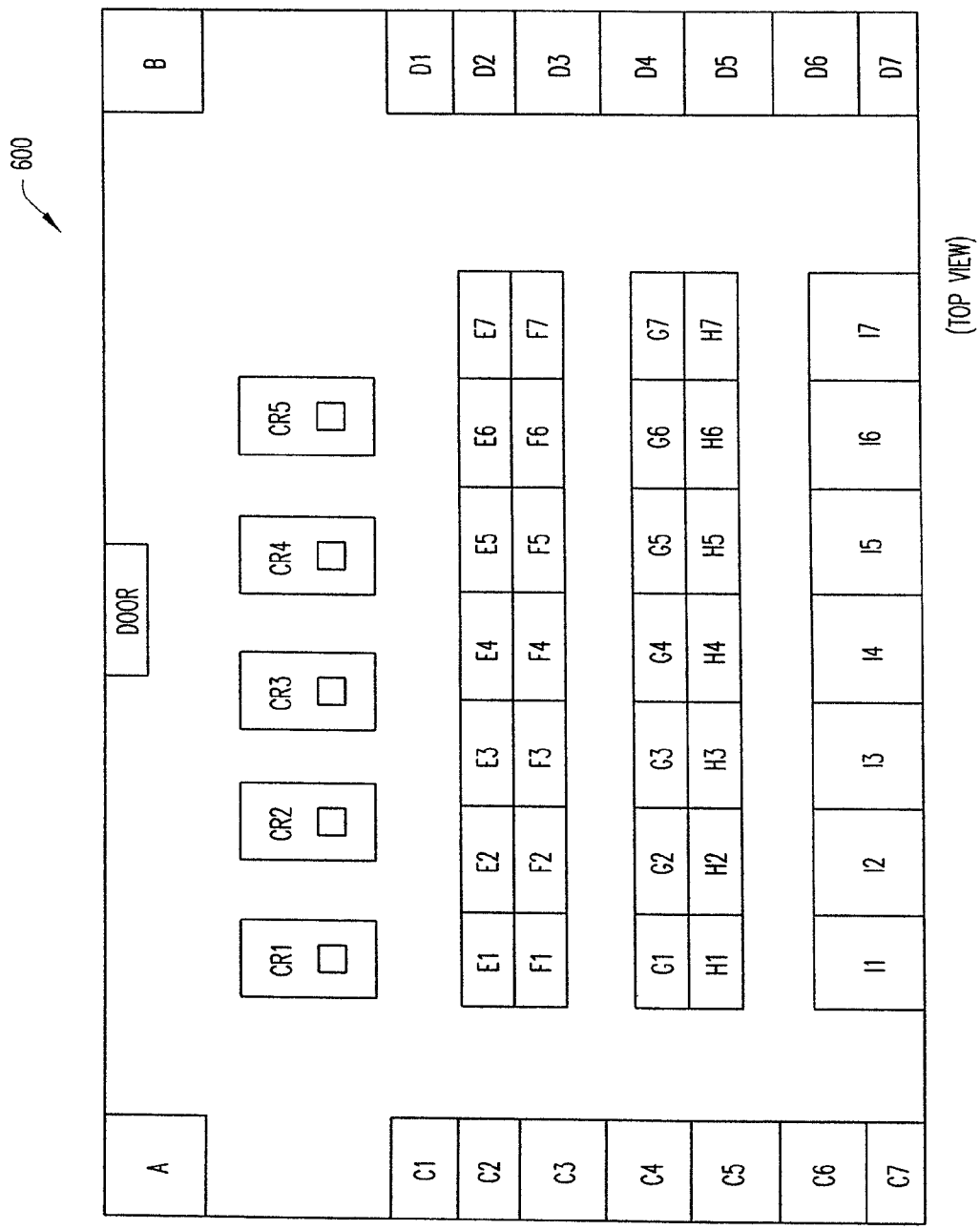
FIG. 6 is an exemplary planogram that maps a physical layout of a facility of FIG. 2.

Planograms are mappings of the physical layout of a facility 208, 210, 212, 214 (e.g., grocery store) in order to show the specific locations of the visual appliances 308 in accordance with the principles of the present invention (see FIGS. 2 and 3A). FIG. 6 is a top view of an exemplary planogram 600 of the physical layout of the facility 208 providing managers of the facility 208 an image or graphical representation of the physical layout. It should be understood that planograms may provide different views, including perspective views (see, for example, FIG. 4C), of the physical layout to assist the facility managers with the management of the facility. By using the planogram 600, the facility manager may determine where to place the visual appliances 308 in relation to particular products placed on the shelves of the facility 208.

As shown, the planogram 600 shows locations A through I, showing structures that support products. For locations C through I, for example, sections 1-7 are provided to account for different products being placed on the physical structures C through I. Accordingly, the visual appliances 308 may be coupled to the sections (e.g., C1-C7) to display content related to the products stored thereon. CR1-CR5 represent cash register checkout lines, which also may have visual appliances 308 coupled thereto. The subscriber 204 that utilizes the planogram 600 may have the values and/or the planogram 600 itself incorporated into the system so that the determination of where to place the visual appliances 308 based on content being shown is easier from an operation point-of-view. Additionally, the use of planogram information within the system allows the workers at the facility 208 to more easily place and record the placement of the visual appliances 308 via an interface having the planogram information pre-established. It should be understood that the planogram 600 may allow for subsections (e.g., C11-C16, not shown) within a given section (e.g., C1) as understood and that the system may accommodate substantially any amount of resolution of the planogram 600.

System Detailed Description Continued

Figure 7A:
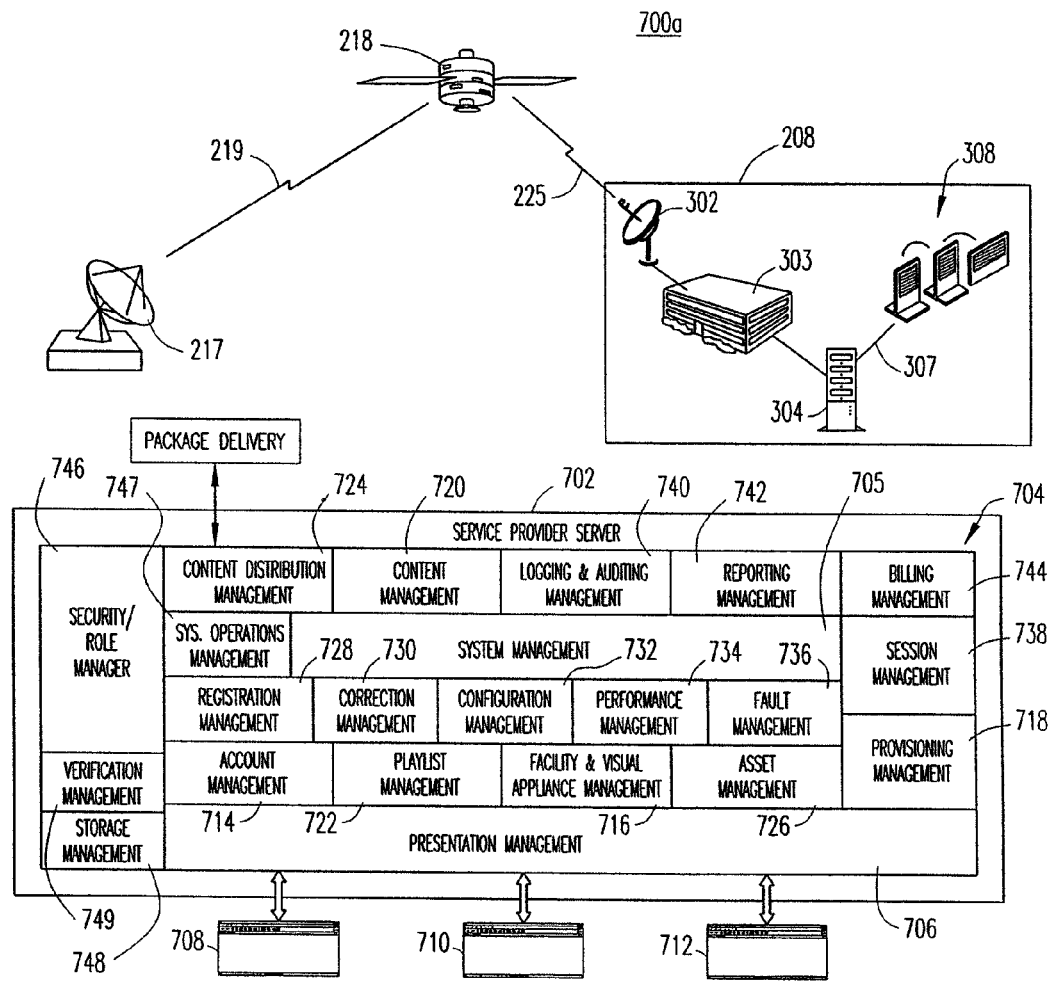
FIG. 7A is a system diagram that describes functional architecture of the service provider server of the service provider of FIG. 2.

FIG. 7A is a system diagram 700a that shows the functional architecture of a service provider server 702 that may be used by the service provider 202 (not shown) in conjunction with communication with the facility 208 via the satellite dish 217 (see also FIGS. 2 and 3A). The service provider server 702 includes standard hardware components, such as a processor, memory, input/output (I/O) unit, and storage unit (each not shown). The processor or processors are operable to provide for the functionality of the service provider server 702 as provided by the functional architecture 704.

In general, the service provider server 702, which may operate as a central or distributed site, enables content management, store and display management, and content distribution functionality for the service provider 202. The service provider server 702 may be utilized to provision new subscribers 204 and 206, facilities 208, visual appliances 308, and domains for each subscriber 204. When a new subscriber 204 is set-up, a new subscriber administrator account is established. When the new subscriber account is established, an employee designated as a subscriber administrator (not shown) may be designated to manage functionality pertaining to the content, users, facilities 208, visual appliances 308 and domains for the subscriber. The subscriber administrator is able to add new users to the account and assign roles to the users, where the roles provide a way to define the system features available to the users based on responsibility of the users for the subscriber 204.

The subscriber administrator is able to create new users and assign them roles allowing each to perform various tasks. A user may be a facility manager (e.g., store manager), content creator, or content approver, for example. Each user has pre-defined responsibilities and access security levels associated with the role assigned to that user.

After the subscriber account is established and new users are created with appropriate security privileges, the subscriber 204 may start using the system. The user who has been assigned a content creator role may upload the content through the network 220 (FIG. 2) or import the content via an external interface (not shown) onto a storage unit that is accessible by the service provider server 702 and communications network service provider 216. A user who is assigned the content approver role is able to review the content and approve it for distribution. Users are able to search and view the content. A user assigned to the facility manager role may add facilities 208 and visual appliances 308 for the subscriber 204 or 206.

A user who is assigned a playlist creator role may create a playlist after the relevant content information, facility 208, and visual appliance 308 information is added. A "playlist" is a mapping of content to specific visual appliance(s) 308 along with associated start and end times.

Once content is loaded into the system and the playlist is created, the content is delivered to the local servers 304 via a package delivery subsystem (not shown) from the communications network service provider 216. In one embodiment, the content may be delivered via the satellite 218. The content is first packaged by a content distribution management package, where the term "package" refers to any data (including playlist and content) that may take the form of one or more files. Package delivery supports the simultaneous transmission of content to one or more locations and the preemption of lower priority packages to ensure the timely delivery of higher priority packages.

The service provider server 702 has modules that enable a user assigned a service provider system operator role to execute system operation functions ranging from asset management to monitoring performance to security management. It should be understood that the service provider 202 may view and perform operations on the content that is uploaded for distribution by each subscriber 204 and 206.

The service provider server 702 provides the ability to keep track of equipment or infrastructure communications on the communications system 200, including the local servers 304, visual appliances 308, and wireless access points (not shown). A user assigned an asset administrator role for the service provider 202 is allowed to add or delete the assets from an asset information database. By maintaining current equipment disposition information and historical logs, asset management essentially provides the inventory for infrastructure located on the communications system 200.

The service provider server 702 provides the capabilities to monitor and manage the local servers 304 and the visual appliances 308 from a system perspective. The service provider 202 is able to monitor the system-wide functionality, such as local server connectivity, local server configuration, local server storage management, visual appliance activation/deactivation, local server status check, visual appliance status check and local network check.

Security for the communications system 200 ensures the integrity of the components and information stored thereon. To that effect, the service provider server 702 provides operators of the service provider 202 multiple tools to ensure that the security of the communications system 200 is not breached. Apart from monitoring any unauthorized access, the operators are responsible for creating default system-wide roles, such as subscriber administrator, content creator, content approver, playlist creator, verification manager, etc. In addition, the operators of the service provider 202 may change the encryption keys for any local server 304 or visual appliance 308 in real-time to ensure that an intruder has not compromised security keys therefor.

TABLE 1 describes the functionality provided by the functional architecture 704 executed by the service provider server 702.

TABLE 1

SERVICE PROVIDER SERVER FUNCTIONALITY

| Ref. No. | Service Provider Server Package/User Interface | Functionality Description |
|---|---|---|
| 705 | System Management | Coordinates and controls functionality of service provider server 702 and ensures operability and maintenance of service |
| 706 | Presentation Management | Formats and handles interactions for internal and external user interfaces |
| 708 | Digital Asset Manager User Interface | Provides a user interface for subscriber to manage digital assets by the service provider server 702 |
| 710 | Subscriber Portal | Provides a portal for subscribers 204 and 206 to upload and schedule content and access business information |
| 712 | Operations Portal | Provides an interface for the service provider to manage the system and subscribers 204 and 206 |
| 714 | Account Management | Creates and analyzes the requirements collected for subscriber account creation, modification, and deletion |
| 716 | Facility and Visual Appliance Management | Creates records of facilities 208 and visual appliances 308 |
| 718 | Provisioning Management | Provisions records for facilities and visual appliances 308 for usage by the subscribers 204 and 206 |
| 720 | Content Management | Manages the content collection and maintenance processes |
| 722 | Playlist Management | Provides the functionality needed to create, modify, delete, view, and approve schedule records (data that directs the system to play particular content on a particular visual appliance at a particular time |
| 724 | Content Distribution Management | Manages distribution of content based on the schedule records |
| 726 | Asset Management | Tracks and manages physical assets (e.g., local servers 304, visual appliances 308, and wireless access points 303) |
| 728 | Registration Management | Validates the rights for a local server 304 to operate within the communications system 200 |
| 730 | Connection Management | Controls the connection of the service provider server 402 with a local server 304 |
| 732 | Configuration Management | Configures the local servers 304 and visual appliances 308 at the service provider server 402 |
| 734 | Performance Management | Collects performance statistics from the communications network 200, including local servers 304, visual appliances 308, and other equipment to be reported to the system operator for review |
| 736 | Fault Management | Collects events and alarms from the local servers 304 and visual appliances 308 |
| 738 | Session Management | Manages currently active sessions with local servers 304 and visual appliances 308 by generating user list and enabling usage |
| 740 | Logging and Auditing Management | Maintains and manages repository of logs generated by events and audit results |
| 742 | Reporting Management | Manages reporting operations for service provider 202 and subscribers 204 and 206 associated with usage of communications system 200 |
| 744 | Billing Management | Provides billing operations for subscribers 204 and 206 |
| 746 | Security and Role Management | Maintains repository for security-related information for users, local servers 304, visual appliances 308, and communications system 200 |
| 747 | System Operations Management | Provides for management of system functions at the service provider server 702 |
| 748 | Storage Manager | Manages and maintains content on storage units, on local servers 304 operating on the communications system 200 |
| 749 | Verification Manager | Manages verification of content being displayed on visual appliances 308 |

Figure 7B:
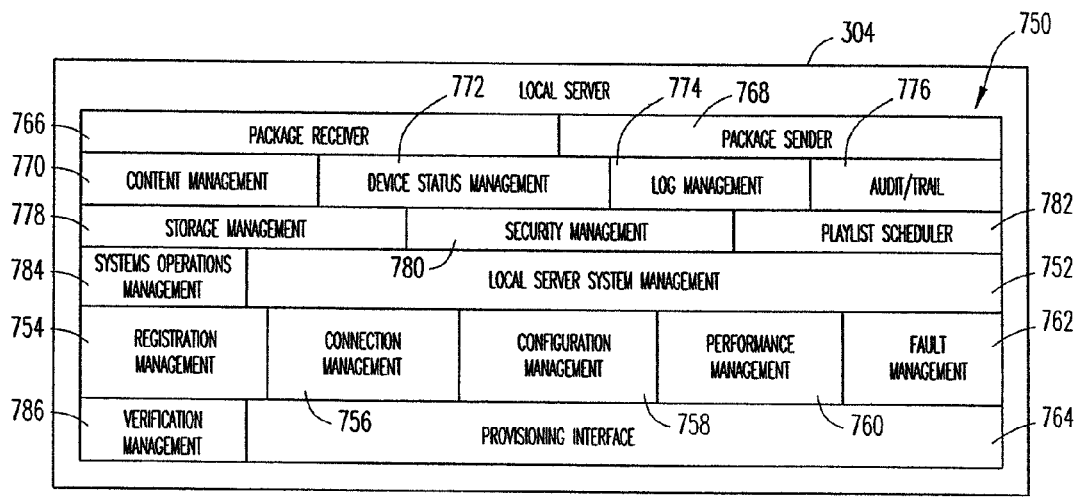
FIG. 7B is an exemplary block diagram of functional architecture provided by the local server in accordance with FIG. 3A.

FIG. 7B is an exemplary block diagram of functional architecture provided by the local server 304 in accordance with FIGS. 2 and 3A. Similar to the service provider server 702, the local server 304 includes a processor, memory, input/output (I/O) unit, and storage unit (all not shown) as understood in the art. It should be understood that the storage unit may be coupled to the local server 304 rather than being integrated therein.

The local server 304 substantially mirrors much of the functional architecture of the service provider server 702, but with more limited functionality. In general, the local server 304 is operable to receive the content from the communications network service provider 216 and communicate the content to the scheduled visual appliance(s) 308. Each facility 208 may include a local server 304. However, closely spaced facilities 208 may share local servers 304. In response to receipt of the content and associated playlist, the local server 304 creates a local schedule for the visual appliances 308 that forms the basis of the content distribution to the visual appliances 308. Based on the local schedule, the local server 304 either broadcasts or multicasts the content to specific visual appliance(s) 308 within the facility 208 over the wireless LAN 306. In one embodiment, the wireless LAN 306 is an 802.11 wireless network (i.e., wireless ethernet). Other wireless protocols as understood in the art alternatively may be utilized. Transmission errors from the local server 304 to the visual appliances 308 are handled locally. In the case of an improper transmission, the local server 304 is operable to retransmit lost segments to the visual appliance 308. Polling of the visual appliances 308 by the local server 304 may be performed to collect errors, alerts, and log data. In one embodiment, when the transmission exceeds a specific threshold, an alert message may be generated to the service provider server 702 or other monitoring system for corrective action.

In general, the visual appliance 308 receives content from the local server 304 and starts playing the content in the memory 320. In addition, the visual appliance 308 may store a default image that may be played during times when no content has been scheduled for that visual appliance 308. The visual appliance 308 may forward usage logs and alerts to the local server 304, and provides interfaces, which allow the operator of the service provider 202 to monitor and manage the visual appliance 308.

TABLE 2 describes the functionality provided by the functional architecture 750 executed by the local server 304.

Figure 7C:
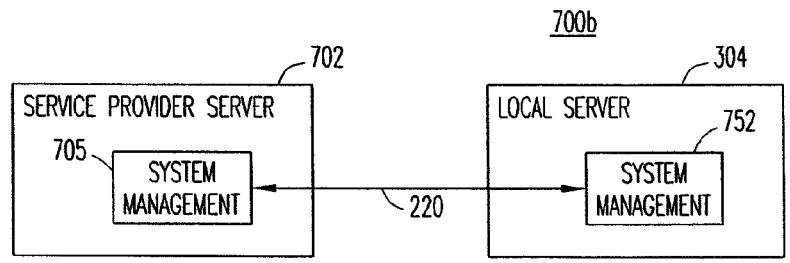
FIG. 7C is an exemplary block diagram depicting communication between the service provider and local servers of FIGS. 7A and 7B.

FIG. 7C is an exemplary block diagram 700b that provides for the service provider server 702 to communicate with the local server 304 of FIGS. 7A and 3A, respectively. As shown, the system management packages 705 and 752 of the service provider server 702 and local server 304, respectively, are utilized to communicate information, such as scheduling and/or system management information, via the network 220 to enable subscribers 204 and 206 to utilize the content management and distribution services provided by the service provider 202. It should be understood that other and/or additional packages may be utilized to perform communications between the service provider server 702 and the local server 304.

Figure 8:
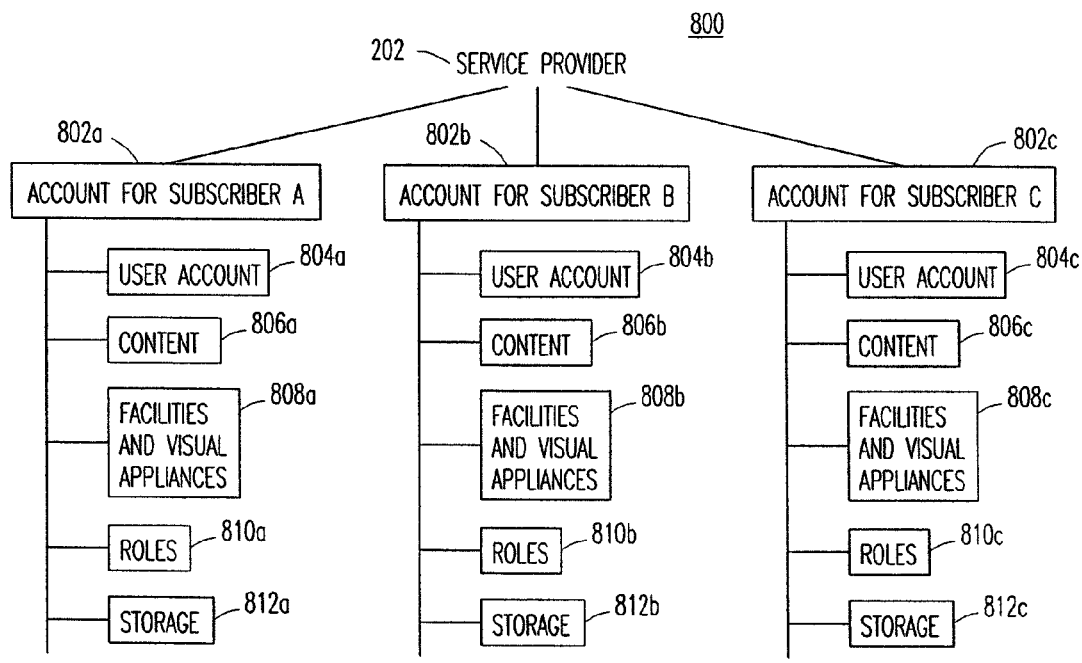
FIG. 8 is an exemplary hierarchy account structure for subscribers of the service provider of FIG. 2.

FIG. 8 is an exemplary hierarchy account structure for subscribers 204 and 206 of the service provider 202. It should be understood that a subscriber may also be considered a customer. As shown, each subscriber has an account 802a-802c that includes the same or similar categorical information. Included in the subscriber accounts 802 are user accounts 804a-804c (collectively 804), which allow individuals to utilize the system, content 806a-806c (collectively 806), facilities and visual appliances 808a-808c (collectively 808), roles 810a-810c (collectively 810), and storage 812a-812c for the users. It should be understood that other information for the subscriber account 802 may be utilized in providing functionality for the subscribers 204 and 206.

In general, the subscriber accounts 802 operates as a master account for a subscriber 204 without regard to the number of facilities 208 associated with the subscriber 204. For

TABLE 2

Local Server Functionality

| Ref. No. | Local Server Package | Functionality Package |
|---|---|---|
| 752 | Local Server System Management | Coordinates and controls functionality of the local server 304 and ensures operability and maintenance of local server |
| 754 | Registration Management | Registration by the local server 304 with the service provider server 702 at provisioning time |
| 756 | Connection Management | Controls connection operations with the service provider server 702 |
| 758 | Configuration management | Manages configurations of the local server 304 and visual appliances 308 as directed by the service provider server 702 |
| 760 | Performance Management | Collects and manages summary information of operations and performance of the local server 304 and visual appliances 308 to be reported to the service provider server 702 |
| 762 | Fault Management | Collects and generates events and alarms from the local server 304 and visual appliances 308 for reporting to the service provider server 702 |
| 764 | Provisioning Interface | Maintains repository for provisioning information associated with the local server 304 and visual appliances 308 |
| 766 | Package Receiver | Receives packages of content and playlists as provided to the service provider server 402 |
| 768 | Package Sender | Sends packages of content to visual appliances 308 |
| 770 | Content Management | Manages content at the local server 304 |
| 772 | Device Status Management | Maintains current operating status of the communications system 200, including local server 304, local LAN 300b, visual appliances 308, service provider server 702, etc. |
| 7744 | Log Management | Maintains and manages repository of logs generated by events on the communications system 200, including local server 304, local LAN 300b, and visual appliances 308 |
| 776 | Audit/Trail | Performs and maintains audit information from local server 304 and visual appliances 308 |
| 778 | Storage Management | Manages storage of content at the local server 304 |
| 780 | Security Management | Maintains repository for security-related information for users, local server 304, and visual appliances 308 |
| 782 | Playlist Scheduler | Determines particular content to transmit to particular visual appliance 308 at a particular time |
| 784 | Systems Operations Management | Provides for management of system functions at the local server 304 |
| 786 | Verification Management | Manages verification of content being displayed on the visual appliance 308 | example, a subscriber account 802a is created for each subscriber 204 that is a direct subscriber 204 of the service provider 202. Each subscriber account 802 is assigned a unique identification number (ID) throughout the system. In addition, billing is associated with each subscriber account 802. At the creation of a new subscriber account 802, a logical directory structure may be created to hold the content 806. The content belonging to the subscriber 204 is associated to the corresponding subscriber account 802. In addition, a default user account 804 with a subscriber administrator role is created for each subscriber account 802.

Multiple user accounts 804 with different roles may be created under the subscriber account 802. The users belonging to a particular subscriber account 802 are able to access system functionality and objects within the subscriber domain. For example, users belonging to a subscriber account 802 for a brand subscriber 206 are able to access only the facilities, content, visual appliances 308, etc., that have been defined under the domain for the brand subscriber 206. A role is an aggregation of different system functionality. Users associated with specific roles are able to access the system functionality as defined for those roles within the system. For example, a user assigned a content creator role may access the create content, modify content and delete content functions. Operators for the service provider 202 are able to create roles within the system. In addition, subscriber administrators are able to create subscriber specific roles that are applicable within their subscriber domain. A default set of roles are created that may be assigned to both service provider and subscriber users.

Figure 9:
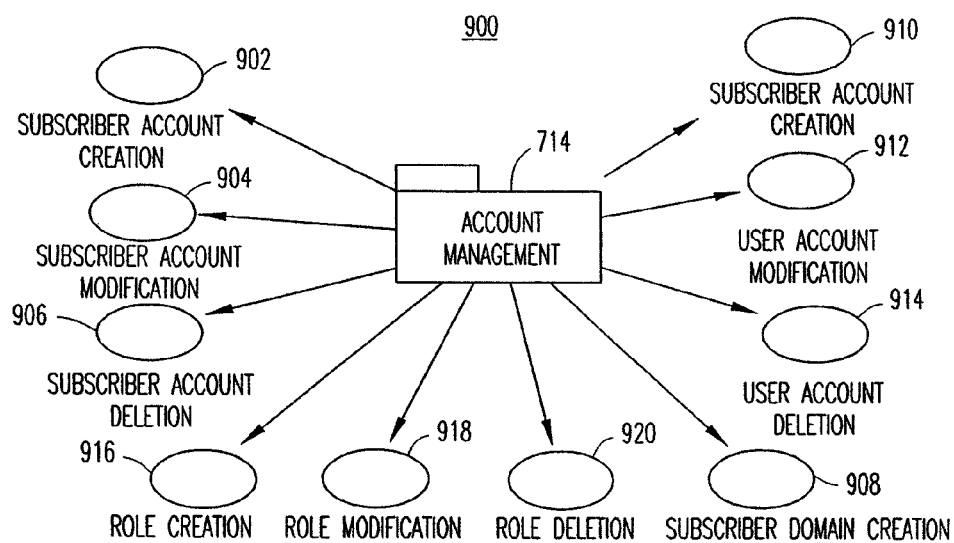
FIG. 9 is an exemplary block diagram describing the functional components utilized by the account management package of FIG. 7A.

FIG. 9 is an exemplary block diagram 900 describing the functional components utilized by the account management package 714 of FIG. 7A. The account management package 714 provides for managing subscriber accounts 802, roles of users, subscriber domains, and user accounts 804. In managing the subscriber accounts 802, the account management package 714 includes subscriber account creation module 902, subscriber account modification module 904, and subscriber account deletion module 906. Once the subscriber accounts 802 are created, the account management package 714 provides for subscriber account domain creation module 908 to define the domain for each subscriber 204. Users for the subscribers 204 may be created by a user account creation module 910. Once the user account 804 is created, the user account 804 may be modified by the user account modification module 912 and deleted by the user account deletion module 914. The user may then be defined roles, whereby a role defines the features available to the users based on the area of responsibility within the organization of the subscriber 204. In managing the roles, a role creation module 916, role modification module 918, and role deletion module 920 are provided.

Figure 10:
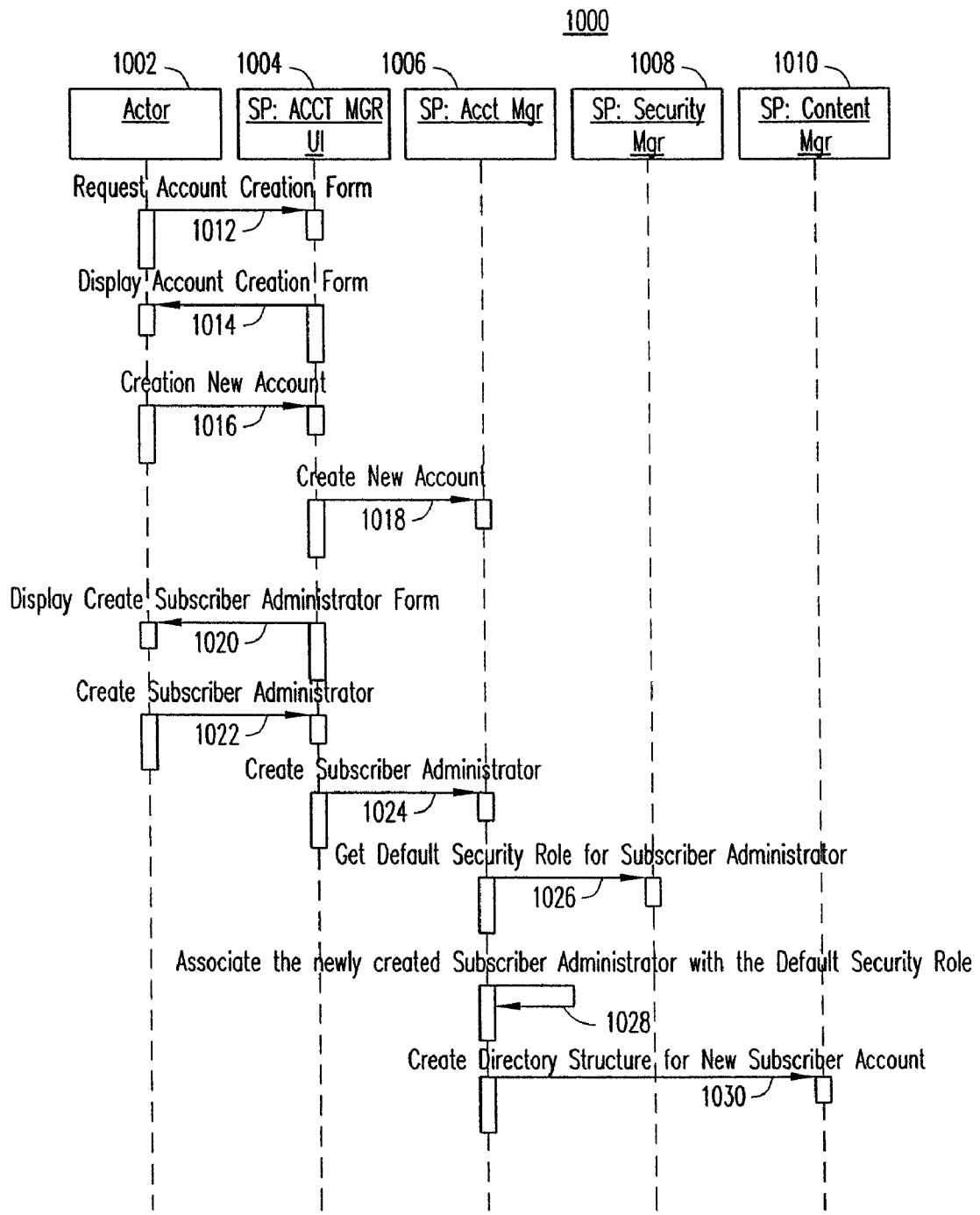
FIG. 10 is an exemplary sequence diagram that illustrates the creation of a new subscriber account as provided by a subscriber account creation module of FIG. 9.

FIG. 10 is an exemplary sequence diagram 1000 that illustrates the creation of a new subscriber account 802 as provided by the subscriber account creation module 902 of FIG. 9. The step numbers and associated actions are provided in TABLE 3 below. As shown, in performing the account management, an actor 1002, which may be a user of the service provider 202, interacts with a service provider (SP) account manager user interface (UI) module 1004. The service provider account manager user interface module 1004 may interact with other modules, including a service provider account manager module 1006, service provider security manager module 1008, and service provider content manager module 1010.

TABLE 3

New Subscriber Account Creation Flow

| STEP | ACTION |
|------|--------|
| 1012 | Request account creation form |
| 1014 | Display account creation form |
| 1016 | Create new account |
| 1018 | Create new account |
| 1020 | Display create subscriber administrator form |
| 1022 | Create subscriber administrator |
| 1024 | Create subscriber administrator |
| 1026 | Get default security role for subscriber administrator |
| 1028 | Associate the newly created subscriber administrator with the default security role |
| 1030 | Create directory structure for new subscriber account |

In operation, the actor 1002 requests an account creation form at step 1012 from the service provider account manager user interface module 1004. The service provider account manager user interface module 1004 may display an account creation form at step 1014. The actor 1002 may utilize the account creation form to create a new subscriber account at step 1016. In creating the new subscriber account 802, the service provider account manager user interface module 1004 displays the account creation form, which requests subscriber name, address, e-mail domain, contact number list, contact person list, subscriber ID, and subscription ID, for example. The system automatically generates a user subscriber identifier (ID) for the new subscriber account 802. At step 1018, the service provider account manager user interface module 1004 may initiate a request to the service provider account manager module 1006 to create a new subscriber account 802. The service provider account manager user interface module 1004 may thereafter display a create subscriber administrator form for the actor 1002 at step 1020. At step 1022, the actor 1002 may create a subscriber administrator. The service provider account manager user interface module 1004 may communicate a request to the service provider account manager module 1006 to create a subscriber administrator at step 1024. At step 1026, the service provider account manager module 1006 may get a default security role for the subscriber administrator being created from the service provider security manager module 1008. At step 1028, the newly created subscriber administrator is associated with a default security role by the service provider account manager module 1006. At step 1030, a directory structure for the new subscriber account 802 is created by the service provider account manager module 1006 notifying the service provider content manager module 1010. The default user account may include the following attributes: user name, password, position, contact number, e-mail address, subscriber ID, and subscription ID. After the subscriber account 802 is created, the subscriber account modification module 904 and subscriber account deletion module 906 allow the service provider 202 the ability to modify and/or delete the subscriber account 802 by utilizing the components 1004-1010 as understood in the art.

Figure 11:
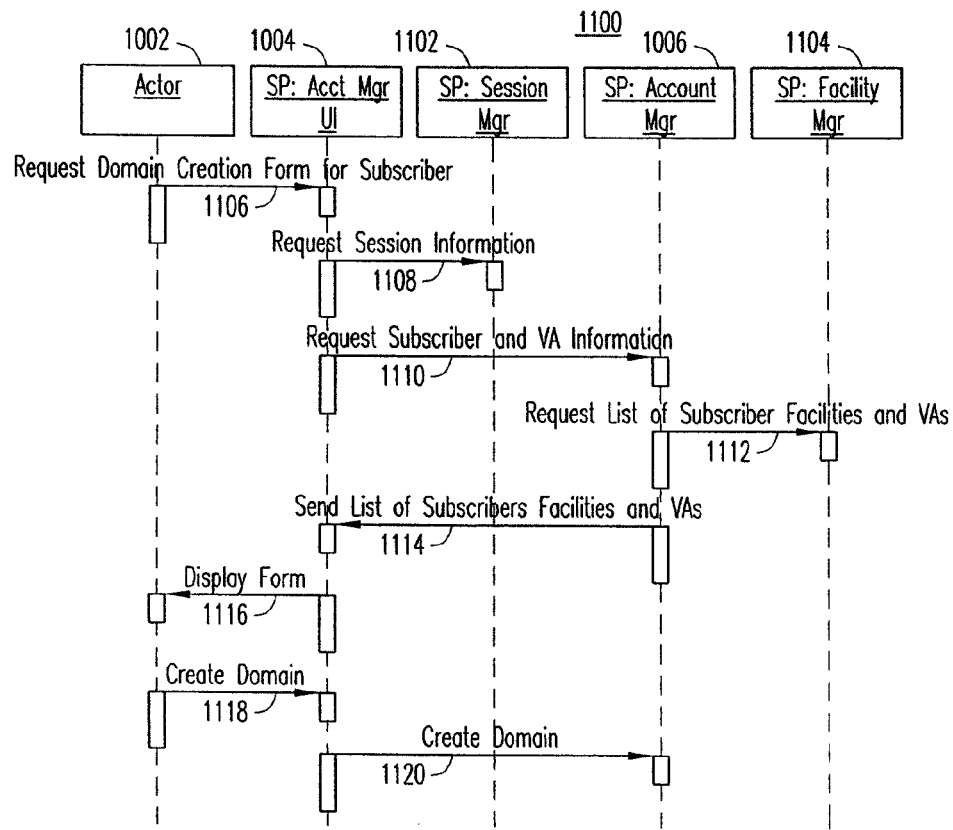
FIG. 11 is an exemplary sequence diagram illustrating the creation of a new subscriber domain by a subscriber domain creation module of FIG. 9.

FIG. 11 is an exemplary sequence diagram 1100 illustrating the creation of a new subscriber domain by the subscriber domain creation module 908 of FIG. 9. The step numbers and associated actions are provided in TABLE 4 below. A subscriber domain is a collection of subscriber facilities 208 and visual appliances 308 belonging to that subscriber 204 and are used to specify the context within which security roles of users are applicable. For example, the subscriber 204 may create a "northeast" domain comprising all stores for that subscriber in the northeastern United States. Subsequently, a user assigned a content approver role and having access to the northeast domain is limited to approving content intended for facilities 208 or stores in the northeast domain.

TABLE 4

New Subscriber Domain Creation Flow

| STEP | ACTION |
|---|---|
| 1106 | Request domain creation form for subscriber |
| 1108 | Request session information |
| 1110 | Request subscriber and visual appliance information |
| 1112 | Request list of subscriber facilities and visual appliances |
| 1114 | Send list of subscriber facilities and visual appliances |
| 1116 | Display form |
| 1118 | Create domain |
| 1120 | Create domain |

The subscriber domain creation module 908 utilizes a service provider session manager module 1102 and service provider facility manager module 1104 in addition to the actor 1002, service provider account manager user interface module 1004, and service provider account manager module 1006. In creating the new subscriber domain, a request from the actor 1002 to the service provider account manager user interface module 1004 is performed at step 1106 for a domain creation form. The service provider account manager user interface module 1004 issues a request to the service provider session manager module 1102 for session information. Additionally, the service provider account manager user interface module 1004 issues a request to the service provider account manager module 1006 for information associated with the subscriber 204 and visual appliance 308. At step 1112, the service provider account manager module 1006 requests a list of subscriber facilities 208 and visual appliances 308 from the service provider facility manager module 1104.

At step 1114, the list of subscriber facilities 208 and visual appliances 308 are sent from the service provider account manager module 1006 to the service provider account manager user interface module 1004. The service provider account manager user interface module 1004 displays a form with the list of subscriber facilities 208 and visual appliances 308 to the actor 1002 at step 1116. At step 1118, the actor 1002 creates a domain for the subscriber 204 by selecting the facilities 208 and/or visual appliances 308 and provides the domain name and description to the service provider account manager user interface module 1004. At step 1120, the domain of the subscriber 204 is created by the service provider account manager user interface module 1004 issuing a notice to the service provider account manager module 1006.

Figure 12:
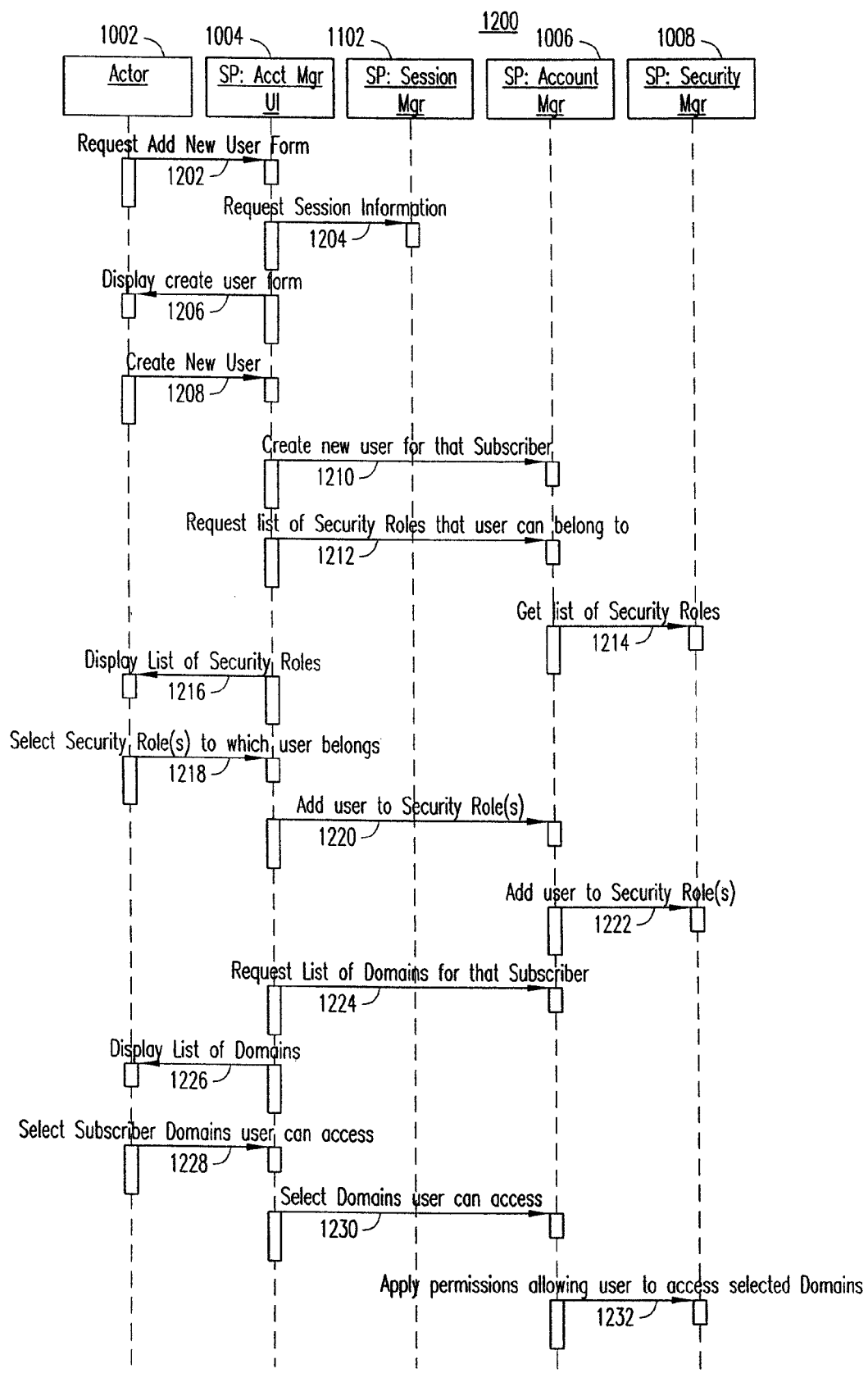
FIG. 12 is a sequence diagram that illustrates the creation of a new user account as provided by the user account creation module of FIG. 9.

FIG. 12 is a sequence diagram 1200 that illustrates the creation of a new user account as provided by the user account creation module 910 of FIG. 9. The step numbers and associated actions are provided in TABLE 5 below. Prior to establishing the user account, the actor 1002 is to be authenticated and authorized to access user creation functionality for the subscriber 204. The creation of a new user account for a subscriber 204 is a three-step process. In the first step, the actor 1002 provides the user attributes, including, but not limited to, user name, password, user contact information, e-mail address, subscriber ID, subscription ID, etc., to enable the creation of the user account by the service provider account manager module 1006. In addition, the account administrators of the service provider 202 are able to define the following attributes for a user account: division, department, contact number, address, and status, for example. The system creates a unique ID for each user of the subscriber 204. The system also is able to verify that the e-mail address entered matches the e-mail domain of that subscriber 204. In the second step, the actor 1002 selects the list of security roles to which the newly created user should access and submit this information. Each user has access to at least one role. In the third step, the actor 1002 chooses the domains, (i.e., group of facilities 208) for that subscriber 204 that the newly created user has access and submits this selection. By default, new user accounts are marked "inactive" and are unavailable for use. After the creator of the user accounts marks the newly created account as "active", the new user account is available for use.

TABLE 5

New User Account Creation Flow

| STEP | ACTION |
|---|---|
| 1202 | Request add new user form |
| 1204 | Request session information |
| 1206 | Display create user form |
| 1208 | Create new user |
| 1210 | Create new user for that subscriber |
| 1212 | Request list of security roles to which user can belong |
| 1214 | Get list of security roles |
| 1216 | Display list of security roles |
| 1218 | Select security role(s) to which user belongs |
| 1220 | Add user to security role(s) |
| 1222 | Add user to security role(s) |
| 1224 | Request list of domains for that subscriber |
| 1226 | Display list of domains |
| 1228 | Select subscriber domains user can access |
| 1230 | Select domains user can access |
| 1232 | Apply permissions allowing user to access selected domains |

As shown, at step 1202, a request by the actor 1002 via the service provider account manager user interface module 1004 for an add new user form is performed. At step 1204, the service provider account manager user interface module 1004 requests session information from the service provider session manager module 1102. At step 1206, the service provider account manager user interface module 1004 displays a create user form for the actor 1002. The actor 1002 creates a new user by providing the user name, password, contact information, subscriber ID, etc., in the create user form. The service provider account manager user interface module 1004 creates a new user for the subscriber 204 by sending the information to the service provider account manager module 1006. Additionally, the service provider account manager user interface module 1004 requests a list of security roles that the user is assigned at step 1212. The service provider account manager module 1006 requests a lists of security roles from the service provider security manager module 1008 at step 1214.

At step 1216, the service provider account manager user interface module 1004 displays a list of security roles to the actor 1002. The actor 1002 selects security roles that the user is assigned at step 1218 and adds the user at step 1220. The service provider account manager user interface module 1004 communicates to the service provider account manager module 1006 security roles for the user account being created. At step 1222, the service provider account manager module 1006 adds a user to the security role(s) by informing the service provider security manager module 1008.

The service provider account manager user interface module 1004 requests a list of domains available for the subscriber 204 from the service provider account manager module 1006 at step 1224. At step 1226, the service provider account manager user interface module 1004 displays the list of domains to the actor 1002. The actor selects subscriber domains that the user may access at step 1228. At step 1230, the selected domains that the user may access are communicated to the service provider account manager module 1006 at step 1230. At step 1232, permissions allowing the user to access selected domains are applied to the user account by the service provider security manager module 1008. In addition to creating the user account, the user accounts may be modified and deleted by the actor 1002 by utilizing the service provider server 702 as understood in the art by utilizing the management tools as discussed herein.

Figure 13:
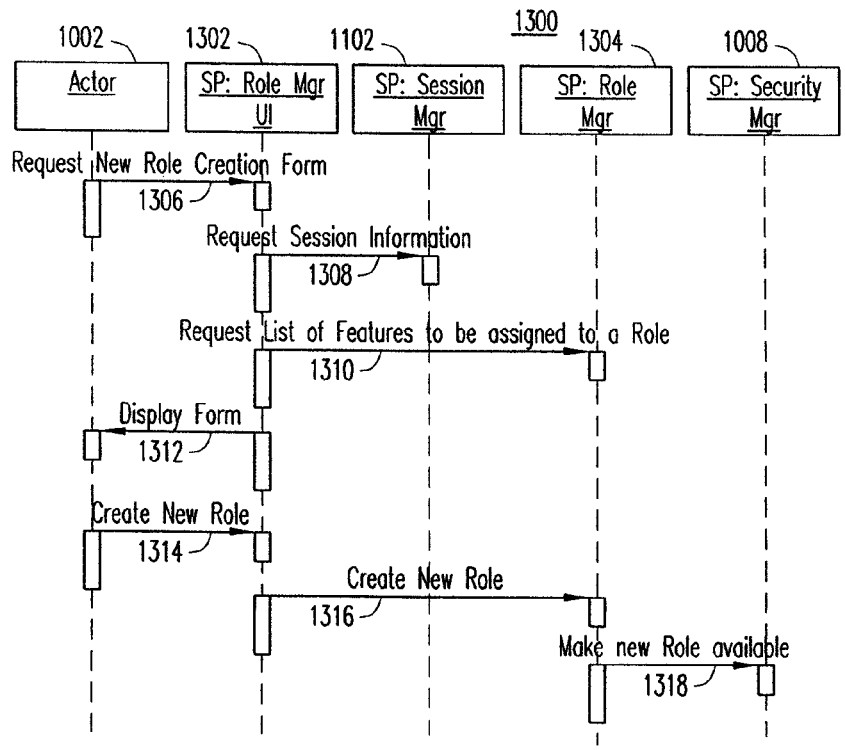
FIG. 13 is an exemplary sequence diagram illustrating the adding of a new security role by a role creation module of FIG. 9.

FIG. 13 is an exemplary sequence diagram 1300 illustrating the adding of a new security role by the role creation module 916 of FIG. 9. The step numbers and associated actions are provided in TABLE 6 below. To add the new security role, a service provider role manager user interface module 1302 and service provider role manager module 1304 are utilized. At step 1306, the actor 1002 requests a new role creation form from the service provider role manager user interface 1302. The service provider role manager interface user 1302 requests session information from the service provider session manager module 1102. Additionally, the service provider role manager user interface 1302 requests a list of features to be assigned to a role from the service provider role manager module 1304 at step 1310. At step 1312, the new role creation form is displayed for the actor 1002 by the service provider role manager user interface 1302.

TABLE 6

New Security Role Creation Flow

| STEP | ACTION |
|---|---|
| 1306 | Request new role creation form |
| 1308 | Request session information |

TABLE 6-continued

New Security Role Creation Flow

| STEP | ACTION |
|---|---|
| 1310 | Request list of features to be assigned to a role |
| 1312 | Display form |
| 1314 | Create new role |
| 1316 | Create new role |
| 1318 | Make new role available |

At step 1314, the new role is created by the actor 1002 providing a new role name, list of features for this role, and type of access to those features. At step 1316, the service provider role manager user interface 1302 creates a new role by notifying the service provider role manager module 1304. At step 1318, the service provider role manager module 1304 notifies the service provider security manager module 1008 and the new role is made available. It should be understood that the roles may be modified and deleted as understood in the art utilizing the components as described herein.

TABLE 7 below is an exemplary table that provides for a mapping of the user roles with the functionality available to the service provider 202 in managing user accounts for the subscribers 204. As shown, the roles that are indicated are default roles for subscriber user accounts 804 and that the roles and functionality may be modified accordingly. Additionally, it should be understood that the list is not exhaustive and that other or different roles may be added based on business rules desired by the service provider 202 and subscribers 204 and 206. The subscribers 204 are able to access system functionality within the domain of the subscriber 204 while the service provider 202 is able to access system functionality across multiple subscriber accounts 802.

TABLE 7

Default User Roles for Service Provider Users

| Functionality | Account Adm. | Content Adm. | Playlist Adm. | Provision Adm. | Asset Adm. | System Operator |
|---|---|---|---|---|---|---|
| Create Content |  | X |  |  |  | X |
| Modify Content |  | X |  |  |  | X |
| Delete Content |  | X |  |  |  | X |
| View Content |  | X |  |  |  | X |
| Assign Access Rights to Content |  | X |  |  |  | X |
| Approve Content |  | X |  |  |  | X |
| Create Directory |  | X |  |  |  | X |
| Delete Directory |  | X |  |  |  | X |
| Apply Permissions to Directory |  | X |  |  |  | X |
| Move Directory |  | X |  |  |  | X |
| Delegate Authority |  | X |  |  |  | X |
| Search Content |  | X |  |  |  | X |
| Create Playlist |  |  | X |  |  | X |
| Modify Playlist |  |  | X |  |  | X |
| Delete Playlist |  |  | X |  |  | X |
| Approve Playlist |  |  | X |  |  | X |
| View Playlist |  |  | X |  |  | X |
| Search Playlist |  |  | X |  |  | X |
| Create User | X |  |  |  |  | X |
| Modify User | X |  |  |  |  | X |
| View User | X |  |  |  |  | X |
| Delete User | X |  |  |  |  | X |
| Search Users | X |  |  |  |  | X |
| Create Subscriber Account | X |  |  |  |  | X |
| Modify Subscriber Account | X |  |  |  |  | X |
| View Subscriber Account | X |  |  |  |  | X |
| Delete Subscriber Account | X |  |  |  |  | X |
| Create Subscriber Administrator | X |  |  |  |  | X |
| Create Security Role | X |  |  |  |  | X |
| Modify Security Role | X |  |  |  |  | X |
| Delete Security Role | X |  |  |  |  | X |
| Assign Security Role | X |  |  |  |  | X |

TABLE 7-continued

Default User Roles for Service Provider Users

| Functionality | Account Adm. | Content Adm. | Playlist Adm. | Provision Adm. | Asset Adm. | System Operator |
|---|---|---|---|---|---|---|
| Create Subscriber Specific Domains | X | | | | | X |
| Set password expiration and password recovery rules | X | | | | | X |
| Reset user passwords | X | | | | | X |
| Create Facility | | | | X | | X |
| Modify Facility | | | | X | | X |
| Delete Facility | | | | X | | X |
| View Facility | | | | X | | X |
| Provision Facility | | | | X | | X |
| Unprovision Facility | | | | X | | X |
| Create VA | | | | X | | X |
| Modify VA | | | | X | | X |
| Delete VA | | | | X | | X |
| View VA | | | | X | | X |
| Provision VA | | | | X | | X |
| Unprovision VA | | | | X | | X |
| Add Asset | | | | | X | X |
| View Asset | | | | | X | X |
| Modify Asset | | | | | X | X |
| Delete Asset | | | | | X | X |
| LS Status Query | | | | | | X |
| VA Status Query | | | | | | X |
| Retrieve Logs | | | | | | X |
| Storage Capacity Query | | | | | | X |
| Retrieve LS Configuration Data | | | | | | X |
| Retrieve VA Configuration Data | | | | | | X |
| Delete LS Files | | | | | | X |
| Retrieve VA Schedule on LS | | | | | | X |
| Retrieve VA List | | | | | | X |
| Apply LS Software Upgrade | | | | | | X |
| Apply VA Software Upgrade | | | | | | X |
| Retrieve Alerts | | | | | | X |
| Replace VA Default Image | | | | | | X |
| Modify LS System Parameters | | | | | | X |
| Change LS Encryption Key | | | | | | X |
| Change VA Encryption Key | | | | | | X |
| VA Operating Status Change | | | | | | X |

TABLE 8 is an exemplary table that defines user roles for users of the subscribers 204 and 206, where the functionality for each of the users are predefined. It should be understood that different functionality may be made available to different users of subscriber 204 by an administrator for the subscriber 204 or service provider 202.

TABLE 8

Default User Roles for Subscriber Users

| Functionality | Subscriber Adm. | Content Creator | Content Approver | Content Adm. | Playlist Creator | Playlist Approver | Facility Manager | Facility Operator |
|---|---|---|---|---|---|---|---|---|
| Create Content | X | X | X | X | | | | |
| Modify Content | X | X | X | X | | | | |
| Delete Content | X | X | X | X | | | | |
| View Content | X | X | X | X | | | | |
| Assign Access Rights to Content | X | | | X | | | | |
| Approve Content | X | | X | X | | | | |
| Create Directory | X | | | | | | | |
| Delete Directory | X | | | | | | | |
| Apply Permissions to Directory | X | | | | | | | |
| Move Directory | X | | | | | | | |
| Delegate Authority | X | | | X | | | | |
| Search Content | X | X | X | X | | | | |
| Create Playlist | X | | | | X | X | | |
| Modify Playlist | X | | | | X | X | | |
| Delete Playlist | X | | | | X | X | | |
| Approve Playlist | X | | | | | X | | |
| View Playlist | X | | | | X | X | | |
| Search Playlist | X | | | | | X | | |

TABLE 8-continued

Default User Roles for Subscriber Users

| Functionality | Subscriber Adm. | Content Creator | Content Approver | Content Adm. | Playlist Creator | Playlist Approver | Facility Manager | Facility Operator |
|---|---|---|---|---|---|---|---|---|
| Create User | X | | | | X | X | | |
| Modify User | X | | | | X | X | | |
| View User | | | | | | | | |
| Delete User | | | | | | | | |

Figure 14:
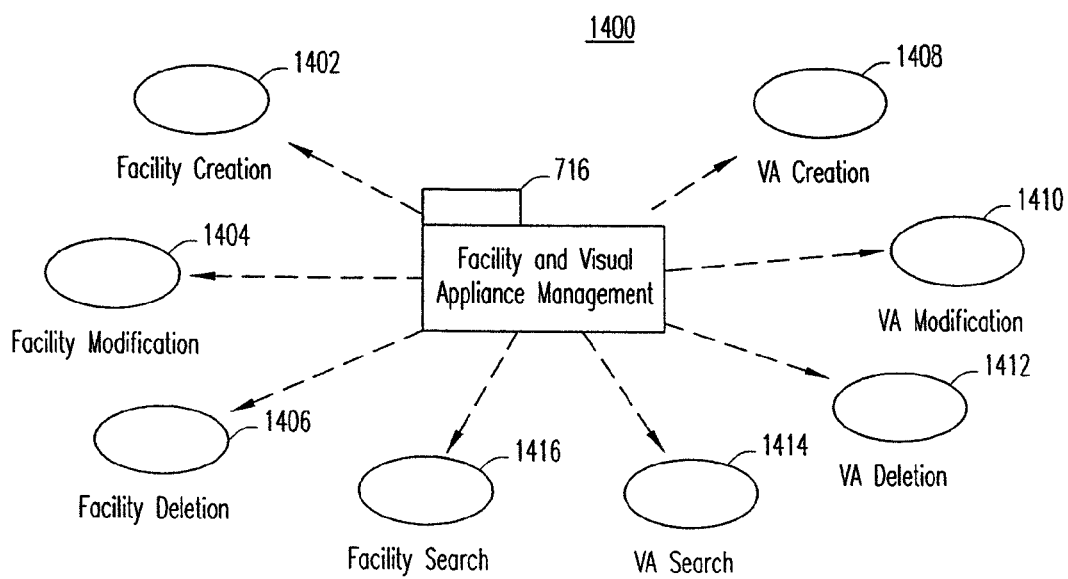
FIG. 14 is an exemplary block diagram providing for a facility and visual appliance manager package of FIG. 7A.

FIG. 14 is an exemplary block diagram 1400 providing for the facility and visual appliance manager package 416. Facility and visual appliance management involves the creation of records for facilities 208 and visual appliances 308 by a subscriber 204. Before an operator of the service provider 202 may provision a facility 208 or visual appliance 308 for use, the subscriber 204 creates or defines the facilities 208 and visual appliances 308. The subscriber 204 is able to create records for visual appliances 308 within the facilities 208 defined by the retail subscriber 204 or facilities 208 defined by other brand subscribers 206 that the managers have access for creating records for visual appliances 308. The records of the facilities 208 created by the retail subscribers 204 within their domain are called "primary stores", whereas the facilities 208 that belong to a domain of another retail subscriber 204 to which they have access to create visual appliances 308 are called "secondary stores". In other words, a brand subscriber 206 (e.g., manufacturer) may have the ability to create visual appliances 308 within facilities 208 of retail subscribers 204 (e.g., retail chain stores). For example, a large manufacturer of a consumer product, may be a brand subscriber 206 and control visual appliances 308 that are defined and established in a variety of grocery and retail stores. The brand subscriber 206 therefore may be provided access to the facilities 208 of the retail subscribers 204.

In addition, the retail subscribers 204 may also specify the list of valid location IDs for the visual appliances 308 within the facility 208 and assign the defined location IDs to the visual appliances 308. As understood in the art, valid locations within a facility 208, such as a retail store, may be defined by the planogram 600, where the point-of-purchase displays 400b, such as shelves, are mapped and products placed on the storage space are associated with particular locations within the retail store. Retail subscribers 204 may also modify and search facilities 208 and visual appliances 308 and delete unprovisioned facilities 208 and visual appliances 308.

As shown, modules may be included with the facility and visual appliance management package 416 for defining and modifying facilities 208 and visual appliances 308. Such modules may include a facility creation module 1402, facility modification module 1404, and facility deletion module 1406. Modules to provide for the visual appliances 308 include a visual appliance creation module 1408, visual appliance modification module 1410, and visual appliance deletion module 1412. Additionally, searching modules, including a visual appliance searching module 1414 and facility searching module 1416 allow the operator to search the defined visual appliances 308 and facilities 208, respectively.

Figure 15:
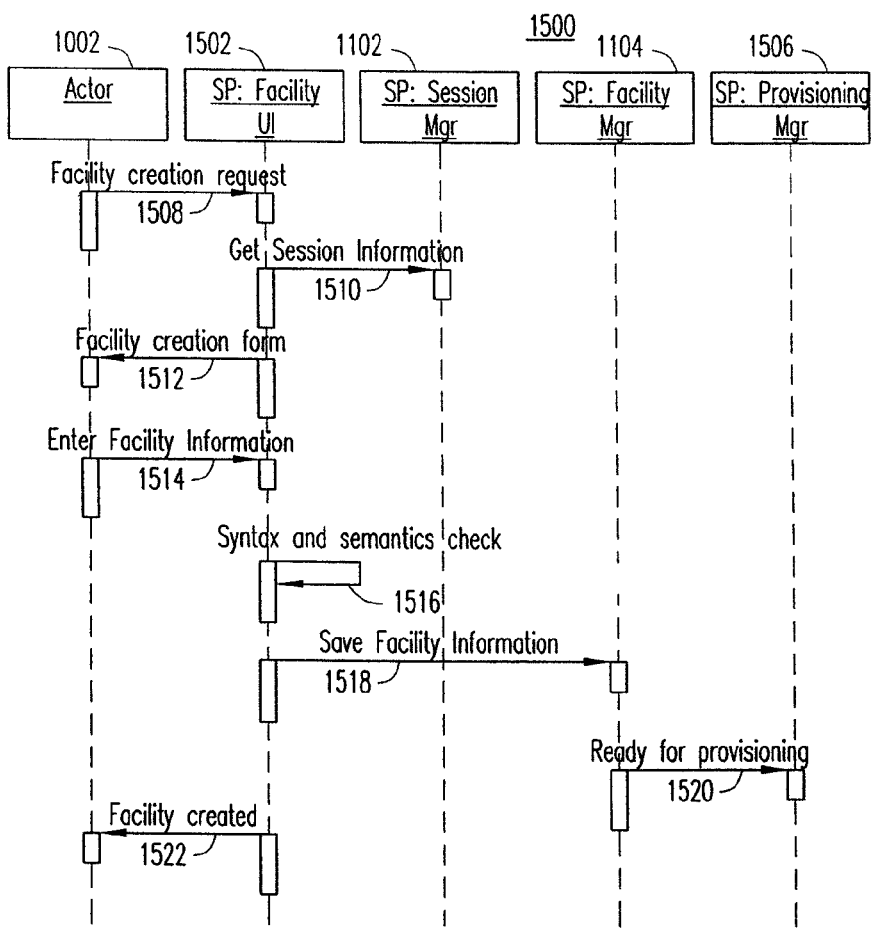
FIG. 15 is an exemplary sequence diagram illustrating the creation and saving records of a facility within the service provider server of FIG. 7A.

FIG. 15 is an exemplary sequence diagram 1500 illustrating the creation and saving of a facility 208 within the service provider server 402 of FIG. 7A. The step numbers and associated actions are provided in TABLE 9 below. To create the facility 208, the actor 1002 is to have authentication and authorization privileges to access the facility creation module 1402. Accordingly, the subscriber account 802 has been previously created for the retail subscriber 204 for which the facility 208 is being created.

TABLE 9

Facility Creation Flow

| STEP | ACTION |
|---|---|
| 1508 | Facility creation request |
| 1510 | Get session information |
| 1512 | Facility creation form |
| 1514 | Enter facility information |
| 1516 | Syntax and semantics check |
| 1518 | Save facility information |
| 1520 | Ready for provisioning |
| 1522 | Facility created |

To define the facility 208 and visual appliances 308, a service provider facility user interface module 1502, service provider facility manager 1504, and service provider provisioning manager module 1506 are utilized. At step 1508, the actor 1002 requests creation of a facility 208 to the service provider facility user interface 1502. At step 1510, a service provider facility user interface 1502 gets session information from the service provider session manager module 1102. The service provider facility user interface 1502 provides a facility creation form to the actor 1002 at step 1512.

At step 1514, the actor 1002 enters facility information, including location name, address, contact person, subscriber ID, etc. At step 1516, the service provider facility user interface 1502 performs a syntax and semantics check of the facility information entered. The service provider facility user interface 1502 saves the facility information by communicating with the service provider facility manager module 1104 at step 1518. The service provider facility manager module 1104 notifies the service provider provisioning manager module 1506 that the facility 208 is ready for provisioning at step 1520. At step 1522, the service provider facility user interface 1502 notifies the actor 1002 that the facility has been created in the system.

Figure 16:
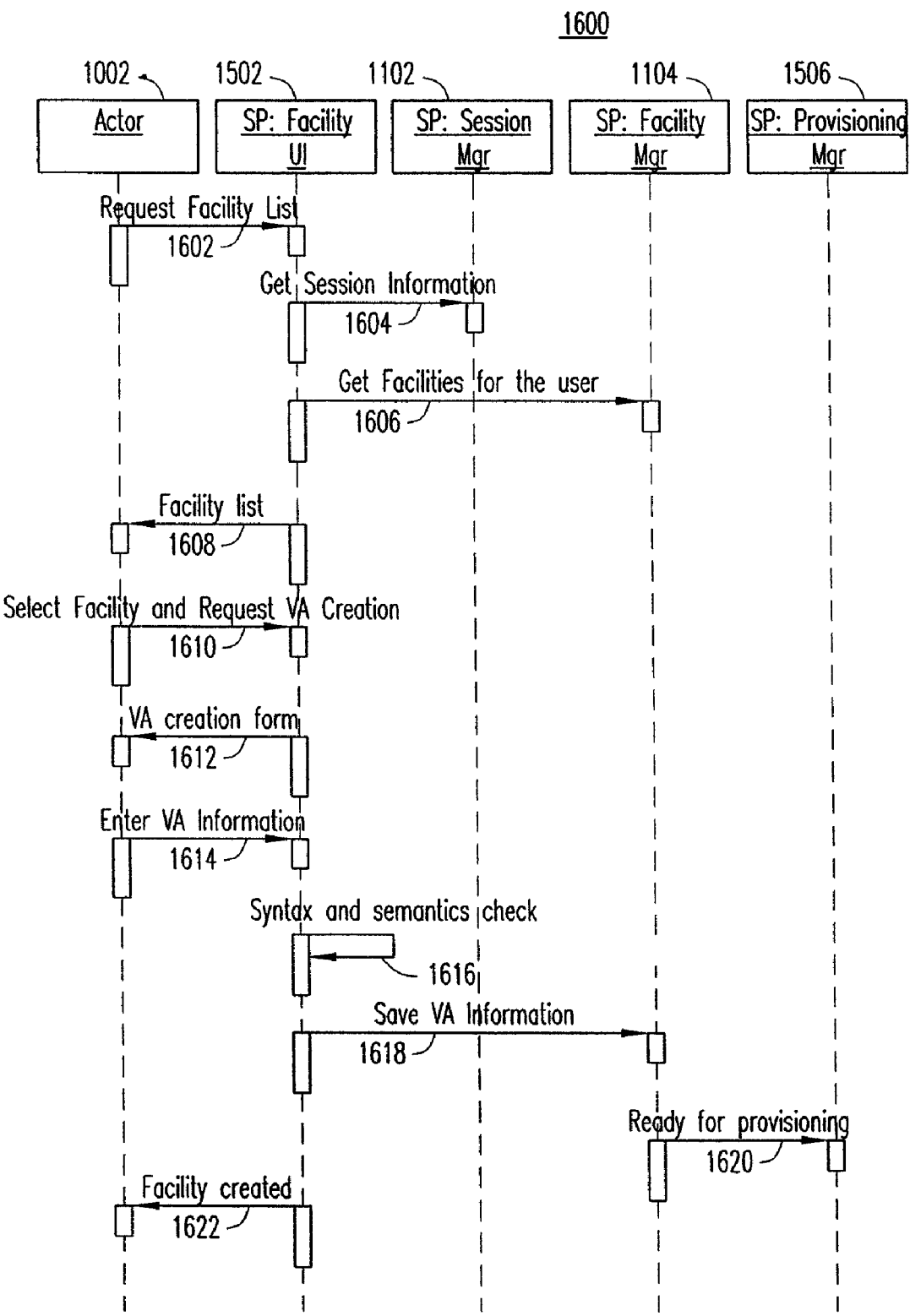
FIG. 16 is an exemplary sequence diagram that illustrates the creation and saving records of a visual appliance within the service provider server of FIG. 7A.

FIG. 16 is an exemplary sequence diagram 1600 that illustrates the creation and saving of a visual appliance 308 within the service provider server 702 of FIG. 7A. The step numbers and associated actions are provided in TABLE 10 below. In creating a facility 208, the user or actor 1002 is to be authenticated and authorized to access the facility creation module 1402. Additionally, the subscriber account 802 is to have been previously created for the subscriber 204 for whom the facility 208 is being created.

TABLE 10

Visual Appliance Creation Flow

| STEP | ACTION |
|------|--------|
| 1602 | Request facility list |
| 1604 | Get session information |
| 1606 | Get all facilities for the user |
| 1608 | Facility list |
| 1610 | Select facility and request visual appliance creation |
| 1612 | Visual appliance creation form |
| 1614 | Enter visual appliance information |
| 1616 | Syntax and semantics check |
| 1618 | Save visual appliance information |
| 1620 | Ready for provisioning |
| 1622 | Visual appliance created |

The managers of the facilities 208 are able to create a new facility 208 within the system, where the facilities 208 are defined as primary stores belonging to that subscriber account 802. In addition, users of the service provider 202 having a provisioning administrator role are able to create new facilities for the subscribers 204. At the time of creation, users enter facility information, such as site, ID, facility or store name, address, subscriber ID, facility contact person name, contact person phone number, facility open hours, facility planogram, valid locations of visual appliances 308, etc. The system generates a unique identifier for each new facility 208 that is added. Each new facility 208 that is added is, by default, in the "unprovisioned" state until a new facility is "provisioned". Provisioning managers of the service provider 202 are able to add subscriber IDs for those subscribers 204 and may create visual appliances 308 in the facilities 208. For these subscribers 204, the facility 208 is defined as "secondary facilities". The users may then enter a minimum set of information when creating the facility 208.

In operation, the actor 1002 requests a facility list from the service provider facility user interface 1502 at step 1602. At step 1604, the service provider facility user interface 1502 requests session information from the service provider session manager module 1102. At step 1606, the service provider facility user interface 1502 requests the facilities 208 of the actor 1002 from the service provider facility manager module 1104. At step 1608, the service provider facility user interface 1502 provides the facility list to the actor 1002.

At step 1610, a facility is selected and a request to create a visual appliance 308 is made to the service provider facility user interface 1502. At step 1612, a visual appliance creation form is provided from the service provider facility user interface 1502 to the actor 1002. The actor may then enter visual appliance information at step 1614, where the visual appliance information may include a visual appliance name, type, location, resolution, IP address, subscription ID, etc. At step 1616, the service provider facility user interface 1502 performs a syntax and semantics check on the visual appliance information entered. The visual appliance information may then be saved with the service provider facility manager module 1104 at step 1618. At step 1620, the service provider facility manager module 1104 may notify the service provider provisioning manager module 1506 that the visual applicant is ready for provisioning. Accordingly, the service provider facility user interface 1502 may notify the actor 1002 that the visual appliance has been created at step 1622. It should be understood that modification and deletion of the facilities may be performed utilizing the same or different modules provided for creating the facilities as understood in the art. Similarly, searches may be performed for the facilities by the facility managers and/or users by the service provider 202.

Figure 17:
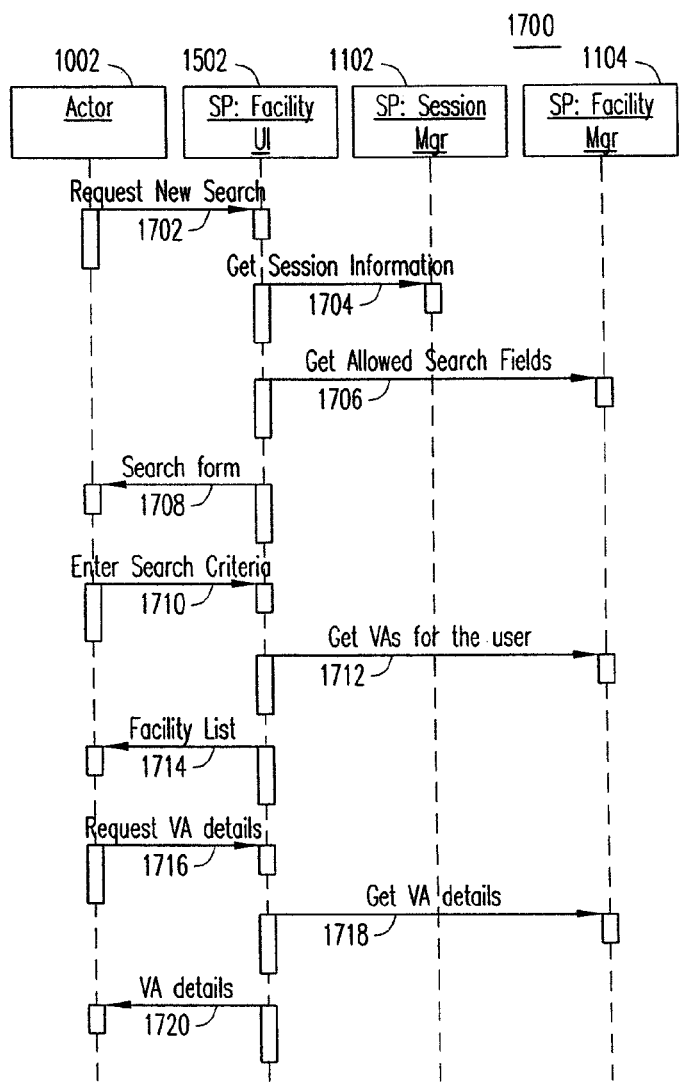
FIG. 17 is an exemplary sequence diagram illustrating the searching of records for visual appliances within the service provider server of FIG. 7A.

FIG. 17 is an exemplary sequence diagram 1700 that illustrates a search for visual appliances 308 by subscribers 204 and 206 of FIG. 2. The step numbers and associated actions are provided in TABLE 11 below. Searches for the visual appliances 308 may be performed by the subscribers 204 and 206 for inventory, verification, accounting, planning, and scheduling purposes, for example. The actor 1002 may be a facility manager, facility operator, and service provider provisioning administrator.

TABLE 11

Visual Appliance Search Flow

| STEP | ACTION |
|------|--------|
| 1702 | Request new search |
| 1704 | Get session information |
| 1706 | Get allowed search fields |
| 1708 | Search form |
| 1710 | Enter search criteria |
| 1712 | Get visual appliances for actor |
| 1714 | Provide Facility list to actor |
| 1716 | Request visual appliance details |
| 1718 | Get visual appliance details |
| 1720 | Provide visual appliance details |

At step 1702, the actor 1002 requests a new search from the service provider facility user interface 1502. At step 1704, the service provider facility user interface 1502 requests session information from the service provider session manager module 1102. Additionally, the service provider facility user interface 1502 requests allowed searchable fields based on the defined role for the actor 1002 from the service provider facility manager module 1104 at step 1706. At step 1708 a search form is provided to the actor 1002.

At step 1710, the actor 1002 enters search criteria into the search form. The service provider facility user interface 1502 requests visual appliances 308 for the user from the service provider facility manager module 1104 at step 1712. A list of visual appliances 308 includes the facilities that match the entered criteria and a facility list is provided to the actor 1002 at step 1714. The actor 1002 may request visual appliance details from the service provider facility user interface 1502 at step 1716 and visual appliance details are requested from the service provider facility manager module 1104 at step 1718. The details of the visual appliances 308 that are provided to the actor 1002 at step 1720 depend on the role of the actor 1002.

Figure 18:
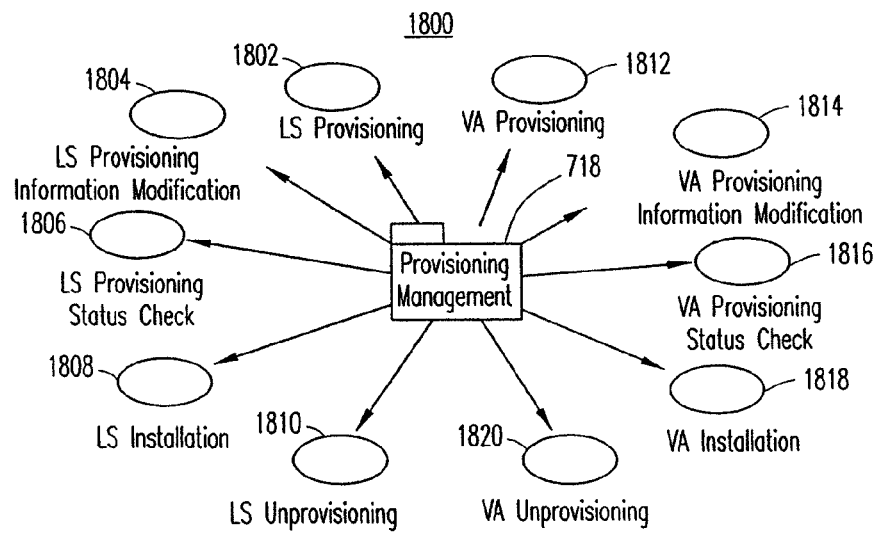
FIG. 18 depicts the provisioning management package that provides for provisioning of local servers and visual appliances on the service provider server of FIG. 7A.

FIG. 18 depicts the provisioning management package 718 that provides for provisioning of local servers 304 and visual appliances 308 on the service provider server 702 of FIG. 7A. To provision local servers 304, a local server provisioning module 1802, local server provisioning information modification module 1804, local server provisioning status check 1806, local server installation module 1808, and local server unprovisioning module 1810 are available. To handle provisioning of visual appliances, a visual appliances 308 provisioning module 1812, visual appliance provisioning information modification module 1814, visual appliance provisioning status check module 1816, visual appliance installation module 1818, and visual appliance unprovisioning module 1820 are available. Each of these modules may be utilized by the service provider 202 and/or subscriber 204 to handle provisioning operations for the local server 304 and visual appliance 308 that are to be installed and uninstalled within facilities 208 of a subscriber 204 and 206.

Figure 19:
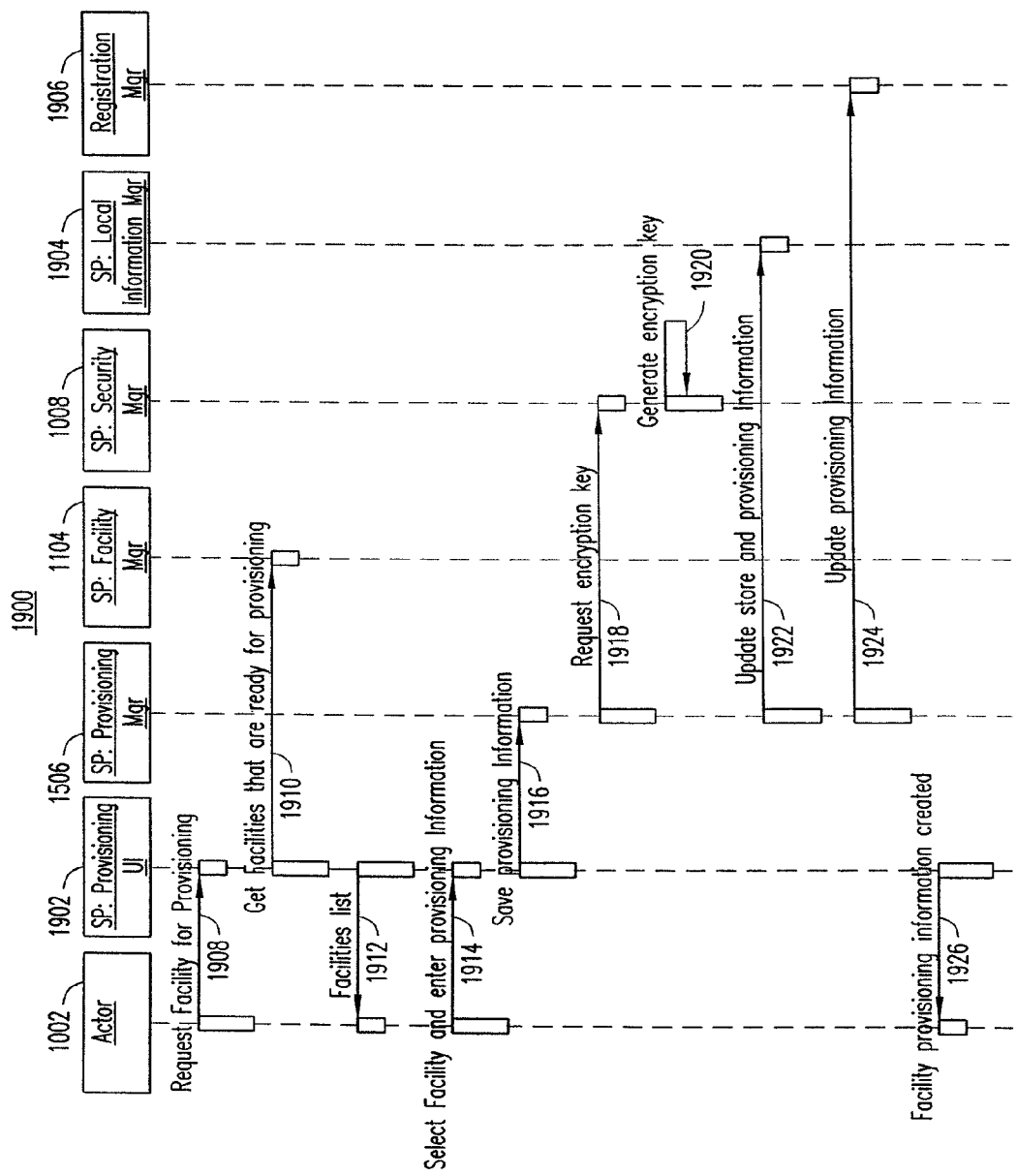
FIG. 19 is an exemplary sequence diagram that illustrates adding provisioning information for the local server within a facility that has already been created at the service provider server of FIG. 7A.

FIG. 19 is an exemplary sequence diagram 1900 that illustrates adding provisioning information for the local server 304 within a facility 208 that has already been created at the service provider server 702 of FIG. 7A. The step numbers and associated actions are provided in TABLE 12 below. In this case, the actor 1002 may be the provisioning administrator of the service provider 202 and is to be authenticated and authorized to access the local server provisioning module 1802. The facility 208 has been created and has been marked ready for provisioning.

TABLE 12

Facility Provisioning Flow

| STEP | ACTION |
|------|--------|
| 1908 | Request facility for provisioning |
| 1910 | Get facilities that are ready for provisioning |
| 1912 | Facilities list |
| 1914 | Select facility and enter provisioning information |
| 1916 | Save provisioning information |
| 1918 | Request encryption key |
| 1920 | Generate encryption key |
| 1922 | Update store and provisioning information |
| 1924 | Update provisioning information |
| 1926 | Facility provisioning information created |

A minimum set of information is to be entered for the facility 208 before it is marked ready for provisioning. The provisioning information may include local server serial ID, IP addresses (for communicating with the service provider server 702 and WLAN access points), communications network service provider remote equipment ID, site ID, subscriber ID, installation schedule, name and contact information of the installer, etc.

In provisioning the local server 304, the service provider server 702 utilizes a service provider provisioning user interface module 1902, service provider local information manager module 1904, and registration manager module 1906. The local server provisioning process starts at step 1908 with the actor 1002 requesting facilities 208 for provisioning from the service provider provisioning user interface 1902. The service provider provisioning user interface 1902 requests facilities that are ready for provisioning from the service provider facility manager module 1104. At step 1912, the service provider provisioning user interface 1902 provides a facilities list to the actor 1002. The actor 1002 selects a facility 208 and enters provisioning information utilizing the service provider provisioning user interface 1902 at step 1914. At step 1916, the service provider provisioning user interface 1902 saves the provisioning information with the service provider provisioning manager module 1506.

At step 1918, the service provider provisioning manager module 1506 requests an encryption key to be used by the local server 304 to communicate with the service provider server 402 upon establishing connection for the first time. At step 1920, the service provider security manager module 1008 generates an encryption key. At step 1922, the service provider provisioning manager module 1506 updates the facility and provisioning information to be sent to the local server 304 after registration by notifying the service provider local information manager module 1904. The facility and provisioning information may include facility open hours, associated visual appliance lists, etc. At step 1924, the service provider provisioning manager module 1506 updates the provisioning information with the registration manager module 1906, where the provisioning information may include local server ID, site ID, subscriber ID, and encryption key. At step 1926, the service provider provisioning user interface 1902 notifies the actor 1002 that the facility provisioning information has been created. It should be understood that the actor 1002 may additionally perform modification and status checks on the provision facility.

Figure 20:
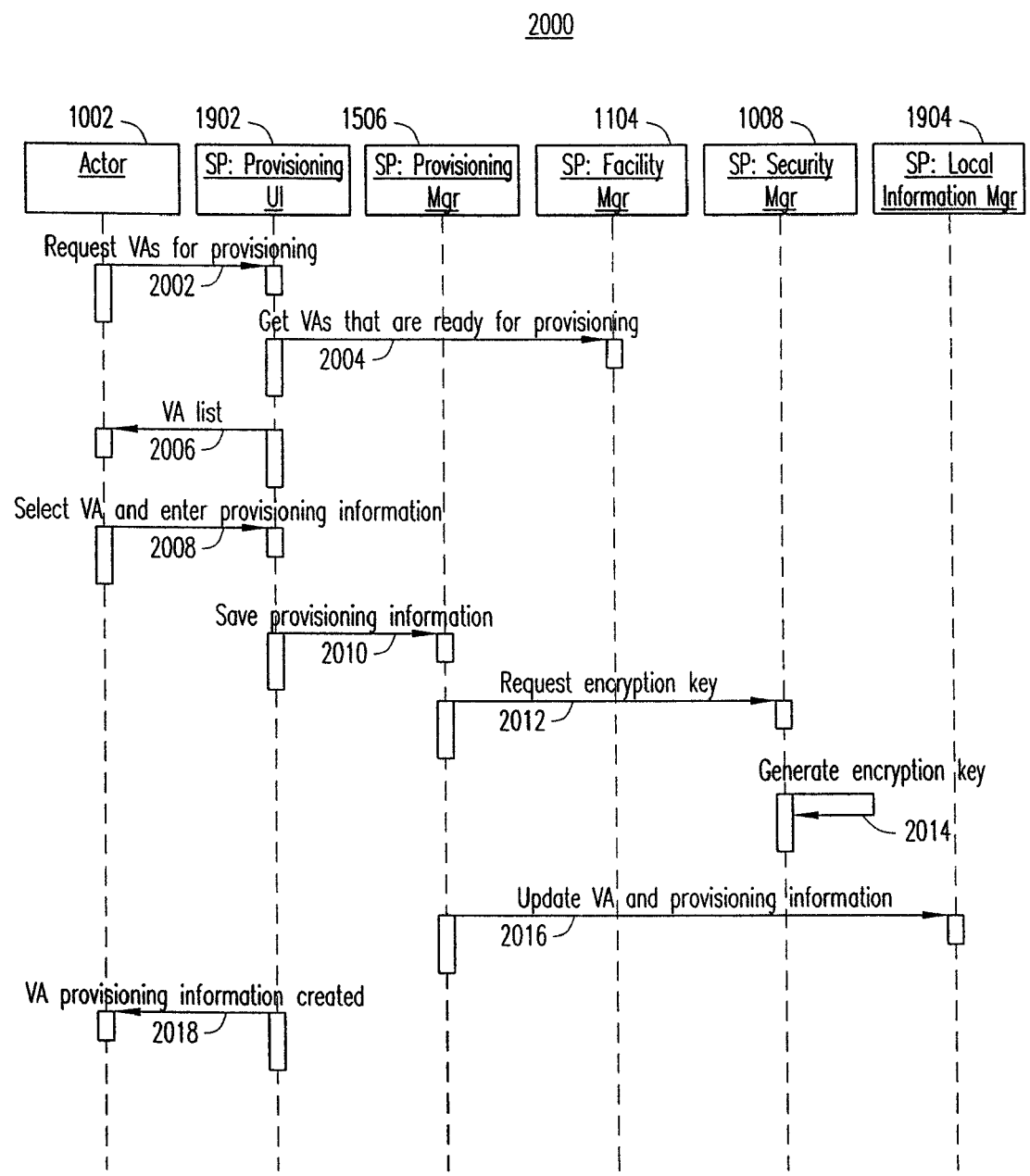
FIG. 20 is an exemplary sequence diagram that illustrates adding provisioning information for a visual appliance that has already been created by the service provider of FIG. 2.

FIG. 20 is an exemplary sequence diagram 2000 that illustrates adding provisioning information for a visual appliance 308 of FIG. 3A that has already been created by the service provider 202. The step numbers and associated actions are provided in TABLE 13 below. A provisioning administrator of the service provider 202 operating as the actor 1002 is to be authenticated and authorized to access the visual appliance provisioning module 1812. The facility 208 has been created and marked as being ready for provisioning. A minimum set of information is to be entered for the visual appliance 308 before being marked ready for provisioning, such as visual appliance location, size, etc. The provisioning information also may include a visual appliance IP address, local server IP address, subscription ID, installation schedule, name and contact information of the installer, etc.

TABLE 13

Visual Appliance Provisioning Flow

| STEP | ACTION |
|------|--------|
| 2002 | Request visual appliances for provisioning |
| 2004 | Get visual appliances that are ready for provisioning |
| 2006 | Visual appliance list |
| 2008 | Select visual appliance and enter provisioning information |
| 2010 | Save provisioning information |
| 2012 | Request encryption key |
| 2014 | Generate encryption key |
| 2016 | Update visual appliance and provisioning information |
| 2018 | Visual appliance provisioning information created |

In particular, the actor 1002 requests visual appliances 308 available for provisioning at step 2002 from the service provider provisioning interface 1902. At step 2004, the service provider provisioning user interface 1902 requests a list of visual appliances that are ready for provisioning from the service provider facility manager module 1104. At step 2006, the service provider provisioning user interface 1902 provides the actor 1002 with a list of visual appliances available for provisioning. The actor 1002 may select one or more visual appliances 308 and enter provisioning information at step 2008. At step 2010, the service provider provisioning user interface 1902 saves the provisioning information via the service provider provisioning manager module 1506.

At step 2012, the service provider provisioning manger module 1506 requests an encryption key for the visual appliance 308 to communicate with the local server 304 when establishing connection for the first time. The service provider security manager module 1008 generates an encryption key at step 2014 in response to the request for the encryption by the service provider provisioning manager module 1506. At step 2016, the service provider provisioning manager module 1506 updates the visual appliance and provisioning information to be sent to the local server 304 for registration of the visual appliance size, visual appliance location, subscriber ID, and encryption key. Additionally, other visual appliance attributes, such as visual appliance memory, resolution, etc., may be sent to the location information manager module 1904 for communication of the information to the local server 304. Accordingly, the service provider provisioning user interface 1902 notifies the actor 1002 that the visual appliance provisioning information has been created at step 2018.

Figure 21:
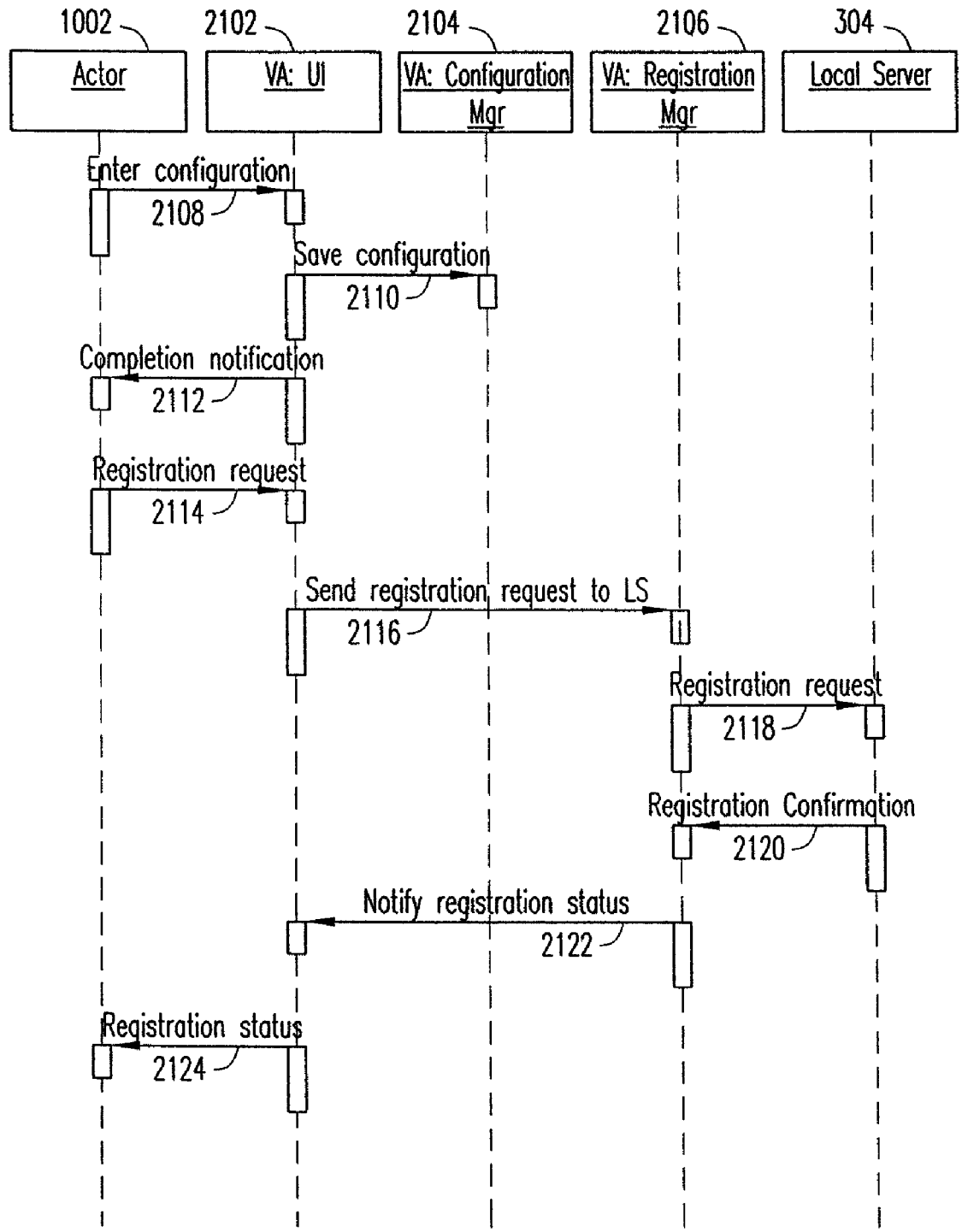
FIG. 21 is an exemplary sequence diagram that illustrates installation of the visual appliance of FIG. 3A that has been provisioned at the service provider server.

FIG. 21 is an exemplary sequence diagram 2100 that illustrates installation of a visual appliance 308 that has been provisioned at the service provider server 702 of FIG. 7A. The step numbers and associated actions are provided in TABLE 14 below. The installer for the service provider 202 enters information into the visual appliance 308. More specifically, the actor 1002 is able to engage a visual appliance user interface module 2102 provided directly on the visual appliance 308 via an input device or element, such as a touch screen as understood in the art or other control device (e.g., keyboard, remote wireless device, and barcode scanner). Alternatively, the visual appliance user interface 2102 may be located at the service provider server 702 or local server 304. In addition to the input element being utilizable for installation purposes, the visual appliance 308 may provide interactive applications, such as surveys or recipe database, that consumers at a facility 208 may engage via the input element. An output device, such as a printer, integrated or external from the visual appliance 308, may enable the consumer to receive requested or other information, such as coupons or recipes.

A visual appliance configuration manager module 2104 and visual appliance registration manager module 2106 may also be utilized in installing the visual appliance 308. At step 2108, the actor 1002 may enter configuration information for the visual appliance 308. The configuration information may include subscriber ID, password, location ID, visual appliance IP address, local server IP address, subscription ID, location name, and planogram information, into the visual appliance user interface 2102 via the touch screen of the visual appliance 308. If the visual appliance is connected to an external electronic display 310, then the installer enters size and resolution of the electronic display 310. In entering the installation information, a graphical user interface may provide entry elements, such as pop-up windows or drop-down menus. Alternatively, simple text entry may be utilized. Still yet, a pen-based entry system may be provided. The serial ID, MAC address, size, type, and subscriber ID is sent to the local server 304 by the visual appliance 308. At step 2110, the visual appliance user interface 2102 may save the configuration of the visual appliance 308 via the visual appliance configuration manager module 2104. Completion of the configuration may prompt a notification from the visual appliance user interface 2102 to the actor 1002 at step 2112.

TABLE 14

Visual Appliance Installation Flow

| STEP | ACTION |
|---|---|
| 2108 | Enter configuration |
| 2110 | Save configuration |
| 2112 | Completion notification |
| 2114 | Registration request |
| 2116 | Send registration request to local server |
| 2118 | Registration request |
| 2120 | Registration confirmation |
| 2122 | Notify registration status |
| 2124 | Registration status |

At step 2114, the actor 1002 may request registration for the visual appliance 308. The visual appliance user interface 2102 may send the registration request to the local server 304 via the visual appliance registration manager module 2106. The local server 304 may receive the registration request at step 2118 from the visual appliance registration manager module 2106 and utilize the information to validate and register the visual appliance 308 when the visual appliance 308 communicates with the local server 304 for the first time. The service provider 202 verifies that the information is received prior to installation of the visual appliances 308. The information may include local server serial ID, IP addresses, encryption key, subscriber ID, subscription ID, planogram information, facility location, etc. At step 2120, the local server 304 may confirm registration to the visual appliance registration manager module 2106. The registration status may be communicated to the visual appliance user interface 2102 at step 2122 and to the actor 1002 at step 2124 by the visual appliance user interface 2102. The visual appliance 308 is thereby provisioned and ready for installation at a facility 208.

It should be understood that the visual appliance may additionally be unprovisioned that has been installed in a facility 208 and registered at the local server 304 and service provider server 702 by a provisioning administrator of the service provider 202. Once the visual appliance 308 is unprovisioned, the local server 304 is updated. Upon receiving the unprovisioned notification, the local server 304 updates the records and deregisters the visual appliance 308. The local server 304 may thereafter stop monitoring the visual appliance 308 upon becoming deregistered. The manager of the facility 208 also is informed by the service provider provisioning manager module 1506 about the unprovisioning status of the visual appliance 308.

Figure 22:
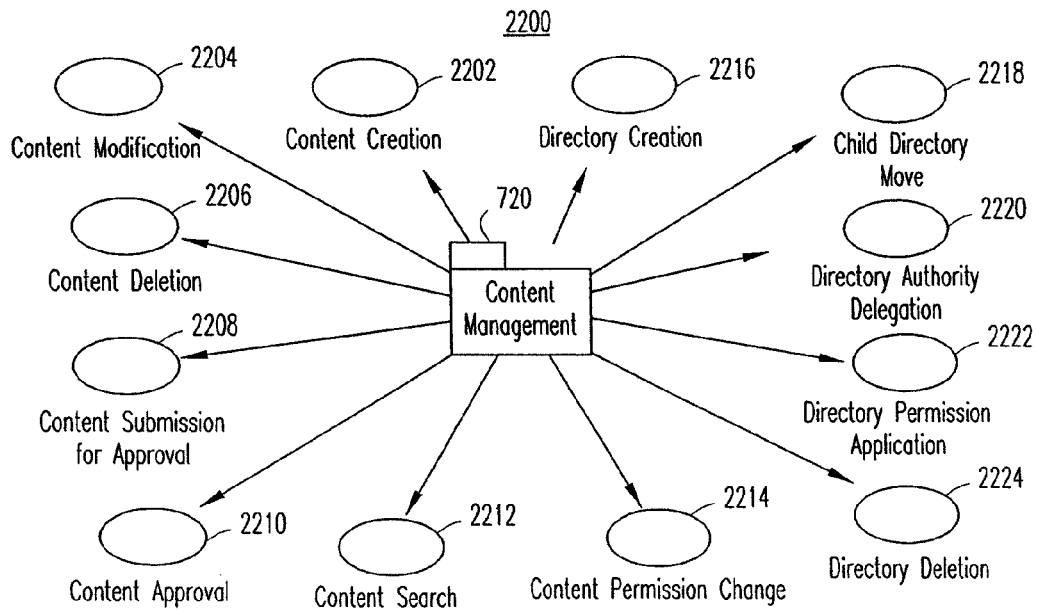
FIG. 22 is an exemplary block diagram showing the content management package of FIG. 7A that is utilized by the subscribers to manage content as understood in the art.

Referring now to FIG. 22, the content management package 720 allows the creation and management of content. Using the content management package 720, users are able to upload multimedia files, modify content property, view content, and assign permission for that content. Users are also able to submit content for approval by the content approvers of the subscriber 204.

To ease the management of the content, users are allowed to create logical trial directories to segregate the content as understood in the art. Content and subscriber administrators are able to create trial directories and assign security privileges thereto. Each content record may comprise one multimedia file and belongs to one directory/trial directory. For security purposes, content records are not shared between different subscribers 204 and 206. The content management package 720 utilizes multiple functionality modules. For managing the content.

More specifically, FIG. 22 is an exemplary block diagram showing the content management package 720 that is utilized by the subscribers 204 and 206 to manage content as understood in the art. As shown, the content management package 720 includes a content creation module 2202, content modification module 2204, content deletion module 2206, content submission for approval module 2208, content approval module 2210, content search module 2212, and content permission change module 2214. Additionally, the content management package 720 includes the ability to manage the content via a directory structure as understood in the art, utilizing a directory. creation module 2216, child directory move module 2218, directory authority delegation module 2220, directory permission application module 2222, and directory deletion module 2224.

Figure 23:
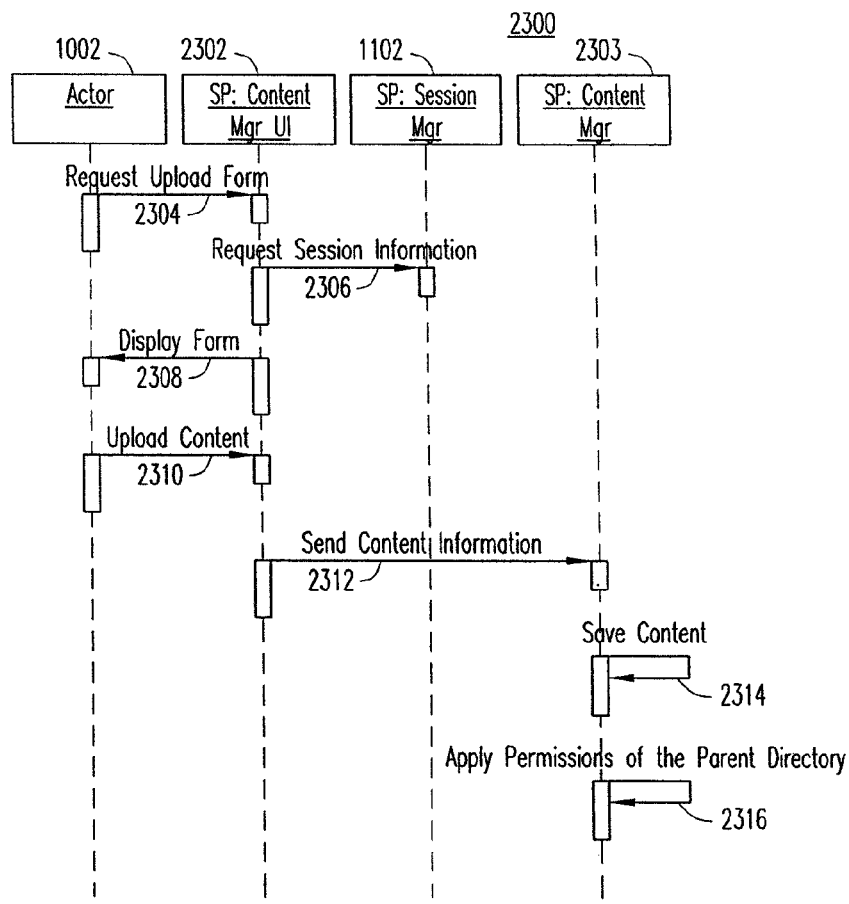
FIG. 23 is an exemplary sequence diagram for illustrating creation of content utilizing the service provider server of FIG. 7A.

FIG. 23 is an exemplary sequence diagram 2300 for illustrating creation of content for distribution on the communications system 200. The step numbers and associated actions are provided in TABLE 15 below. The actor 1002 may be a user of the subscriber 204 and 206, including a content creator, content approver, and/or content administrator. Additionally, the actor 1002 may be a content administrator of the service provider 202. The actor 1002 is to be authenticated and authorized to access the content in order to utilize the create content functionality.

TABLE 15

Content Creation Flow

| STEP | ACTION |
| --- | --- |
| 2304 | Request upload form |
| 2306 | Request session information |
| 2308 | Display form |
| 2310 | Upload content |
| 2312 | Send content information |
| 2314 | Save content |
| 2316 | Apply permissions of the parent directory |

The actor 1002 requests an upload form from the service provider content manager user interface module 2302 at step 2304. The service provider content manager user interface 2302, in turn, requests session information from the service provider session manager module 1102 at step 2306. At step 2308, the service provider content manager user interface 2302 displays the upload form for the actor 1002 to upload content via the service provider content manager user interface 2302. The uploading of the content involves uploading the multi-media file, adding attributes thereto, and mapping the content to a directory. The content may be added attributes, including content name, file ID, file name, file description, expiration date, creator name, subscriber account, creation time, modification history, file path, file type, file size, resolution, aspect ratio, visual appliance type list, facility list, status, meta data, and clearance, for example. For each content, a unique content ID and file ID is also generated. The system also may deduce the following information for each content, file ID, file path, file type, file size, creation time, modified history, resolution, aspect ratio, subscriber account, and creator name, for example. By default, each content may utilize an uploaded multimedia file. Further, by default, the status of each content is set as "inactive" and clearance is assigned "unapproved". The content information is sent by the service provider content manager user interface 2302 to the service provider content manager module 2303 at step 2312. The service provider content manager module 2303 saves the content at step 2314, and at step 2316, permissions of the parent directory are applied to the content. Accordingly, content modification and deletion may also be performed in accordance with the principles of the present invention and as understood in the art.

Figure 24:
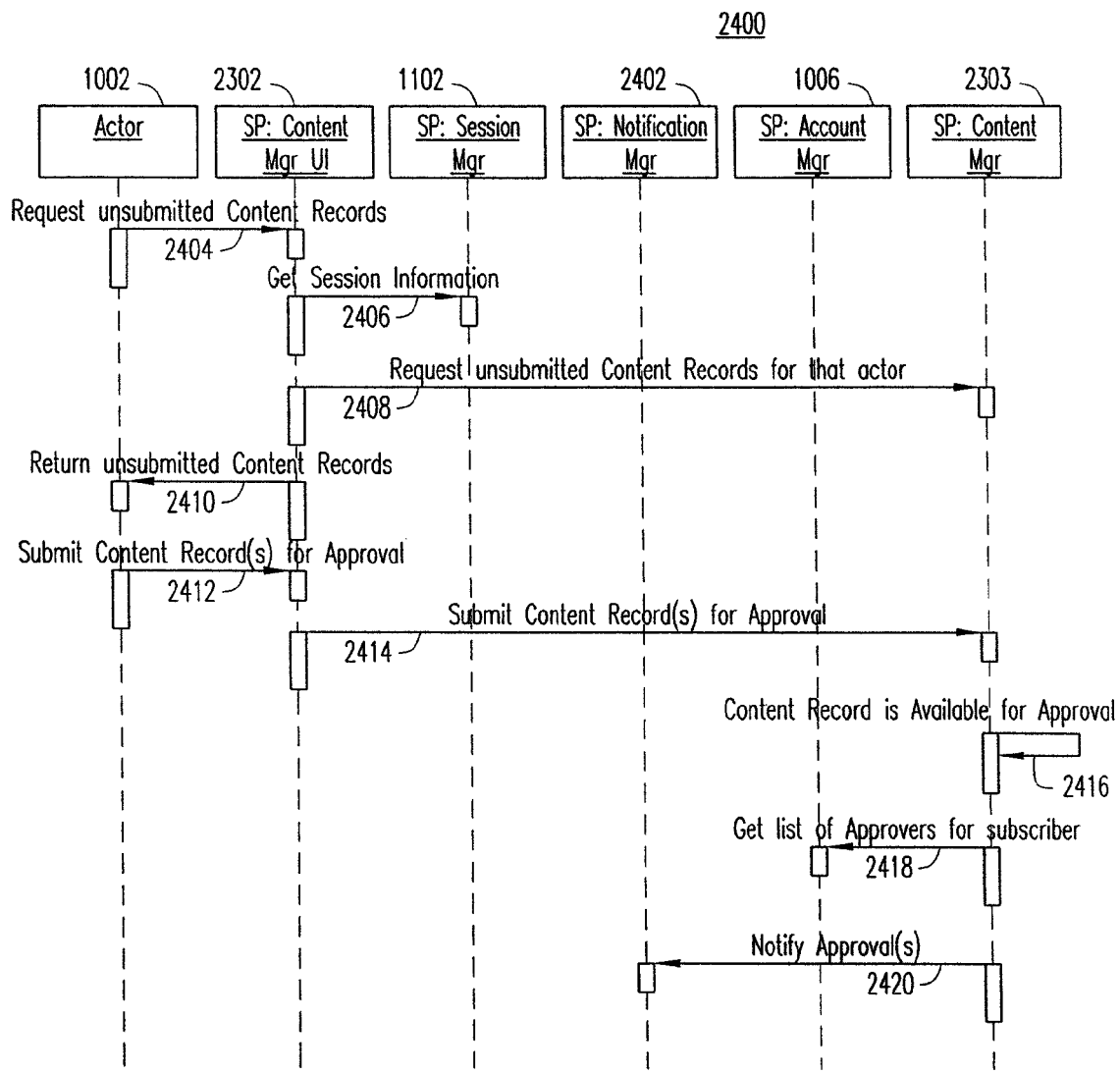
FIG. 24 is an exemplary sequence diagram illustrating submission of content for approval by a user designated as content approver for the subscriber of FIG. 2.

FIG. 24 is an exemplary sequence diagram 2400 illustrating submission of content for approval by a user designated as content approver for the subscriber 204 of FIG. 2. The step numbers and associated actions are provided in TABLE 16 below. The content approver is charged with approving content deemed acceptable to a subscriber 204 or 206 for display at a facility 208 associated with the subscriber 204 or 206. In providing for the approval submission, a service provider notification manager module 2402 is utilized in conjunction with other modules. The process starts at step 2404 where the actor 1002 requests unsubmitted or unapproved content records from the service provider content manager user interface 2302. At step 2406, the service provider content manager user interface 2302 requests session information from the service provider session manager module 1102. At step 2408, the service provider content manager user interface 2302 requests unsubmitted content records for the actor 1002 from the service provider content manager module 2303. The unsubmitted content records are provided to the actor 1002 by the service provider content manager user interface 2302 at step 2410.

TABLE 16

Content Submission for Approval Flow

| STEP | ACTION |
| --- | --- |
| 2404 | Request unsubmitted content records |
| 2406 | Get session information |
| 2408 | Request unsubmitted content records for that actor |
| 2410 | Return unsubmitted content records |
| 2412 | Submit content record(s) for approval |
| 2414 | Submit content record(s) for approval |
| 2416 | Content record is available for approval |
| 2418 | Get list of approvers for subscriber |
| 2420 | Notify approver(s) |

At step 2412, the content record(s) are submitted for approval by the actor 1002 to the service provider content manager user interface 2302. At step 2414, the service provider content manager users interface 2302 submits content record(s) for approval to the service provider content manager module 2303. The content record is set to be available for approval at step 2416. At step 2418, the service provider content manager module 2303 requests a list of approver(s) for the subscriber 204 and the service provider content manager module 2303 notifies the approver(s) of the content being available for approval. In notifying the approver(s), an e-mail or other notification may be communicated either actively or passively to the approvers at step 2420. Additionally, the service provider content manager module 2303 may mark the content as "awaiting approval".

Figure 25:
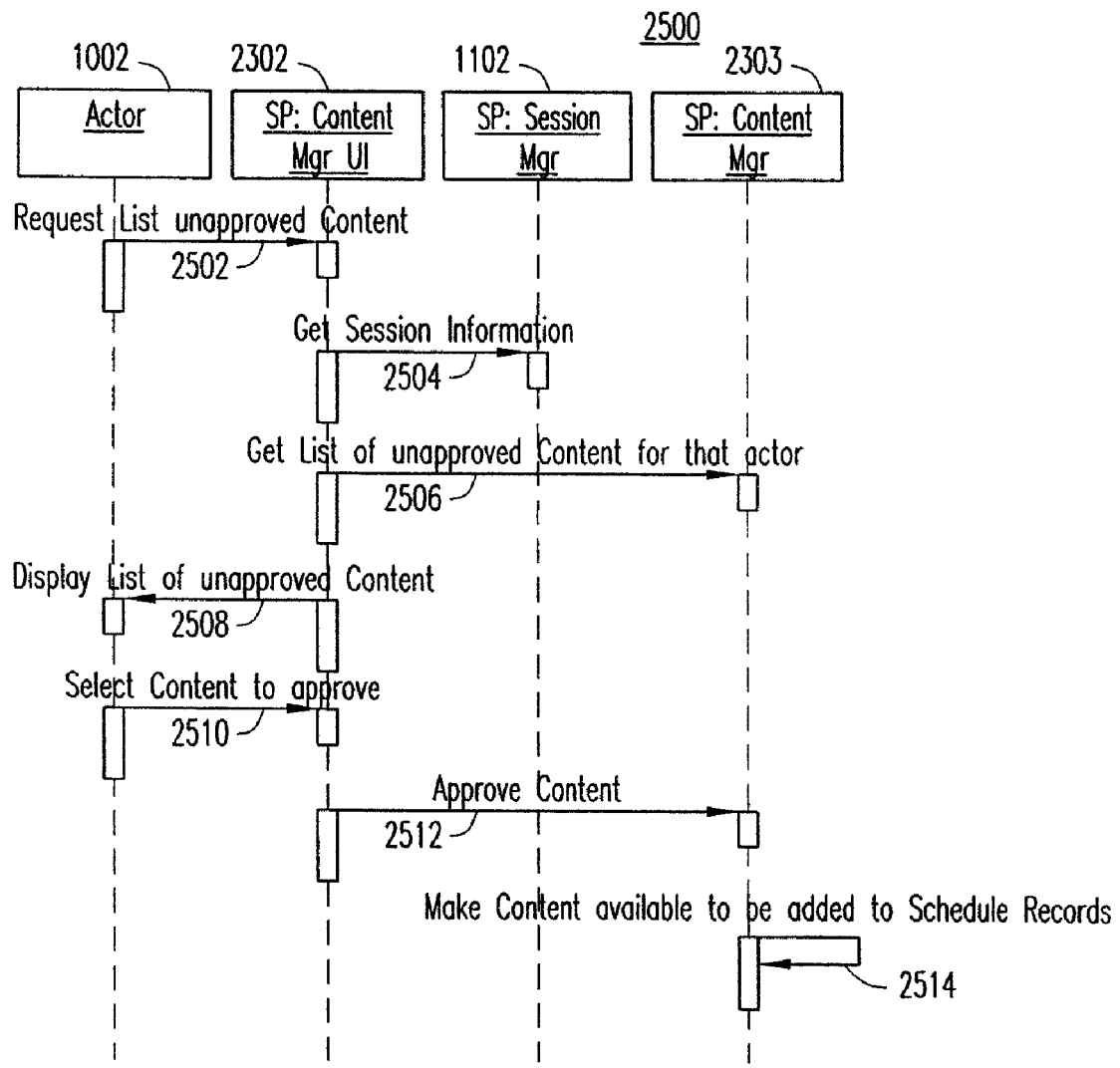
FIG. 25 is an exemplary sequence diagram illustrating the approval process for the content to be broadcast by the subscriber of FIG. 2.

FIG. 25 is an exemplary sequence diagram 2500 illustrating the approval process for the content to be broadcast by the subscriber 204 of FIG. 2. The step numbers and associated actions are provided in TABLE 17 below. The actor 1002 may be a user from the subscriber 204 or 206 (e.g., content approver or content administrator) and/or a content administrator from the service provider 202. The actor 1002 is to be authenticated and authorized to access the content approval module 2210.

TABLE 17

Content Approval Flow

| STEP | ACTION |
| --- | --- |
| 2502 | Request list of unapproved content |
| 2504 | Get session information |
| 2506 | Get list of unapproved content for that actor |
| 2508 | Display list of unapproved content |
| 2510 | Select content to approve |
| 2512 | Approve content |
| 2514 | Make content available to be added to schedule records |

At step 2502, the actor 1002 may request a list of unapproved content from the service provider content manager user interface 2102. At step 2504, the service provider content manager user interface 2102 requests session information from the service provider session manager module 1102. Additionally, the service provider content manager user interface 2102 requests a list of unapproved content for that actor from the service provider content manager module 2303 at step 2506. The service provider content manager user interface 2102 displays the list of unapproved content for the actor 1002 at step 2508, whereby the actor 1002 may select content to approve at step 2510. In step 2512, the service provider content manager user interface 2102 may approve the content as selected by the actor 1002 and notify the service provider content manager module 2303 thereof. The service provider content manager module 2303 may make the content available to be added to scheduled records at step 2514.

As understood in the art, other content functionality may be provided to the subscriber 204 and 206 and service provider 202 including content search and permission change as understood in the art. Additionally, directory creation, directory authority delegation, directory permissions application, child directory move, and directory deletion may be provided for the subscriber 204 and 206 and service provider 202.

A playlist approver is a role that is assigned to one or more users per subscriber 204 and 206. The playlist approver role enables a user to approve and submit a scheduled record (SR). In addition, the playlist approver role provides the user the same privileges as the playlist creator role. A user is able to add, modify, view, and delete scheduled records. In addition, playlist approvers may have the authority to override any schedule conflicts presented by the system at the scheduled record during the schedule record submission process.

Figure 26:
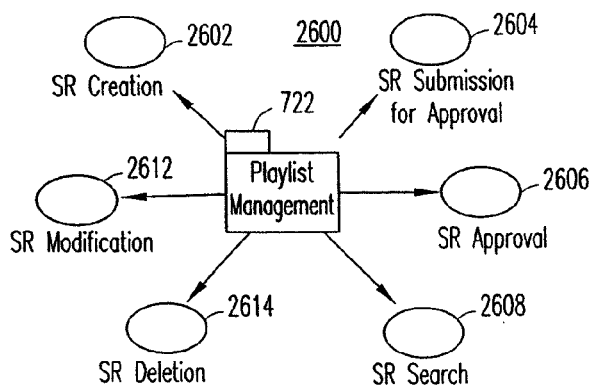
FIG. 26 is an exemplary block diagram of the playlist management package of FIG. 7A and associated modules.

FIG. 26 is an exemplary block diagram 2600 of the playlist management package 722 and associated modules of FIG. 7A. The playlist management package 722 provides for management of scheduled records utilized for playing content on visual appliances 308 at the facilities 208 of the subscribers 204 and 206. The playlist management 722 includes a scheduled record creation module 2602, scheduled record submission for approval module 2604, scheduled record approval module 2606, scheduled record search module 2608, scheduled record modification module 2612, and scheduled record deletion module 2614.

Figure 27:
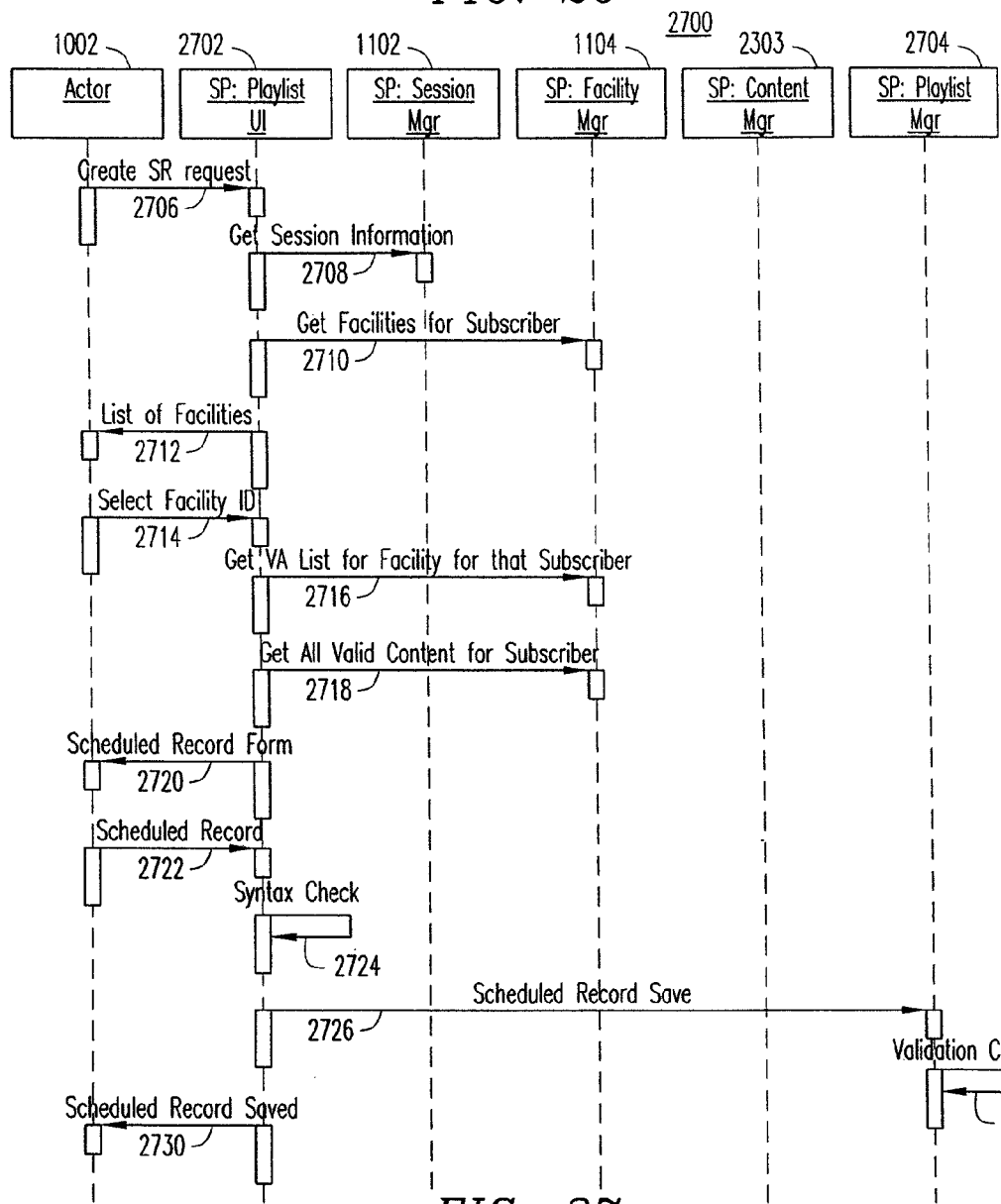
FIG. 27 is an exemplary sequence diagram for illustrating the creating and saving of a scheduled record utilizing the service provider server of FIG. 7A.

FIG. 27 is an exemplary sequence diagram 2700 for illustrating creating and saving a scheduled record utilizing the service provider server 702 of FIG. 7A. The step numbers and associated actions are provided in TABLE 18 below. A service provider playlist user interface module 2702, and service provider playlist manager module 2704 are utilized in conjunction with other modules for the scheduled record creation process. At step 2706, the actor 1002 creates a scheduled record request with the service provider playlist user interface 2702. The service provider playlist user interface 2702 requests session information from the service provider session manager module 1102 at step 2708. The service provider playlist user interface 2702 further requests a list of facilities 208 for the subscriber 204 at step 2710 from the service provider facility manager module 1104. At step 2712, the service provider playlist user interface 2702 lists the facilities for the actor 1002. At this point, the actor 1002 has the facility IDs within the domain of the subscriber 204 for the selection.

TABLE 18

Creating Scheduled Record Flow

| STEP | ACTION |
| --- | --- |
| 2706 | Create scheduled record request |
| 2708 | Get session information |
| 2710 | Get facilities for subscriber |
| 2712 | List of facilities |
| 2714 | Select facility |
| 2716 | Get visual appliance list for facility for that subscriber |
| 2718 | Get all valid content for subscriber |
| 2720 | Scheduled record form |
| 2722 | Scheduled record |
| 2724 | Syntax check |
| 2726 | Scheduled record save |
| 2728 | Validation Check |
| 2730 | Scheduled Record Saved |

At step 2714, the actor 1002 selects a facility ID or group of facilities ID. The service provider playlist user interface 2702 requests a visual appliance list for the selected facility 208 for the subscriber 204 from the service provider facility manager module 1104 at step 2716. At step 2718, the service provider playlist user interface 2702 requests valid content for the subscriber 204 from the service provider content manager module 2303. At step 2720, the service provider playlist user interface 2702 presents a scheduled record form to the actor 1002, where the schedule record form may include a facility ID, visual appliance list, and multi-media file list, for example.

At step 2722, the actor 1002 may select a facility ID, visual appliance ID, content ID, and start and stop times for the content to be displayed on the visual appliance 308. It should be understood that other and/or alternative identifiers and parameters may additionally be selected accordingly. At step 2724, the service provider playlist user interface 2702 performs a syntax check on the scheduled record, which is saved at step 2726 by the service provider playlist manager module 2704. The service provider playlist manager module 2704 further performs a validation check at step 2728. A notice of the scheduled record being saved is provided to the actor 1002 at step 2730. It should be understood that the scheduled record may further be modified and deleted as understood in the art.

Figure 28:
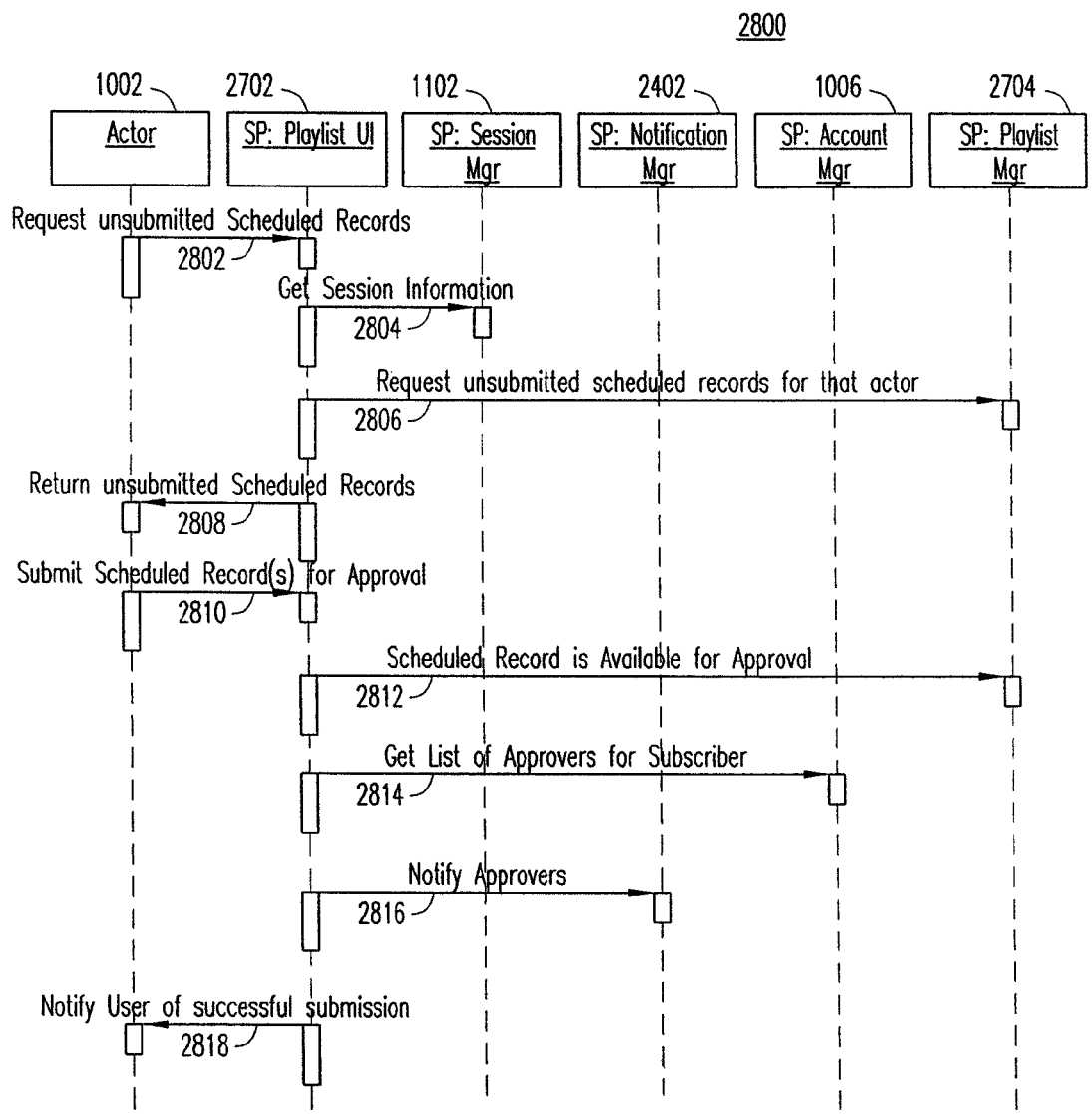
FIG. 28 is an exemplary sequence diagram illustrating submission of a scheduled record for approval utilizing the service provider server of FIG. 7A.

FIG. 28 is an exemplary sequence diagram 2800 illustrating submission of a scheduled record for approval on the service provider server 702 of FIG. 7A. The step numbers and associated actions are provided in TABLE 19 below. The actor 1002 may be a user from the subscriber 204 or 206 and/or playlist administrator of the service provider 202. The actor 1002 is to be authenticated and authorized to access the scheduled record submission for approval module 2604. At step 2802, the actor 1002 requests unsubmitted scheduled records from the service provider playlist user interface 2702, which, in turn, requests session information from the service provider session manager module 1102 at step 2804. At step 2806, the service provider playlist user interface 2702 requests unsubmitted scheduled records for that actor 1002 from the service provider playlist manager module 2704. The unsubmitted scheduled records are provided to the actor 1002 at step 2808.

TABLE 19

Submission of Scheduled Record for Approval Flow

| STEP | ACTION |
| --- | --- |
| 2802 | Request unsubmitted scheduled records |
| 2804 | Get Session Information |
| 2806 | Request unsubmitted scheduled records for that actor |
| 2808 | Return unsubmitted scheduled records |
| 2810 | Submit scheduled record(s) for approval |
| 2812 | Scheduled record is available for approval |
| 2814 | Get list of approvers for subscriber |
| 2816 | Notify approvers |
| 2818 | Notify user of successful submission |

At step 2810, the actor submits scheduled record(s) for approval to the service provider playlist user interface 2702. Notice to the service provider playlist manager module 2704 indicating that scheduled record(s) are available for approval at step 2812. At step 2814, a list of approvers for the subscriber are requested by the service provider playlist user interface 2702 from the service provider account manager module 1006. At step 2816, the service provider playlist user interface 2702 notifies approvers that scheduled record(s) are available for approval via the service provider notification manager module 2402. In notifying the approvers, the system may utilize e-mail or other communication means about the new scheduled record(s) awaiting approval. At step 2818, the actor is notified of successful submission of the submitted scheduled record(s). It should be noted that a scheduled record may not be submitted for approval unless the following attributes have valid values: file ID, facility name, visual appliance name, location name, content name, scheduled start time, scheduled end time or relevant information, including verification of display of the content. The system tags the submitted scheduled records as "submitted" for record keeping purposes.

Figure 29:
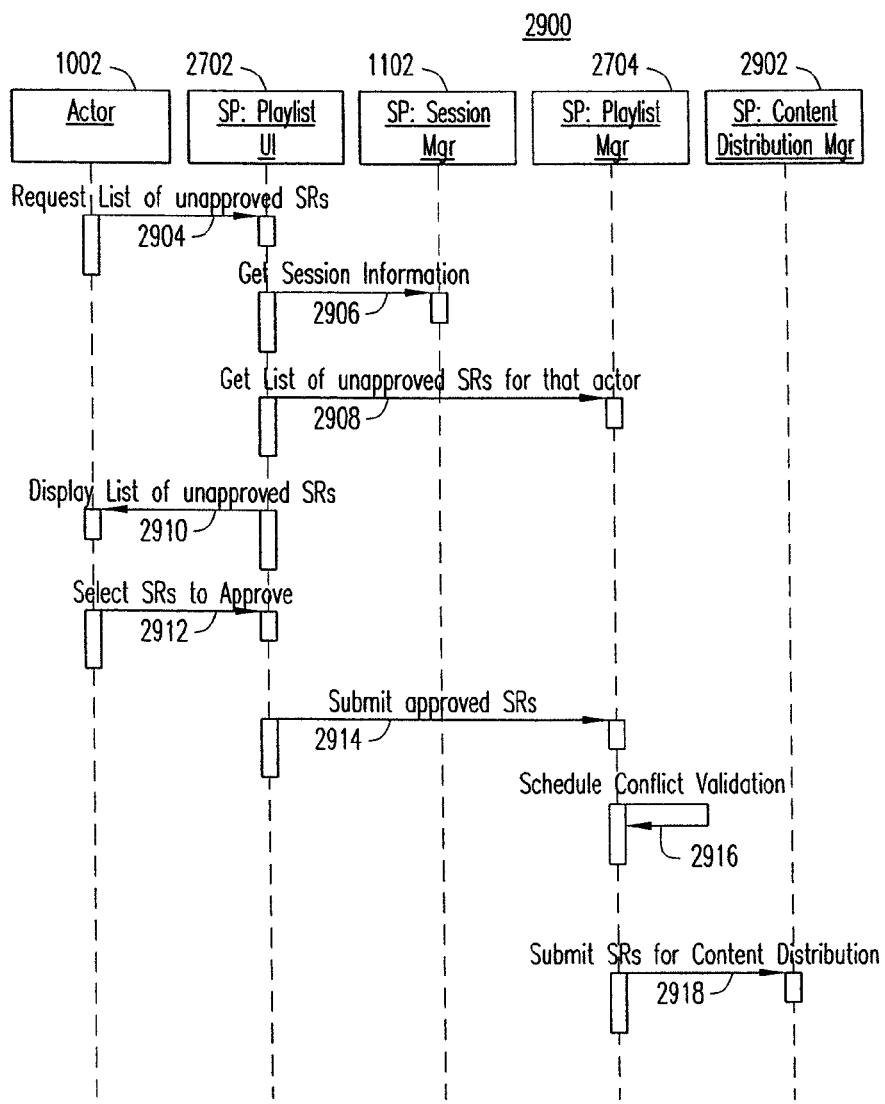
FIG. 29 is an exemplary sequence diagram illustrating submission of scheduled records for content distribution utilizing the service provider server of FIG. 7A.

FIG. 29 is an exemplary sequence diagram 2900 illustrating submission of scheduled records for content distribution by the service provider server 702 of FIG. 7A. The step numbers and associated actions are provided in TABLE 20 below. The actor 1002 may be a playlist approver from either the subscriber 204 or service provider 202. The actor 1002 is to be authenticated and authorized to access the scheduled record submission module 2604. A service provider content distribution manager module 2902 is utilized in providing for the scheduled record approval functionality.

TABLE 20

Submission of Scheduled Records for Distribution Flow

| STEP | ACTION |
|---|---|
| 2904 | Request list of unapproved scheduled records |
| 2906 | Get session information |
| 2908 | Get list of unapproved scheduled records for that actor |
| 2910 | Display list of unapproved scheduled records |
| 2912 | Select scheduled records to approve |
| 2914 | Submit approved scheduled records |
| 2918 | Submit scheduled records for content distribution |

At step 2904, the actor 1002 requests a list of unapproved scheduled record(s) to the service provider playlist user interface 2702, which, in turn, requests session information from the service provider session manager module 1102. At step 2908, the service provider playlist user interface 2702 requests a list of unapproved service requests for the actor 1002 from the service provider playlist manager module 2704. The list of unapproved scheduled record(s) is displayed for the actor 1002 at step 2910.

At step 2912, the actor 1002 selects scheduled record(s) to approve. The service provider playlist user interface 2702 submits the selected approved scheduled record(s) to the service provider playlist manager module 2704 at step 2914. At step 2916, the system validates that no schedule conflict exists between scheduled records submitted for distribution as well as between submitted scheduled records and scheduled records currently on the local server 304. Upon successful validation of conflicts, the system sends the selected scheduled record(s) to the service provider content distribution manager module 2902 at step 2918. If, however, during the schedule conflict resolution, the system detects a conflict, conflict is reported to the actor 1002. The actor 1002 may submit the scheduled record(s) in spite of the conflict. In the case of conflicting scheduled records, the system overwrites the existing scheduled record with the new scheduled record. Once the scheduled records are submitted, a scheduled record search may be performed by the subscriber 204 or service provider 202 as understood in the art.

Figure 30:
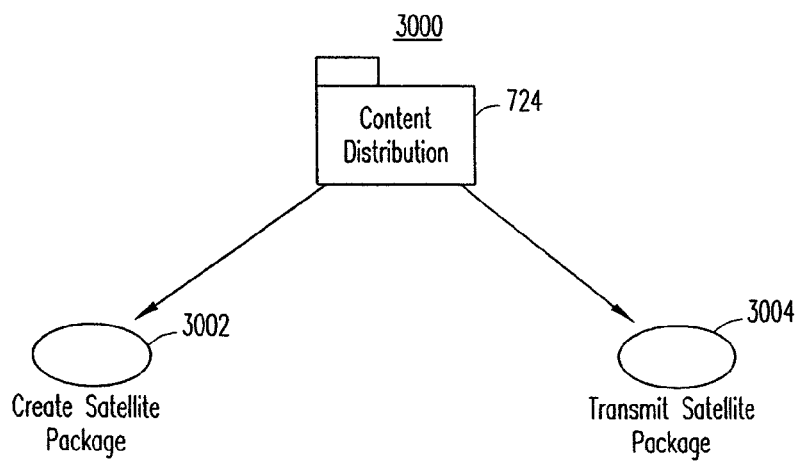
FIG. 30 is an exemplary block diagram providing for content distribution by the communications network service provider of FIG. 2.

FIG. 30 is an exemplary block diagram 3000 providing for content distribution by the communications network service provider 216 of FIG. 2. The content distribution management package 724 includes monitoring the scheduled records to determine when to transmit the scheduled records to the appropriate local servers 304. Additionally, the content distribution packets determine additional content to be transmitted to the appropriate local servers 304. Further, the content distribution management package 724 is responsible for determining the scheduled records ready to be transmitted to the local servers 304 and the particular local server(s) 304 for transmission. Bandwidth usage is optimized by the content distribution management package 724 by determining scheduled records containing the same content and multicasting the content to multiple locations. After determining the content to be transmitted to the different local server 304, the content distribution management package 724 creates satellite packages multicasting the content and associated meta data to the local servers 304 at remote facilities 208 by a package delivery service from the communications network service provider 216.

The content distribution management package 724 is responsible for substantially guaranteeing delivery of the satellite package to the local server(s) 304. To substantially guarantee the delivery of the satellite packages, the content distribution management package 724 multicast/unicast(s) the satellite package(s) to the local server(s) 304 and receive confirmations of successful delivery therefrom. Pre-transmission of the complete or partial satellite packages may also be performed as understood in the art. As shown in FIG. 30, the content distribution management package 724 includes a create satellite package module 3002 and transmit satellite package module 3004.

Figure 31:
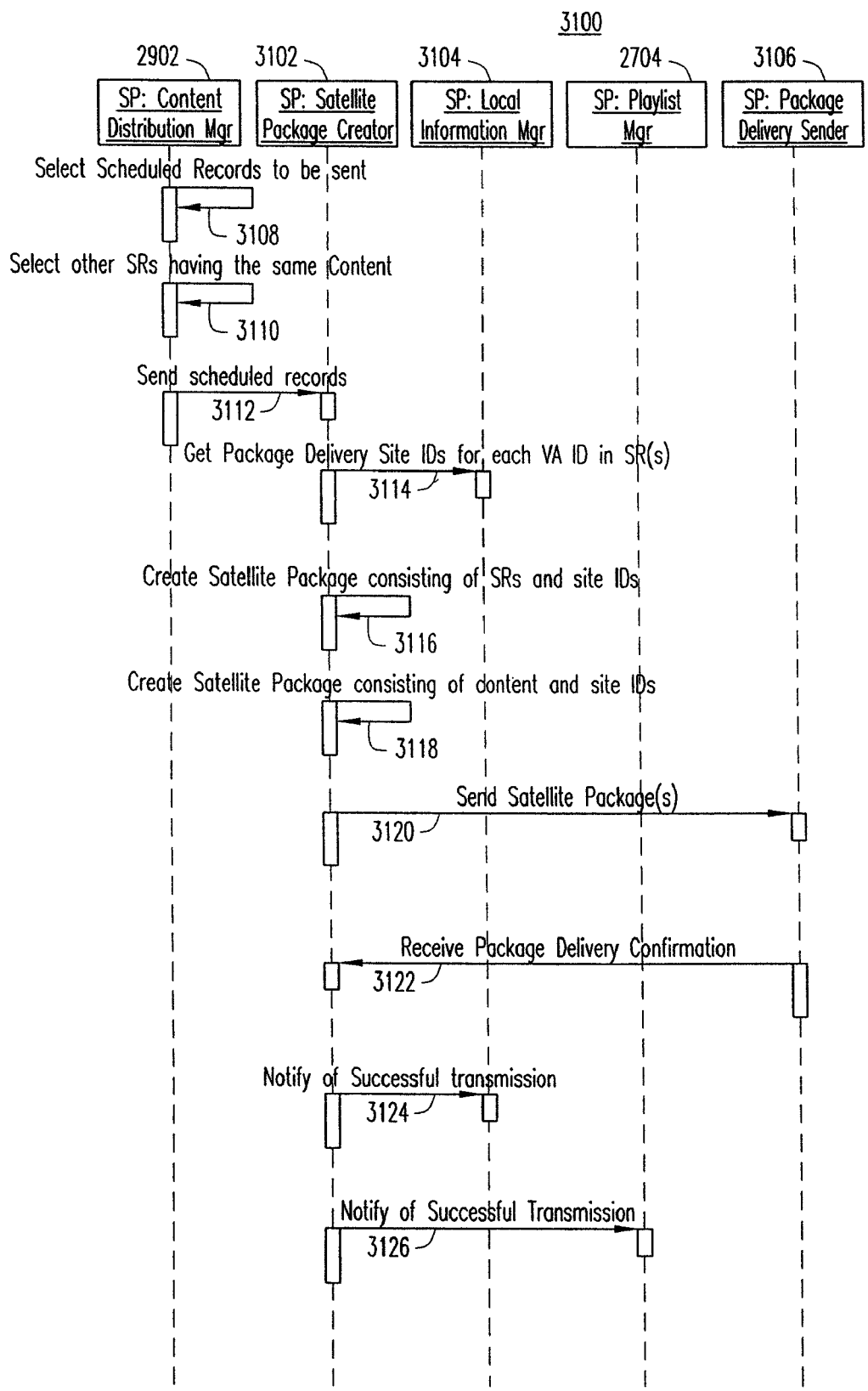
FIG. 31 is an exemplary sequence diagram illustrating the creation of a satellite package for multicast/unicast to local server(s) of FIG. 3A.

FIG. 31 is an exemplary sequence diagram 3100 illustrating the creation of a satellite package for multicast/unicast to local server(s) 304 of FIG. 3A. The step numbers and associated actions are provided in TABLE 21 below. Rather than having a human actor, the service provider content distribution manager module 2902 operates as the initiator of the creation of the satellite package. The service provider content distribution manager module 2902 initiates the sequence once it has scheduled record(s) that are to be relayed or communicated to the local server 304. As shown, the sequence utilizes a service provider satellite package creator module 3102, service provider local information manager module 3104, and service provider package delivery sender module 3106.

TABLE 21

Creation of Satellite Package Flow

| STEP | ACTION |
|---|---|
| 3108 | Select scheduled records to be sent |
| 3110 | Select other scheduled records having the same content |
| 3112 | Send scheduled records |
| 3114 | Get package delivery site IDs for each visual appliance ID in scheduled record(s) |
| 3116 | Create satellite package consisting of scheduled records and site IDs |
| 3118 | Create satellite package consisting of content and site IDs |
| 3120 | Send satellite package(s) |
| 3122 | Receive package delivery confirmation |
| 3124 | Notify of successful transmission |
| 3126 | Notify of successful transmission |

In operation, the service provider content distribution manager module 2902 selects scheduled records to be sent at step 3108. In selecting the scheduled records to be sent, the service provider content distribution manager module 2902 determines which scheduled records to submit for delivery based on the time that the content is scheduled to play. The time interval for delivery prior to playtime may be configurable (e.g., 2 days, 5 days, or 1 week) for priority delivery purposes.

At step 3110, the service provider content distribution manager module 2902 may select other scheduled records having the same content as previously selected, but not yet eligible for delivery, so as to maximize distribution of a single content via a broadcast/multicast. In step 3112, the service provider content distribution manager module 2902 sends the scheduled records to the service provider satellite package creator module 3102.

The service provider satellite package creator module 3102 requests package delivery site IDs for each visual appliance ID in the scheduled record(s) from the service provider local information manager module 3104 at step 3114. The service provider satellite package creator module 3102 may create multiple satellite packages. A first satellite package is created at step 3116 and includes scheduled records and site IDs. A second satellite package is created at step 3118 and includes content and site IDs. The packages having content may have the following attributes for each file: file name, size, resolution, aspect ratio, creation date, last modified date, expiration date, subscriber ID, subscription ID, verification parameters, and status. The service provider satellite package creator module 3102 sends the satellite package(s) to the service provider package delivery sender module 3106 at step 3120. In response, the service provider package delivery sender module 3106 communicates a package delivery confirmation receipt back to the service provider satellite package creator module 3102 at step 3122. The service provider satellite package creator module 3102 notifies the service provider local information manager module 3104 of a successful transmission at step 3124 and the service provider playlist manager module 2704 of the successful transmission at step 3126. The service provider playlist manager module 2704 may mark the status of the scheduled records as "sent".

Figure 32:
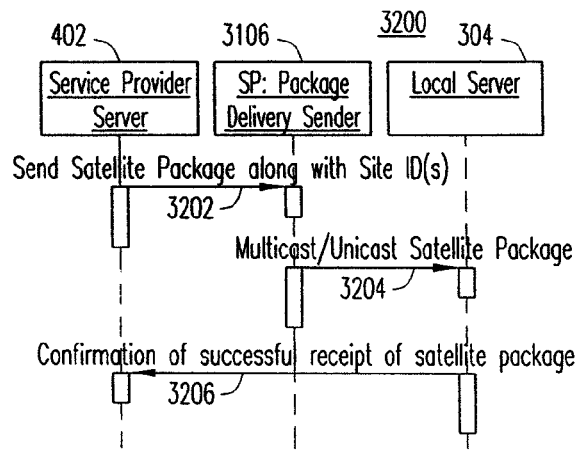
FIG. 32 is an exemplary sequence diagram that illustrates the multicasting/unicasting of the satellite package to the local server(s) of FIG. 3A.

FIG. 32 is a more basic exemplary sequence diagram 3200 of the sequence diagram 3100 of FIG. 31 that illustrates the multicasting/unicasting of the satellite package(s) to the local server(s) 304. The step numbers and associated actions are provided in TABLE 22 below. In operation, the service provider server 702, via the service provider package delivery sender module 3106, receives a valid satellite package along with a list of valid site ID(s) to where the package is to be sent, and, based on this information, the service provider package delivery sender module 3106 multicasts/unicasts the satellite package to the specified local server(s) 304. More specifically, the service provider server 702 sends the satellite package along with site ID(s) to the service provider package delivery sender module 3106 at step 3202 and the satellite package is multicast/unicast to the local server 304 at step 3204. At step 3206, the local server 304 sends a confirmation of a successful receipt of the satellite package to the service provider server 702.

TABLE 22

Distribution of Satellite Package Flow

| STEP | ACTION |
| --- | --- |
| 3202 | Send satellite package along with site ID(s) |
| 3204 | Multicast/unicast satellite package |
| 3206 | Confirmation of successful receipt of satellite package |

Figure 33:
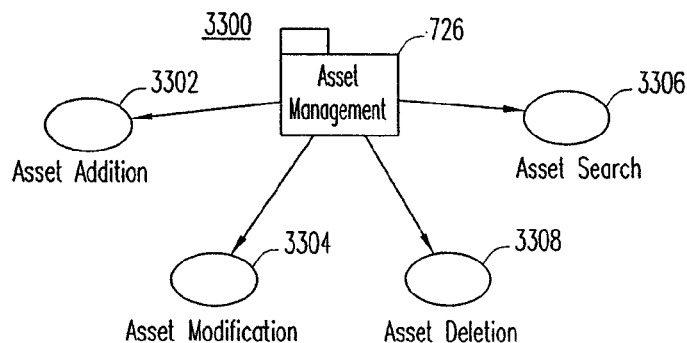
FIG. 33 is an exemplary block diagram of the asset management package for managing the physical assets of FIG. 3A.

FIG. 33 is an exemplary block diagram 3300 of the asset management package 726 for managing the physical assets of FIG. 3A. Assets are defined as the infrastructure components of the system, including servers, such as the service provider server 702 and local server 304, satellite dishes 302, visual appliances 308, wireless access point 602, etc. Asset management involves maintaining a knowledge base of the inventory. In one embodiment, the asset management maintains the entire inventory in a single location via the communications system 200. The asset management package 726 provides a mechanism to perform asset management from the service provider server 702. The asset management package 726 includes an asset addition module 3302, asset modification module 3304, asset search module 3306, and asset deletion module 3308.

Figure 34:
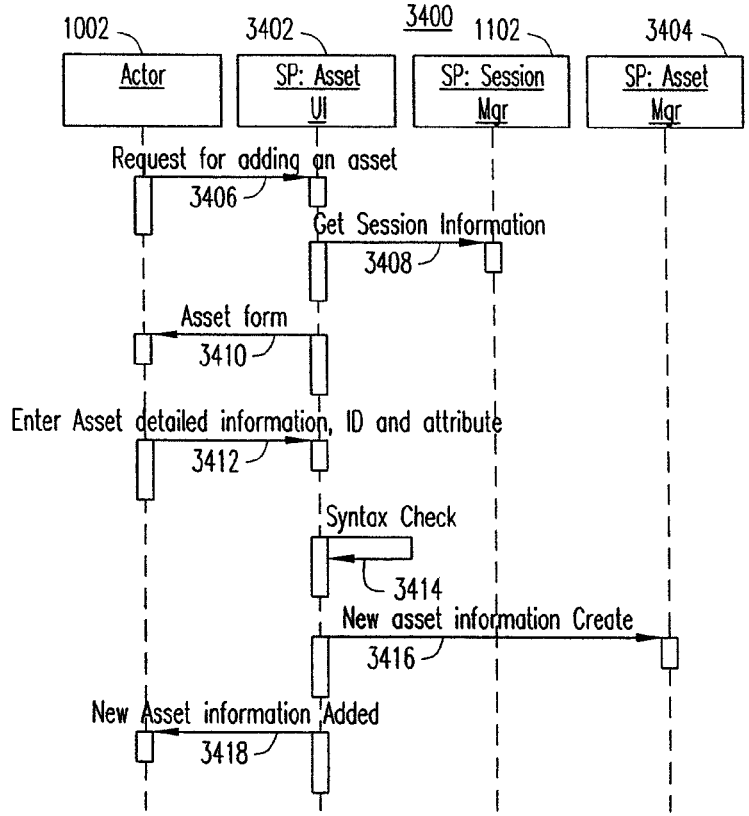
FIG. 34 is an exemplary sequence diagram illustrating the asset addition process provided by an asset addition module of FIG. 33.

FIG. 34 is an exemplary sequence diagram 3400 illustrating the asset addition process provided by the asset addition module 3302 of FIG. 33. The step numbers and associated actions are provided in TABLE 23 below. The actor 1002 may be the asset administrator of the service provider 202 who has been authenticated and authorized to access the asset addition functionality. The asset administrators may utilize the asset addition functionality to add assets of the service provider 202, including local server 304, visual appliances 308, satellite dishes 302, receivers 303, and access points 314. A service provider asset user interface module 3402 and service provider asset manager module 3404 modules are utilized in the asset additions process.

TABLE 23

Asset Addition Flow

| STEP | ACTION |
| --- | --- |
| 3406 | Request for adding an asset |
| 3408 | Get session information |
| 3410 | Asset form |
| 3412 | Enter asset detailed information, ID and attribute |
| 3414 | Syntax check |
| 3416 | New asset information create |
| 3418 | New asset information added |

In operation, the actor 1002 requests to add assets via the service provider asset user interface 3402 at step 3406. At step 3408, the service provider asset user interface 3402 requests session information from the service provider session manager module 1102. At step 3410, the service provider asset user interface 3402 provides the actor 1002 with an asset form, which includes fields, such as serial ID, physical location, type, make, owner, and status for each asset.

At step 3412, the actor 1002 enters asset detailed information as provided by the fields on the asset form. At step 3414, the service provider asset user interface 3402 performs a syntax check on the asset information and new asset information is created in response to the service provider asset manager module 3404 receiving a communication from the service provider asset user interface 3402. New asset information is created at step 3416. At step 3418, the service provider asset user interface 3402 notifies the actor 1002 that the new asset information has been added to the system for future utilization. It should be understood that asset modification, asset deletion, and asset searching may be performed as understood in the art.

Figure 35:
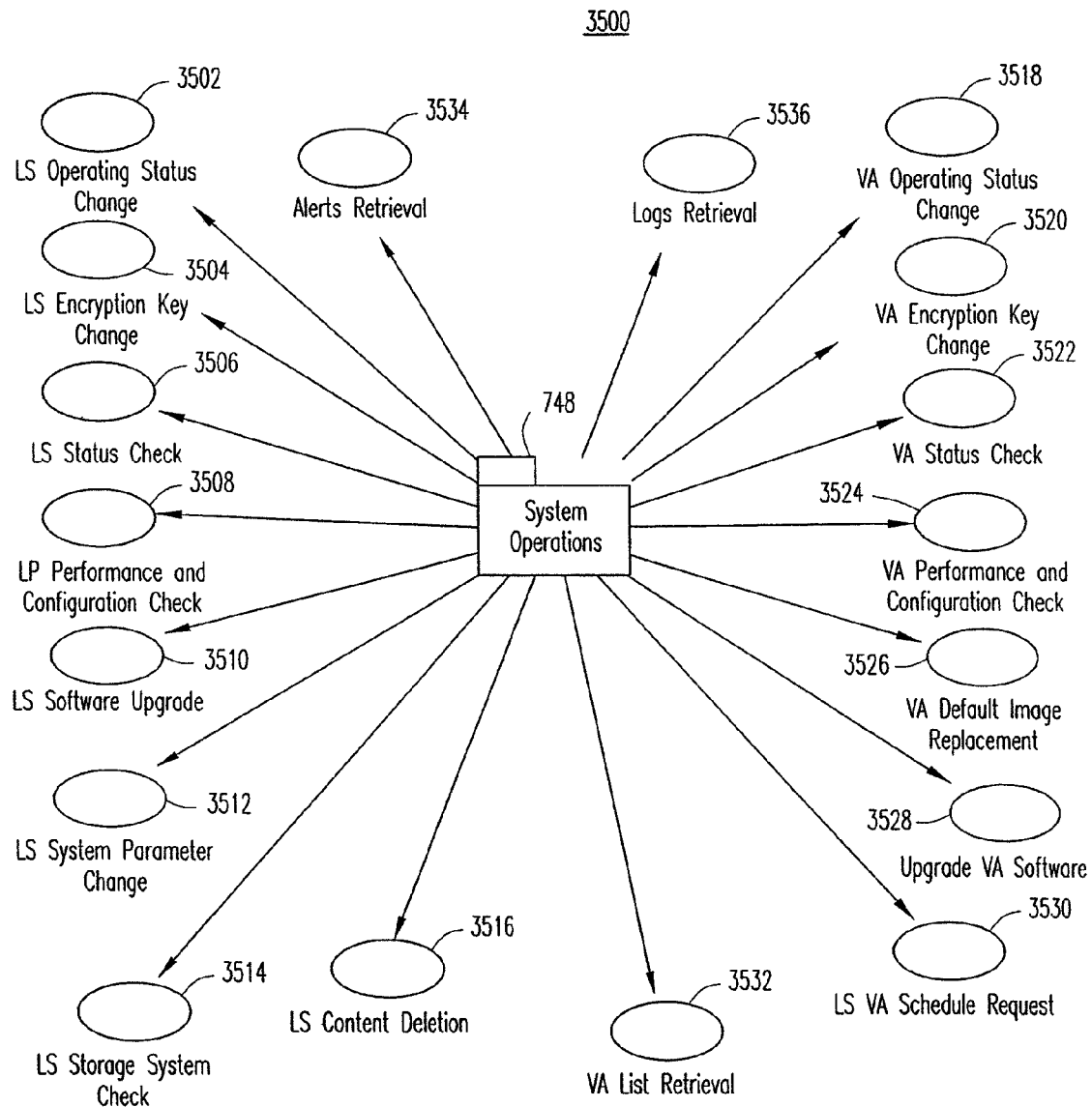
FIG. 35 provides a system operations package for the service provider to provide the service operations and maintenance for the assets of the communications system of FIGS. 2 and 3A.

FIG. 35 provides the system operations package 748 for the service provider 202 to provide the service operations and maintenance for the assets of the communications system 200 of FIG. 2. As shown, the functionality of the system operations package 748 includes performing operations for the local servers 304 and visual appliances 308. The functionality for the local servers 304 include local server operating status change 3502, local server encryption key change 3504, local server status check 3506, local server performance and configuration check 3508, local server software upgrade 3510, local server system parameter change 3512, local server storage system check 3514, and local server content deletion 3516. The visual appliance functionality includes visual appliance operating status change 3518, visual appliance encryption key change 3520, visual appliance status check 3522, visual appliance performance and configuration check 3524, visual appliance default image replacement 3526, upgrade visual appliance software 3528, local server visual appliance schedule request 3530, and visual appliance list retrieval 3532. In addition, the system operations package 748 includes functionality for retrieval of system information, including alerts retrieval 3534 and logs retrieval 3536. In general, the functionality provided by the system operations package 748 includes status checks, updating configuration parameters, and upgrading software. The functionality of the modules are as understood in the art. However, certain operations are described hereinafter in accordance with the principles of the present invention so as to provide for those aspects of the communications system 200 that enable the service provider 202 the ability to provide for a system features in accordance with the principles of the present invention.

Figure 36:
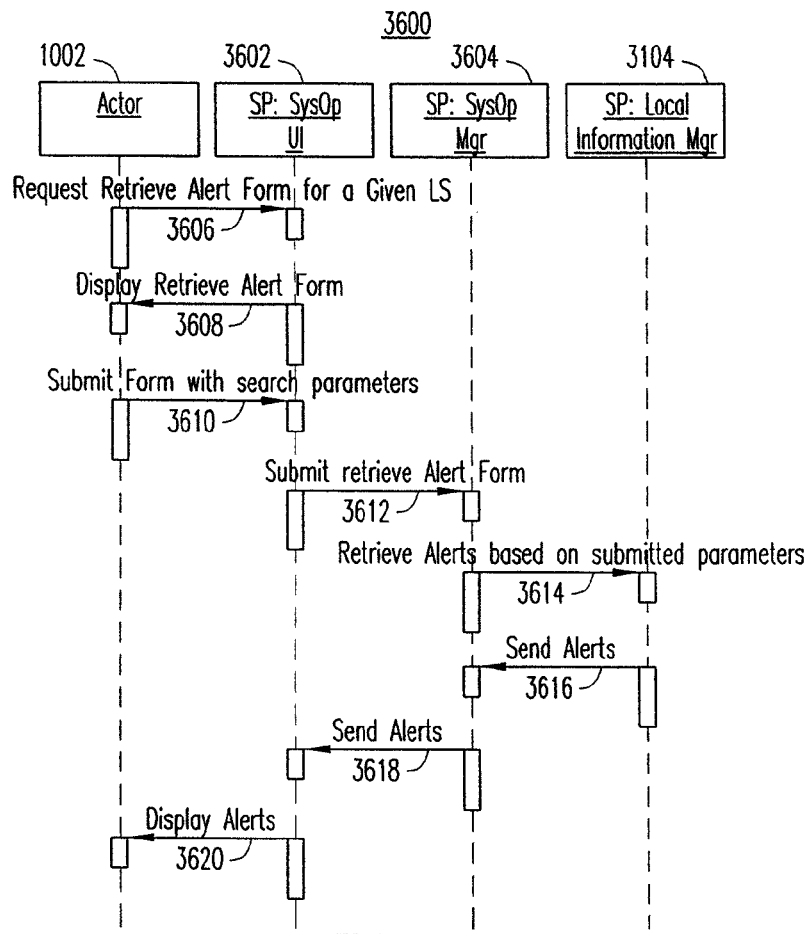
FIG. 36 is an exemplary sequence diagram that illustrates retrieving alert history via the communications system of FIG. 2.

FIG. 36 is an exemplary sequence diagram 3600 that illustrates retrieving alert history via the communications system 200 of FIG. 2. The step numbers and associated actions are provided in TABLE 24 below. The actor 1002 in this case is a system operator of the service provider 202 who has been authenticated and authorized to retrieve logs from the local servers 304. As shown, a service provider system operation user interface module 3602 and service provider system operation manager module 3604 are utilized in providing the alert retrieval functionality. It should be understood that the alert retrieval functionality is a post-processing function to look-up alerts that have occurred in the past and that current alerts are, in general, automatically propagated from the device (e.g., local server 304 and visual appliance 308) to the service provider server 702. The service provider server 702, in response, may communicate message(s) to the facility 208 or an operator at the service provider 202 to take corrective actions to address the alert.

TABLE 24

Alert Retrieval Flow

| STEP | ACTION |
| --- | --- |
| 3606 | Request retrieve alert form for a given local server |
| 3608 | Display retrieve alert form |
| 3610 | Submit form with search parameters |
| 3612 | Submit retrieve alert form |
| 3614 | Retrieve alerts based on submitted parameters |
| 3616 | Send alerts |
| 3618 | Send alerts |
| 3620 | Display alerts |

At step 3606, the actor 1002 requests a retrieval alert form for a particular local server 304 from the service provider system operation user interface 3602. The requested retrieved alert form is displayed for the actor 1002 at step 3608. The actor 1002 may search for alerts for a given local server 304 based on visual appliance identifier (ID), date, and alert severity level, for example, at step 3610 by submitting the form with the search parameters to the service provider system operation user interface 3602. At step 3612, the retrieved alert form is communicated to the system provider system operation manager module 3604, which, in turn, requests alerts based on the submitted parameters from the service provider local information manager module 3104 at step 3614. The alerts as searched are returned at step 3616 and 3618 and displayed to the actor 1002 at step 3620.

Figure 37:
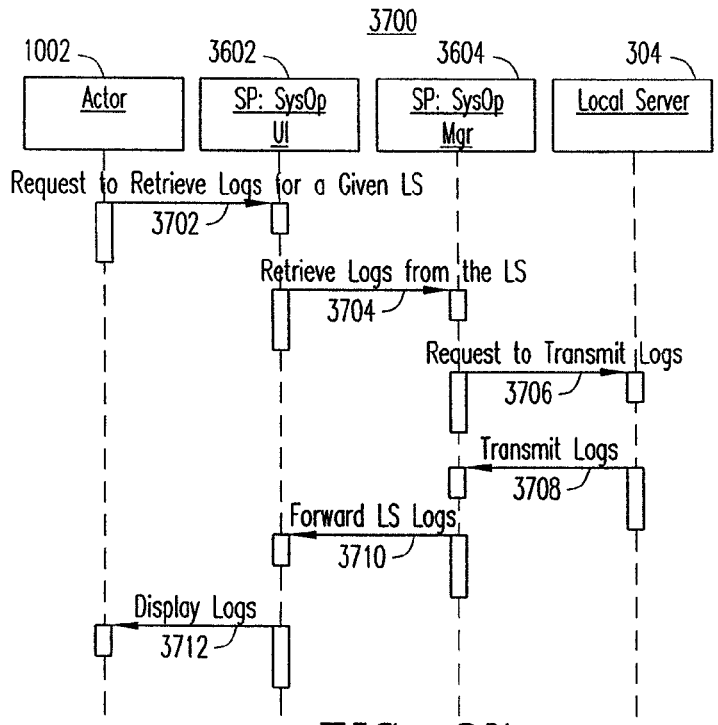
FIG. 37 is an exemplary sequence diagram illustrating the retrieval of logs from the local server of FIG. 3A.

FIG. 37 is an exemplary sequence diagram illustrating the retrieval of logs from the local server 304 of FIG. 3A. The step numbers and associated actions are provided in TABLE 7 below. The process starts at step 3702 by the actor 1002, who may be a system operator of the service provider 202, requesting to retrieve logs for a given local server 304 from the service provider system operator user interface 3602. At step 3704, the service provider system, operator user interface 3602 requests the logs from the local server 304 from the service provider system operation manager module 3604, which, in turn, requests to transmit logs from the local server 304 at step 3706. The local server 304, in response to the request to transmit the logs, transmits the logs to the service provider system operation manager module 3604 at step 3708. The logs may be transmitted via a management channel on the communications system 200. The logs of the local server 304 are forwarded to the service provider system operator user interface 3602 at step 3710 and displayed for the actor 1002 at step 3712.

TABLE 25

Log Retrieval Flow

| STEP | ACTION |
| --- | --- |
| 3702 | Request to retrieve logs for a given local server |
| 3704 | Retrieve logs from the local server |
| 3706 | Request to transmit logs |
| 3708 | Transmit logs |
| 3710 | Forward local server logs |
| 3712 | Display logs |

Figure 38:
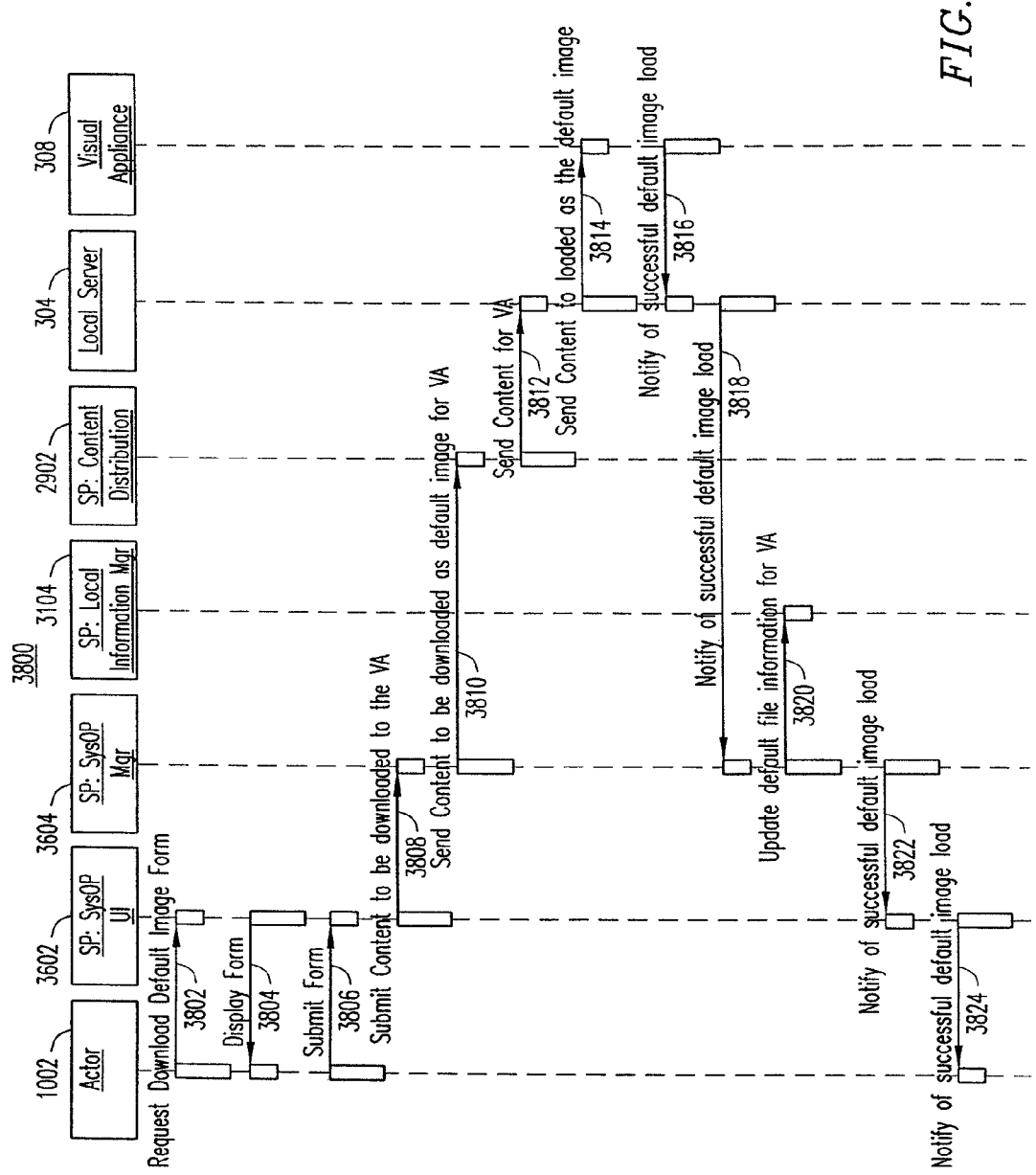
FIG. 38 is an exemplary sequence diagram that illustrates the replacement of a default image for a visual appliance by an operator of the service provider of FIG. 2.

FIG. 38 is an exemplary sequence diagram 3800 that illustrates the replacement of a default image for a visual appliance 308 by a subscriber 204 of the service provider 202 of FIG. 2. The step numbers and associated actions are provided in TABLE 26 below. A default image may be any image, including still (e.g., logo) or motion (e.g., video), to prevent an electronic display 310 from having a blank screen. The default image replacement process starts at step 3802, where a request to download a default image form by the actor 1002 to the service provider system operator user interface 3602 is performed. The default image form is displayed for the actor 1002 at step 3804. At step 3806, the actor submits the default image form after entering a visual appliance ID and loads content (e.g., default image previously approved). At step 3808, the submitted content to be downloaded to the visual appliance 308 is sent to the service provider system operator manager module 3604, which sends the content to be downloaded as a default image for the visual appliance 308 to the service provider content distribution module 2902 at step 3810. The content is thereafter communicated to the local server 304 at step 3812. The local server 304 communicates the content to the visual appliance 308 to be loaded as the default image at step 3814. It should be understood that the default image may be a fixed or dynamic image.

TABLE 26

Default Image Replacement Flow

| STEP | ACTION |
| --- | --- |
| 3802 | Request download default image form |
| 3804 | Display form |
| 3806 | Submit form |

TABLE 26-continued

Default Image Replacement Flow

| STEP | ACTION |
|---|---|
| 3808 | Submit content to be downloaded to the visual appliance |
| 3810 | Send content to be downloaded as default Image for visual appliance |
| 3812 | Send content for visual appliance |
| 3814 | Send content to loaded as the default image |
| 3816 | Notify of successful default image load |
| 3818 | Notify of successful default image load |
| 3820 | Update default file information for visual appliance |
| 3822 | Notify of successful default image load |
| 3824 | Notify of successful default image load |

In response to the visual appliance 308 receiving and loading the content as the default image, the visual appliance 308 notifies the local server 304 of a successful default image load at step 3816. The notification of the successful default image load is further updated throughout the system at steps 3818, 3820, 3822, and 3824, which ultimately notifies the actor 1002.

Local Server Software Packages and Processes

Figure 39:
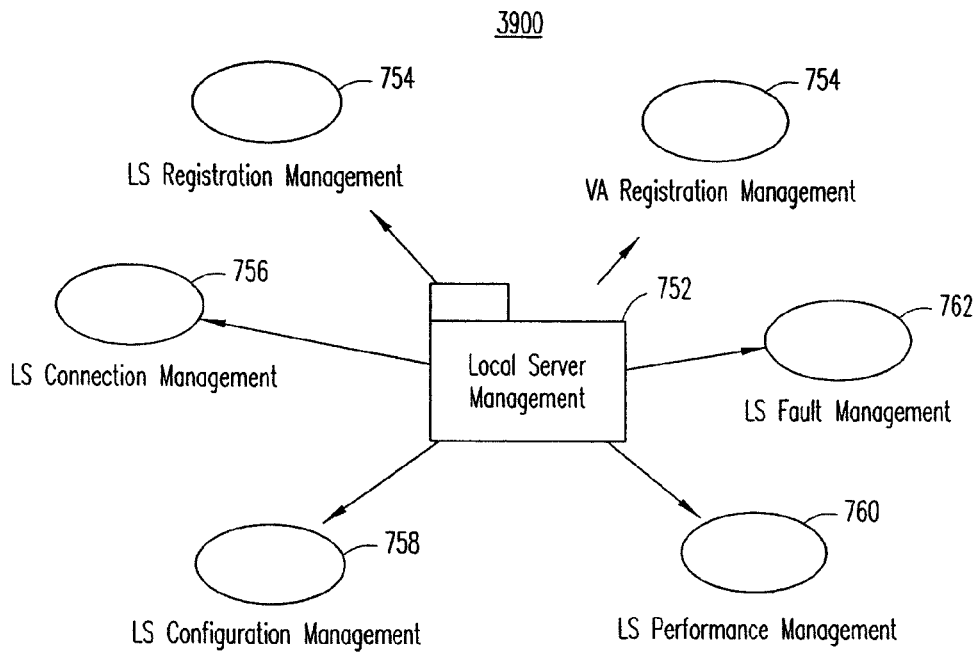
FIG. 39 is an exemplary block diagram providing for the packages that a local server management package interfaces for operating the local server of FIG. 3A.

FIG. 39 is an exemplary block diagram 3900 providing for the packages that the local server management package 752 interfaces for operating the local server 304 of FIG. 3A. As shown, the local server management package 752 interfaces with the local registration management package 754, local server connection management package 756, local server configuration management package 758, local server performance management package 760, local server default management package 762, and visual appliance registration management package 754. Modules 754-762 are generally described with regard to FIG. 7B. The visual appliance registration management package 754 is operable to register visual appliances 308 with the local server 304.

Figure 40:
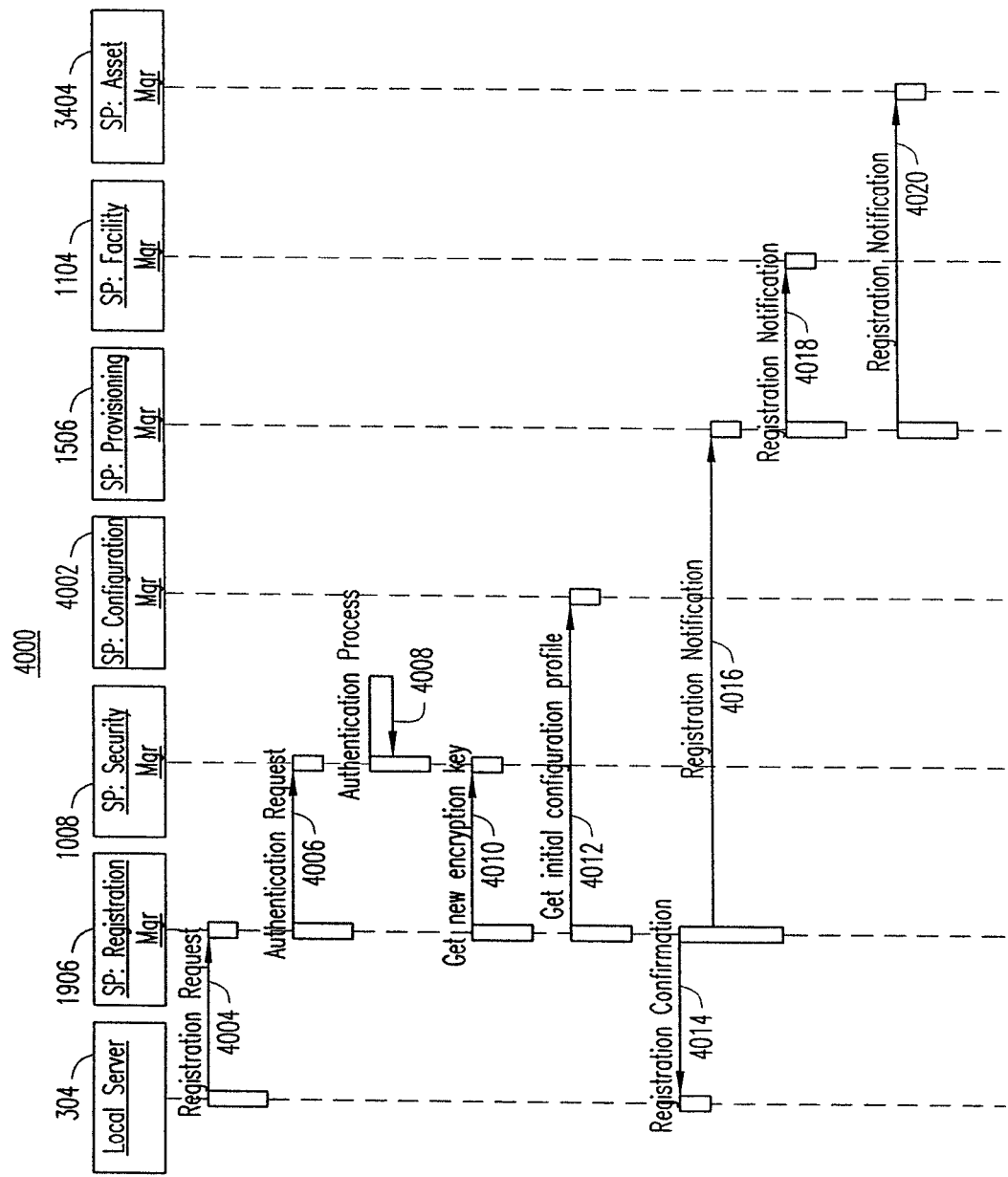
FIG. 40 is an exemplary sequence diagram illustrating registration of the local server to the service provider server of FIG. 7A at the time of provisioning.

FIG. 40 is an exemplary sequence diagram 4000 illustrating registration of the local server 304 of FIG. 7B to the service provider server 702 at the time of provisioning. The step numbers and associated actions are provided in TABLE 27 below. For registration, the local server 304 is to be previously defined in the service provider server 702 through the provisioning management package 718, locally configured, and ready for registration with the service provider server 702. To provide for the registration of the local server 304, a service provider configuration manager module 4002 is utilized.

TABLE 27

Local Server Registration Flow

| STEP | ACTION |
|---|---|
| 4004 | Registration request |
| 4006 | Authentication request |
| 4008 | Authentication process |
| 4010 | Get new encryption key |
| 4012 | Get initial configuration profile |
| 4014 | Registration confirmation |
| 4016 | Registration notification |
| 4018 | Registration notification |
| 4020 | Registration notification |

At installation time, an operator installing the local server 304 configures the local server 304 by loading software into the local server 304 and entering system parameters into the system. Such parameters may include the IP address of the service provider server 702, the local server ID (LSID), the serial ID, subscription ID, and an initial encrypting key.

Once the local configuration is successful, the operator or installer is to bring the local server 304 online to register with the service provider server 702. At step 4004, the local server 304 requests registration from the service provider registration manager module 1906. The registration request communicates an information packet containing an encrypted local server ID, which may be decrypted and validated by the service provider security manager module 1008 at steps 4006 and 4008. Upon a successful validation, the service provider registration manager module 1906 requests a new encryption key from the service provider security manager module 1008. An initial configuration profile may be requested at step 4012 from the service provider configuration manager module 4002, where the initial configuration profile may include site ID for content distribution purposes and the visual appliance list for visual appliance management purposes. Upon completion of the registration, the service provider registration manager module 1906 communicates a registration confirmation to the local server 304 at step 4014. The registration confirmation may include registration profile, including the new encryption key for connection purposes and other system parameters. The service provider registration manager module 1906 may additionally communicate a registration notification message to the service provider provisioning manager module 1506 at step 4016, the service provider facility manager module 1104 at step 4018, and the service provider asset manager module 3404 at step 4020.

Local Server

The local server 304 is typically deployed at each facility 208 of the subscriber 204. The local servers 304 have multiple functions and receive satellite packages as provided for by the service provider server 702. Additionally, the local server 304 validates the satellite packages and extract the scheduled records and content. The extracted contents are stored locally and the scheduled records are added to the visual appliance scheduler being locally maintained. Also, the local server 304 is responsible for transmitting the content to the visual appliances 308 and the facility 208 at the scheduled times.

Apart from receiving the satellite packages as provided by the service provider server 702 and transmitting the content to the visual appliances 308, the local server 304 is responsible for commissioning the visual appliances and collecting logs, alerts, and performance related data from the visual appliances 308. The local server 304 also monitors the visual appliances 308 in the facility 208 and notifies the service provider server 702 in real-time of any high-priority alerts.

The local server 304 is responsible for its own maintenance. In that regard, the local server 304 constantly monitors its local storage capacity and deletes content if the usage reaches a certain threshold. The local server 304 may further be capable of deciding which visual appliance alerts to pass on to the service provider server 702 in real-time and which ones to pass on periodically. In addition to performing the various system management tasks, the local server 304 also processes requests from the service provider server 702. The operators of the service provider 202 may send multiple types of requests from the service provider server 702 to the local server 304. The requests may request information, task performance, or collected logs. In general, however, the local server 304 is primarily tasked with transmitting content to the visual appliances 308 and collecting logs and alerts therefrom.

Figure 41:
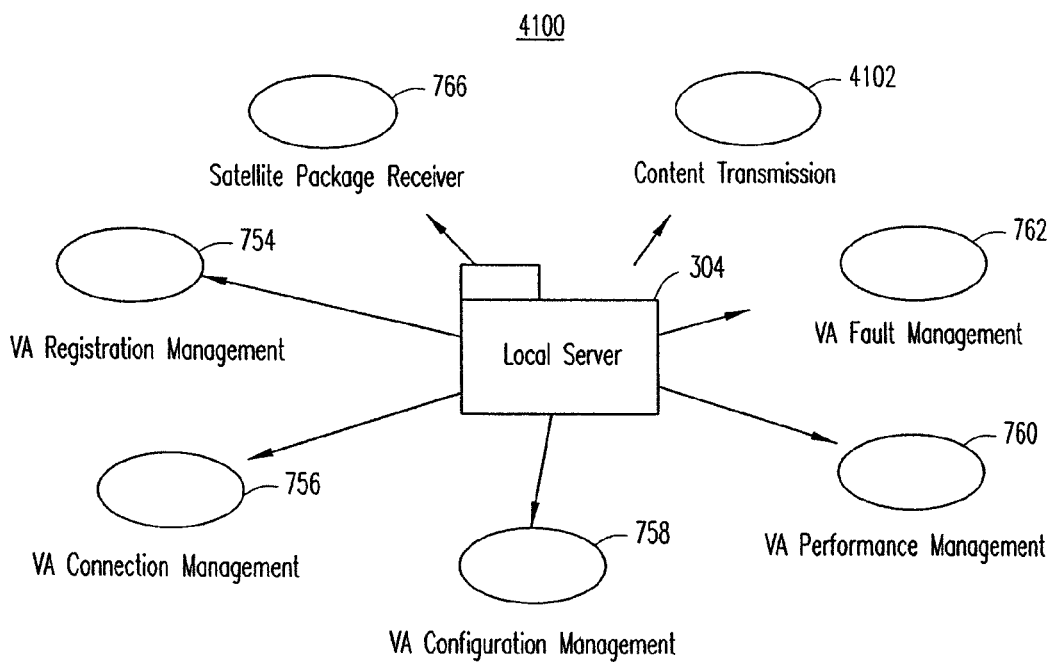
FIG. 41 is an exemplary block diagram that depicts the local server and functionality provided thereby of FIG. 3A.

FIG. 41 is an exemplary block diagram that depicts the local server 304 of FIG. 7B and functionality provided thereby, including the satellite package receiver package 766, visual appliance registration management package 754, visual appliance connection management package 756, visual appliance configuration management package 758, visual appliance performance management package 760, visual appliance fault management package 762, and content transmission package 4102. The functionality of the packages provides for substantially automatic operation via the local server 304 so that the scheduling of the content may be performed by a single operator of the subscriber 204 or service provider 202 by interfacing with the service provider server 702, thereby minimizing efforts at the individual facilities 208.

Figure 42:
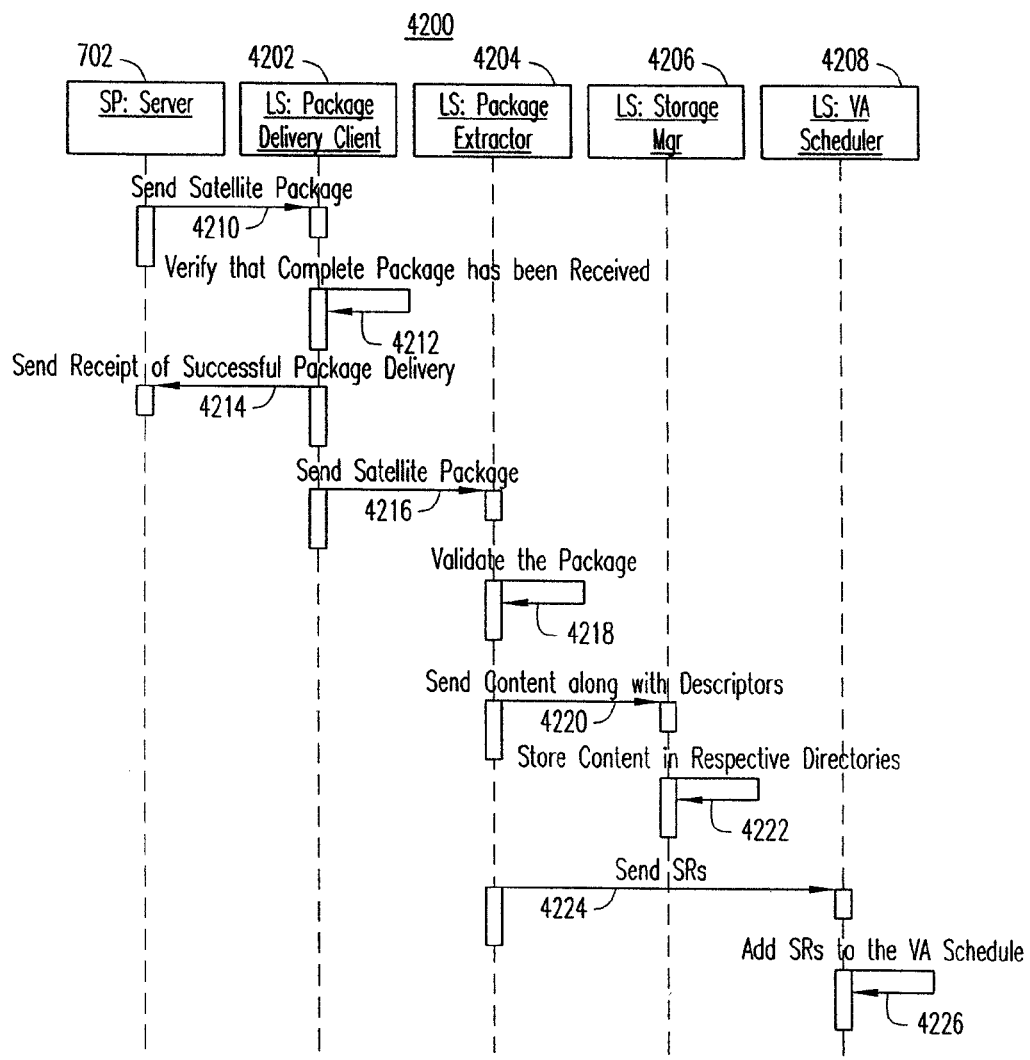
FIG. 42 is an exemplary sequence diagram that illustrates receipt and post processing of satellite packages by the local server of FIG. 3A.

FIG. 42 is an exemplary sequence diagram 4200 that illustrates receipt and post processing of satellite packages by the local server 304 of FIG. 7B. The step numbers and associated actions are provided in TABLE 28 below. The satellite package receipt verification process utilizes a local server package delivery client module 4202, local server package extractor module 4204, local server storage manager module 4206, and local server visual appliance scheduler module 4208. The process starts at 4210 as the service provider server 702 sends the satellite package to the local server package delivery client module 4202, which verifies that the complete satellite package has been received at step 4212. In the case of the satellite package missing one or more segments, a request for those missing segments is made to the service provider server 702. Upon successfully receiving the satellite package, the local server package delivery client module 4202 sends a receipt of a successful package delivery to the service provider server 702 at step 4214.

TABLE 28

Satellite Package Receipt Flow

| STEP | ACTION |
|---|---|
| 4210 | Send satellite package |
| 4212 | Verify that complete package has been received |
| 4214 | Send receipt of successful package delivery |
| 4216 | Send satellite package |
| 4218 | Validate the package |
| 4220 | Send content along with descriptors |
| 4222 | Store content in respective directories |
| 4224 | Send scheduled records |
| 4226 | Add scheduled records to the visual appliance schedule |

The satellite package further is sent to the local server package extractor module 4204 at step 4216 and a validation of the package is made at step 4218. The validation includes performing multiple tests, including verifying that content exists as specified in each schedule record, verifying that the content has been scheduled for visual appliance(s) 308 with the correct resolution, and verifying that file descriptors exist for each content received. At step 4220, the local server package extractor module 4204 sends a content along with descriptions to the local server storage manager module 4206, which stores the contents in respective directories at 4222. At step 4224, the local server package extractor module 4204 sends the scheduled records to the local server visual appliance scheduler module 4208, which adds the scheduled records to the schedule of the visual appliance 308 at step 4226. In the case of a conflicting schedule, the current scheduled record may override any other scheduled record existing in the schedule.

Figure 43:
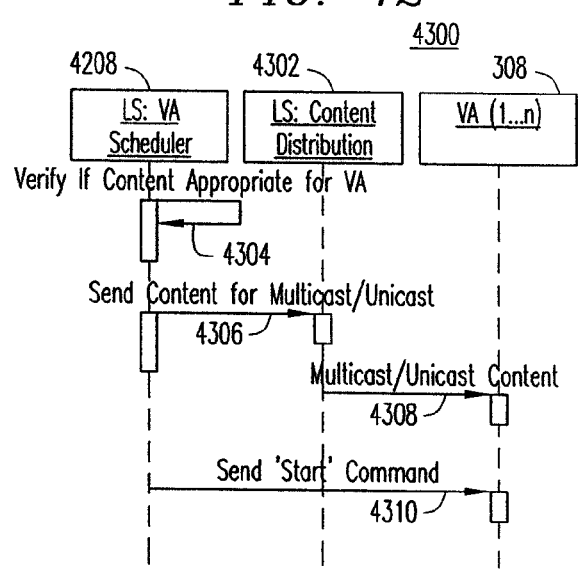
FIG. 43 is an exemplary sequence diagram that illustrates delivery of content to the visual appliances of FIG. 3A.

FIG. 43 is an exemplary sequence diagram 4300 that illustrates delivery of content to the visual appliances 308 of FIG. 3A. The step numbers and associated actions are provided in TABLE 29 below. For delivery of the content, the local server 304 utilizes an active visual appliance schedule list as produced by receiving content from the communications network service provider 216 as directed by the service provider server 702. The content transmission is responsible for transmitting the content to the visual appliances 308 in these facilities 208 of the subscribers 204 and 206. The local server visual appliance scheduler module 4208 is constantly executed on the local server 304 and, at the appropriate times, transmits content to the visual appliance(s) 308 as indicated in the stored schedule record(s). Before delivery of any content to a visual appliance 308, verification of the content being appropriate for the visual appliance 308 is performed at step 4304. The verification process may include checking the aspect ratio, size of the content, and expiration time and date against the specifications of the visual appliance 308 that the content is to be displayed. After ensuring the validity of the content, the local server visual appliance scheduler module 4208 sends the content for multicast/unicast to the local server content distribution module 4302 at step 4306.

TABLE 29

Content Delivery Flow

| STEP | ACTION |
|---|---|
| 4304 | Verify if content appropriate for visual appliance |
| 4306 | Send content for multicast/unicast |
| 4308 | Multicast/unicast content |
| 4310 | Send 'start' command |

At step 4308, the local server content distribution module 4302 communicates the content via a multicast/unicast technique to the visual appliances 308 as understood in the art. In one embodiment, the communication technique utilizes an 802.11 wireless protocol. The visual appliance 308 loads the content into memory for execution or display thereby. In one embodiment, the local server visual appliance scheduler module 4208 communicates a "start" command over a management channel to the visual appliance(s) 308 to begin play of the content. Alternatively, the visual appliance(s) 308 may begin playing the content during or upon completion of receiving the content into memory. It should be understood that the visual appliance 308 generally operates as a dummy terminal in that it responds to commands by the local server 304 for the display of the content.

Figure 44:
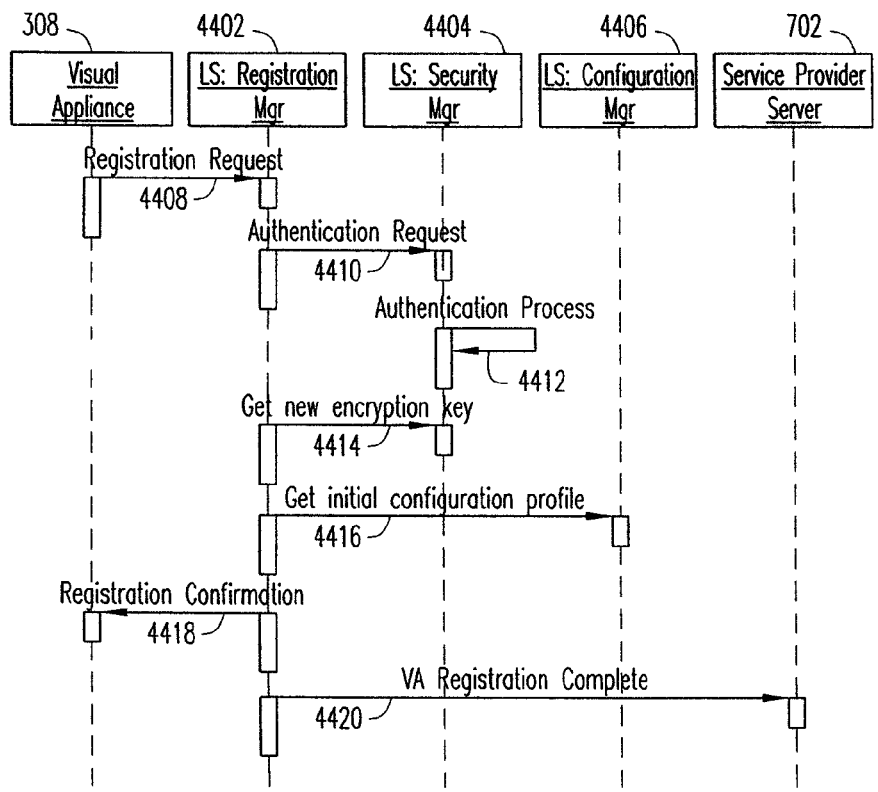
FIG. 44 is an exemplary sequence diagram that depicts a registration process for the visual appliances with the local server of FIG. 3A.

FIG. 44 is an exemplary sequence diagram 4400 that depicts a registration process for the visual appliances 308 with the local server 304 of FIG. 3A. The step numbers and associated actions are provided in TABLE 30 below. Prior to the communication of content to the visual appliances, the visual appliances 308 are registered with the local server 304 at the provisioning time. Also, prior to the visual appliances 308 being installed locally (i.e., via the local server 304), the visual appliances 308 are to be provisioned in the service provider server 702 before the registration process. In performing the registration process, a local server registration manager module 4402, local server security manager module 4404, and local server configuration manager module 4406 are utilized.

TABLE 30

Visual Appliance Registration Flow

| STEP | ACTION |
|---|---|
| 4408 | Registration request |
| 4410 | Authentication request |
| 4412 | Authentication process |
| 4414 | Get new encryption key |

TABLE 30-continued

Visual Appliance Registration Flow

| STEP | ACTION |
|---|---|
| 4416 | Get initial configuration profile |
| 4418 | Registration confirmation |
| 4420 | Visual appliance registration complete |

The registration process begins at step 4408 where a registration request, which may contain an encrypted visual appliance ID, from the visual appliance 308 is made to the local server registration manager module 4402 operating within the local server 304. The operator or installer of the visual appliances 308 configures the visual appliance 308 by entering the system parameters, such as the IP address of the local server 304, the visual appliance ID, and the initial encryption key. The visual appliance ID may be composed of three fields, including subscriber ID, facility ID, and serial machine ID. It should be understood that other or alternative ID fields may be utilized. At step 4410, the local server registration manager module 4402 requests authentication from the local server security manager module 4404, which, in turn, performs an authentication process at step 4412. Once authenticated, the local server registration manager module 4402 communicates a request for a new encryption key from the local server security manager module 4404 at step 4414.

At step 4416, the local server registration manager module 4402 requests an initial configuration profile from the local server configuration manager module 4406. The local server registration manager module 4402 communicates a registration confirmation to the visual appliance 308, where the associated registration profile includes a new secret key for connection purposes and other system parameters. At step 4420, the local server registration manager module 4402 communicates a message to the service provider server 702 that the visual appliance registration process is complete for that visual appliance 308.

Figure 45:
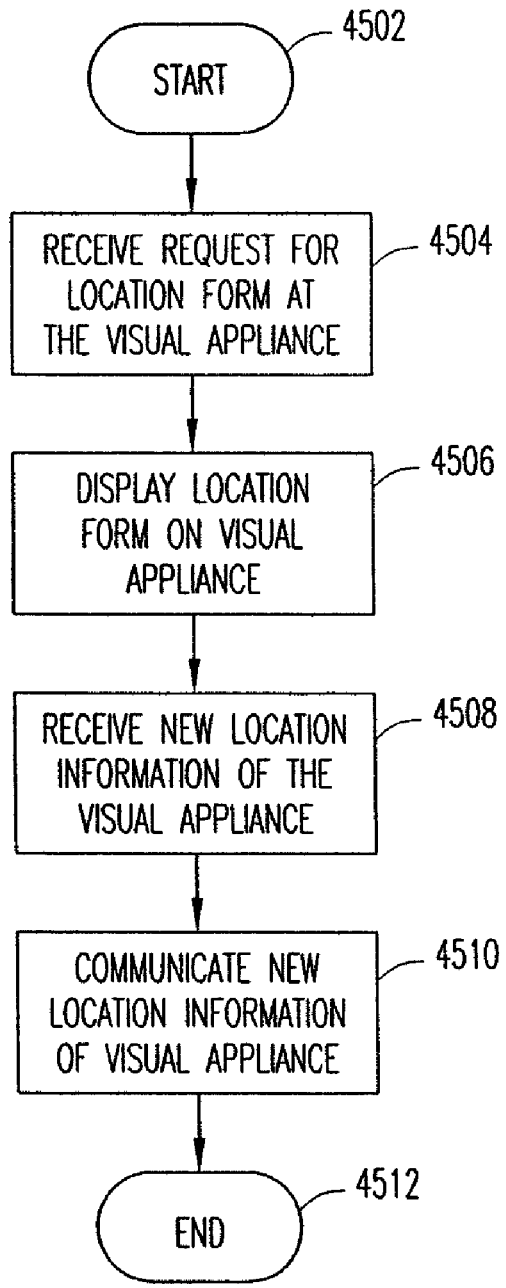
FIG. 45 is an exemplary flow diagram for updating location information of the visual appliance of FIG. 3A.

FIG. 45 is an exemplary flow diagram 4500 for updating location information of visual appliance 308 of FIG. 3A. The location update process starts at step 4502. At step 4504, a request for a location form at the visual appliance is received. The location form is displayed on the visual appliances step 4506. The location form may be a graphical user interface displayed on the visual appliance 308, where the graphical user interface includes entry fields for an operator to enter the location or position information of the visual appliance 308. Because the visual appliance 308 may be small enough to apply directly to a shelf containing products within a facility 208, the location form may include information associated with a planogram of the facility 208. For example, in the case of the facility 208 being a grocery store, a graphical map, entry field, product list, or other representative feature within the grocery store may be available to the operator for selecting or notifying the visual appliance 308 of the position thereof.

At step 4508, the new location information of the visual appliance 308 is received and communicated from the visual appliance 308. In one embodiment, the location information is communicated to the local server 304 for updating a database containing location information of the visual appliances 308. Alternatively, the location information may be communicated via the satellite 218 to the service provider server 702 directly from the visual appliance 308. It should be understood that the communication may be a passive communication, whereby the local server 304 requests the updated information from the visual appliance 308 rather than the visual appliance 308 actively notifying the local server 304 in response to the update information being received. The location updating process ends at step 4512.

Figure 46:
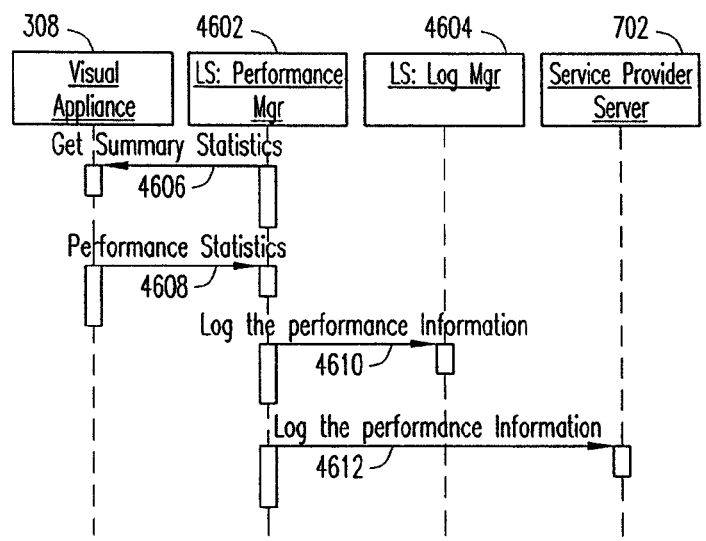
FIG. 46 is an exemplary sequence diagram that shows polling of summary information by the local server from the visual appliance of FIG. 3A.

FIG. 46 is an exemplary sequence diagram 4600 that shows polling of summary information by the local server 304 from the visual appliance 308 of FIG. 3A. The step numbers and associated actions are provided in TABLE 31 below. The summary information may be polled on a periodic or aperiodic basis from the local server 304. The polling may occur on an established management connection channel with the visual appliance 308 and the local server 304. Two modules utilized for polling the summary information include a local server performance manager module 4602 and local server log manager module 4604.

TABLE 31

Summary Information Polling Flow

| STEP | ACTION |
|---|---|
| 4606 | Get summary statistics |
| 4608 | Performance statistics |
| 4610 | Log the performance information |
| 4612 | Send visual appliance performance summary statistics to service provider server |

The performance management polling process starts at step 4606 as the local server performance manager module 4602 requests summary performance statistics from the visual appliance 308. At step 4608, the visual appliance 308 responds to the local server performance manager module 4602 and communicates the summary performance statistics is to the local server performance manager 4602. At step 4610, a log of the summary performance statistics is communicated to the local server log manager 4604 periodically or aperiodically and the visual appliance summary performance statistics are sent periodically or aperiodically to the service provider server 702 at step 4612. In general, the performance management receives the aggregate statistics from the visual appliance 308 including CPU utilization, memory utilization, display qualify measurement index, packet losses, content transfer loss rate, and other performance statistics.

Service Provider Software Classes

Figure 47:
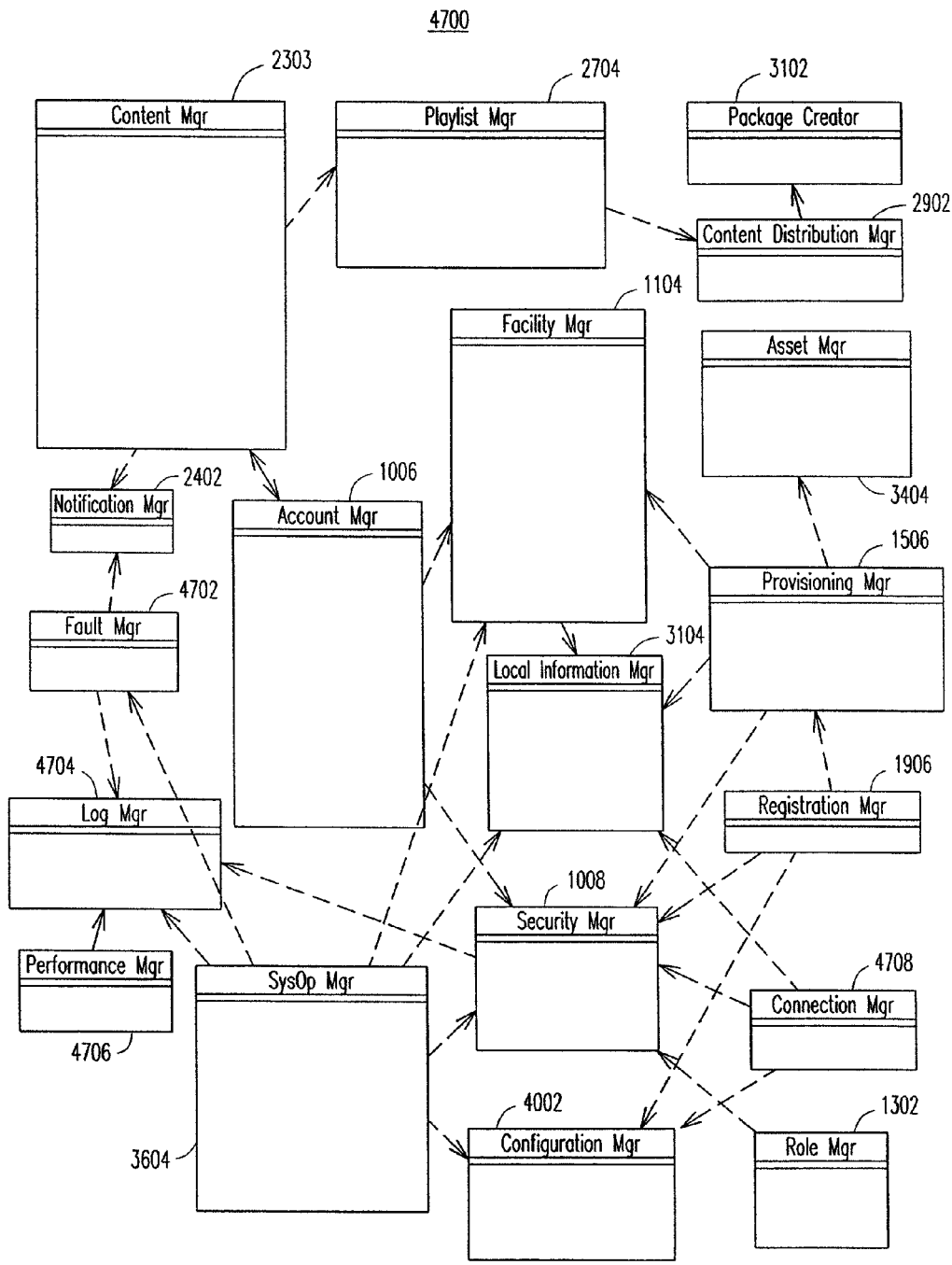
FIG. 47 is an exemplary class diagram for operating on the local server of FIG. 3A in accordance with the principles of the present invention.

FIG. 47 is an exemplary class diagram for operating on the local server 304 of FIG. 3A in accordance with the principles of the present invention. Interaction and interconnection between the classes are provided. The classes for each module are provided in TABLES 32-50 as shown herein below. TABLE 32 shows classes utilized by the content manager module 2303 and provides content management functionality ranging from content creation to child directory creation for applying permissions to content.

TABLE 32

Content Manager Classes
CONTENT MANAGER

Is__Authorized( )
Delete__by__Content__ID( )
Get__Content__ID__by__Attribute( )
Set__Permission__on__Content( )
Get__Unapproved__Content( )
Approve__Content( )
Content__Creation( )
Content__Deletion( )
Set__Content__Description( )
Modify__Content__Description( )
Create__Directory( )
Delete__Directory( )
Get__Directory__Structure( )
Get__Patent__Directory( )
Set__User__Directory__Access( )

TABLE 32-continued

Content Manager Classes
CONTENT MANAGER

Delete_User_Directory_Access( )
Modify_User_Director_Access( )
Get_Content_Search_Parameter( )

TABLE 33 shows classes utilized by the playlist manager module 2704 that provides functionality to create, modify, delete, view, and approve scheduled records. The playlist manager module 2704 interfaces with other classes to provide its functionality, and provides interfaces to other classes.

TABLE 33

Playlist Manager Classes
PLAYLIST MANAGER

Is_Schedule_Record_Existing( )
Is_Content_In_Schedule( )
Add_Scheduled_Record( )
Delete_Scheduled_Record( )
Modify_Scheduled_Record_Attribute( )
Get_Unsubmitted_Scheduled_Record( )
Get_Search_Parameter( )

TABLE 34 shows a class utilized by the content distribution manager module 2902. Approved scheduled records are submitted to content distribution manager, which processes scheduled records according to the start times specified in the scheduled records. After processing the scheduled records, the content distribution manager module 2902 interacts with the package creator module 3102 to create the satellite package that is multicast to the facilities 208.

TABLE 34

Content Distribution Manager
CONTENT DISTRIBUTION MANAGER

Submit_Scheduled_Record( )

TABLE 35 shows a class utilized by the package creator module 3102 to receive scheduled records and content from the content distribution manager module 2902, and create satellite packages with proper package headers and addressed to appropriate local servers 304.

TABLE 35

Package Creator Class
PACKAGE CREATOR

Transmit_Scheduled_Record( )

TABLE 36 shows classes utilized by the account manager module 1006 to provide functionality to create/modify/delete a subscriber account 802 and a user account 804. The account manager module 1006 also maintains the repository of the subscriber specific domains.

TABLE 36

Account Manager Classes
ACCOUNT MANAGER

Get_Approver_List( )
Change_Access_Control( )
Create_Directory( )

TABLE 36-continued

Account Manager Classes
ACCOUNT MANAGER

Modify_Account( )
Create_Account( )
Delete_Account( )
Get_Account_Info( )
Create_Domain( )
Modify_Domain( )
Delete_Domain( )
Get_Domain( )
Create_User( )
Delete_User( )
Get_User_Role( )
Add_User_Role( )
Modify_User_Role( )
Delete_User_Role( )

TABLE 37 shows classes utilized by the facility manager module 1104 to maintain the facility repository for subscribers. The facility manager module 1104 also provides interfaces for other classes to query this repository.

TABLE 37

Facility Manager Classes
FACILITY MANAGER

Get_Facility_List( )
Get_LSID( )
Get_Unprovisioned_Facility( )
Create_Facility( )
Modify_Facility_Attribute( )
Delete_Facility( )
Get_Facility_Attribute( )
Get_Search_Parameter( )
Create_VA( )
Delete_VA( )
Get_VA_List( )
Get_VA_Attribute( )
Modify_VA_Attribute( )
Get_Unprovisioned_VA( )
Get_Provisioned_VA( )
Update_Provision_Status( )

TABLE 38 shows classes utilized by the local information manager module 3104 to provide functionality for information, including configuration, visual appliance schedule, storage space, list of files, etc., about each local server 304 maintained by this class at the service provider server 402 to provide quick access to that information.

TABLE 38

Local Information Manager Classes
LOCAL INFORMATION MANAGER

Update_Facility_Status( )
Update_VA_Status( )
Update_LS_Status( )
Update_Software_Version( )
Get_LS_Status( )
Get_VA_Status( )
Get_Deleted_File_List( )

TABLE 39 shows a class utilized by the notification manager module 2402 to notify applicable parties of an event occurring within the service provider server 402 that are reviewed and/or approved.

TABLE 39

| Notification Manager Class |
|---|
| NOTIFICATION MANAGER |
| Notification( ) |

TABLE 40 shows classes utilized by the system operator (sysop) manager module 3604 that provide functionality used by the system operators to perform administrative tasks, such as upgrade software, query local server or visual appliance, retrieve alerts, etc.

TABLE 40

| SYSOP Manager Classes |
|---|
| SYSOP MANAGER |
| Request_Software_Version( ) |
| Update_Software_Version( ) |
| Retrieve_Configuration_Profile( ) |
| Request_LS_Status( ) |
| Change_Encryption_Key( ) |
| Activate_VA( ) |
| Deactivate_VA( ) |
| Activate_LS( ) |
| Deactivate_LS( ) |
| Retrieve_VA_Statistics( ) |
| Get_VA_Status( ) |
| Get_LS_Status( ) |

TABLE 41 shows classes utilized by the fault manager 4702 to collect the events and alarms from the local server 304 and the visual appliances 308. When the local server 304 or visual appliances 308 detects the abnormal or special conditions that change the operational state of the devices, the alarm/event is reported to the service provider server 402. The fault management process allows the operations of the service provider 202 to identify the fault location and can quickly take the corrective action to fix or find a way to work around faults.

TABLE 41

| Fault Manager Classes |
|---|
| FAULT MANAGER |
| Get_Alert_History( ) |
| Alert( ) |

TABLE 42 shows classes utilized by the log manager 4704 to maintain the repository of logs generated by events and provide interfaces to other components to add logs and query the existing logs.

TABLE 42

| Log Manager Classes |
|---|
| LOG MANAGER |
| Log_Alarm_Event( ) |
| Log_Performance_Statistics( ) |
| Log_Security_Violation( ) |
| Retrieve_Log( ) |

TABLE 43 shows a class utilized by the performance manager 4706 to provide a mechanism to collect the performance statistics from the local server 304 and visual appliances 308 and report to the system operator for the review. The statistics collected may include the operational characteristics of the local server 304 being consolidated in an aggregation form.

TABLE 43

| Performance Manager Class |
|---|
| PERFORMANCE MANAGER |
| Initiate_Collection( ) |

TABLE 44 shows classes utilized by the security manager module 1008 to maintain the repository for security-related information for users, local servers 304, and visual appliances 308. The security manager module 1008 further is responsible for generating encryption keys and maintaining the relationship between users and security roles. Interfaces are also provided to other classes to query for security related information.

TABLE 44

| Security Manager Classes |
|---|
| SECURITY MANAGER |
| Get_Permission_List( ) |
| Change_Permission( ) |
| Remove_Permission( ) |
| Set_Permission( ) |
| Create_Encryption_Key( ) |
| Request_Authentication( ) |

TABLE 45 shows classes utilized by the configuration manager module 4002 to properly configure the local server and the visual appliances 308 during the registration time and during the connection state. The configuration parameters include the local server wide system parameters and facility specific parameters.

TABLE 45

| Configuration Manager Classes |
|---|
| CONFIGURATION MANAGER |
| Get_Software_Version( ) |
| Get_Configuration_Profile( ) |
| Get_System_Parameter( ) |
| Modify_System_Parameter( ) |
| Initiate_Config( ) |

TABLE 46 shows classes utilized by the connection manager 4708 to control the connection with the local server 304 by establishing a management channel to transport the management related information (command/response) to the local server 304 from the service provider server 402 or vice versa. The connection manager 4708 is responsible for sending a keep alive message to the local server 304 to assure the management channel is continuously operational.

TABLE 46

| Connection Manager Classes |
|---|
| CONNECTION MANAGER |
| Connection_Request( ) |
| Connection_Release( ) |

TABLE 47 shows classes utilized by the role manager 1302 to maintain the repository of security roles and provide interfaces to create, view, delete, and modify roles. The role manager 1302 also is the repository of basic system functionality that creates roles and provides interfaces to other classes to query about existing roles.

TABLE 47

Role Manager Classes
ROLE MANAGER

Add_Role( )
Delete_Role( )
Modify_Role( )
Associate_Role( )

TABLE 48 shows a class utilized by the registration manager module 1906 for the service provider server 402 to validate the rights of a local server 304 to operate within the communications system 200. When the local server 304 is provisioned at the facility 208, it registers with the service provider server 402 by sending the encrypted local server ID. The service provider server 402 validates the local server ID to authenticate the local server 304. At the end of the successful registration, the service provider server 402 assigns a unique encryption key to the local server 304.

TABLE 48

Registration Manager Class
REGISTRATION MANAGER

Update_Registration_Info( )

TABLE 49 shows classes utilized by the provisioning manager module 1506 to maintain the repository of provisioning information for local servers 304 and visual appliances 308.

TABLE 49

Provisioning Manager Classes
PROVISIONING MANAGER

Check_Provisioning_Status( )
Update_Provisioning_Status( )
Ready_Facility_Provisioning( )
Remove_Provisioning_by_Facility( )
Get_Provisioning_Info( )

TABLE 50 shows classes utilized by the asset manager module 3404 to maintain the repository of infrastructure assets (e.g., visual appliances 308) and provides interfaces to other classes to add/modify/view/delete assets.

TABLE 50

Asset Manager Classes
ASSET MANAGER

Update_Registration_Status( )
Get_Unprovisioned_Asset( )
Add_New_Asset( )
Delete_Asset( )
Get_Asset_Info( )
Modify_Asset_Info( )

Local Server Software Classes

Figure 48:
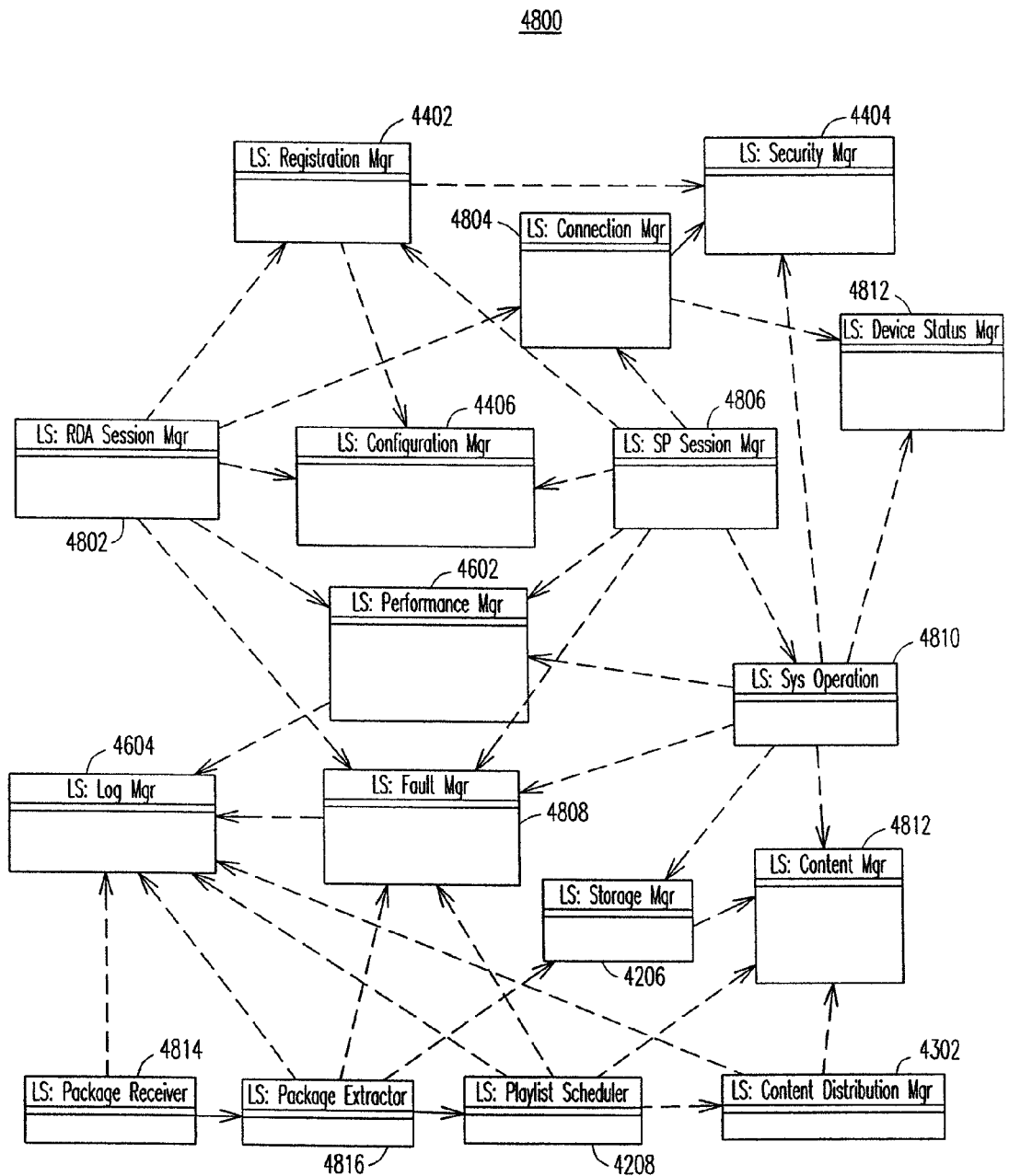
FIG. 48 is an exemplary class diagram for operating within the communication system of communication system of FIG. 2 and for providing the principles of the present invention.

FIG. 48 is an exemplary class diagram for the local server 304 operating within the communications system 200 of FIG. 2 and for providing the principles of the present invention. The class diagram includes associations between the modules and classes. The classes are further provided in TABLES 51-67 as shown herein below.

TABLE 51 shows classes utilized by the local server registration manager module 4402 for the local server to validate the rights of visual appliances 308 to operate within the domain of the local server 304 When visual appliances 308 are provisioned at the local facility 208, the visual appliances 308 register with the local server 304 by sending the encrypted visual appliance identifier. The local server 304 validates the visual appliance ID to authenticate the local server 304. Upon successful registration, a new unique encryption key is assigned to each of the visual appliances 308.

TABLE 51

Local Server Registration Manager Classes
LS: REGISTRATION MANAGER

VA_Registration( )
LS_Registration_to_SP( )

TABLE 52 shows classes utilized by the local server security manager module 4404 that are executed on every local server 304 and responsible for ensuring that that the communications with visual appliances 308 and the service provider server 402 are secure. The classes also are responsible for generating encryption keys.

TABLE 52

Local Server Security Manager Classes
LS: SECURITY MANAGER

Create_Encryption_Key( )
Authenticate_Request( )
Replace_Encryption_Key( )

TABLE 53 shows classes utilized by the local server visual appliance session manager 4802 for initiation of the network connection between the local server 304 and visual appliances 308.

TABLE 53

Local Server Visual Appliance Session Manager Classes
LS: VISUAL APPLIANCE SESSION MANAGER VA_Session_Init( )
VA_Session_Release( )

TABLE 54 shows classes utilized by the local server connection manager 4804 to provide connection control of the visual appliances 308 to the local server 304. The purpose of providing connection control is to establish a management channel to transport the management related information (command/response) to the local server 304 from the visual appliance 308 or vice versa. The connection manager 4804 is responsible for sending the "keep alive" message to the visual appliance 308 to assure the management channel is continuously operational.

TABLE 54

Local Server Connection Manager Classes
LS: CONNECTION MANAGER

VA_Connect( )
SP_Connect( )
VA_Disconnect( )
SP_Disconnect( )

TABLE 55 shows classes utilized by the local server device status manager 4812 for managing the operating status of the visual appliances 308 in facility 208 of the local server 304. Interfaces are provided to other classes to query this repository.

TABLE 55

Local Server Device Status Manager Classes
LS: DEVICE STATUS MANAGER

VA_Status_Change( )
Get_VA_Status( )
Get_LS_Status( )

TABLE 56 shows classes utilized by the local server configuration manager module 4406 to properly configure visual appliances 308 during the registration/connection time. The configuration parameters include the visual appliance wide system parameters and facility specific parameters.

TABLE 56

Local Server Configuration Manager Classes
LS: CONFIGURATION MANAGER

Configuration_Init( )
Get_Configuration_Profile( )
Modify_Configuration_Parameter( )

TABLE 57 shows classes utilized by the local server performance manager 4602 to collect the performance statistics from the visual appliances 308 and report to the system operator for review. The statistics collected may include the operational characteristics of the visual appliances 308 in an aggregated form.

TABLE 57

Local Server Performance Manager Classes
LS: PERFORMANCE MANAGER

VA_Performance_Collect( )
LS_Performance_Deliver( )
Get_VA_Performance( )
Get_LS_Performance( )

TABLE 58 shows classes utilized by the local server log manager 4604 to maintain the repository of logs generated by events. The log manager 4604 is executed at the service provider server 402, except this class is executed on every local server 304 and is limited in functionality. Interfaces to other classes to add logs and query the existing logs also are provided.

TABLE 58

Local Server Log Manager Classes
LS: LOG MANAGER

Log_Alert_Event( )
Log_Performance_Statistics( )
Package_Receive_Error( )

TABLE 59 shows classes utilized by the local server service provider session manager 4806 for initiation of the network connection with the service provider server 402 and for the routing of network message to appropriate handlers, such as connection manager 4804, registration manager module 4402, etc., on the local server 304.

TABLE 59

Local Server Service Provider Session Manager Classes
LS: SERVICE PROVIDER SESSION MANAGER SP_Session_Init( )
SP_Session_Release( )

TABLE 60 shows classes utilized by the local server fault manager 4803 to collect the event and alarms from the visual appliances 308. When the visual appliance 308 detects the abnormal or special conditions that change the operational state of the devices, the alarm/event is reported to the local server 304. The fault and alarm collection process allows the operators of the service provider 202 to identify the fault location and to quickly take the corrective action to fix or find a way to work around the faults.

TABLE 60

Local Server Fault Manager Classes
LS: FAULT MANAGER

VA_Fault( )
LS_Fault( )
Package_Receiving_Fault( )
Playlist_Conflict( )

TABLE 61 shows a class utilized by the local server system operation module 4810 for handling the system requests originating from the service provider server 402, such as visual appliance status check, storage allocation, etc.

TABLE 61

Local Server System Operation Class
LS: SYSTEM OPERATION

Operation_Proc( )

TABLE 62 shows classes utilized by the local server content manager 4812 to maintain the local repository of content files and to provide interfaces to other local server classes to interact with the content repository. The local server content manager 4812 is similar in functionality to the content manager module 2303 being executed at service provider server 402, except this content manager 4812 is executed on each local server 304 and is limited in functionality.

TABLE 62

Local Server Content Manager Classes
LS: CONTENT MANAGER

Get_Default_MMF( )
Get_MMF_Path( )
Remove_File( )
Lock_File( )
Get_PlayList( )

TABLE 63 shows classes utilized by the local server storage manager module 4206 to maintain the storage of the local servers 304. The local server storage manager module 4206 determines when and which content to delete.

TABLE 63

Local Server Storage Manager Classes
LS: STORAGE MANAGER

File_Saved( )
Storage_Operation( )

TABLE 64 shows a class utilized by the local server package receiver 4814 to receive satellite packages transmitted or caused to be transmitted by the service provider 202, The package receiver 4814 verifies that received packages are complete and error free and, if need be, requests the service provider server 402 to retransmit segments of the package or the complete package.

TABLE 64

| Local Server Package Receiver Class<br>LS: PACKAGE RECEIVER |
|---|
| Receive_Package( ) |

TABLE 65 shows a class utilized by the local server package extractor 4816 to accept a verified complete satellite package from the local server package receiver module 4814 and extract the content and scheduled requests contained in the satellite package.

TABLE 65

| Local Server Package Extractor Class<br>LS: PACKAGE EXTRACTOR |
|---|
| Extract_Package( ) |

TABLE 66 shows a class utilized by the local server playlist scheduler module 4208 to maintain a schedule of what file needs to be transmitted to which visual appliance 308 at what time within the facility 208.

TABLE 66

| Local Server Playlist Scheduler Class<br>LS: PLAYLIST SCHEDULER |
|---|
| Send_PlayList( ) |

TABLE 67 shows a class utilized by the local server content distribution manager 4302 to create packages, including files, and transmit the packages to the visual appliances 308 in the same facility 208. The content distribution manager 4302 of the local server 304 is similar in functionality as the content distribution manager module 2902 of the service provider server 402, except that it is executed on each local server 304 and has limited capability.

TABLE 67

| Local Server Content Distribution Manager Class<br>LS: CONTENT DISTRIBUTION MANAGER |
|---|
| Transmit_File( ) |

Content Display Verification

Figure 49:
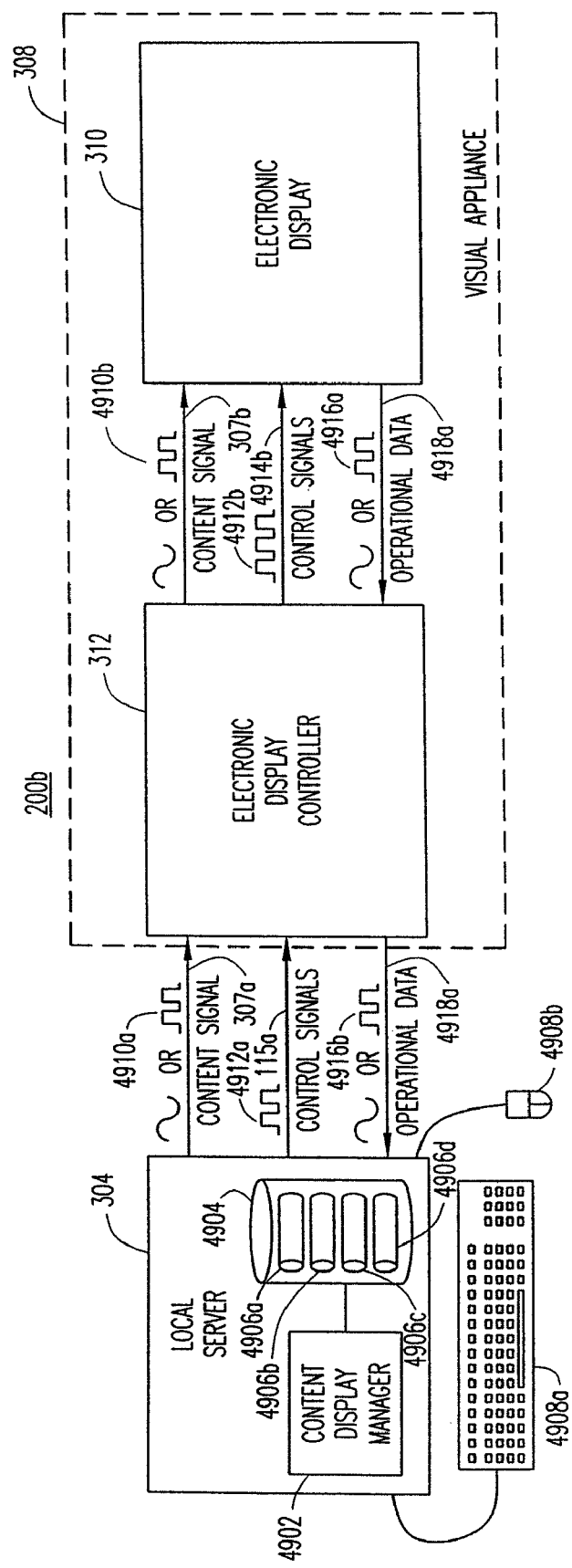
FIG. 49 is an exemplary block diagram of a local network for displaying and verifying that visual content and/or display parameters are displayed on a visual appliance of FIG. 3A.

FIG. 49 is an exemplary block diagram of a local network 300*b* for displaying and verifying that visual content and/or display parameters are displayed on a visual appliance 308 of FIG. 3A. As shown, the local network 300*b* includes the local server 304 and visual appliance 308. Accordingly, more or fewer components may be utilized to provide for the proper and timely display of the content.

The local server 304 includes a content display manager 4902, which may include the packages described hereinbefore, that is operable to manage the content for display by the visual appliance 308. As understood in the art, the local server 304 may interface and operate many electronic display controllers 312 coupled to or integrated with electronic displays 310 located on the local network 300*b*. The content display manager 4902 may include a storage unit 4904 operable to facility (i) a content database 4906*a* having the content facility therein, (ii) a management database 4606*b* that maintains information utilized to distribute the content to the visual appliance 308 at specific times and dates, for example, (iii) a log database 4906*c* operable to maintain information associated with the display of the content being fed-back from the visual appliance 308, and (iv) an expected operational parameter database 4906*d* for signature analysis usage. In managing the content, locally or remotely a user of the local server 304 may utilize input and control devices 4908*a* and 4908*b* coupled to the local server 304. The input and control devices 4908*a* and 4908*b* may be a keyboard and computer mouse, respectively. Alternatively, other input and control devices 4908*a* and 4908*b*, such as a stylus, operable to interact with the content display manager 4902, may be utilized to generate and/or schedule the content for distribution and display. It should be understood that to maintain security control may be limited to control at the service provider server 702.

The electronic display controller 312 is operable to receive information from the local server 304 and drive the electronic display 310. Additionally, the electronic display controller 312 may be utilized to interact with and/or control the electronic display 310 based on information or operational parameter(s) being fed-back by the electronic display 310. Additional detail for an exemplary embodiment of the electronic display controller 312 and electronic display 310 is shown further in accordance with FIGS. 50A-50C. In another embodiment (not shown), functionality of the local server 304 may be included into the electronic display controller 312 to enable the electronic display 310 to operate in a substantially standalone manner (i.e., where no local server exists and without having to operate in a local network).

In operation, the local server 304 communicates a content signal 4910*a* in the form of data packets 226 (FIG. 2) via communication path 307*a* to the visual electronic controller 312, which, in turn, communicates a content signal 4910*b* via communication path 307*b* to the electronic display 310. The content signals 4910*a* and 4910*b* (hereinafter 4910) may be identical or the content signal 4910*b* may be a derivative of the content signal 4910*a*. The content signal 4910 may be analog or digital. If the content signal 4910 is analog, then the electronic display controller 312 may convert the content signal 4910 into a digital signal for communication to the electronic display 310. Alternatively, the electronic display controller 312 may directly or indirectly communicate the content signal 4910 as an analog signal for direct display or for analog-to-digital (A/D) conversion and display by the electronic display 310. Additionally, the local server 304 communicates control signals 4912*a* via communication path 4914*a* to the electronic display controller 312, which, in turn, may communicate control signals 4912*b* (hereinafter control signals 4912) via communication path 4914 to the electronic display 310. The same or derivative control signals 4912*a* received by the electronic display controller 312 may be communicated to the electronic display 310 as control signals 4912*b*.

The control signals 4912 may be utilized to initiate display of the content signal 4910, alter operational parameters of the electronic display 310, or perform some other control function of the electronic display controller 312 or electronic display 310. The control signals 4912 may be digital signals, however, analog control signals alternatively may be utilized to control the electronic display 310. A standard bus architecture and protocol may be utilized for communicating the control signals 4912. Alternatively, a non-standard or proprietary bus architecture and protocol may be utilized. If the content signal 4910 is digital, then the content signal 4910 and control signals 4912 may be communicated over a single communication path (e.g., bus) as understood in the art. The electronic display controller 312 processes or conveys the content signal 4910 and control signals 4912 for delivery to the electronic display 310.

The electronic display 310, which may be of any display type, including CRT, LCD, LED, organic LED, plasma, or any other electronic display device, may receive the control signals 4912 and provide for operational data 4916*a* to be fed-back from the electronic display 310 to the electronic display controller 312 via communication path 4918a and may be analog or digital. The operational data 4816a may include any operational information of the electronic display 310 that can be measured as understood in the art. Such operational data 4916a may include temperature, voltage, current, frame rate, refresh rate, etc., according to the type of electronic display 310 being utilized and sensors operating within the electronic display 310. It should be understood that a variety of voltage and currents may be measured at the electronic display 310. For example, a voltage level from the power supply that sources the electronic display 310 may be measured. Alternatively, voltage or current levels being drawn by various components, such as a fluorescent light bulb of a liquid crystal display device or LED of an LED display device, may be measured.

The electronic display controller 312 further may process and/or communicate the operational data 4916a back to the local server 304 as operational data 4916b (collectively operational data 4916). The local server 304 may apply the operational data 4916 of the electronic display 310 to the log database 4906c stored by the storage unit 4904. Additionally, data other than the operational data 4916 of the electronic display 310 may be provided to the local server 304. For example, information regarding the communication of the content signal 4910 from the electronic display controller 312 to the electronic display 310 may be applied to the log database 4906c. The communication information may include the existence of date and/or time of the communication of the content signal 4910.

By feeding-back the operational data 4916 and data associated with the communication of the content signal 4910 to the local server 304 and ultimately to the service provider server 702, verification levels 1 and 2 may be achieved. In other words, by recording when the content is communicated to the electronic display 310 and recording the operational parameter(s) of the electronic display 310 at the time of the display of that content, verification level 1 may be performed either automatically or manually by determining that (a) the content was delivered and (b) the electronic display 310 was operating properly during the display of the content. If the operational data 4916 has associated expected operational parameter data facility in the expected operational parameter database 4906d, then verification level 2 may be achieved by comparing the operational parameter data fed-back with the expected operational parameter data.

FIGS. 50A, 50B, and 50C (FIG. 50) are more detailed block diagrams of the electronic display controller 312 and electronic display 310 of FIG. 49. FIG. 50A illustrates the electronic display controller 312 coupled to a communication path or databus 307a and 307b, which may be analog or digital and operable to carry the content signal 4910. A network IP bus or communication path 4914a, PCI bus 4918b, and power bus 5004 are further coupled to the electronic display controller 312 and utilized to communicate general network, control information (e.g., control signals 4912), and power, respectively, to the electronic display controller 312 from the local server 304.

It should be understood that the content signal 4910 may be communicated across the PCI bus 4918b rather than the databus 307. It should further be understood that the content signal 4910 and control signals 4912 are not dependent on the protocol or architecture of the associated buses. For example, rather than utilizing multiple buses 307, 4914a, and 4918b, a single bus may be used to provide for communication of the content signal 4910 and control signals 4912. The electronic display controller 312 may include a processor 5006 coupled to a memory 5008, and further coupled to a storage unit 5010 and a driver unit 5012. The driver unit 5012 may include a display driver 5014 and input/output (I/O) driver module 5016. The processor 5006 is operable to execute software 5018 as discussed with regard to FIG. 7B.

As shown in FIG. 50B, the software 5018, which is executed by the processor 5006, may include a local content manager 5022 that manages the visual content and other content information received by the electronic display controller 312. Rules manager 5024 is operable to apply rules for making decisions as to management of the content, applying the verification code, monitoring operational parameters, and performing other functional operations in accordance with the principles of the present invention. It should be understood that the packages described for the software are general and that the specific packages discussed with regard to FIGS. 7A and 7B provide additional detail.

Control function drivers 5026 may be software that operate hardware for controlling the electronic display 310. The control function drivers 5026 may include multiple drivers for providing interfacing capability with a variety of types and brands of electronic displays 310 produced by different manufactures of electronic displays 310. For example, a plasma-type electronic display 310 utilizes different control function drivers 5026 than does an LCD-type electronic display 310. And, different manufacturers of the same type of electronic display 310 may utilize different control protocols or commands and therefore require different control function drivers 5026.

The control function drivers 5026 may include various levels of control capability for the electronic display 310. For example, a low cost electronic display controller 312 may not include various automatic adjustment type drivers, such as intensity or volume, while a more expensive electronic display controller 312 may include intensity and volume control function drivers 5026. Additionally, depending upon the verification level being utilized, other control function drivers 5026 may be included. For example, while a verification level 1 system may simply measure the existence of a particular operational parameter communicated via the operational data 4916, a verification level 2 system may utilize a control function driver 5026 that alters the operational parameters being fed-back by the electronic display 310 by comparing the operational data 4916 with certain expected operational parameters of the electronic display 310 as a result of displaying a particular content signal 4910 or test signal.

A limit table manager 5028 may be utilized to determine that certain responses of the operational parameters result from displaying a content signal 4910 on the electronic display 310, thereby providing for verification levels 2 and 4. For example, the limit table manager 5028 may interact with the expected operational parameter database 4906d stored in the storage unit 4904 of the local server 304 or a corresponding expected operational parameter database 4906d stored in the storage unit 4904 of the electronic display controller 312 for performing signature analysis based on expected operational parameter feedback. Test or signature patterns may be stored and inserted into the content signal 4910 to perform signature analysis.

Further included in the software 5018 of the electronic display controller 312 are measurement functions 5030 as understood in the art. The measurement functions 5030 operate to receive the operational data 4916 and determine values associated therewith. For example, operational data 4916 representative of voltage levels (e.g., power supply or individual component usage) used by the electronic display 310 may be sensed by sensors in the electronic display 310 and measured by the measurement functions 5030. Alternatively, the measurement function may be performed by the electronic display 310. The measurement functions 5030 may also interact with the limit table manager 5028 in performing the signature analysis by comparing expected operational parameters with the actual measured operational parameters as provided by the operational data 4916.

A log generator 5032 may be utilized to form a log event in the log database 5020b each time the electronic display controller 312 communicates the content signal 4910 to the electronic display 310 and/or each time the content signal 4910 is displayed on the electronic display 310. The log generator 5032 may receive information via the PCI bus 4918a or as part of the content signal 4910 or control signals 4912 that includes identification data associated with the content signal 4910. By having the log generator 5032 form a log event, verification levels 1 and 2 of the content signal 4910 being displayed is enabled. However, it should be understood that the log generator 5032 may be executed by the local server 304, whereby when the local server 304 communicates the content signal 4910 to the electronic display controller 312, a log of the communication may be facility in the log database 4906c.

As shown in FIG. 50C, the driver unit 5012 may include a number of components including a clock 5034, test pattern or character generator 5036, network local area network (LAN) driver 5038, local bus/display driver 5040, PCI bus interface 5042, signal measurements unit 5044, and display driver 5014. It should be understood, however, that the functions of the driver unit 5012 may additionally and/or alternatively be executed by the processor 5006. The clock 5034 may be utilized to maintain proper synchronization between the electronic display controller 312 and the electronic display 310. The test pattern or character generator 5036 may be utilized to generate a test pattern to allow the electronic display controller 312 to measure operational parameter(s) having an expected operational parameter feedback, thereby providing for test and calibration capabilities.

The network LAN driver 5038 may be utilized in performing communications between the electronic display controller 312 and the electronic display 310. The network LAN driver 5038 may also be utilized in communicating with other remotely located devices as understood in the art. The local bus/display driver 5040 may additionally provide local communication with the electronic display 310 or other remotely located devices. The PCI bus interface 5042 may be utilized to interface with the processor 5006 and the local server 304 via the PCI bus 4918b as understood in the art.

A signal measurements unit 5044 may be capable of interfacing with analog and/or digital signals from the electronic display 310. Accordingly, the signal measurements unit 5044 may include A/D converters (not shown) for sampling analog signals, if the signals received from the electronic display 310 are analog. The signal measurements unit 5044 may also include a processor (not shown) or other electronic device operable to perform measurements of the operational data 4916. It should be understood that the measurement functions 5030 and the signal measurements unit 5044 may be combined or operated in conjunction with one another such that the operational data 4916 is measured or received in accordance with the types of operational parameters being fedback by the electronic display 310 via PCI bus 4918a.

The electronic display 310 includes a processor 5046 coupled to memory 5048 and video driver 5050, which is coupled to and operable to drive an electronic display unit 5052. It should be understood that, depending on the type of electronic display 310, other hardware components may be included or excluded from the electronic display 310 as understood in the art. For example, a CRT-type electronic display 310 would include a picture tube for displaying the content signal 4910 and an LCD-type electronic display 310 would include LCD drivers and, typically, a fluorescent light source.

The processor 5046 further may be coupled to conventional sensor(s) 5054 that may be utilized to measure operational parameters of the electronic display 310. For example, the sensors 5054 may sense voltage, current, scan rate, etc. The information sensed by the sensor(s) 5054 may be received directly by the processor 5046 or, in the case of measuring analog signals, be sampled by D/A converters (not shown) located in the electronic display 310 or electronic display controller 312. The processor executes software 5056 that is used to interface with the video driver 5050 in order to display the content signal 4910 by the electronic display unit 5052. The software 5056 may also be utilized to form log data in the memory 5048 for communication to the electronic display controller 312.

Other functionality may be performed by the software 5056. For example, the software 5056 may be utilized to interface with a wireless communication device or interface to receive the content signal 4910 and control signals 4912 and communicate the operational data 4916 back to the electronic display controller 312. It should be understood that the electronic display 310 may alternatively be a slave device and be fully operated and controlled by the electronic display controller 312.

Figure 51A:
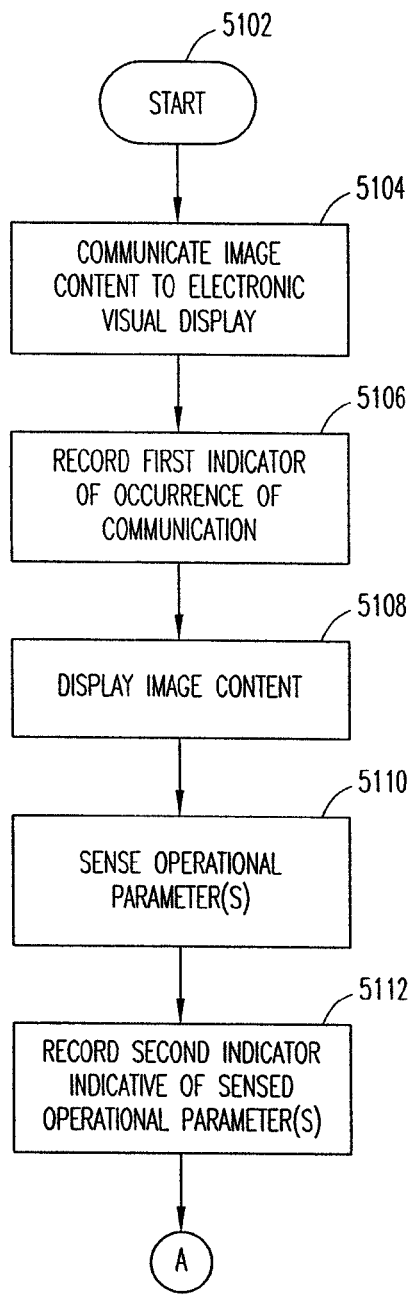
FIG. 51A is an exemplary flow diagram providing verification level 1 of the content being displayed on the visual appliance of FIG. 3A.

FIG. 51A is an exemplary flow diagram 5100a providing verification level 1 of the visual content being displayed on the visual appliance 308 of FIG. 3C. The verification level 1 process starts at step 5102. At step 5104, the content signal 4910, which may be analog or digital, is communicated via a wired or wireless communication channel to the visual appliance 308. In one embodiment, wireless ethernet using the 802.11b standard may be utilized. Alternatively, satellite wireless communication may be utilized either indirectly or directly to the visual appliance 308. Depending upon the configuration of the system, the fact that the content signal 4910 is provided to the visual appliance 308 from the local server 304 may be sufficient to consider that the content is displayed on the visual appliance 308. Alternatively, a communication from the electronic display controller 312 to the electronic display 310 may be utilized in verifying that the content is displayed on the visual appliance 308.

At step 5106, a first indicator of the occurrence of the communication of the content signal 4910 is recorded. The first indicator may be established in response to the content signal 4910 being communicated from the local server 304 to the electronic display controller 312 or from the electronic display controller 312 to the electronic display 310 depending on the system configuration. In one embodiment, the first indicator includes a date and time. Other indicators may alternatively be recorded, including a flag indicative of the content signal 4910 being communicated.

At step 5108, the content is displayed on the electronic display 310 via the content signal 4910. At least one operational parameter of the visual appliance 308 is sensed at step 5110. The operational parameter(s) may be any operational parameter that is available to be sensed by a conventional or custom designed sensor 5054 for the electronic display 310. At step 5112, a second indicator indicative of the sensed operational parameter(s) is recorded. The second indicator may be a measured value or an indicator that is indicative of the fact that the operational parameter(s) are operating in a normal range. For example, the voltage operational parameter of the electronic display 310 may be verified to have been operating at 120±5 volts. By associating or combining the knowledge that the first and second indicators are valid, verification level 1 may be satisfied for the operator of the visual appliance 308 and/or the provider of the visual content. The verification level 1 process ends at step A.

Figure 51B:
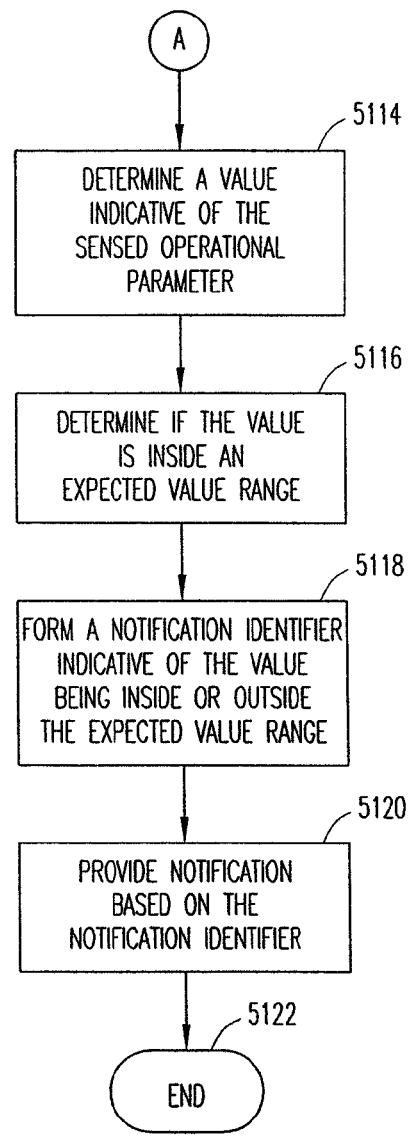
FIG. 51B is an exemplary flow chart of a verification level 2 process of the content being displayed on the visual appliance of FIG. 3A.

FIG. 51B is an exemplary flow diagram 5100b of a verification level 2 process. The verification level 2 process starts at step A, which extends from the verification level 1 process of FIG. 51A. At step 5114, a value indicative of the sensed operational parameter is determined. In other words, a measurement of the sensed operational parameter produces a measured value corresponding thereto. Verification level 2 may additionally measure the time-varying operational parameter at multiple times for determination purposes. At step 5116, a determination is made if the measured value is inside an expected measured value range. At step 5118, a notification identifier indicative of the measured value being inside or outside the expected measured value range is formed. If the measured value is inside the expected measured value range, then the notification identifier may be set to a value of "1" or logical TRUE. If the measured value is outside the expected measured value range, the notification identifier may be a "0" or logical FALSE. At step 5120, a notification based on the notification identifier is communicated. In one embodiment, the notification may be communicated from the electronic display 310 to the electronic display controller 312. Alternatively, the notification may be communicated from the electronic display controller 312 to the local server 304. The process ends at step 5122. It should be understood that each of the indicators and identifiers may be stored in the log database 4906c of the local server 304.

TABLE 68 is an exemplary log table containing logs for verification levels 1 and 2. As shown, a number of different data elements indicative of the delivery of the content signal 4910 and measurement of operational parameters are stored. Examples of such data elements are delivery/playtime of the content signal 4910, content identifier, content name, operational parameters, and verification identifier. The delivery/playtime may include a date and time that the content signal 4910 is delivered from the local server 304 to the electronic display controller 312 or from the electronic display controller 312 to the electronic display 310. Since the delivery of the content signal 4910 may only be performed once and then the display of the content signal 4910 be repeated continuously at the visual appliance 308, playtime may also be logged. It should also be understood that subscriber ID, visual appliance ID, and other relevant information associated with content verification may be stored.

The content identifier may be any identifier associated with the content provided by the content signal 4910. For example, if the content is an advertisement that shows a running shoe, then the content identifier may be the uniform product code (UPC) associated therewith. Alternatively, the operator may assign a random or non-random alphanumeric value for the content identifier. The content name may be an identifier associated with the content or a provider of the content, for example. The operational parameters may include any operational parameter of the electronic display 310 that is measured or derived from the electronic display 310.

As shown, the operational parameters may include temperature, volts, current, light, and refresh rate. For the running shoe visual content, operational parameters are measured and stored in the log table each time the content is delivered and/or played. For example, on Jun. 14, 2002, at 2:45 p.m., the operating temperature of the visual appliance 308 is 96 degrees Fahrenheit and the operating voltage is 120 volts with the visual appliance 308 drawing a current of 0.5 amps. As indicated by the verification identifier (right most column) being "L1-PASS", the delivery of the content signal 4910 was successful and the visual appliance 308 is deemed to be operational. The running shoe advertisement is displayed at three minute intervals (i.e., 2:45 p.m., 2:48 p.m., and 2:51 p.m.). However, while the visual appliance 308 at 2:51 p.m. is deemed to be operational at 2:48 p.m., the operational parameters (volts and current) indicate a failure of the verification level 1 of the visual appliance 308 as identified by the verification identifier (i.e., "L1-FAIL").

The log table further includes data associated with a second advertisement. As shown, on Jun. 21, 2002, at 8:00 a.m., a "snacks-chips" advertisement having a content identifier of 28400-07056, representative of the UPC number or any other proprietary or standard number associated with the snack-chips product, is displayed. The operational parameters for the visual appliance 308 include an additional parameter of light, which is derived from measuring a current operational parameter drawn by the picture tube, for example and utilizing factory setting parameters as understood in the art. The light operational parameter may be utilized by the visual appliance 308, and more specifically by the limit table manager 5028, to verify that the operational parameter is operating within an expected operational parameter range for the given time sample of the display of the content signal 4910. In this case, the current measured has a corresponding light operational parameter of 1.4 Foot-Lamberts (FL). The range of expected light parameters may be set between 1.3 FL and 1.5 FL, so that the light operational parameter for the visual content displayed at 8:30 a.m. allows the rules manager 5024

TABLE 68

| DELIVERY/PLAYTIME | | CONTENT | CONTENT | OPERATIONAL PARAMETERS | | | | | VERIFICATION |
|---|---|---|---|---|---|---|---|---|---|
| DATE | TIME | IDENTIFIER | NAME | TEMP | VOLTS | CURRENT | LIGHT | REFRESH | IDENTIFIER |
| Jun. 14, 2002 | 2:45 p.m. | 50286-03471 | Running Shoe | 96 | 120 | .5 | — | — | L1-PASS |
| Jun. 14, 2002 | 2:48 p.m. | 50286-03471 | Running Shoe | 98 | 122 | .58 | — | — | L1-PASS |
| Jun. 14, 2002 | 2:51 p.m. | 50286-03471 | Running Shoe | 110 | 32 | .01 | — | — | L1-FAIL |
| Jun. 21, 2002 | 8:30 a.m. | 28400-07056 | Snacks-Chips | 95 | 120 | .5 | 1.4 | 60 | L2-PASS |
| Jun. 21, 2002 | 8:35 a.m. | 28400-07056 | Snacks-Chips | 95 | 120 | .52 | 1.4 | 60 | L2-PASS |
| Jun. 21, 2002 | 8:40 a.m. | 28400-07056 | Snacks-Chips | 95 | 120 | .52 | 1.4 | 60 | L2-PASS |
| Jun. 21, 2002 | 8:45 a.m. | 28400-07056 | Snacks-Chips | 95 | 120 | .51 | 1.32 | 60 | L2-PASS |
| Jun. 21, 2002 | 8:50 a.m. | 28400-07056 | Snacks-Chips | 95 | 120 | .5 | 1.28 | 60 | L2-FAIL |
| Jun. 28, 2002 | 12:00 p.m. | Coca-Cola ® | Carbonated Beverage | 95 | 120 | .5 | 1.4 | 60 | L2-PASS | of the electronic display controller 312 to indicate that the display of the content signal 4910 was acceptable from a verification level 2 standpoint. Accordingly, the verification identifier at 8:30 a.m. receives "L2-PASS". The carbonated beverage advertisement is displayed every 5 minutes and continues to receive "L2-PASS" indications until 8:50 a.m., where the light operational parameter falls outside the expected light operational parameter range with a value of 1.28 FL. Accordingly, the verification identifier is logged as being "L2-FAIL", which indicates a verification level 2 failure.

A third visual content is shown to be communicated to the visual appliance 308 via the content signal 4910 on Jun. 28, 2002 at 12:00 p.m. The content identifier is alphanumeric and spells the name of the manufacturer "Coca-Cola®" rather than using a uniform product code (UPC) number. As described in relation to FIG. 50A, the content identifier may be utilized as a verification code to be displayed on the visual appliance 308 to provide for verification levels 3 and 4. The delivery and operational parameters successfully met the verification level 2 conditions and, thus, a verification identifier of "L2-PASS" is logged.

It should be understood that rather than using a single log table to record both levels of verification that separate tables may be utilized to support each verification level. Additionally, it should be understood that one or more tables may be organized to record visual content being displayed on each visual appliance 308, thereby providing the operator of the local server 304 easier log manageability. It should also be understood that there may be more or fewer operational parameters than those shown in TABLE 68. While the operational parameters are shown to be static, the operational parameters may be provided in a more detailed or time-varying format. Datafile(s) containing expected time-varying recordation of operational parameter measurements that provides for signature analysis may be stored by the local server 304 expected operational parameter database 4906d. The software 5018 may facility the datafiles for lookup by the parametric limit table for control functions manager 5028 and rules manager 5024 for performing the verification process of verification level 2.

Verification levels 3 and 4 are based on a sensing technique that extends beyond conventional sensing of operational parameters. As understood in the art, conventional sensing of operational parameters in non-production operations (i.e., beyond factory testing operations) are limited to those parameters that may be measured electronically (i.e., voltage or current) within the electronic display 310. Again, in the case of determining the color or intensity of light for conventional systems, a current measurement is performed and a numerical conversion is performed utilizing factory established parameters as understood in the art to estimate the light produced by the electronic display 310. Techniques for performing verification levels 3 and 4 are described hereinafter.

To provide for content verification levels 3 and 4, a verification code (see, FIG. 53) may be generated and associated with or descriptive of the content that is displayed on the visual appliance 308 (see, FIG. 52A). The verification code may be generated automatically or manually. If generated automatically, the verification code may be based on the name of the content datafile stored in the content database 4906a. Alternatively, the verification code may be based on another identifier associated with the visual content, such as the UPC number or proprietary barcode number, product or service name, or other related information stored in the content database 4906a.

The verification code is ultimately a binary word or multiple binary words to represent the information associated with the visual content. For example, an ASCII letter "G" may be represented as $7_H$ (hexadecimal or $01000111_2$ binary). Alternatively, the verification code may be an alphanumeric identifier generated by the content provider or operator of the operation server 102. For example, the alphanumeric identifiers may be generated over time or for successive image frames, either serially (e.g., C001, C002, C003, etc.) or randomly (e.g., XP483, YN248, 32A3N, etc.), without repeating values, or, alternatively, used on a limited predetermined basis to form the verification code. Still yet, time and date may be included in generating unique verification codes for the associated content. For example, a verification code may include a product name, date, time, and/or identifier of an visual appliance 308. If the verification code is generated manually, the same or similar information utilized to automatically generate the verification code may be used. It should be understood that the verification code may be generated at the local server 304, electronic display controller 312, electronic display 310, or a combination thereof.

In practice, a number of techniques may be utilized to generate and apply the verification code to be displayed on the visual display 310. One embodiment includes utilizing a software tool for producing video content. One such software tool is Macromedia Director™. Another embodiment for generating and/or applying the verification code to be displayed via a visual verification code signal includes software or hardware operated by the local server 304, electronic display controller 312, electronic display 310, either individual or by a combination thereof. The software and/or hardware may apply the visual verification code signal to either an analog or digital video signal containing content. The digital video signal may be MPEG-1, -2, or -4, or any other digital video signal format supported by a communication system. It should be understood that the verification code may be applied automatically, semi-automatically, or manually by any of the subscriber 204 and 206, service provider 202, advertiser, or other content provider/editor.

In the case of the content signal 4910 being analog, synchronization pulses indicating the beginning of lines and fields (i.e., horizontal and vertical synchronization) as understood in the art may be utilized to insert the visual verification code signal. In one embodiment, an on-screen display or video pattern generator, such as those used to generate an on-screen menu guide, may be utilized to insert the visual verification code signal onto the content signal 4910 being displayed by the visual appliance 308. For example, at a specific line and column based on the synchronization pulses, the content signal 4910 being delivered to or displayed by the visual appliance 308 is switched to the visual verification code signal. To accomplish the switching of the signals, an on-screen display (OSD) chip as understood in the art may be utilized.

In the case of the content signal 4910 being converted to digital by any of the local server 304, electronic display controller 312, or electronic display 310, a variety of techniques may be utilized to display the visual verification code signal in association with the content signal 4910. Three such techniques include (1) using the same or similar technique as discussed above with regard to insertion of the visual verification code signal 5206 by counting the synchronization pulses in conjunction with a video pattern generator, (2) forming a data stream of images of the content in memory and applying or overwriting the visual verification code signal onto the proper locations in the memory such that the verification code is displayed at a desired location on the electronic display 310, or (3) performing real-time insertion of the visual verification code signal into the content signal 4910 utilizing video mixing equipment as understood in the art. Again, by displaying the verification code, verification levels 3 and 4 may be enabled.

FIGS. 52A-52C provide a number of exemplary embodiments for utilizing an optical sensor for measuring illumination of a verification code. FIG. 52A(1) provides an exemplary electronic display 310 having an optical sensor 5202 coupled thereto for sensing illumination of a display region 5204 identified within dashed lines for displaying a visual verification code signal 5206 on the screen 5208 of the electronic display 310. The optical sensor 5202 may be electronic or any other type of sensor (e.g., photodiode, phototransistor, and solar cell) capable of sensing illumination of the visual verification code signal 5206 by the electronic display 310. In one embodiment, the optical sensor 5204 is one produced by Panasonic Corporation and identified as a part number PN335.

As can be seen on the front view of the electronic display 310a of FIG. 52A(1), the optical sensor 5202 is disposed within the display area or region 5204 formed to display the visual code verification signal 5206. To reduce optical noise during sensing by the optical sensor 5202, including simultaneous display of the visual content and ambient lighting conditions, the optical sensor 5202 should have a field-of-view no greater than the display region 5204 for displaying the visual verification code signal 5206.

The optical sensor 5202 may be coupled to the screen 5208 using adhesives or other non-permanent or permanent securing materials. FIG. 52A(2) shows a front isometric view of the electronic display 310 having the optical sensor coupled to the screen 5208. The optical sensor as shown does not have any wires for communicating the signal sensed by illumination from the visual verification code signal 5206, but rather utilizes a wireless communication device (not shown) coupled to the optical sensor 5202. In one embodiment, the wireless communication device is produced by Racliotronix, Inc. and having part number rtc-433-as. Alternatively, the optical sensor may be wired to an electronic board for communicating the sensed visual verification code signal 5206.

FIG. 52B(1) is a front view of the electronic display 310 that provides an alternative embodiment for coupling the optical sensor 5202 to the electronic display 310 for illumination by the visual verification code signal 5206. In this embodiment, a bracket or support member 5210 may be coupled to a housing 5212 of the electronic display 310 using adhesives or other fastening techniques as understood in the art. As shown in FIG. 52B(2), the support member 5210 is curved and disposes the optical sensor 5204 in a position to be illuminated by display of the visual verification code signal 5206. Alternatively, the optical sensor 5202 may be mounted to a support member that is not directly coupled to the housing 5212 of the electronic display 310. In another embodiment, a mirror, light pipe, optical fiber, or another light reflection device may be utilized to project the illumination of the visual verification code signal 5206 onto the optical sensor 5202 that is remotely associated with the electronic display 310. For some display types having rear projection systems, the optical sensor 5202 may be placed behind the viewing screen. For a front projection system, the optical sensor 5202 may be placed at the display plane (e.g., screen) or within the projector itself.

FIG. 52C(1) is a front view of the electronic display 310a showing that the optical sensor 5202 is not positioned externally in front of the display region 5204 on the screen 5208. As shown on FIG. 52C(2), the optical sensor 5202 is disposed within the electronic display 310 and behind the screen 5208 by coupling the optical sensor 5202 by support member 5210, which is further coupled to the housing 5212 or the screen 5208 of the electronic display 310b. To illuminate the optical sensor with the visual verification code signal 5206, a mirror 5214 reflects the visual code signal 5206 onto the optical sensor 5202. It should be understood that a beam splitter may alternatively be used to reflect the visual code signal 5206 onto the optical sensor 5202 so that at least a portion of the visual verification code signal 5206 or other content signal 4910 is displayed on the screen 5208 to reduce distraction in viewing of the electronic display 310.

Another embodiment for utilizing the optical sensor 5202 is an outdoor display utilizing LED and LCD devices (e.g., electronic billboard). Outdoor LED displays may utilize LED bulbs, as understood in the art, where the LED bulbs include multiple light emitting diodes to produce multiple colors from a single LED bulb. To ensure that the electronic billboard is operating properly, the optical sensor 5202 may be coupled to a portion or all of the LED bulbs. Alternatively, the optical sensor 5202 may be or disposed to receive the illumination from some or all of the LED bulbs. Accordingly, by sensing the illumination being displayed from the LED bulbs, verification of content and/or display parameters (e.g., color, intensity, etc.) of the outdoor display may be performed. The optical sensor 5202 may be utilized similarly with an LCD display.

Yet another embodiment for utilizing the principles of the present invention includes a video display wall, where multiple electronic displays 310 form a large, single electronic display. In such a case, each individual electronic display 310 may have the optical sensor 5202 or other feedback mechanism(s), as previously discussed, so as to ensure the proper operation of each individual electronic display 310.

FIG. 53 is an exemplary graph 5300 for showing a digital verification code signal 5302 representative of a content identifier (TABLE 68), which may be utilized to form a verification code associated with a content signal 4910. The digital verification code signal 5302 is formed of 48 bits having four (4) bits per word. The time segments $T_0$-$T_{48}$ represent the time segments for each bit. For example, bit-0 extends between times $T_0$-$T_1$, bit-1 extends between times $T_1$-$T_2$, bit-2 extends between times $T_2$-$T_3$, and bit-3 extends between times $T_3$-$T_4$. Word 1, therefore, forms the hexadecimal number $5_H$ (i.e., binary number $0101_2$). Word 2, forms a hexadecimal number of $6_H$ (i.e., $0110_2$) and word 12 forms the hexadecimal number $8_H$ (i.e., $1000_2$). It should be understood that the digital verification code signal 5302 may be formed of words having fewer or more than 4-bits. For example, if alphanumeric or ASCII code values are desired to be utilized for the verification code, then 8-bit words may be utilized, thereby providing a potential of 256 values for each character.

In displaying the digital verification code signal 5302 as a visual verification code signal 5306, the bits are displayed in series (i.e., bit-0, bit-1, bit-2, bit-3, etc.). The bits may be synchronized with the content signal 4910 according to the frame and/or refresh rate of the electronic display 310. It should be further understood that other modulation techniques may be utilized to represent the verification code. For example, pulse width modulation (PWM) may be utilized such that percentage of a word that is HIGH may be utilized in forming different levels or average values that represent characters of the verification code.

FIGS. 54A-54D show a sequence of images that illustrate the digital verification code signal 5302 (FIG. 53) being displayed as a visual verification code signal 5206 on the electronic display 310. FIGS. 54A(1)-54D(1) show a sequence of the 4-bits representative of word 1 of the digital verification code 5302 of FIG. 53. Between times $T_0$ and $T_1$, the visual verification code signal 5206*a* is highlighted, thereby indicating that the bit between times $T_0$ and $T_1$ of the digital verification code signal 5302 is HIGH. FIG. 54B(1) has the visual verification code signal 5206*b* being unhighlighted, thereby indicating that the second bit (i.e., bit-1) of the digital verification code signal 5302 is LOW between times $T_1$ and $T_2$. FIG. 54C(1) again has the visual verification code signal 5206*a* being indicated as highlighted, thereby representing that the third bit of the digital verification code signal 5302 is HIGH. FIG. 54D(1) shows the visual verification code signal 5206*b* as being unhighlighted, thereby indicating that the fourth bit of the digital verification code signal 5302 is LOW. By sensing the illumination of the visual verification code signal 5206 from each frame provided by FIGS. 54A(1)-54D(1), a determination may be made that the verification code being represented by the digital verification code signal 5302 and displayed by the visual verification code signal 5206 is a hexadecimal number $5_H$ (i.e., $0101_2$).

FIG. 54B illustrates the digital verification code signal 5302 being displayed as a combination of values (e.g., HIGH and LOW). The display region 5204 is formed of a visual verification code signal 5206*c* having two half-regions being inverse from one another. In other words, to represent a HIGH value, shown on FIG. 54A(2), the left half 5206*e* of the visual verification code signal 5206*c* is highlighted and the right half 5206*f* is unhighlighted. FIG. 54B(2) shows a low bit of the digital verification code signal 5302, whereby the right half 5206*f* of the visual verification code signal 5206*d* is highlighted and the left half 5206*e* is unhighlighted. By using a pair of sensors being configured electronically as a differential pair, optical noise from ambient lighting conditions may be reduced in sensing the visual verification code signal 5206 illuminated by the electronic display 310. It should be understood that other configurations and/or patterns generated to represent a HIGH value and a LOW value of the digital verification code signal 5302 may be utilized for sensing purposes.

Further, the HIGH and LOW colors may be other than black and white. For example, an operator may desire to verify that the colors (i.e., red, green, blue) of the electronic display 310 are operating properly. To verify the colors, the visual verification code signal 5206 may be cycled or selectively turned on independent of the other colors to verify that (i) each color is operating and (2) the intensity of each color is balanced with respect to the other colors. Still yet, the visual verification code signal 5206 may be formed to appropriately match other colors surrounding the content identification region to minimize distraction for the viewer as the visual verification code signal 5206 is being displayed by the electronic display 310. Another technique for verifying the colors may include applying the colors simultaneously with the substantially same or different intensities and measured accordingly.

FIG. 55A is an exemplary flow chart 5500*a* describing an operation for the verification level 3 of the visual content being displayed on the visual appliance 308 of FIG. 3C. The verification level 3 process starts at step 5502. At step 5504, a digital signal representative of a verification code is converted to a visual verification code signal 5206. The verification code signal 5206 is displayed in relation to a content signal 4910, where the visual verification code signal 5206 may be displayed prior to, in conjunction with, or after the content signal 4910. By displaying the visual verification code signal 5206 in relation to the visual content signal, knowledge that a particular content signal 4910 was displayed may be determined by measuring the visual verification code signal 5206.

At step 5508, the digital verification code signal 5302 displayed as a visual verification code signal 5206 is read. In reading the visual verification code signal 5206, the illumination of the visual verification code signal 5206 may be sensed by optical sensors 5204 and measured by circuitry and/or software. At step 5510, a verification code is determined based on the read visual verification code signal 5206. The verification code is the code based on a content identifier and generated to form the digital verification code signal 5302. By determining the verification code as represented by the visual verification code signal 5206, a high level of certainty as to which content signal 4910 displayed can be made for successfully providing verification level 3. The verification level 3 process ends at step B.

FIG. 55B is an exemplary flow chart 5400*b* describing verification level 4, which indicates that a particular content signal 4910 is timely and properly displayed on the visual appliance 308 of FIG. 3C. The process starts at step B, which is an extension of the process of FIG. 55A. At step 5512, operational parameter(s) are sensed. In sensing the operational parameters, the optical sensor(s) 5054 may be utilized to measure operational parameters of the visual appliance 308. The process continues at step A of FIG. 51B so as to determine values of the sensed operational parameters and compare the sensed values with expected operational parameter values to determine (1) the quality of the visual content signal being displayed and (2) perform signature analysis of the operational parameter(s). In one embodiment, signature analysis may be performed by measuring each of the component colors displayed by the visual verification code signal 5206. The verification level 4 process ends at step 5514.

While the principles of the present invention provide for feedback of parameters associated with the display of the content, it should be understood that feedback of parameters associated with audio may also be utilized in accordance with the principles of the present invention. In the case of feeding back audio parameters, measurements of audio characteristics rather than optical characteristics are performed. Such audio characteristics may include fidelity (e.g., static and interference), volume, range dynamics, etc.

In accordance with verification levels (1) and (2), measurement and knowledge of sensory information, such as audio, being communicated to an electronic device (e.g., the visual appliance 308) may establish verification that the sensory information (e.g., audio and/or video) is properly communicated and output or played by the electronic device. A transducer or microphone (not shown) may be utilized to sense the audio produced by the electronic display 310 or, optionally, a remotely located radio. In one embodiment, the feedback of the audio measurements may be utilized to verify that the audio is operating properly. The feedback may additionally be fed-back to provide for the volume to automatically be adjusted to a particular level. For example, in the case of the visual appliance 308 being located in an aisle of a grocery store, the volume may be adjusted to a predetermined level to enable individuals within a certain distance (e.g., eight feet) to hear the audio being produced by the visual appliance 308.

In accordance with verification levels (3) and (4), an audio verification code may cause an audio verification code signal that may or may not be heard by the human ear (i.e., at a very high or low frequency), but is capable of being produced by a sound system and measured by an audio sensor. The measurement of the audio verification code signal may be fed-back to the local server 304 to verify that a particular audio and/or video content is played by the output device (e.g., radio or visual appliance 308). To further improve the audio verification, speech recognition may be used to detect key words or phrases embedded into the audio content to "blend" the audio verification code into the content itself.

An audio selection flag may be established for each visual appliance 308 at the local server 304. If the operator of the visual appliance 308 does not want to play the audio, the audio selection flag may be set to an OFF state, thereby preventing error conditions from being reported when the measurement of the audio signal from the visual appliance 308 results in an OFF condition. Otherwise, an error condition may be reported and the operator may correct the audio problem manually, semi-automatically, or automatically.

System Databases

TABLES 69-71 are exemplary databases that provide for maintaining information associated with the service provider 202 and subscribers 204 and 206. Additionally, the tables for maintaining information in connection with the service provider server 702, local servers 304 and visual appliances 308. Additionally, TABLES 73-75 maintain information associated with the content, operation of the components, and financial obligations (e.g., billing) of the subscribers 204 and 206 to the service provider 202.

TABLE 69

Server Provider Server Database(s)
Local Server Population

Visual Appliance Population
Content
Playlists
Accumulated Logs
Storage Mapping
Reporting
Billing TABLE 69 includes databases maintained by the service provider server 702 that includes information associated with the equipment, (e.g., local servers 304 and visual appliances 308), content and schedules for the content to be played on the visual appliances 308, billing, and reporting. The local server population database is utilized to maintain information associated with local servers 304 that are distributed amongst the subscribers 204 and 206. Such information may include detailed information identifying the local servers, locations, operators, software version, etc. The visual appliance population database includes information associated with the visual appliances 308 that are being utilized on the communications system 200 operating within the facilities 208 of the subscribers 204 and 206. The visual appliance population database may associate the visual appliances 308 in communication with specific local servers 304. Additionally, the visual appliance population database includes identification information associated with the each of the visual appliances 308. Still yet, the visual appliance population database may include other relevant information associated with each visual appliance 308, including software version, processor, age, screen size, refresh rate, etc. The content database may include content information associated with each subscriber 204 and 206. For example, the content information may include location of storage of the content, size of the content, type of content, cumulative size of content, average moves per month of content, etc. The playlist database includes playlists generated maintained by the subscribers 204 and 206 and used to display the content on the visual appliances 308 located at the facilities 208.

The accumulated logs database includes logs generated by the local servers 304 and visual appliances 308. The accumulated logs may include performance, health, number of plays, verification information, etc. It should be understood that the accumulated logs are typically a summary of the log information provided by the local servers 304 and visual appliances 308. However, a complete set of logs may also be maintained.

The storage mapping database includes location of the content being stored for the subscribers 204 and 206. Because the equipment, such as the local servers 304, are owned by the service provider in one business model, the service provider is able to maintain storage for content for the different subscribers anywhere within the network of local servers 304. In other words, because the content is not deemed to be critical business data, the subscribers 204 and 206 may share storage on the local servers 304 with data of other subscribers 204 and 206. Therefore, a storage mapping of the content is utilized by the service provider 202 to maintain location information of the content being stored for each subscriber 204 and 206. The reporting database is utilized for maintaining information associated with reporting usage and billing information to the subscribers 204 and 206. The billing database is utilized for billing purposes for maintaining billing records for the subscribers 204 and 206 for utilization of the services provided by the service provider 202. For example, the billing information may include distribution of data charges via the satellite 218 on a per unit of measure (e.g., megabytes) rate. Additionally, the billing information may include storing content on a per unit per time of measure basis (e.g., megabytes for a month). It should be understood that other billing arrangements may be maintained by the billing databases as described herein and as understood in the art.

TABLE 70

Local Server Database(s)

Local Server ID
Visual Appliance Population
  Type
  Location
  Current Content
  Visual Appliance ID
  MAC Address
  IP Address
  Subscription ID
Accumulated Logs from Visual Appliance
Content
Playlists
  Content
  Start Time
  End Time
  Specific Location
Storage TABLE 70 includes databases maintained by the local server 304. The databases may include local server identification information, visual appliance population, accumulated logs from the visual appliances 308, content, playlists, and storage. The local server identification information may include addresses, serial numbers, etc. The visual appliance population may include type, location (within the facilities 208), current content, visual appliance identification number, MAC address, IP address, etc. The location information may be associated with the planogram of the facilities 208 as understood in the art. The accumulated logs from the visual appliance may include performance, health, type ID, start and stop of content play, number of plays, verification information, or any other information generated by the visual appliances 308. The content database may include a list of content being stored by the local, server 304. In one embodiment, the content database includes a list of content to be played on the associated visual appliances 308.

The playlist database may include content, start time, end time, subscription ID, content ID, visual appliance ID, specific location for the visual appliance 308, etc. The playlist database may be utilized by the manager of a facility 208 to ensure that the content is displayed in association with product located at the facility. For example, a manager of a grocery facility is to notify personnel that a particular visual appliance 308 is to be placed in association (e.g., attached to a particular shelf) with a particular product. For example, a soup advertisement is to have the visual appliance 308 located or positioned in relation to the soup product. Therefore, the facility manager may verify and confirm that the visual appliance 308 to play the soup advertisement is located at or has been moved to a shelf that stores the soup prior to distribution of the content to the visual appliance 308. A verification of the location of the visual appliance 308 may be performed automatically prior to the content being communicated or displayed. If it is determined that the visual appliance 308 is not properly located for display of the particular content, a notification may be sent to the subscriber 204 to move the visual appliance 308. The storage database may maintain information associated with the content to be displayed by the visual appliances 308 at the facility 208. Additionally, the storage database may maintain information associated with all content being stored by the local server 304, whether or not it is to be displayed by the visual appliances 308 at the facility 208.

TABLE 71

Visual Appliance Database(s)

Visual Appliance Address Information
    Local Server ID
    MAC Address
    IP Address
    ESN
    Location ID
    Visual Appliance ID
    Subscription ID
Content
Log
    Performance
    Health
    Type ID
    Start/End
    Number of Plays
    Verification Information
        Correct ID
        Frame Rate
        Color
        Intensity
        Performance
        Correct Resolution for Screen TABLE 71 is an exemplary set of databases that are maintained by the visual appliances 308 of FIG. 3C. The databases may include visual appliance ID information, including local server ID, MAC address, IP address, EFN, location ID, subscription ID, and visual appliance ID number, for example. The location ID may be associated with a planogram mapping of a facility 208 and updated each time the visual appliance 308 is moved from one location to another. The updating may be performed at the visual appliance 308 via a touch screen or local connection to ensure that the location information has been updated appropriately. The content database maintains the current content information that is downloaded onto the visual appliance 308. Content database may include date of download, size of file, name of content, type of content, subscriber ID, etc., as provided by the subscriber 204 into a playlist.

The log database maintains information associated with operation of the visual appliance 308. The log database may include information, such as performance and alerts of the visual appliance 308. For example, the performance may include temperature or other environmental and operational conditions of the visual appliance 308, either determined by the electronic display controller 312 or electronic display 310. The log information may also maintain information associated with the content being displayed by the visual appliance 308, including type ID, start/end time, subscriber ID, and number of plays. The type ID may be the type of content being displayed, such as a still or video image. The start/end times may be utilized to verify that the content is being displayed by the visual appliance 308, including the number of times played on the visual appliance 308. The verification information may be utilized to provide the subscribers 204 and 206 with a "electronic tearsheet" for verification purposes utilizing the verification levels described hereinbefore. The verification information may include correct ID, frame rate, color, intensity, performance, correct resolution for screen and/or other verification information. Accordingly, the visual appliance 308 may perform a summary or accumulation of the log information prior to communicating the log information to the local server 304. By accumulating the log information, a minimal amount of bandwidth and storage space may be utilized while still capturing enough information for reporting and billing purposes. Alternatively, the visual appliance 308 may be notified to upload log information to the local server 304, which may in turn, upload the log information to the service provider server 402.

Because the visual appliance 308 is formed of the electronic display controller 312 and electronic display 310 in either an integrated or separate configuration, a wide variety of designs of the visual appliance 308 may be utilized in accordance with the principles of the present invention. The designs may range from small, light-weight, flat-panel LCD screens that may be integrated onto facility shelves, display stands, peg-board displays, and other display structures. Additionally, the visual appliances may be integrated into functional product dispensers, such as candy machines, soft-drink dispensers, beer-tap dispensers, cigarette machines, etc. In other non-integrated embodiments of the visual appliance 308, the electronic display controller 312 may be coupled to an existing electronic display, such as a CRT or television, for download and display of the content.

System User Interfaces

FIGS. 56A-56D show a set of user interfaces 56 provided by the subscribers 204 and 206 to utilize for providing broadcasting services using the communications system 200. The user interfaces may include a library user interface 5602, scheduling/transmission user interface 5604, site selection user interface 5606, and account interface 5608. The user interfaces 5600 allow the subscribers 204 and 206 to handle content being maintained, communicated, and displayed at the facilities 208 of the subscribers 204 and 206. Additionally, the user interfaces 5600 provide for receiving and reporting account (e.g., billing) information.

Figure 56B:
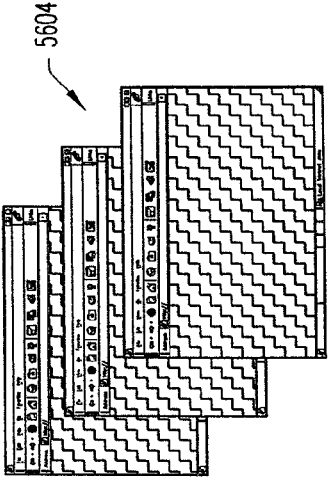
FIGS. 56A-56D are exemplary user interfaces for utilizing the communications system of FIG. 2.
Figure 56D:
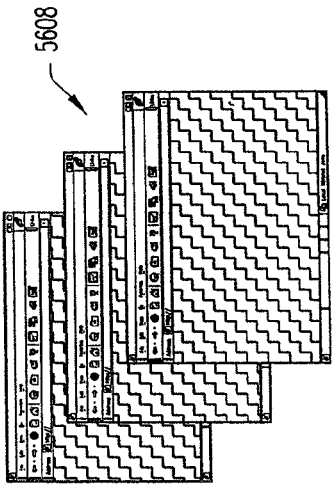
Figure 56A:
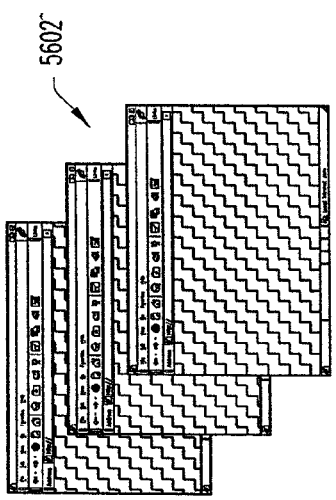

The library user interface 5602 of FIG. 56A allows for the subscribers 204 and 206 to manage content being stored by the service provider 202. The library user interface 5602 may be formed in a hierarchical structure or folder based structure as understood in the art. Alternatively, the library user interface 5602 may utilize a content management system that manages the content in a "black-box" manner. The library or content database partitions the content being stored by the subscribers 204 and 206 so that each subscriber 204 and 206 is prevented from viewing content of other subscribers. The library user interface 5602 may be utilized for subscribers 204 and 206 who engage the system for storage and/or broadcast purposes. In other words, the library user interface 5602 may be utilized for a variety of different subscription types.

Subscribers 204 who upload the content to the library may establish rules for distributing the content via the library user interface 5602. For example, if a new product advertisement is uploaded, but intended to be confidential until a certain release date, the subscriber 204 may set a restriction date by which the service provider server 702 prevents the content from being distributed. Additionally, the library user interface 5602 may enable the user to set rules for storage of the content. For example, a rule may be established to always maintain a backup copy of the content at least one time zone away.

The scheduling/transmission user interface 5604 of FIG. 56B allows the subscribers 204 and 206 to establish times, locations, and/or visual appliances 308 for the content being maintained by the library to be broadcast. The scheduling/transmission interface 5604 may be utilized for generating playlists for the content to be distributed and played on the visual appliances 308. The scheduling/transmission user interface 5604 may provide the subscriber 204 with the ability to categorize the facilities 208 and/or visual appliances 308 into a variety of categories for multicasting the content. For example, the facilities 208 may be categorized into regions (e.g., midwest), venues (e.g., malls), size (e.g., over 100,000 sq. ft.), type (e.g., clothing store), locations (e.g., northeast), owners (e.g., Southwest Enterprises), or any other category for the facilities 208 to be associated. The visual appliances 308 also may be categorized for multicasting, including categorizing by locations (e.g., store fronts), regions (e.g., northeast), venues (e.g., malls), departments (e.g., mens wear), planogram defined locations (e.g., aisle 3), associated products (e.g., jellies), associated services (e.g., lawn services), size (e.g., 48×36-inch electronic displays), or any other category for the visual appliances 308 to be associated. Still yet, the scheduling/transmission user interface 5604 may include pricing to be provided to the subscribers 204 and 206 in a dynamic fashion as the subscribers 204 and 206 define the content to be broadcast. The subscriber 204 and 206 may select content distribution delivery options based on priority. For example, content that is to be broadcast in a few weeks may be sent as low-priority, while content to be broadcast the same day may be selected as a high-priority delivery, which may have a higher cost as established by the communications network service provider 216.

Figure 56C:
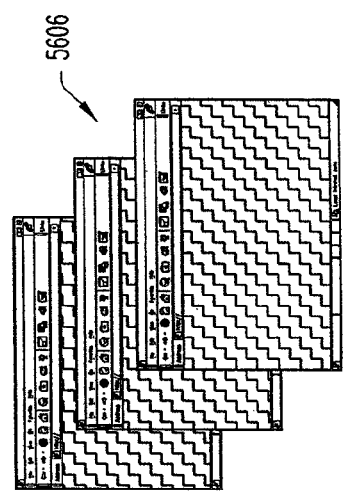

The site selection user interface 5606 of FIG. 56C may provide the subscribers 204 and 206 the ability to establish details for the facilities 208. Such details may include address, facility manager, planogram, size, products, facility hours, venue, owner, facility ID, and/or any other details to assist the service provider 202 and subscriber 204 with providing infrastructure and content distribution services. One or more planogram may be generated and associated with the facilities 208 of the subscribers 204 and 206 on an individual or collective basis, thereby providing the subscribers 204 and 206 an easy way to manage and service infrastructure and schedule the content for broadcasting.

The account information user interface 5608 of FIG. 56D provides the subscribers 204 and 206 the ability to view account information, including billing and revenue. The subscribers 204 and 206 may be billed according to usage of the communications system 200, such as on a per unit of size per unit of time (e.g., megabytes/month). The subscribers 204 and 206 may, in turn, form revenue by billing the advertisers for the broadcast services. Additionally, the account information user interface 5608 may provide for the verification information that indicates that the content was timely and properly displayed on the visual appliances 308. It should be understood that the account information user interface 5608 may provide other administrative information and functionality as understood in the art.

Business Models for System Utilization

Revenue Stream Models

Figure 57:
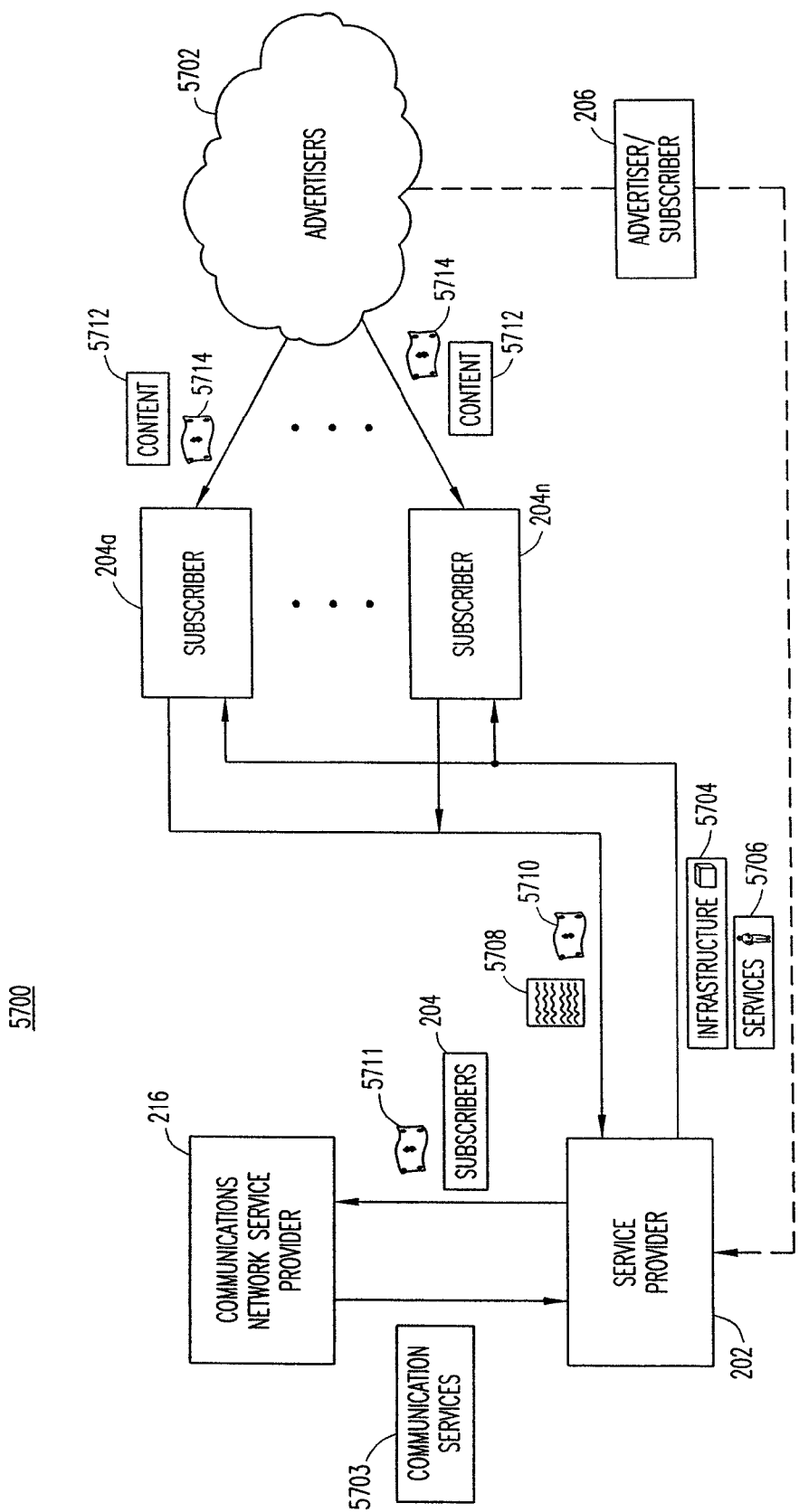
FIG. 57 is an exemplary block diagram that describes a subscription model for the service provider of FIG. 2 to provide the content management and distribution services according to the principles of the present invention.

FIG. 57 is an exemplary block diagram that describes a subscription model 5700 for the service provider 202 of FIG. 2 to provide the content management and distribution services according to the principles of the present invention. Because the cost of the infrastructure is generally cost prohibitive for most retailers, the subscription model 5700 generally enables both large and small subscribers 204a-204n (collectively 204) to utilize the infrastructure and profit from the usage by selling advertisement space, communication, access, capacity to advertisers 5702.

More specifically, the service provider 202 engages the communication services of the communications network service provider 216 to provide communication services 5703 via the communications system 200 for the subscribers 204. The communication services 5903 may be via the satellite 218 to provide substantially complete communications coverage for the United States and/or other continents. To provide the communications network service provider 216 with subscribers 204, the service provider 202 may offer a subscription based service to the subscribers 204 that enables the subscribers 204 to utilize the content delivery maintenance and distribution technology in accordance with the principles of the present invention without having to purchase the infrastructure 5704 (e.g., local servers 304 and visual appliances 308). In providing the subscriptions 5708 to the subscribers 204, the service provider 202 establishes subscriptions 5708 for the infrastructure 5704 and services 5706 at minimal or no cost to the subscribers 204. In one embodiment, the subscriber 204 pays usage fees of the infrastructure 5704 irrespective of the type or amount of infrastructure 5704 utilized. In another embodiment, the subscriber 204 pays for usage of a certain number of visual appliances 308. The usage fees may include communication and/or storage fees in terms of capacity communicated and/or content stored over a given time period.

The infrastructure 5704 may include all of the equipment necessary to operate as a broadcast provider for advertisers within the facilities 208 of the subscriber 204. For example, the infrastructure 5704 may include a home office and individual facility equipment. The home office equipment may include a satellite dish, home office server, home office terminals, and home office network equipment. The individual facility equipment may include a satellite dish 302, local server 304, wireless access point 314, wired access point, storage units, and visual appliances 308.

Additionally, the service provider 202 provides the services 5706 to install and maintain the infrastructure 5704. Because the infrastructure 5704 is not owned by the subscriber 204, but merely utilized, the subscriber 204 may receive the installation and maintenance services 5706 as part of a subscriber agreement or subscription 5708. And, because the infrastructure 5704 is not owned by the subscriber 204, the subscriber 204 may treat the infrastructure usage as an expense rather than having to treat the infrastructure 5704 as a capital asset on a balance sheet, thereby minimizing exposure to the equipment and technology becoming outdated while still being depreciated.

In addition to the installation and maintenance services 5704 provided by the service provider 202, the service provider 202 provides the content management and distribution services for the subscribers 204. As previously discussed, the service provider 202 offers a network interface to enable the subscribers 204 to upload the content of the advertisers 5702 and schedule the content for distribution and play on the visual appliances 308 at the facilities of the subscribers 204. Because the subscribers 204 operate as the broadcaster, the subscribers 204 have incentive to seek advertising from the advertisers 5702 from both an advertising revenue and product movement (i.e., sales) point-of-view. Utilizing the revenue model 5700 of FIG. 57, the subscribers 204 may incur advertising revenue without having to manage and maintain the infrastructure 5704.

The subscription 5708 may establish subscription fees 5708 for usage of the infrastructure 5704 to be in the form of usage fees for both communication services 5703 and storage for the content. For the communication services 5903, the subscription fees 5710 may be established as a fee per billable unit of measure over a unit of time. For example, the subscriber 204 may by charged a certain amount of money per megabyte per month (e.g., $1/megabyte/month). Further, the service provider 202 may be able to predetermine a date of profitability by setting a minimum subscription fee on the unit of time (e.g., monthly). If the subscriber 204 is able to sell additional content broadcasting services and the volume of communications is over the minimum unit, then a premium communications fee 5711 may be charged to the subscriber 204. However, while the communications fee may be charged to the subscriber 204, the communications fee may be passed through to the advertisers 5702 that utilize the broadcasting services so as to minimize cost to the subscribers 204. Depending on the agreement between the subscriber 204 and advertisers 5702, the overhead (e.g., communications and storage fees) may be applied to the cost of advertising for the advertisers 5702.

For the storage fees, the service provider 202 may offer the subscriber 204 storage fees for the content on a per unit measure over a unit of time (e.g., megabytes per month) Additionally, a minimum amount of storage capacity for content without cost on a unit of time basis (e.g., monthly) for promotional purposes, based on the number of visual appliances 308 utilized, based on the number of facilities 208 that the subscriber 204 owns, based on the subscription fees, etc. Any storage capacity utilized over the minimum, the service provider 202 may assess a premium storage fee to the subscriber 204. Additional discussion with regard to distributed storage utilizing the principles of the present invention is provided in conjunction with FIGS. 65 and 66.

In operation, the subscribers 204 sell advertising services, access, capacity, advertising space, etc., which include the communication services 5703 of the communications network service provider 216 and content management by the service provider 202, to the advertisers 5702 within the facilities 208 of the subscribers 204. In return for the broadcasting services, the subscribers 204 collect advertising fees 5714, which may be include collecting for miscellaneous fees, such as communication and/or storage premium fees, passed through from the subscriber 204 to the advertiser 5702. The subscribers 204 upload and schedule the content 5712 to be distributed to the proper visual appliances 308 as requested by the advertisers 5702 as discussed hereinbefore. Accordingly, the cost for broadcasting and/or storing the content may be applied to the advertising fees 5714 paid by the advertisers 5702.

If the subscriber 206 is a manufacturer or advertiser that places the visual appliances 308 into the facilities 208 of its customers (e.g., grocery store), then the subscriber 206 may not have advertisers 5902 because the subscriber 206 is, in-fact, the advertiser. The subscriber 206 in this case may have a lower overhead cost because the subscriber 206 may not pay for surcharges that the subscriber 204 (e.g., retailer) would assess to the subscriber 206. Additionally, the subscriber 206 essentially guarantees the dedicated usage of the infrastructure 5904 (e.g., visual appliances 308) over time. In other words, if the brand subscriber 206 is large enough, the brand subscriber 206 may purchase a long-term subscription 5908 from the service provider 202, thereby making the subscription 5708 more cost effective for the subscriber 206. The subscriber 206 may thereafter place the visual appliances 308 into the facilities 208 in association with the products of the subscriber 206 and control the content being distributed to the visual appliances 308. If the facilities 208 of the customers of the subscriber 206 do not have the necessary infrastructure 5904 for communication of the content to the visual appliances 308, then the brand subscribers 206 may, in essence, "push" and/or subsidize the customers to become subscribers 204 of the service provider 202. Brand subscribers 206 who push the customers may achieve a "charter subscriber" status, which enables the brand subscriber 206 to operate under a "special" agreement with the service provider, thereby enabling the charter subscriber to service select retailers.

In one embodiment, the subscription fees are based on the costs of the infrastructure utilized by the subscriber 204. In determining the capacity utilization fees, a total cost of the local server 304, receiver 303, visual appliances 308, and wireless access point 314 may be computed and divided into the term of the subscription (e.g., 5 years).

To produce revenue to continue to produce the infrastructure for subscribers, initial subscriptions sold to large business entities having good credit (e.g., credit rating of A) may be sold to financial institutions for a discount, thereby producing revenue. Once the revenue is no longer needed to capitalize the infrastructure, the service provider 202 may keep the subscriptions and the subscription fees generated therefrom.

Figure 58:
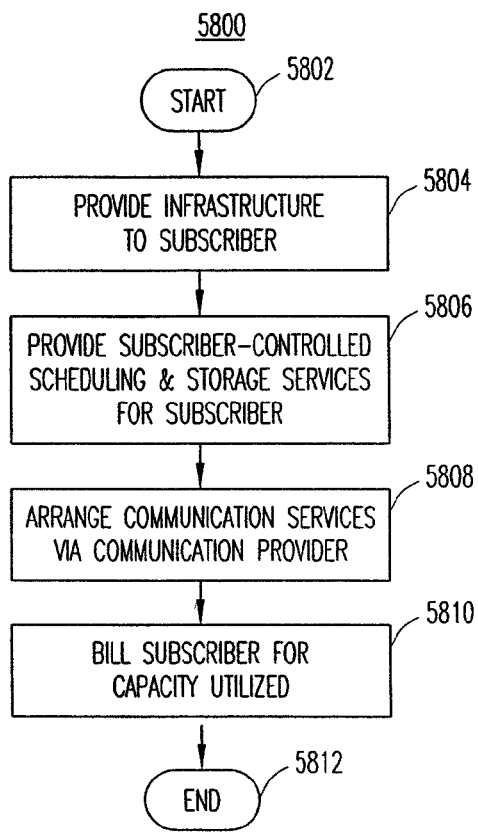
FIG. 58 is an exemplary flow diagram describing operation of the revenue stream depicted in FIG. 57.

FIG. 58 is an exemplary flow diagram 5800 describing operation of the revenue stream 5700 depicted in FIG. 57. The process for establishing the revenue stream for the subscriber 202 starts at step 5802. At step 5804, infrastructure is provided to the subscriber 204. The infrastructure may be provided to the subscriber 204 at, below, or no cost to the subscriber 204 as payment for the infrastructure 5704 is supported by the subscription 5708 for utilizing the infrastructure 5704 via content management and communication services by the service provider 202. At step 5806, subscriber-controlled scheduling and storage services are provided for the subscriber 204. where the subscriber-controlled scheduling services allow the subscribers to schedule the content 5712 for distribution and display on the visual appliances 308. Because the subscriber 204 controls the scheduling of content for distribution and display at the visual appliances 308 located in the facility(s) 208 of the subscriber 204, the subscriber 204 is motivated to schedule as many advertisements or content delivery as possible. At step 5808, communication services 5703 via the communications network service provider 216 are arranged. In utilizing the communications system 200, the subscriber 204 may be billed on a capacity utilization basis. At step 5810, the subscriber is billed for the capacity utilized. The process ends at step 5812.

Network Affiliate Model

Figure 59:
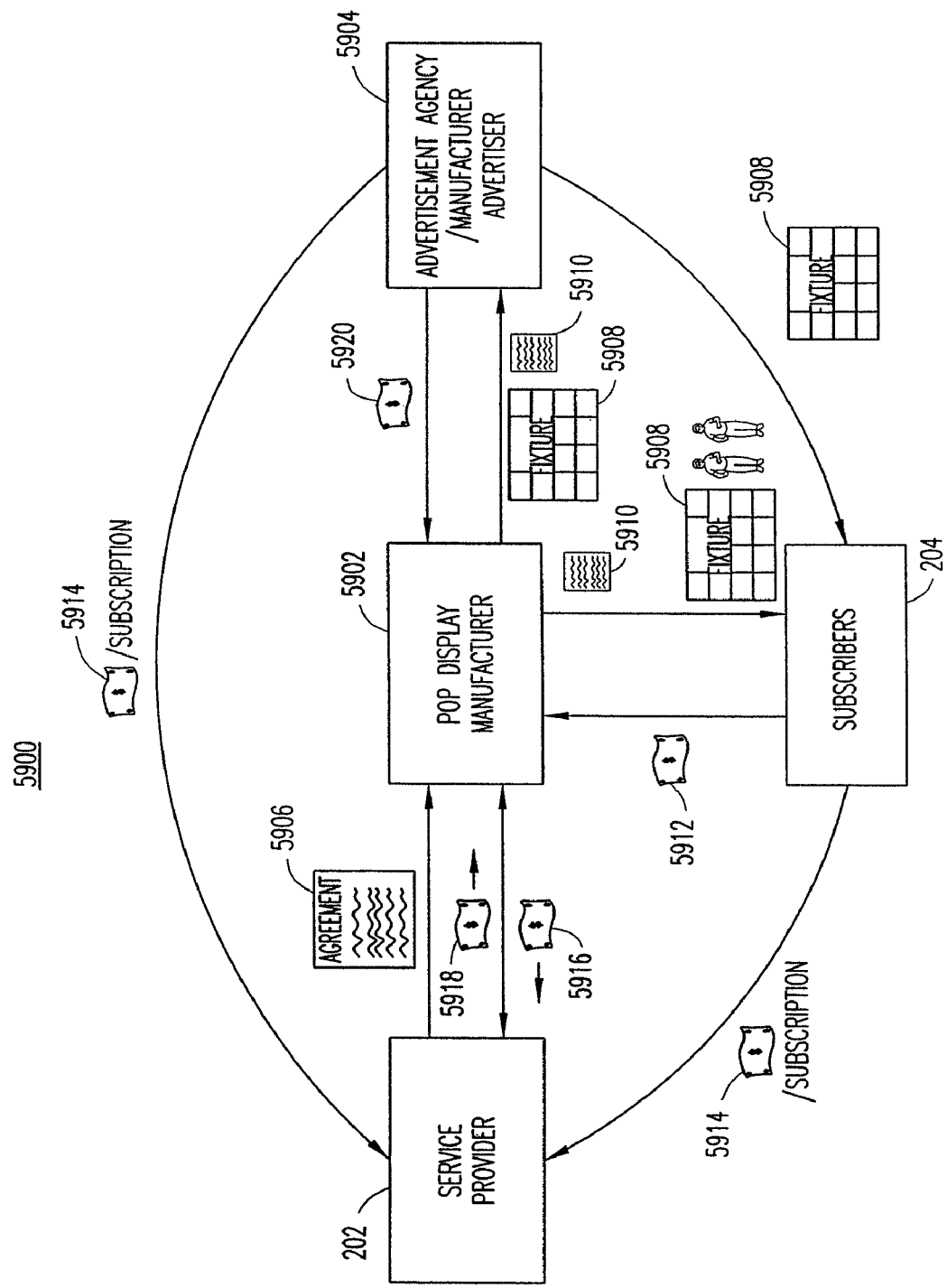
FIG. 59 is an exemplary block diagram that describes a subscription model that utilizes a point-of-purchase (POP) display manufacturer and advertisement agencies/manufacturer-advertiser to offer the content management and distribution services of the service provider of FIG. 2 in accordance with products and/or services offered by the POP display manufacturer and advertisement agency/manufacturer-advertiser.

FIG. 59 is an exemplary block diagram that describes a network affiliate subscription model 5900 that utilizes a point-of-purchase (POP) display manufacturer 5902 and advertisement agencies/manufacturer advertiser 5904 to offer the content management and distribution services of the service provider 202 of FIG. 2 in accordance with products and/or services offered by the POP display manufacturer 5902 and advertisement agency/manufacturer advertiser 5904. POP display manufacturers 5902 face a competitive market with regard to selling point-of-purchase displays. The business model for POP display manufacturers 5902 has traditionally been to manufacture and sell the point-of-purchase displays without potential for any residual financial benefits after the sale of the displays.

In accordance with the principles of the present invention, the POP display manufacturer 5902 may execute an agreement 5906 that enables the POP display manufacturer 5902 to incorporate the visual appliances 308 into point-of-purchase displays 5908 and sell subscriptions 5910 to subscribers 204 with the point-of-purchase display 6908 for the service provider 202. The POP display manufacturer 5902 may reduce or eliminate the cost of the point-of-purchase display 5908 by selling the subscription 6910 due to the service provider 202 providing residual revenue over the life of the subscription 5910. Accordingly, the subscriber 204 may pay the POP display manufacturer 5902 fees 5912 for the cost of the point-of-purchase display 5908 and the service provider 202 fees 5914 for the usage of the services. Additionally, the POP display manufacturer may pay fees 5916 to the service provider for infrastructure and/or services in producing the point-of-purchase display 5908 and the service provider 202 may financially compensate to the POP display manufacturer 5902 for the initial sale of the subscription 5910 and residual revenue in the form of fees 5918 during the lifetime of the subscription 5910.

The POP display manufacturer 5902 may additionally and/or alternatively sell the point-of-purchase display 5908 for fees 5902 to the advertisement agency/manufacturer advertiser 5904, who may sell or distribute the point-of-purchase display 5908 to the subscriber 204 to assist with sales of products and/or services. The POP display manufacturer 5902 may sell a subscription 5910 to the advertisement agency/manufacturer advertiser 5904 with the point-of-purchase display 5908 to offset the cost of the point-of-purchase display 5908, optionally. Accordingly, the advertisement agency/manufacturer advertiser 5904 may pay the subscription fee 5914 directly to the service provider 202. Accordingly, the POP display manufacturer 5902 may receive financial compensation for the sale of the subscription 5910 and for residual revenue during the lifetime of the subscription 5910.

Figures 60A, 60B:
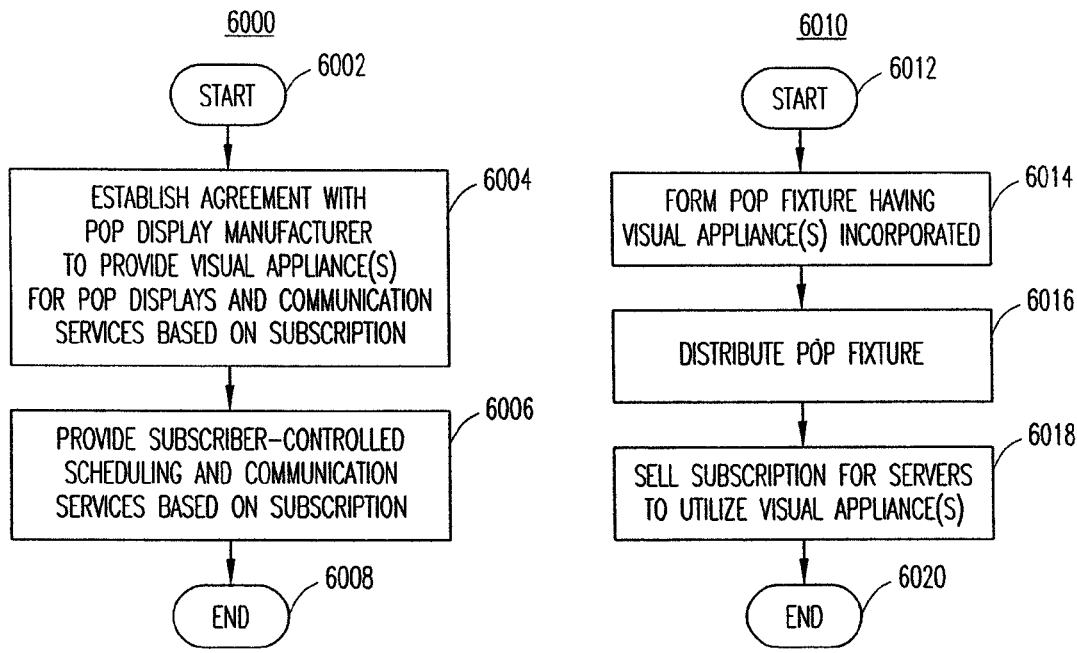
FIG. 60A is an exemplary flow diagram describing the subscription model of FIG. 59.
FIG. 60B is an exemplary flow diagram describing the subscription model of FIG. 59 from the view of the POP display manufacturer.

FIG. 60A is an exemplary flow diagram 6000 describing the subscription model 5900 of FIG. 59. The subscription model process starts at step 6002. At 6004, an agreement 5906 is established with the POP display manufacturer 5902 to provide visual appliance(s) 308 for point-of-purchase displays 5908 and communication services based on a subscription that may be offered by the POP display manufacturer 5902 to subscribers 204 and 206. The visual appliance(s) 308 may be provided to the POP display manufacturer 5902 at, below, or no cost to the POP display manufacturer 5902 for integration into the point-of-purchase displays 5908 so as to encourage the POP display manufacturer 5902 to incorporate the visual appliances 308 into the point-of-purchase displays 5908. At step 6006, subscriber-controlled schedule and communications services based on the subscription 5910 may be provided to the subscribers 204 and 206. The process ends at step 6008.

FIG. 60B is an exemplary flow diagram 6010 describing the network affiliate subscription model 5900 of FIG. 59 from the view of the POP display manufacturer 5902. The process starts at step 6012. At step 6014, a point-of-purchase fixture or display 5908 having at least one visual appliance incorporated therein is formed. The point-of-purchase fixture 5908 is distributed to subscribers 204 and 206 who utilize the point-of-purchase fixtures 5908 in displaying products at step 6036. At step 6018, a subscription is sold by the POP display manufacturer 5902 for services to utilize the visual appliance(s) 308 to the subscribers 204 and 206. The process ends at step 6020.

Sign Management Model

Figure 61:
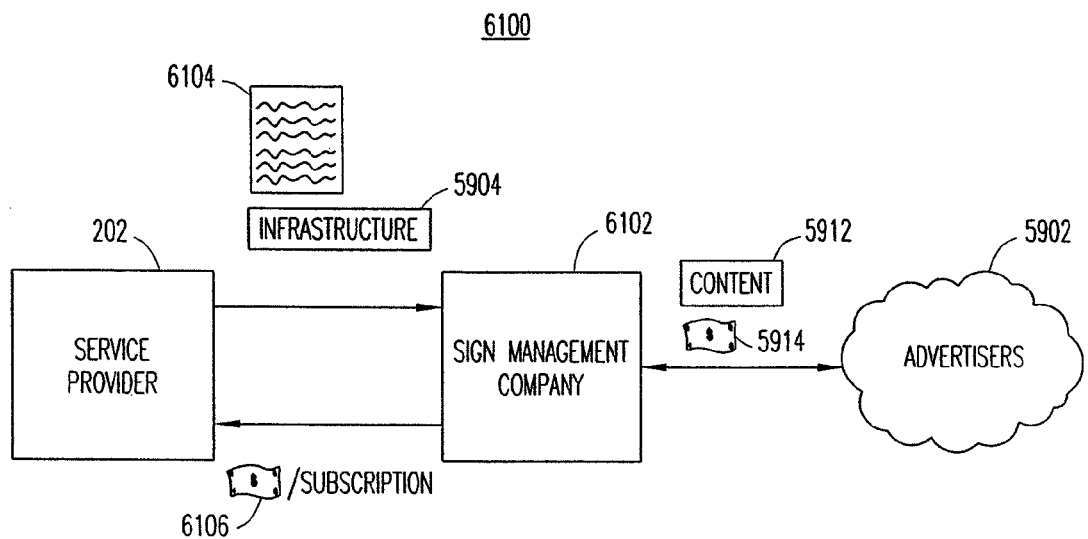
FIG. 61 is an exemplary block diagram describing a subscription model from the service provider of FIG. 2 to a sign management company.

FIG. 61 is an exemplary block diagram describing a subscription model from a service provider 202 of FIG. 2 to a sign management company 6102. As understood in the art, the sign management company 6102 typically manages out-of-home signs that are visible to the viewing public. Because the sign management company 6102 currently manages established signs located on prime areas of real estate, the service provider 202 is motivated to work with the sign management company 6102. The sign management company 6102 may execute a subscription 6104 to utilize the infrastructure 5904 provided by the service provider 202. The subscription 6104 may obligate the service provider 202 to replace the current signs of the sign management company 6102 with visual appliances 308 and obligate the sign management company 6102 to utilize the content management and distribution services of the service provider 202 for a minimum number of years, for example. As understood in the art, the sign management company 6102 sells advertising space for the sign locations to advertisers. In accordance with the principles of the present invention, the sign management company 6102 may sell advertisement space on the visual appliances 308 for the replaced signs and manage the content provided by the advertisers 5902 by utilizing the content management services provided by the service provider 202. Accordingly, a subscription fee 6106 may be paid to the service provider 202 on a substantially periodic basis based on usage of the communication and storage capacity utilized by the sign management company 6102 for distribution and storage of the content 5912. Further in accordance with the principles of the present invention, the service provider 202 may provide the infrastructure 5904 to the sign management company 6102 at, below, or without cost to the sign management company 6102.

Billing System Bridge Model

Figure 62:
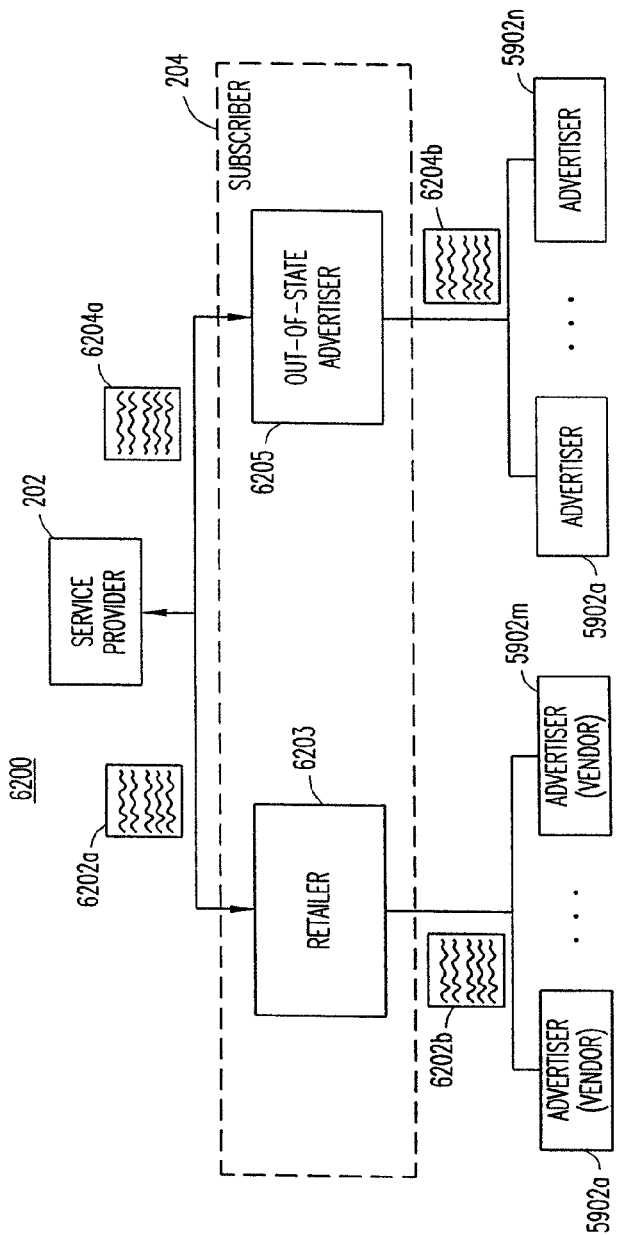
FIG. 62 is an exemplary block diagram that provides for a billing system bridge for subscribers of the service provider of FIG. 2.

FIG. 62 is an exemplary block diagram 6200 that provides for a billing system bridge for subscribers 204 of the service provider 202. performing the billing system bridge, the service provider 202 utilizes the infrastructure 5904 provided to the subscribers 204 to electronically distribute bills or invoices 6202a and 6204a to the different subscribers 204. As shown, the subscribers 204 may include a retailer 6203 and an out-of-home advertiser 6205. The bills 6202a and 6204a may be "passed through" the subscribers 204 to the advertisers 5902a-5902m and 5902a-5902n, respectively, in the form of bills 6202b and 6204b. The billing system bridge, which may be operated by the server utilized by the home office of the subscribers 204, may (i) operate on or in conjunction with an accounting software package as understood in the art and (ii) incorporate the bills 6202a and 6204a generated by the subscribers 204 utilizing the services of the service provider 202 into the bills 6202b and 6204b for the advertising services provided to the advertisers 5902. In other words, the billing system bridge may seamlessly provide a mechanism for passing the bills from the service provider 202 to the advertisers 5902 for the subscribers 204. Alternatively, the bills 6202a and 6204a may be formatted in accordance with information of the subscribers 6203 and 6205, including letterhead, cost structures, etc., and be merely sent from the subscribers 204 to the advertisers 5902 without incorporating into an account package managed by the subscribers 204.

Figure 63A:
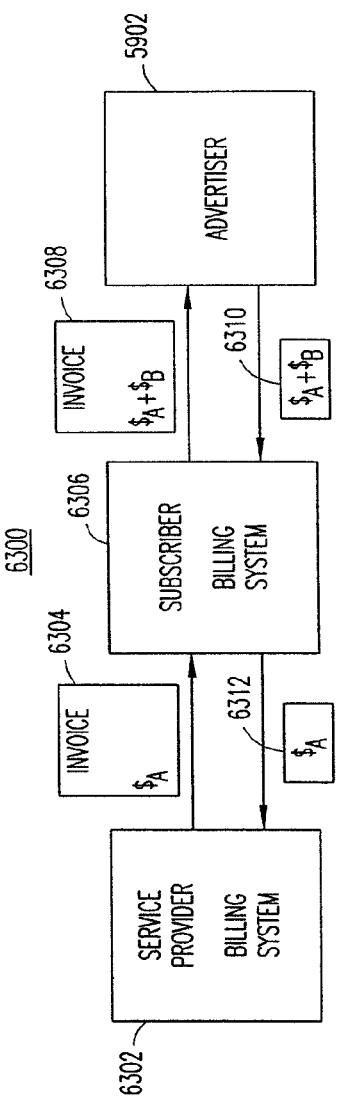
FIG. 63A is another billing system bridge model for subscribers to bill advertisers utilizing the communications system of FIG. 2.

FIG. 63A is another billing system bridge model 6300 for subscribers 204 to bill advertisers 5902 utilizing the communications system 200 of FIG. 2. As shown, a service provider billing system 6302 issues an invoice 6304 to a subscriber billing system 6306, which may operate on a server utilized by a home office of the subscriber 204. The invoice 6304 may include fees generated by the subscriber 204 utilizing the communications and storage services provided by the service provider 202. As shown, the fees of the invoice 6304 are for a total of $A for the advertiser 5902. In response to the subscriber billing system 6306 receiving the invoice 6304, an invoice 6308 including (i) the fees $A for the service provider fees and (ii) the costs or fees $B associated with the advertiser 5902 for advertising on the visual appliances 308 operated by the subscriber 204 at the facilities 208. As shown, the invoice 6308 is for a total of $A+$B. Alternatively, a percentage markup may be applied to the bill for the subscriber 204. In response to the invoice 6308, the advertiser 5902 sends the subscriber 204 a payment 6310 for $A+$B. The subscriber 204, in turn, sends the service provider 202 a payment 6312 of $A. By utilizing such a billing system bridge model 6300, the fees for utilizing the content management and distribution services provided by the service provider 202 to the subscriber 204 may be seamless and/or invisible to the advertiser 5902. It should be understood that the invoice 6304 provided by the service provider billing system 6302 may be on an individual advertiser basis or on a cumulative basis for all of the advertisers 5902 serviced by the subscriber 204 depending on how the subscriber billing system 6306 is set-up.

Figure 63B:
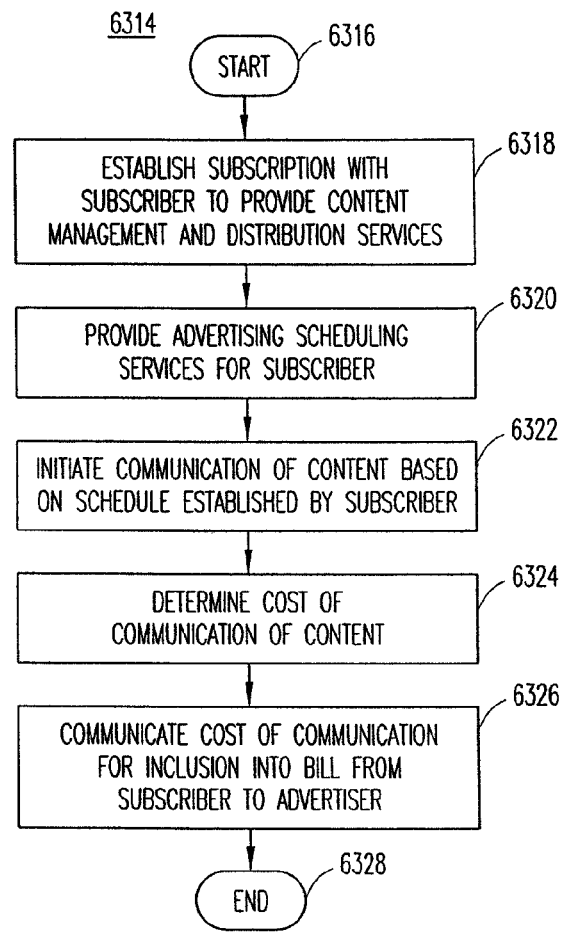
FIG. 63B is an exemplary flow diagram describing a process for performing the billing system bridge model of FIG. 63A.

FIG. 63B is an exemplary flow diagram 6314 describing a process for performing the billing system bridge model 6300 of FIG. 63A. The process starts at 6316. At step 6318, a subscription is established with the subscriber 204 to provide content management, distribution and storage services. At step 6320, advertising scheduling services for the subscriber 204 are provided. At step 6322, communication of the content based on a schedule established by the subscriber 204 is initiated. The cost of content management and communication for the advertising services are determined at step 6324. At step 6326, the cost of communication for inclusion into a bill from the subscriber 204 to the advertiser 5902 is communicated. In one embodiment, the cost is a cumulative cost for all advertisers 6302 of the subscriber 204. Alternatively, the cost of content management and communication is separated for individual advertisers 6302 of the subscriber 204. The process ends at step 6328.

System Appendages Model

Figure 64:
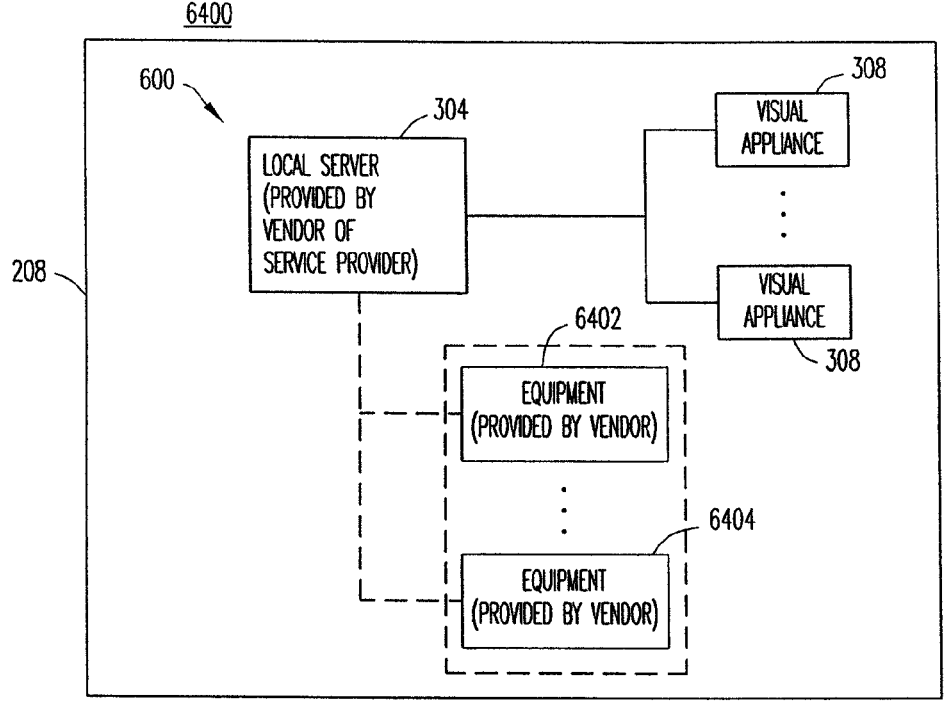
FIG. 64 is an exemplary block diagram representative of a local network of a facility of the subscriber of FIG. 2.

FIG. 64 is an exemplary block diagram 6400 representative of the local network 300b of a facility 208 of a subscriber 204 of FIG. 2. The local network 300b may utilize the infrastructure 5904 provided by the service provider 202 and other equipment provided by a vendor of the service provider 202. Vendors of the service provider 202 may be providers or manufacturers of the local server 304, who also produce retail equipment 6402 and 6404 that the subscriber 204 utilizes at the facility 208 for performing retail functions. For example, the vendor may provide cash registers that retailers utilize in performing operations for retail and services. Additionally, and/or alternatively, the vendors may provide services that the subscribers 204 utilize in performing the retailing services. For example, the communications network service provider 216 may provide credit card confirmation communication services for the subscribers 204, where the retailers currently purchase infrastructure for the credit card confirmation communication services.

Accordingly, the vendors of the service provider 202 may sell or provide subscriptions to the subscribers 204 to the content management and distribution services provided by the service provider 202 in conjunction with selling equipment and/or services to the subscribers 204. In other words, the vendors may sell appendages to the infrastructure 5904 provided by the service provider 202 that operates in conjunction with the infrastructure 5904. For example, cash registers may be connected to the local server 304 or other services that simultaneously operates the visual appliances 308. This selling of a subscription by the service provider 202 to the subscribers 204 may be a "value-added" service that entices the subscribers 204 to purchase the equipment 6402 from the vendors. It should be understood that the vendor equipment 6402 may be provided at, below or without cost to the subscribers 204 in connection with the purchasing of a subscription to the services of the service provider 202. Alternatively, the infrastructure 5904 may be provided to the subscribers 204 in connection with purchasing of a subscription directly from the service provider 202 and the equipment 6402 and 6404 may be provided to the subscriber 204 as an add-on to the infrastructure 5904, thereby enticing the subscriber 204 to purchase a subscription from the service provider 202. Still yet, the service provider 202 may offer reduced or free credit card verification communication services from the communications network service provider 216, or network operated by the service provider 202, in conjunction with a subscriber 204 purchasing the subscription for the content management and distribution services. Again, because the service provider 202 is able to accurately determine a minimum amount of revenue generated by selling subscriptions to the subscribers 204 for the content management and distribution services over a long term period (e.g., five years), the service provider 202 may provide a variety of different subscription options in conjunction with equipment and services provided by vendors of the service provider 202.

A variety of functional operations may be provided by the local server 304 due to the equipment 6402 and 6404 and visual appliances 308 being simultaneously managed by the local server 304. One such functional operation may include dynamic pricing of products. Because the local server 304 may monitor product sales real-time, pricing changes may be displayed on the visual appliances 308 in substantial real-time. If a product is briskly or sluggishly selling, then the price may be dynamically altered by providing notice to shoppers via the visual appliance 308 located at the shelf of the product. Another functional operation may include the dynamic display of one content versus another based on the sales volume. For example, if sales are below average, a more consumer appealing advertisement may be played on the visual appliance 308, possibly based on time of day if more risqué content is to be played.

Distributed Storage Model

Figure 65:
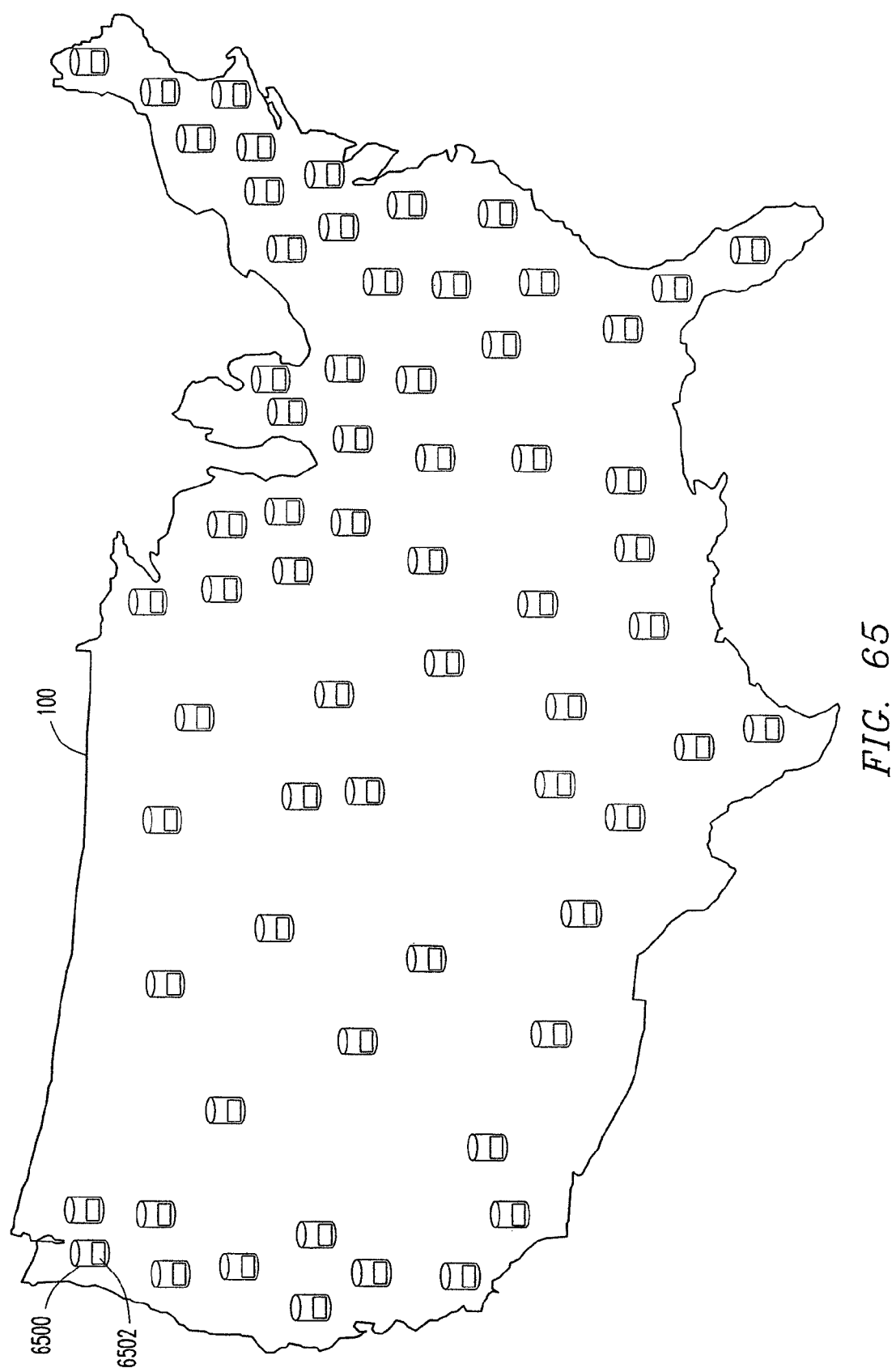
FIG. 65 is an exemplary map showing a distributed network of storage unit located in facility of subscribers of the service provider of FIG. 2.

FIG. 65 is an exemplary map 100 showing a distributed network of storage unit 6500 located in facility 208 of subscribers 204 of the service provider 202 of FIG. 2. The storage units 6500 are typically under-utilized by the facilities 208 utilizing the visual appliances 308. Because the service provider 202 owns the storage units 6500, the service provider 202 may utilize excess capacity 6502 in the storage unit 6500 for storing content of subscribers 204 other than those utilizing the storage units 6500 for communication operations at the facilities 208. The content is generally deemed to be non-critical data of a subscriber 204 and may therefore be stored in the storage unit 6500 with content of other subscribers 204.

In providing for subscribers 204 to share available storage capacity on the storage unit 6500, the service provider 202 may charge subscribers 204 for actual storage capacity utilized on a per storage amount per time unit basis (e.g., MB per month). In providing for the storage capacity on a per time unit basis, the service provider 202 may allow the subscribers 204 to have a free amount of storage capacity on a per month basis and pay for additional storage capacity utilized on a premium basis, for example. Alternatively, the subscribers 204 may simply be charged on an actual storage capacity amount used over a given time period. In one embodiment, the actual storage capacity is an average storage capacity utilized over the given time period. A variety of different billing models may be utilized, but, essentially, the subscriber of storage capacity need not pay for the storage unit 6500 either located in a facility 208 or central location of the service provider 202 as the storage units 6500 are owned and/or managed by the service provider 202. Therefore, the subscriber 204 need not pay for unutilized storage capacity. It should be understood that subscribers of storage capacity need not be subscribers of the content management and distribution services of the service provider 202.

Because the storage units 6500 are established in a distributed network across the United States, for example, the service provider 202 may strategically locate and make redundant the content of the subscribers 204 and 206 in a variety of locations or regions around the country to substantially minimize the risk of loss for the content based on a regional disturbance within the distributed network. Because the storage unit 6500 may be linked via the satellite 218 (FIG. 2) managed by the communications network service provider 216, content may easily be communicated between locations. Terrestrial communication may alternatively be utilized to communicate the content for storage purposes.

Storage rules may be generated to provide for the management of the content in accordance with the desires of the subscribers 204. For example, a subscriber 204 may wish to not have content of other subscribers 204 located on storage units 6500 operating within the facilities 208 of the subscribers 204. In such a case, the service provider 202 may charge additional fees to the subscriber 204 for making unavailable the excess storage capacity of the storage unit 6500 operating within the facilities 208 of the subscriber 204. It should be understood that other rules may be utilized to charge fees or manage data amongst the storage units 6500 in accordance with the principles of the present invention (i.e., service fees to move data in and out in addition to bandwidth charges).

Figure 66:
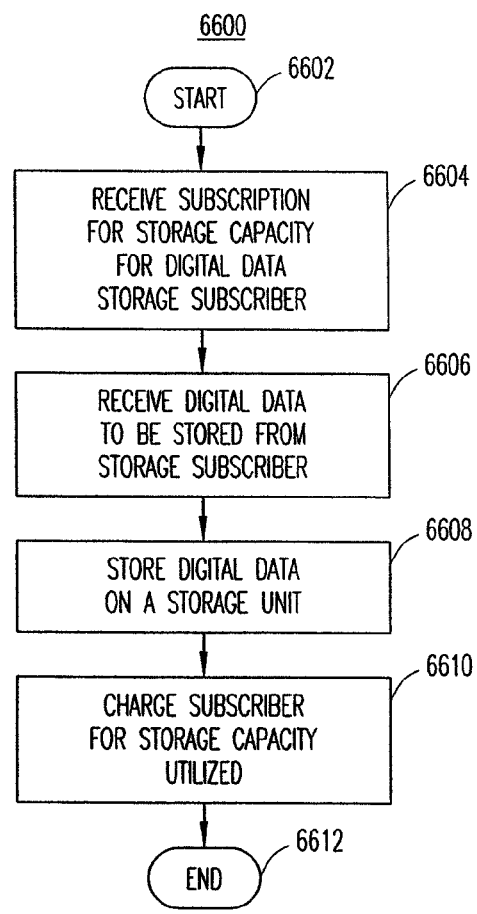
FIG. 66 is an exemplary flow diagram describing a data storage model utilizing the storage units of FIG. 65.

FIG. 66 is an exemplary flow diagram 6600 describing a data storage model utilizing the storage units of FIG. 65. The process starts at step 6602. At step 6604, a subscription for storage capacity for digital data is received from a storage subscriber. Digital data to be stored on the storage unit 6500 is received from the storage subscriber at step 6606. At step 6608, the digital data is stored on a storage unit 6500. It should be understood that the digital data may be stored on storage unit 6500 operated by another subscriber 204 as the storage unit 6500 is merely being utilized by the subscriber 204, but owned and/or managed by the service provider 202.

In storing the digital data on the storage unit 6500, rules may be utilized to determine where and when to store and distribute the digital data. The subscription for storage capacity may allow the subscriber to have a fixed amount of storage area over a given time period. For example, the fixed amount of storage capacity may be in terms of megabytes per month. Any storage capacity utilized by the storage subscriber over the fixed amount of storage capacity (e.g., 100 megabytes) per month may be charged a premium to the storage subscriber by the service provider 202. Alternatively, the subscriber may pay for an actual amount of storage capacity utilized over a given time period without having to purchase a minimum amount of storage capacity via the storage subscription fee. Other subscriber models may be utilized for providing storage capacity for the storage subscribers utilizing the distributed network of storage units 6500. At step 6610, the storage subscriber is charged for the storage capacity utilized on an actual or average basis, for example, in accordance with the subscription. The process ends at step 6612.

The previous description is of a preferred embodiment for implementing the invention, and the scope of the invention should not necessarily be limited by this description. The scope of the present invention is instead defined by the following claims.

What is claimed:

1. A method for providing a subscription-based, electronic signage advertisement service to retailers, said method comprising:
    establishing a retailer as a subscriber for use of an electronic display, a subscription agreement enabling the retailer to use the electronic display and receive communications services for content to be distributed to the electronic display;
    providing the electronic display to the retailer, the electronic display being configured to receive and display the content;
    configuring the electronic display as a network node for content to be distributed;
    storing content in a data repository, the content to be distributed to the electronic display at the retailer;
    distributing the content via a communications network to the electronic display for display at the retailer; and
    displaying the content on the electronic display.

2. The method according to claim 1, wherein said providing of the electronic display to the subscriber is performed without cost to the subscriber in lieu of subscription fees.

3. The method according to claim 1, further comprising:
    determining a cost for communications services; and
    billing the retailer for the communications services.

4. The method according to claim 3, wherein determining a cost for communications includes determining a cost for communications services based on capacity.

5. The method according to claim 4, wherein determining a cost for communications includes determining a cost for communications services based on capacity utilized over a time duration.

6. The method according to claim 1, further comprising:
    establishing a second retailer as a subscriber for use of a second electronic display, a second subscription agreement enabling the second retailer to receive communications services for second content to be distributed to the second electronic display;
    providing the second electronic display to the second retailer, the electronic display being configured to receive and display the second content;
    configuring the electronic display of the second retailer as a second network node for the second content to be distributed;

storing second content in the data repository, the second content to be distributed to the second electronic display at the second retailer;

distributing the second content to the second electronic display for display; and displaying the second content on the second electronic display.

7. The method according to claim 1, wherein establishing the retailer as a subscriber further includes providing the retailer with network equipment without cost, the network equipment being configured to receive and distribute the content set to the electronic display at the retailer.

8. The method according to claim 1, wherein establishing the content includes providing advertisers with the ability to submit advertisements for distribution to the electronic display.

9. The method according to claim 1, wherein establishing the content includes enabling the retailer to establish a playlist of content for communication to the electronic display.

10. The method according to claim 1, further comprising:

establishing the retailer as a subscriber for use of a second electronic display, the subscription agreement enabling the retailer to receive communications services for second content to be distributed to the second electronic display;

providing the second electronic display to the retailer, the electronic display being configured to receive and display the second content;

configuring the electronic display of the retailer as a second network node for the second content to be distributed;

storing second content in the data repository, the second content to be distributed to the second electronic display at the retailer;

distributing the second content to the second electronic display for display at the retailer; and displaying the second content on the second electronic display at the retailer.

* * * * *